(12) United States Patent
Singh et al.

(10) Patent No.: US 12,080,440 B2
(45) Date of Patent: *Sep. 3, 2024

(54) NUCLEAR WASTE CASK WITH IMPACT PROTECTION, IMPACT AMELIORATION SYSTEM FOR NUCLEAR FUEL STORAGE, UNVENTILATED CASK FOR STORING NUCLEAR WASTE, AND STORAGE AND TRANSPORT CASK FOR NUCLEAR WASTE

(71) Applicant: Holtec International, Camden, NJ (US)

(72) Inventors: Krishna P. Singh, Jupiter, FL (US); Charles W. Bullard, II, Merion Station, PA (US); Xuejun Zhai, Mount Laurel, NJ (US); John D. Griffiths, Deptford, NJ (US)

(73) Assignee: Holtec International

( * ) Notice: Subject to any disclaimer, the term of this patent is extended or adjusted under 35 U.S.C. 154(b) by 0 days.

This patent is subject to a terminal disclaimer.

(21) Appl. No.: 18/109,290

(22) Filed: Feb. 14, 2023

(65) Prior Publication Data
US 2023/0197304 A1 Jun. 22, 2023

Related U.S. Application Data

(63) Continuation of application No. 17/374,005, filed on Jul. 13, 2021, now Pat. No. 11,610,696, which is a
(Continued)

(51) Int. Cl.
*G21F 5/12* (2006.01)
*G21F 5/012* (2006.01)
*G21F 5/08* (2006.01)

(52) U.S. Cl.
CPC ............... *G21F 5/12* (2013.01); *G21F 5/012* (2013.01); *G21F 5/08* (2013.01)

(58) Field of Classification Search
CPC ................... G21F 5/08; G21F 5/008
(Continued)

(56) References Cited

U.S. PATENT DOCUMENTS

| | | |
|---|---|---|
| 4,336,460 A | 6/1982 | Best et al. |
| 4,851,286 A | 7/1989 | Maurice |

(Continued)

FOREIGN PATENT DOCUMENTS

| | | |
|---|---|---|
| DE | 102008060654 | 7/2010 |
| EP | 0234890 A2 | 9/1987 |

(Continued)

OTHER PUBLICATIONS

Extended European Search Report EP20872007 Issued Sep. 20, 2023.

*Primary Examiner* — Nicole M Ippolito
(74) *Attorney, Agent, or Firm* — The Belles Group, P.C.

(57) ABSTRACT

A nuclear waste cask with impact protection includes impact limiters comprising deformable energy-absorbing perforated sleeves. An impact amelioration system for nuclear fuel storage components includes impact limiter assemblies at the bottom cask to canister interface including impact limiter plugs frictionally engaging corresponding plug holes formed in the cask closure plate. A nuclear waste fuel storage system includes an unventilated cask including a heavy free-floating radiation shielding lid loosely coupled the top end of the cask in a movable manner via the anchor bosses which provides cask over pressurization protection. A nuclear waste cask includes an axially elongated rectangular cuboid cask body having a cavity for holding nuclear waste materials and cask locking mechanism including first locking protrusions on the lid which are selectively interlockable with mating second locking protrusions on the cask body to lock the lid to the cask body.

20 Claims, 90 Drawing Sheets

Related U.S. Application Data continuation-in-part of application No. 17/061,700, filed on Oct. 2, 2020, now Pat. No. 11,081,249, and a continuation-in-part of application No. 17/132,102, filed on Dec. 23, 2020, and a continuation-in-part of application No. 17/165,224, filed on Feb. 2, 2021, and a continuation-in-part of application No. 17/181,439, filed on Feb. 22, 2021, now Pat. No. 11,373,775.

(60) Provisional application No. 62/910,073, filed on Oct. 3, 2019, provisional application No. 62/954,083, filed on Dec. 27, 2019, provisional application No. 62/969,183, filed on Feb. 3, 2020, provisional application No. 62/979,640, filed on Feb. 21, 2020.

(58) Field of Classification Search
USPC ......... 250/506.1, 507.1, 515.1, 516.1, 517.1, 250/518.1, 519.1
See application file for complete search history.

(56) References Cited

U.S. PATENT DOCUMENTS

| | | | |
|---|---|---|---|
| 4,996,019 A | 2/1991 | Catalayoud et al. | |
| 5,037,147 A | 8/1991 | Fay | |
| 5,127,535 A | 7/1992 | Shinno | |
| 5,394,449 A | 2/1995 | Johnson et al. | |
| 5,546,436 A | 8/1996 | Jones et al. | |
| 6,064,710 A | 5/2000 | Singh | |
| 6,718,000 B2 | 4/2004 | Singh et al. | |
| 9,105,365 B2 | 8/2015 | Singh et al. | |
| 9,460,821 B2 | 10/2016 | Singh et al. | |
| 9,466,400 B2 | 10/2016 | Singh et al. | |
| 9,672,948 B2 | 6/2017 | Singh | |
| 10,049,777 B2 | 8/2018 | Singh | |
| 10,373,722 B2 | 8/2019 | Singh | |
| 10,410,756 B2 | 9/2019 | Singh | |
| 10,446,285 B2 | 10/2019 | Singh | |
| 10,515,730 B2 | 12/2019 | Singh et al. | |
| 10,692,617 B2 | 6/2020 | Singh | |
| 11,081,249 B2 | 8/2021 | Singh et al. | |
| 11,373,775 B2 * | 6/2022 | Singh ..................... | G21F 5/12 |
| 11,610,696 B2 * | 3/2023 | Singh ..................... | G21F 5/10 |
| 11,721,447 B2 * | 8/2023 | Singh ..................... | G21F 5/08 |
| | | | 376/272 |
| 2004/0071254 A1 | 4/2004 | Malalel | |
| 2008/0086025 A1 | 4/2008 | Van Der Lee et al. | |
| 2009/0114856 A1 | 5/2009 | Shimojo et al. | |
| 2010/0104061 A1 | 4/2010 | Argoud | |
| 2010/0177858 A1 | 7/2010 | Kielbowicz | |
| 2013/0068578 A1 | 3/2013 | Saito et al. | |
| 2014/0219408 A1 | 8/2014 | Singh | |
| 2014/0247916 A1 | 9/2014 | Singh et al. | |
| 2015/0092903 A1 | 4/2015 | Tuite et al. | |
| 2015/0206610 A1 | 7/2015 | Carver et al. | |
| 2015/0213910 A1 | 7/2015 | Allan et al. | |
| 2015/0310947 A1 | 10/2015 | Singh et al. | |
| 2016/0125966 A1 | 5/2016 | De Gasquet et al. | |
| 2018/0005718 A1 | 1/2018 | Singh | |
| 2018/0322970 A1 | 11/2018 | Singh et al. | |
| 2021/0225541 A1 | 7/2021 | Singh | |
| 2021/0257119 A1 | 8/2021 | Singh | |
| 2021/0272714 A1 | 9/2021 | Singh | |

FOREIGN PATENT DOCUMENTS

| | | |
|---|---|---|
| FR | 1500850 | 11/1967 |
| JP | 2003315493 | 11/2003 |
| WO | 2018162768 A1 | 9/2018 |

* cited by examiner

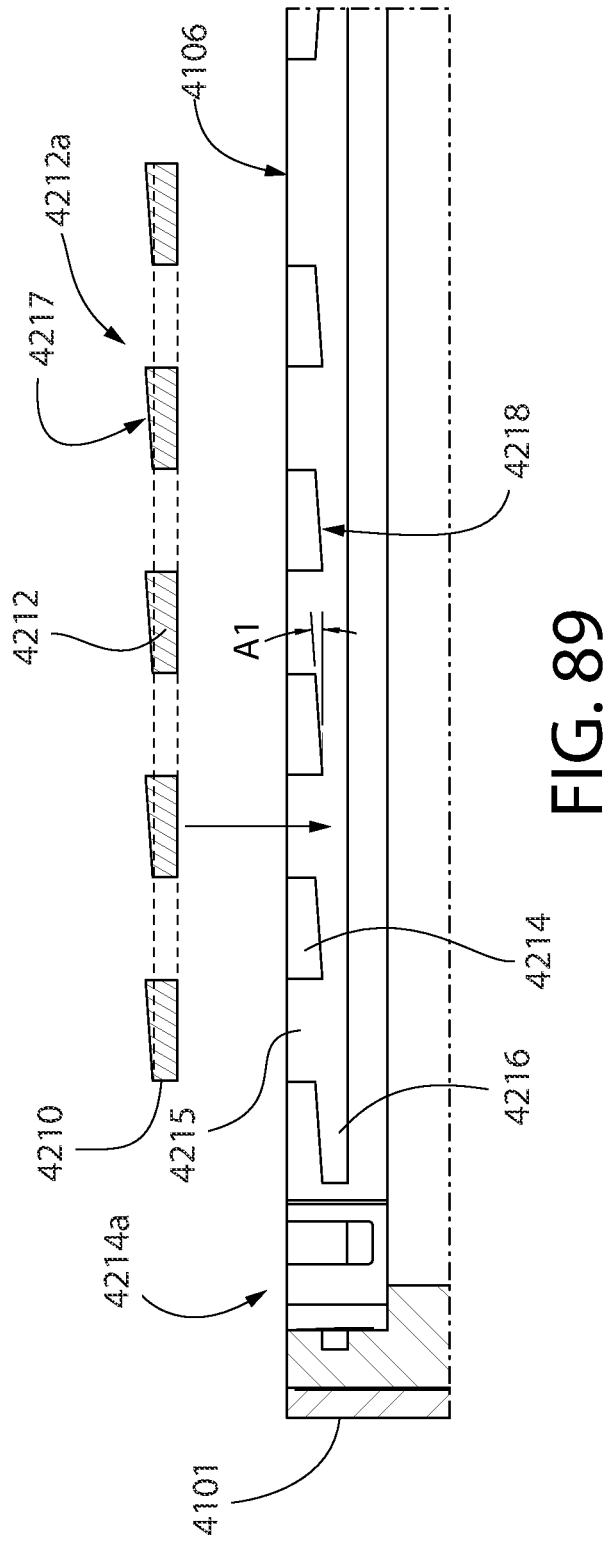
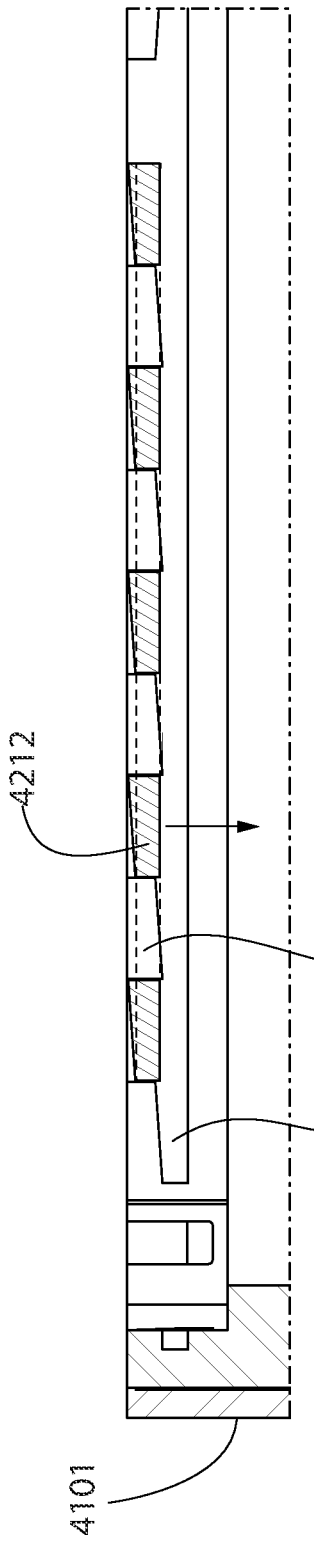
FIG. 89
FIG. 90

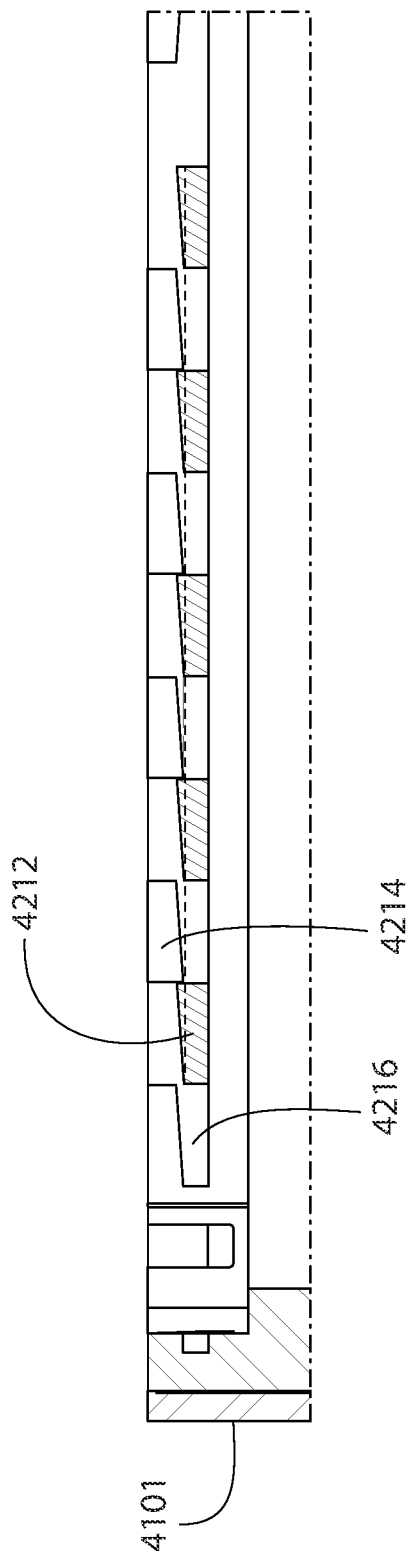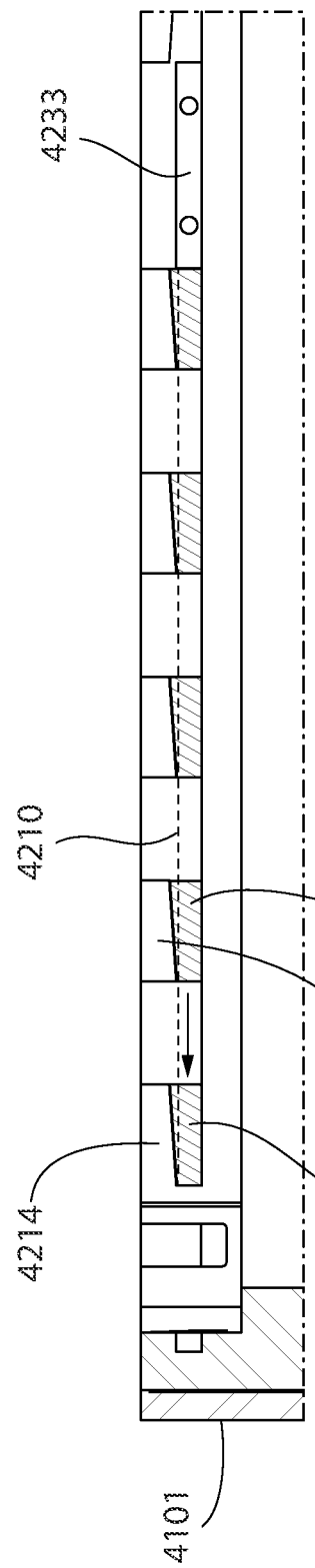

NUCLEAR WASTE CASK WITH IMPACT PROTECTION, IMPACT AMELIORATION SYSTEM FOR NUCLEAR FUEL STORAGE, UNVENTILATED CASK FOR STORING NUCLEAR WASTE, AND STORAGE AND TRANSPORT CASK FOR NUCLEAR WASTE

CROSS-REFERENCE TO RELATED APPLICATIONS

This application is a continuation of U.S. patent application Ser. No. 17/374,005 filed Jul. 13, 2021.

U.S. patent application Ser. No. 17/374,005 is a continuation-in-part of U.S. patent application Ser. No. 17/061,700 filed Oct. 2, 2020, which claims the benefit of U.S. Provisional Application No. 62/910,073 filed Oct. 3, 2019; which are each incorporated herein by reference in their entireties.

U.S. patent application Ser. No. 17/374,005 is a continuation-in-part of U.S. patent application Ser. No. 17/132,102 filed Dec. 23, 2020, which claims the benefit of U.S. Provisional Application No. 62/954,083 filed Dec. 27, 2019; which are each incorporated herein by reference in their entireties.

U.S. patent application Ser. No. 17/374,005 is a continuation-in-part of U.S. patent application Ser. No. 17/165,224 filed Feb. 2, 2021, which claims the benefit of U.S. Provisional Application No. 62/969,183 filed Feb. 3, 2020; which are each incorporated herein by reference in their entireties.

U.S. patent application Ser. No. 17/374,005 is a continuation-in-part of U.S. patent application Ser. No. 17/181,439 filed Feb. 22, 2021, which claims the benefit of U.S. Provisional Application No. 62/979,640 filed Feb. 21, 2020; which are each incorporated herein by reference in their entireties.

BACKGROUND

The present invention in one aspect relates generally to systems and apparatuses for storing high level radioactive waste such as used or spent nuclear fuel, and more particularly to an improved nuclear fuel cask with impact protection.

In the operation of nuclear reactors, the nuclear energy source is in the form of hollow zircaloy tubes filled with enriched uranium, collectively arranged in multiple assemblages referred to as fuel assemblies. When the energy in the fuel assembly has been depleted to a certain predetermined level, the used or "spent" nuclear fuel (SNF) assemblies are removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a cylindrical metallic storage canister (typically stainless steel), which is often referred to as a multi-purpose canister (MPC), which forms the primary nuclear waste containment barrier. The fuel assemblies are typically loaded into the canister while submerged in the spent fuel pool of the reactor containment structure to minimize radiation exposure to personnel. The canisters which typically comprise a single metal shell have limited ability however to block or attenuate the gamma and neutron radiation emitted by the decaying SNF other than borated water remaining in the canister from the spent fuel pool.

To transport the nuclear waste canister loaded with SNF or other waste, the canister is placed into a radiation-shielded outer ventilated overpack or cask for safe transport and storage of the waste. The cask forms the secondary containment barrier. Casks are used to transfer the SNF or other high level nuclear waste from the spent fuel pool (e.g. "transfer cask") in the nuclear reactor containment structure to a more remote interim term storage such as in the dry cask storage system of an on-site or off-site independent spent fuel storage installation (ISFSI) until a final repository for spent nuclear fuel is available from the federal government.

A typical modern transport cask, used to move radiative nuclear waste, including spent nuclear fuel, is a heavy cylindrical weldment transported over railroads or occasionally by sea on ships. A typical transport cask may be equipped with an impact limiter of some form at each extremity. The external diameter of such cask package is governed by the narrowest passage through which the rail car carrying the loaded cask must pass. Typically, the narrowest passageway in the cask package's travel path is a tunnel, or sometimes a low-profile bridge underpass. Since casks are extremely tall structures, the casks are typically transported in a horizontal position on the rail car. In the US, the outside diameter (OD) of the impact limiter is limited to 128 inches to avoid clearance issues in tunnels. In most other countries, it is even smaller.

Impact limiters are fabricated from energy-absorbing materials that prevent or limit structural damage to the transport cask in case of an accident to prevent release of radiation to the environment. Such devices are mandate by the NRC (Nuclear Regulatory Commission) for nuclear waste transport packages such as casks and must undergo drop tests to evaluate their effectiveness. In the past, plastic foams, metal honeycombs, and wood have been used. Impact limiters made of organic materials such as wood have many drawbacks. Wood is inherently non-homogeneous and non-isotropic, its strength properties are affected by weather, and it is flammable. Therefore, the main appeal of wood impact limiter is low cost. The standard honeycomb impact limiter is made by placing alternate layers of solid corrugated aluminum sheets or panels 10 laid out in alternating orthogonal directions to each other and bonding the layers together by a high-temperature epoxy (see, e.g. FIG. 29). The layers are cut to a circular or other shape and stacked on top of each other being oriented transversely to longitudinal axis of the cask such that there are no openings between the layers extend in the longitudinal direction of the cask. Honeycomb impact limiters are typically time intensive and expensive to manufacture, and in generally scare supply.

Accordingly, there remains a need for improvements in impact limiters for nuclear waste transport casks.

The present invention in another aspect relates generally to systems and vessels for storing high level radioactive waste such as used or spent nuclear fuel (SNF), and more particularly to an improved system which ameliorates the effects of a forceful impact on such nuclear fuel storage vessels and concomitantly the SNF assemblies stored therein.

In the operation of nuclear reactors, the nuclear energy source is in the form of hollow Zircaloy tubes filled with enriched uranium, collectively arranged in multiple assemblages referred to as fuel assemblies. When the energy in the fuel assembly has been depleted to a certain predetermined level, the used or "spent" nuclear fuel (SNF) assemblies are removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a cylindrical metallic fuel storage canister, which is often referred to as a multi-purpose canister (MPC) that forms the primary nuclear waste containment barrier. Such MPCs are available from Holtec International of Camden, New Jersey. The fuel assemblies are typically loaded into the canister while submerged in the spent fuel pool of the reactor containment structure to minimize radiation exposure to personnel.

The fuel canister loaded with SNF (or other high level radioactive waste) is then placed into an outer overpack or cask, which forms the secondary containment, for safe transport and storage of the multiple spent fuel assemblies. Casks are heavy radiation shielded containers used to store and/or transfer the SNF canister from the spent fuel pool ("transfer cask") in the nuclear reactor containment structure to a more remote staging area for interim term storage such as in the dry cask storage system of an on-site or off-site independent spent fuel storage installation (ISFSI) until a final repository for spent nuclear fuel is available from the federal government.

Drop events involving heavy loads such as nuclear waste fuel casks are among the more serious accidents in industry. In the nuclear industry, an accidental drop of a cask onto a stationary reinforced concrete surface is a typical postulated scenario involving a hard and heavy object slamming onto a highly inflexible surface. Classical dynamics teaches us that the deceleration g-load under such an impact scenario is roughly proportional to the square root of the stiffness of the impacting interface. The more rigid the impactor and the stationary target, the higher is the g-load. Reducing the g-load is essential to minimize the physical damage to the colliding bodies; which is critically important if one of the two bodies contains a hazardous radioactive material such as spent nuclear fuel.

Accordingly, there remains a need for improvements in controlling and reducing the g-load associated with impacts occurring with the foregoing nuclear waste storage systems.

The present invention in another aspect relates generally to systems and vessels for storing high level radioactive nuclear waste such as used or spent nuclear fuel (SNF), and more particularly to an improved unventilated storage cask system for storing nuclear waste.

In the operation of nuclear reactors, the nuclear energy source is in the form of hollow Zircaloy tubes filled with enriched uranium, collectively arranged in multiple assemblages referred to as fuel assemblies. When the energy in the fuel assembly has been depleted to a certain predetermined level, the used or "spent" nuclear fuel (SNF) assemblies are removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods.

The fuel basket is arranged inside a cylindrical metallic nuclear waste fuel canister, which is often referred to as a multi-purpose canister (MPC). Such MPCs are available from Holtec International of Camden, New Jersey. The fuel assemblies are typically loaded into the canister while submerged in the spent fuel pool of the reactor containment structure to minimize radiation exposure to personnel.

An essential attribute of such a fuel storage MPC is that it is designed and manufactured to provide safe radiological confinement to its contents and satisfies the criterion of "leak tight" (against particulate and gaseous radiological matter) as defined in the USNRC regulatory guidance documents. Such a waste package, however, is not autonomously capable of providing protection against neutrons and gamma radiation emanating from its contents which would, if exposed to biological life would be deadly. Therefore, the MPC needs to be stored in a heavily radiation-shielded outer cask that permits as little radiation as possible to escape to the environment. The storage cask must also be able to transmit and dissipate the decay heat generated inside the MPC by the decaying fuel assemblies to the ambient environment. Effective heat rejection and effective reduction of radiation are thus the twin functions of the storage cask, also referred to in the industry as an "overpack" or "storage module."

The storage cask used to store the loaded canister has historically been in the form of a ventilated cask wherein ambient ventilation air enters the cask near the bottom and exits near the top thereby convectively removing heat emitted by the canister. Ventilated cask designs are widely used for storing nuclear waste fuel canisters with aggregate heat loads as high as 50 kW. However, such ventilated cask suffer from one potential vulnerability in marine environments where the salt-laden ambient ventilation air can induce stress corrosion cracking (SCC) in the canister's austenitic stainless-steel confinement boundary. SCC is a well-documented problem encountered in the nuclear fuel storage industry. Ventilated overpacks also need to be surveilled regularly to ensure that their vent passages are not blocked which an diminish heat rejection from the cask.

Accordingly, there remains a need for an improved nuclear waste storage cask that provides the necessary heat dissipation and radiation blockage functions, but eliminates the risk of initiating stress corrosion cracking on the exterior surfaces of the waste fuel canister inside the cask.

The present invention in another aspect relates generally to systems and vessels for transporting and storing high level radioactive nuclear waste materials, and more particularly to a box-type cask in one embodiment for transport and storage of radioactive nuclear waste materials.

The overpacks or casks used to store neutron activated metal and other radiated non-fissile high level radioactive waste, such as that resulting from operation nuclear power generation plants or other type facilities, is typically an open-top cylindrical structure with a bolted circular lid. Such a cask is inefficient to load all types of nuclear waste materials not limited to spent nuclear fuel into the cask. The radiation waste materials are often too large and/or may be irregular shaped for insertion through the narrow top access opening in such cylindrical casks which leads to the internal storage cavity. Further, the act of tightening the bolts once the cylindrical cask is packed with nuclear waste materials is a time consuming which exposes the workers to radiation dosage in proportion to the time needed to complete the tedious installation of the closure bolts.

Accordingly, there remains a need for an improved nuclear waste storage cask that can accommodate a wide variety of waste materials, and which can further be closed and sealed in an expedient manner to reduce radiation exposure of operating personnel handling the cask.

BRIEF SUMMARY

A First Inventive Concept of the present application discloses a nuclear waste transport cask with improved impact protection provided by impact limiters which are economical to manufacture and overcome the drawbacks of the foregoing prior impact limiter designs. The present impact limiters comprise cylindrical structures which are detachably coupled to the top and bottom extremities of the cask. Each impact limiter may comprise a deformable and crushable annular metallic perforated impact barrel or sleeve of cylindrical shape comprising a plurality of elongated perforations in the form of longitudinal passages. The passages may have a circular cross-sectional shape in certain embodiments. The perforated sleeve has an annular metallic body of monolithic unitary structure in which the perforations are formed and an enlarged central opening to receive the ends of the cask therein.

The longitudinal passages of the perforated sleeve form open passageways which extend between opposite ends of the sleeve in a direction parallel to each other, and in one embodiment parallel to the longitudinal axis of the vertically elongated transport cask. The passages define ligaments or webs of solid material between adjacent perforations. When the impact limiters are subjected to an inward-acting external impact force having a radial component (e.g. perpendicular or obliquely angled transversely to the longitudinal axis of the cask) caused by dropping the cask horizontally on its side or end first at an angled orientation to horizontal, the perforations radially collapse in the impact or crush zone. The outer webs in the impact zone increasingly deform inwardly under the impact while collapsing the perforations, and may contact at least some of the more inner webs in the crush zone which slows the progression of deformation and collapse of the impact ring is resisted by the solid web material. The amount of deformation experienced by perforation sleeve or ring is generally the result of the magnitude of the external impact force, diameter of perforations, pitch or spacing between the perforations, diameter of the perforations and web thickness, and modulus of elasticity of metal selected for the impact rings. In one example, the impact rings may be formed of a soft isotropic material such as without limitation a suitable grade or alloy of aluminum; however, other suitable metallic materials may be used.

According to one aspect, a nuclear waste cask with impact protection comprises: a longitudinal axis; a longitudinally elongated cask body including a top end, a bottom end, a sidewall extending between the ends, and a cavity configured for holding a nuclear waste canister; and an impact limiter coupled to the top end of the cask body, the impact limiter comprising an annular perforated sleeve having a body including a central opening and a circumferential array of elongated longitudinal passages formed therethrough around the central opening. The body of the perforated sleeve may be formed of a solid metal ring of monolithic unitary structure. The longitudinal passages may be oriented parallel to each other and the longitudinal axis of the cask in one embodiment.

According to another aspect, a nuclear waste cask with impact protection comprises: a longitudinal axis; a longitudinally elongated cask including a top end, a bottom end, a sidewall extending between the ends, and a cavity configured for holding a nuclear waste canister; and an impact limiter coupled to each of the top and bottom ends of the cask; the impact limiter comprising an outer shell and an inner perforated core of monolithic unitary structure. In one embodiment, the perforated core comprises an annular sleeve including a plurality of elongated longitudinal passages oriented parallel to the longitudinal axis of the cask.

A Second Inventive Concept of the present application discloses an impact amelioration or limiting system usable in nuclear waste fuel storage vessels. The system operates to ameliorate and reduce the g-load or force (gravitational) imparted to such vessels due to mutual impact between the vessels resulting from a drop event. The proposed impact limiting system design can comprise installing one or preferably more tapered impact limiter rods or plugs in closely fitting and frictionally engaged tapered plug holes formed in one of the two mutually impacting vessels. The combination tapered plug and corresponding hole collectively defines an impact limiter assembly. In one embodiment, the impacting vessels may be without limitation an outer nuclear waste transfer overpack or cask and a SNF storage canister (aka fuel canister) such as a MPC described above. The impact limiter rods or plugs and corresponding tapered plug holes may be arranged on the cask in one configuration at the interface between the bottom of the canister and bottom closure plate of the cask. The impact amelioration system is designed to absorb and dissipate at least a portion of the kinetic energy imparted to the vessels during a cask drop event, as further described herein.

The impact limiter plugs are partially embedded in their respective plug holes. Under impact during a generally vertical drop scenario, each tapered impact limiter plug that may be provided when acted upon by the canister will advance a distance deeper inside its respective tapered hole in the cask. The impact force of the plug's kinetic energy is absorbed by the combined action of interfacial friction (between engaged side surfaces of the plug and hole walls) and the elastic-plastic (elastoplastic) deformation and expansion of the plugs within the tapered holes. Accordingly, the partially embedded plugs which protrude above top surface of the bottom closure plate of the cask are driven deeper into the plug holes by the impact force. Calculations show that a suitable choice of the principal parameters such as the material of the tapered rod, angle of taper, rod diameter, and number of impact limiter rods or plugs provided results in reducing the peak g-load resulting from the impact significantly. Advantageously, this protects and minimizes or prevents the spent nuclear fuel (SNF) assemblies stored within the fuel canister from damage during the impact scenario.

A plurality of impact limiter rod or plugs and corresponding tapered plug holes may be arrayed around and partially embedded in the top surface of the bottom closure plate of the cask. The plugs protrude upwards beyond the top surface towards the canister in a pattern selected to provide impact protection in a uniform manner at the bottom or lower cask to canister interface. The canister is seated on the top surfaces of the plugs which act as pedestals that support the canister in a spaced apart manner from the cask bottom closure plate. The canister therefore does not directly contact the bottom closure plate of the cask. All quadrants of the cask bottom closure plate may include at least one impact limiter assembly (i.e. tapered plug and hole), but preferably multiple impact limiter assemblies. This ensures even distribution of the impact forces in the event of a generally straight vertical drop and/or guarantees that an off-center drop at an angle will result in at least some impact limiter assemblies being positioned to absorb the resultant impact forces and decelerate the canister to reduce peak g-loads.

An impact amelioration system for nuclear fuel storage components in one embodiment comprises: a fuel storage canister comprising a first shell extending along a vertical centerline, the canister configured for storing nuclear fuel; an outer cask defining a cavity receiving the canister, the cask comprising a second shell and a bottom closure plate attached to the second shell; a plurality of impact limiter assemblies disposed on the bottom closure plate at a canister to cask interface, each of the impact limiter assemblies comprising a plug frictionally engaged with a corresponding plug hole formed in the bottom closure plate; wherein the plugs engage the canister.

A method for ameliorating impact between components of a fuel storage system in one embodiment comprises: partially embedding a plurality of impact limiter plugs in corresponding plug holes formed in a bottom closure plate of a cask; seating the canister on the plugs, the plugs being positioned at a first depth in the plug holes; impacting the canister against the plugs with an impact force; and driving the plugs to a second depth in the plug holes deeper than the first depth.

A Third Inventive Concept of the present application discloses a radiation-shielded unventilated nuclear waste storage cask with heat dissipation system which effectively removes decay heat emitted from the nuclear waste fuel canister housed therein. In one embodiment, the cask comprises an inner shell, outer shell, and plurality of radial rib plates connected between the shells which convey heat away from the canister through the walls of the cask to the ambient environment. The outer shell is cooled by convection via ambient airflow and radiation effects. Radiation shielding is provided in the annulus between the shells and the rib plate therein. The rib plates further structurally reinforced the cask and play a role in lifting the cask, as further described herein.

In contrast to the typical ventilated storage casks discussed above, the present unventilated storage cask is hermetically sealed forming a pressure retention vessel configured to contain pressures in excess of atmospheric pressure. Because there is no ambient air exchanged with the sealed internal cavity of the unventilated storage cask in which the waste fuel canister is stored, the risk of initiating stress corrosion cracking (SCC) of the canister is effectively mitigated. The unventilated storage cask also includes a safety feature comprising a pressure relief mechanism to relieve the buildup of excessive pressure within the pressure vessel class cask. Excess pressure is safely released to atmosphere by a unique floating lid to cask interface design which protects the structural integrity of the unventilated cask and waste fuel canister therein. When overpressurization conditions abate, the lid automatically reseals the cask cavity.

As its design configuration indicates, the unventilated storage cask has a considerably reduced heat load capacity compared to its ventilated counterpart. Because the only heat rejection pathway available in the present unventilated storage system is via conduction through the shells of the cask and natural convection/radiation at the cask's exterior surface to the ambient, the annulus gas inside the overpack will be at an elevated temperature. Because heating of air reduces its relative humidity and a high humidity content is necessary (but not sufficient) to induce stress corrosion cracking (SCC) in the austenitic stainless steel confinement boundary of the waste fuel canister, increasing the temperature of the air surrounding the canister in the internal cavity of the cask serves to prevent the onset of SCC under extended storage conditions. A preferred alternative is to replace the air within the annular area of the cask surrounding the canister with a non-reactive gas, such for example without limitation as nitrogen or argon. Preventing SCC in long term dry storage casks of the present design is one objective of the present unventilated nuclear waste fuel storage system.

If SCC is not a major threat in the nuclear waste fuel storage environment, then it is not necessary to purge the ambient air from the cask for replacement with an inert gas. In such a case, the air pressure in the hermetically sealed cavity of the unventilated storage cask will rise in temperature roughly in accordance with the perfect gas law. To provide pressure relief under a U.S. NRC (Nuclear Regulatory Commission) postulated accident scenario to which dry cask waste fuel storage systems must be designed, such as the cask's Design Basis Fire Event, the cask closure lid bolt assemblies are installed with a small vertical gap to loosely mount the lid to the cask body with a copious preset vertical travel clearance or gap to enable the lid to slideably lift up without frictional interference from the bolts. If the air pressure within the cask is high enough to lift the lid even by a minute amount, then some air will escape reducing the pressure within the cask back to normal operating pressures. Thus, the cask is a self-regulating and self-relieving device making uncontrolled overpressure impossible, as further described herein. In some embodiments, the internal design pressure of the cask may be set equal to approximately 200% of the pressure that will equilibrate the weight of the cask closure lid.

In one aspect, an unventilated nuclear waste fuel storage system comprises: a longitudinal axis; a canister configured for storing nuclear waste fuel inside; an outer cask comprising a cask body including an inner shell, an outer shell, an annular space containing a radiation shielding material formed between the shells, and a bottom baseplate sealed to bottom ends of the shells; a radiation shielding lid selectively sealable to the cask body, the lid when positioned on the cask body collectively defining a gas tight cavity receiving the canister; a plurality of longitudinal lifting rib plates extending radially between and fixedly attached to the inner and outer shells in the annular space, each lifting rib plate comprising a threaded anchor boss fixedly attached at a top end thereof; and a plurality of threaded bolt assemblies threadably engaged with the anchor bosses which secure the lid to the cask; wherein the gas tight cavity forms a pressure vessel operable to retain pressures above atmospheric pressure within the cask.

According to another aspect, an unventilated nuclear waste fuel storage pressure vessel with self-regulating internal pressure relief mechanism comprises: a longitudinal axis; a cask body including an inner shell, an outer shell, an annular space containing a radiation shielding material formed between the shells, a bottom baseplate sealed to bottom ends of the shells, and an internal cavity configured to house a nuclear waste fuel canister therein; a plurality of upwardly open threaded anchor bosses affixed to a top end of the cask body; a radiation shielding lid loosely coupled to the top end of the cask body in a movable manner; an annular compressible gasket forming a circumferential seal between the lid and the top end of the cask body which renders the cavity gas tight; and a plurality of bolt assemblies passing through the lid and threadably engaged with the anchor bosses, the bolt assemblies configured and operable to loosely secure the lid to the cask body; the lid being movable between (1) a downward sealed position engaged with the cask body which seals the gas tight cavity of the cask; and (2) an adjustable raised relief position engaged with the bolt assemblies but ajar from the top end of the cask body to partially open the gas tight cavity thereby defining a gas overpressurization relief passageway to ambient atmosphere; wherein the cask is operable to retain an internal pressure within the cavity above atmospheric pressure.

According to another aspect, a method for protecting an unventilated nuclear waste storage system from internal overpressurization comprises: providing an unventilated cask comprising a sealable internal cavity and a plurality of threaded anchor bosses; lowering a canister containing high level nuclear waste into the cavity; positioning a radiation shielded lid on the cask, the lid being in a downward sealed position engaged with the cask making the cavity gas tight to retain pressures exceeding atmospheric; aligning a plurality of fastener holes formed in the lid with the anchor bosses; threadably engaging a threaded stud with each of the anchor bosses through the fastener holes of the lid; rotatably engaging a threaded limit stop with each of the threaded studs; positioning the limits stops on the studs such that a vertical travel gap is formed between the lid and the limit stops; wherein during a cask overpressurization condition, the lid slideably moves upward along the studs to a relief position ajar from the cask to vent excess pressure to atmosphere.

A Fourth Inventive Concept of the present application provides a nuclear waste storage system comprising a radiation-shielded nuclear waste storage cask which overcomes the shortcomings of the foregoing cylindrical type storage casks described above for storing a wide variety of different nuclear waste materials. In one embodiment, a longitudinally elongated box-type cask is disclosed comprising an essentially rectangular body with rectilinear cross sectional internal storage cavity configured for holding nuclear waste material, and a matching rectangular closure lid. The elongated large top opening leading into the storage cavity extends for a majority of the longitudinal length of the cask. In contrast to the small circular opening at the top of cylindrical casks, the present rectangular opening allows large and irregular shaped radioactive metal pieces of waste material to be loaded inside the cask storage cavity in an efficient and expedient manner without undue handling by operating personnel, thereby reducing potential radiation dosage.

In one embodiment, the closure lid be coupled and sealed to the cask body to close the top opening through a quick connect-disconnect joint that does not utilize any threaded fasteners. Instead, a slider locking mechanism comprising mechanically interlocking protrusions provided on peripheral portions of each of the lid and correspondingly cask body around the cask top opening is employed. While the lid remains stationary on the cask body, the locking protrusions on the lid are slideably relative to the locking protrusions on the cask body between locked and unlocked positions or states. The locking protrusions may be arrayed and spaced apart perimetrically around the lid and cask body. The locking protrusions may be wedge-shaped in one embodiment to produce a wedging-action when mutually engaged which effectively locks the lid to the cask body and seals the nuclear waste contents inside the cask. A gasket at the lid to cask body interface is compressed by the wedging-action to form a gas-tight seal of the cask storage cavity which completes the containment barrier. There is no exchange of air between the ambient environment and the storage cavity in one embodiment.

The term "nuclear waste material" as used herein shall be broadly construed to mean any type or form of radioactive waste material which has been irradiated by a source of radiation. Such irradiation may occur in a nuclear power generation plant with nuclear reactor, or other types of facilities. As one non-limiting example, the radioactive nuclear waste materials may be associated with decommissioning or repair/maintenance of a nuclear facility, and may therefore include a wide variety of sizes and shapes of pieces of equipment (including parts of the reactor), structural components/members, parts, debris, scrap, or similar which have been irradiated and generate radiation.

In one aspect, a cask for containing radioactive materials comprises: a cask body comprising an opening forming a passageway into an internal storage cavity of the cask; a closure lid configured to be detachably coupled to the cask body to enclose the opening; and a locking mechanism comprising at least one first locking member and at least one second locking member, the first and second locking members slideable relative to one another to alter the locking mechanism between: (1) a first state in which the closure lid can be removed from the cask body; and (2) a second state in which the first and second locking members engage one another to prevent the closure lid from being removed from the cask body.

According to another aspect, a cask for containing radioactive materials comprises: a longitudinal axis; an axially elongated cask body defining a top opening forming an entrance to an internal storage cavity of non-cylindrical cross-sectional configuration, the cavity configured for holding radioactive waste materials; and a closure lid detachably coupled to the cask body at the top opening.

According to another aspect, a method for locking a radioactive waste storage cask comprises: positioning a closure lid on a cask body over an opening leading into an internal storage cavity; inserting a peripheral array of first locking protrusions on the lid between and through a peripheral array of second locking protrusions disposed on the cask body around the opening; slideably moving the first locking protrusions beneath the second locking protrusions; and frictionally engaging the first locking protrusions with the second locking protrusions; wherein the lid cannot be removed from the cask body.

Further areas of applicability of the present invention will become apparent from the detailed description provided hereinafter. It should be understood that the detailed description and specific examples, while indicating the exemplary ("example") embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which:

FIG. 89 is a first schematic diagram of a sequential method for locking the cask of FIG. 61;

FIG. 90 is a second schematic diagram thereof;

FIG. 91 is a third schematic diagram thereof; and

FIG. 92 is a fourth schematic diagram thereof.

Figure 1:
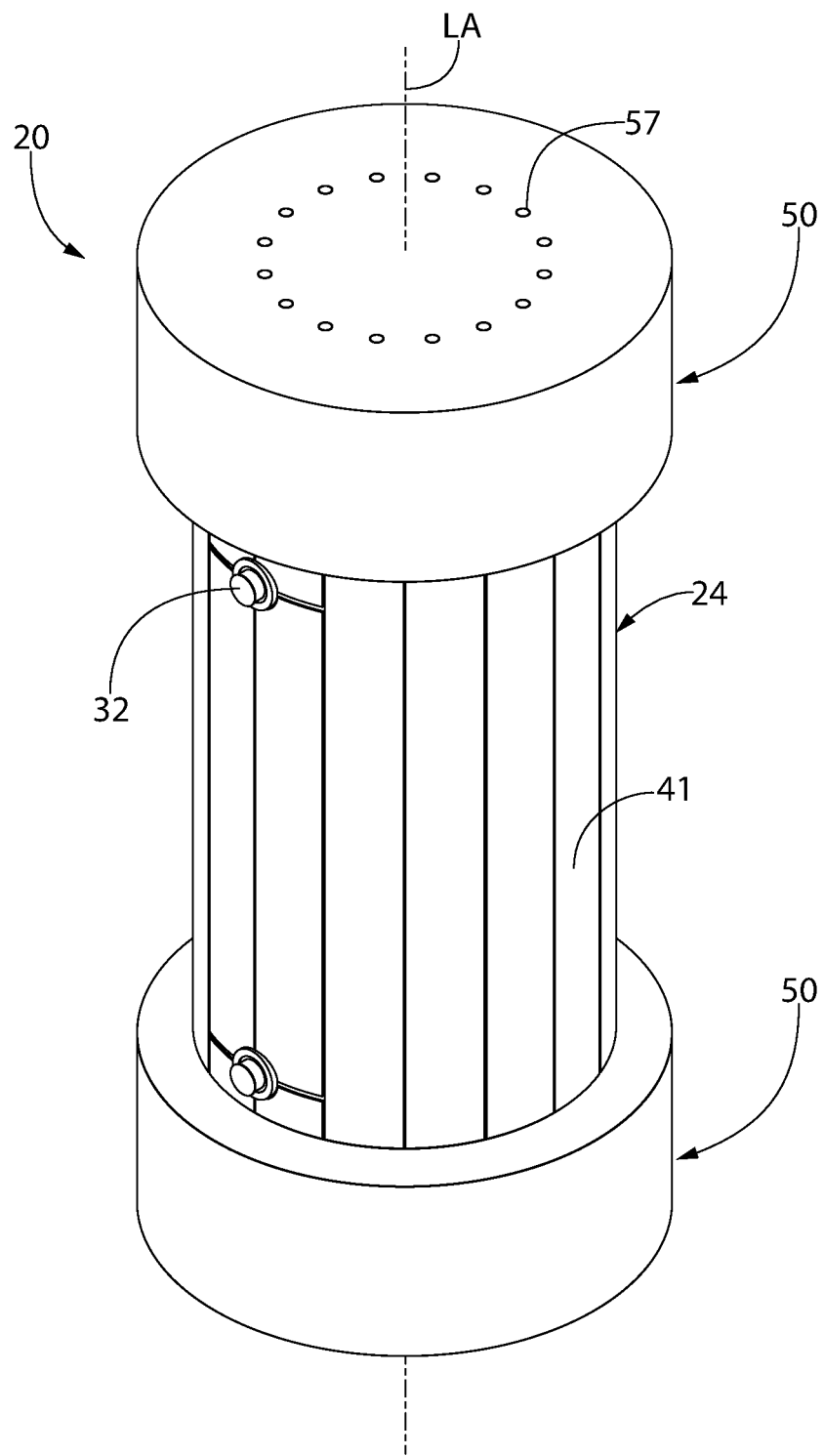
FIG. 1 is a top perspective view of a nuclear waste cask for storing high level radioactive materials with mounted impact limiters according to the present disclosure.
Figure 2:
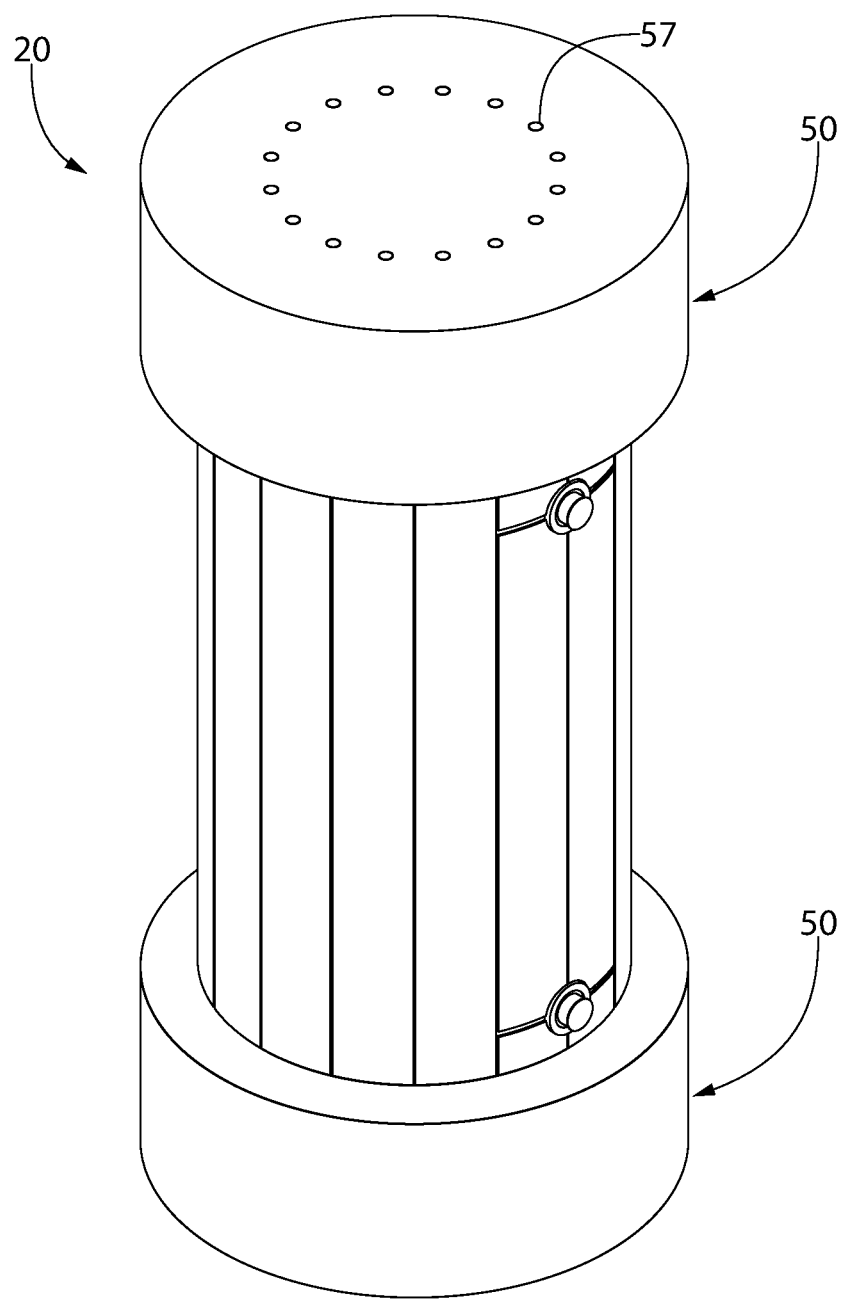
FIG. 2 is a second top perspective view thereof.
Figure 3:
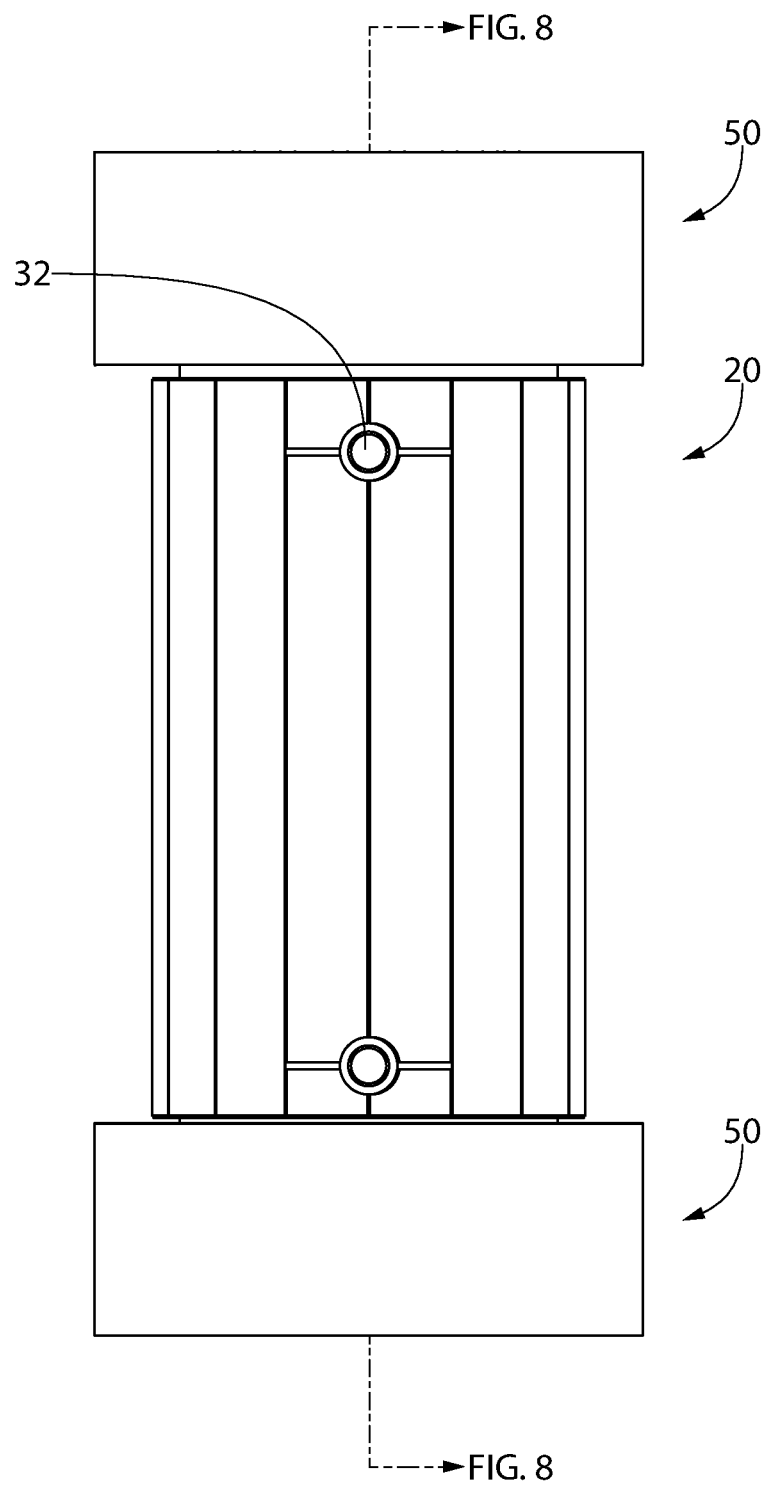
FIG. 3 is a first side view thereof.
Figure 4:
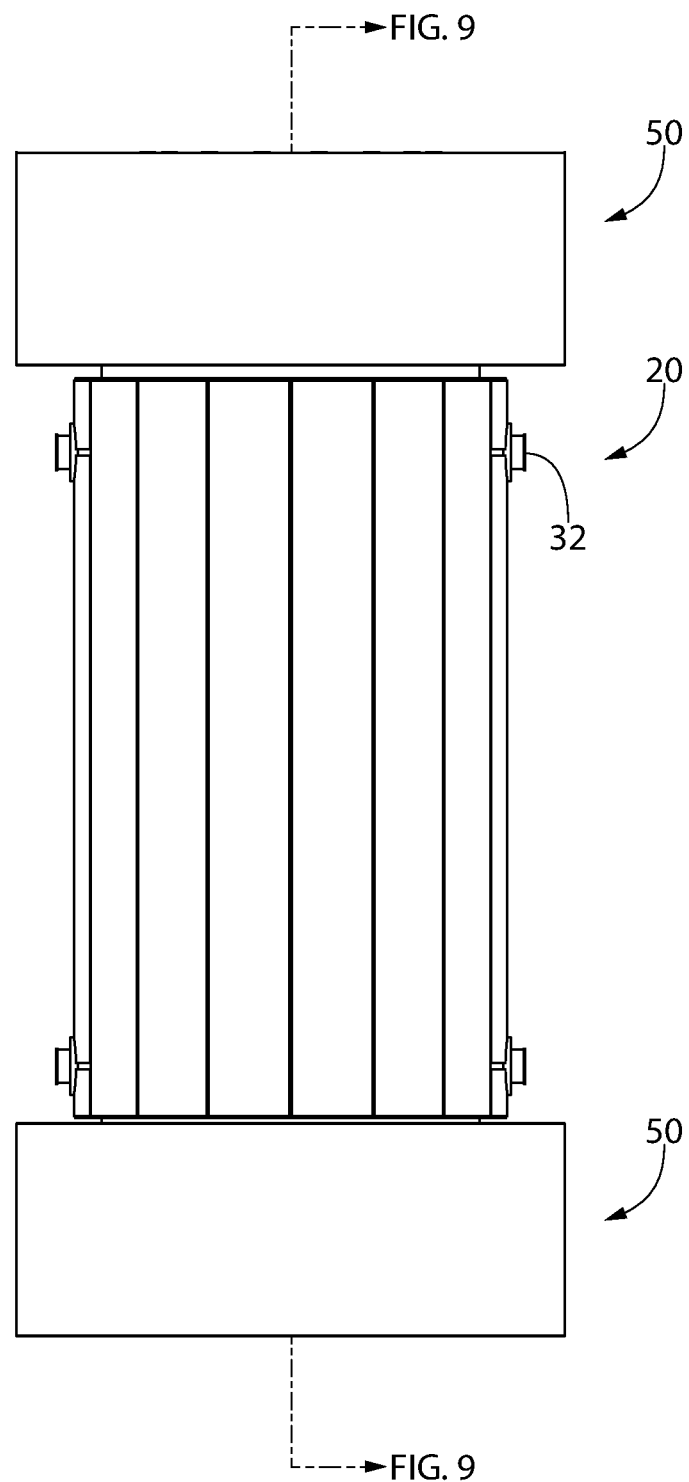
FIG. 4 is a second side view thereof.
Figure 5:
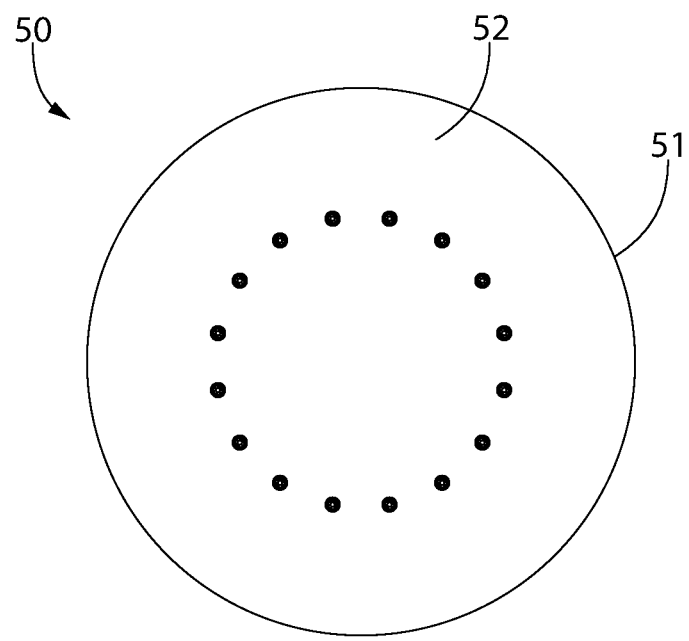
FIG. 5 is a top view thereof.
Figure 6:
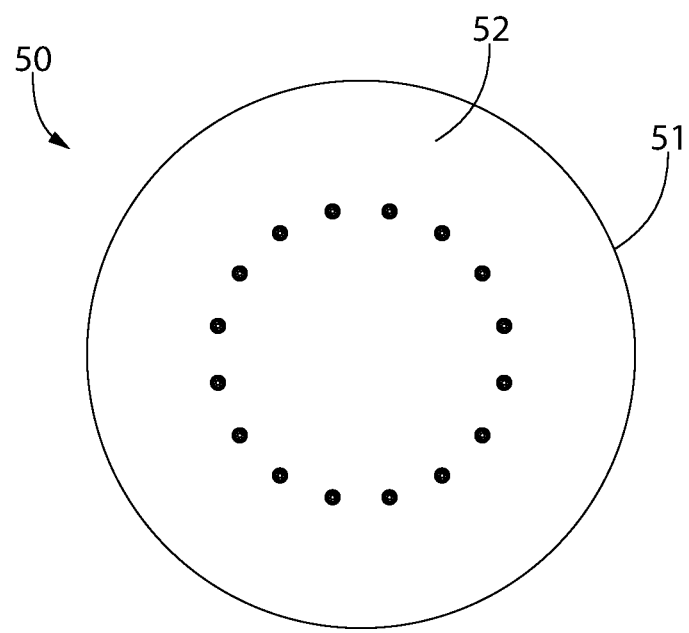
FIG. 6 is a bottom view thereof.
Figure 7:
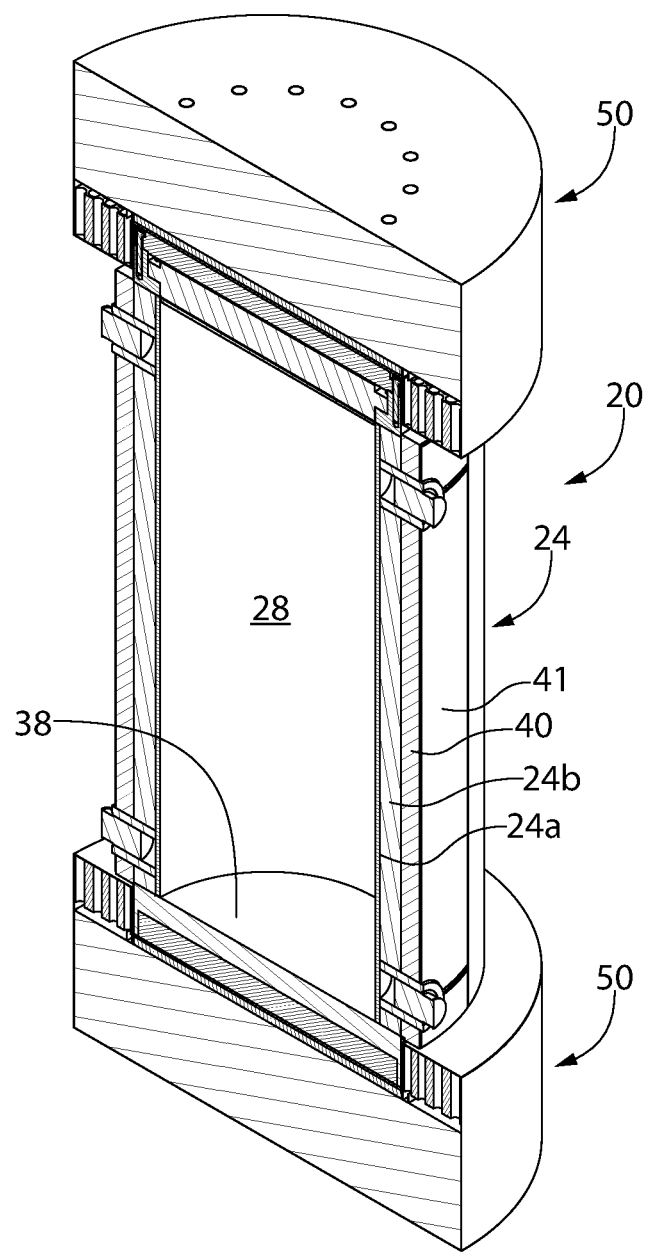
FIG. 7 is a longitudinal cross-sectional perspective view thereof.
Figure 8:
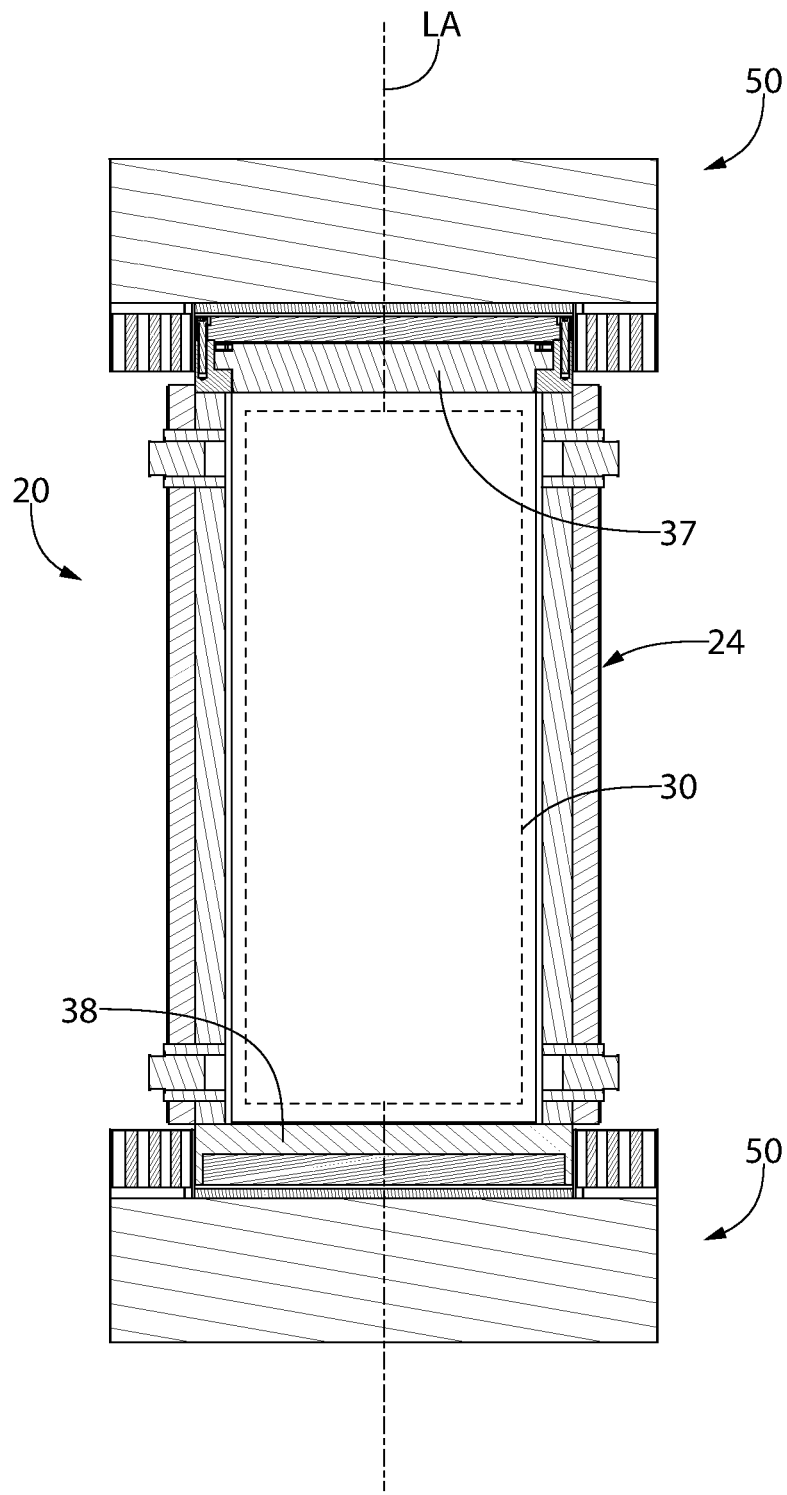
FIG. 8 is a first side cross-sectional view thereof.
Figure 9:
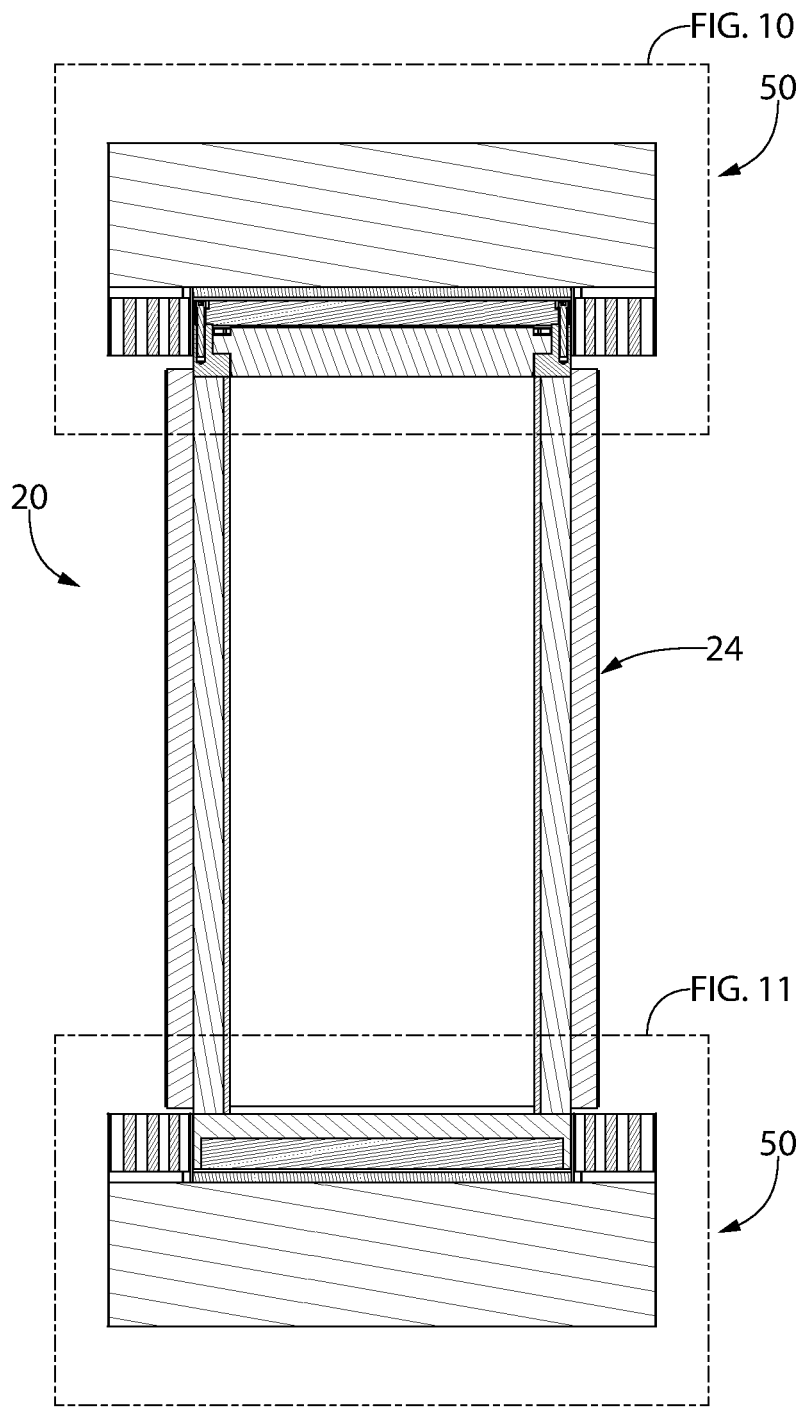
FIG. 9 is a second side cross-sectional view thereof.

All drawings are schematic and not necessarily to scale. Features shown numbered in certain figures which may appear un-numbered in other figures are the same features unless noted otherwise herein.

DETAILED DESCRIPTION

The features and benefits of the invention are illustrated and described herein by reference to non-limiting exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, any references cited herein are hereby incorporated by reference in their entireties. In the event of a conflict in a definition in the present disclosure and that of a cited reference, the present disclosure controls.

As used herein, the terms "seal weld" or "seal welding" shall be construed according to its conventional meaning in the art to be a continuous weld or process which forms a gas-tight joint between the parts joined by the weld and may be used to form hermetically sealed cavities or chambers.

Multiple Inventive Concept Roadmap

Multiple broad inventive concepts are disclosed herein and are distinguished from one another using different sections each having an appropriately descriptive section header in the description and discussion that follows. Specifically, FIGS. 1-30 are relevant to a broad First Inventive Concept, FIGS. 31-44 are relevant to a broad Second Inventive Concept, FIGS. 45-60 are relevant to a broad Third Inventive Concept, and FIGS. 61-92 are relevant to a Fourth Inventive Concept. The broad inventive concepts should each be considered in isolation from one another. Each broad inventive concept may comprise multiple inventive sub-concepts and embodiments within which may be designated by descriptive sub-headers in some instances. It is possible that there may be conflicting language or terms used between the descriptions of each of the inventive concepts. For example, it is possible that in the description of the First Inventive Concept a particular term may be used to have one meaning or definition and that in the description of the Second Inventive Concept the same term might be used to have a different meaning or definition. In the event of such conflicting language, reference should be made to the particular disclosure of the relevant inventive concept being discussed under each section heading which should be used and is controlling for interpreting the language and terms used in the description of that particular relevant inventive concept. Similarly, the section of the description describing a particular relevant inventive concept being claimed should be used and is controlling to interpret the respective claim language when necessary.

First Inventive Concept

Nuclear Waste Cask with Impact Protection

Reference is made generally to FIGS. 1-30 which are relevant to First Inventive Concept described below.

Because the extent of crush depth available in the radial direction of the cask is limited by the diameter of the impact limiter (which is constrained by the size of the tunnels and bridges that the package must pass through as previously described herein), the challenge to limit the deceleration of the cask under horizontal or near-horizontal drop is more acute. Limiting the peak g-load under the horizontal (side drop) or near-horizontal (slap-down) angled drop conditions is the governing condition in the impact limiter's performance. This is attributed to the fact that the fuel basket panels of the spent nuclear fuel canister inside the outer cask have relatively limited capacity to withstand the inertia load of the fuel assemblies in their weak (lateral) direction. In the longitudinal direction, there is no such dimensional constraint; hence vertical and oblique (center of gravity or CG over the corner) drop orientations do not pose a similar challenge.

To overcome the challenge of limiting deceleration of the package from a horizontal or near-horizontal fall, a new perforated impact limiter design and configuration which may comprise a perforation aluminum ring or sleeve in one non-limiting embodiment is disclosed. The term "aluminum" is used in a generic sense in this document meaning pure aluminum or any of the many aluminum alloys available in the industry.

As further described below, the present perforated aluminum impact limiter is an assemblage comprising an essentially annular shaped cylindrical body of certain height and diameter that slides over the top and bottom ends of the cask's machined end flanges or forgings as further described herein. The impact limiter generally comprises an outer cap shell and an internal perforated core comprising in one embodiment an annular cylindrical perforated barrel or sleeve. The perforated sleeve may have a monolithic body comprising a central opening configured to slip over the top and bottom ends of the cask body. The "donut-shaped" perforated sleeve includes a plurality of elongated perforations forming longitudinal passages through the solid body of the sleeve. The passages have a greater longitudinal length than their respective diameters, as further described herein. The passages circumferentially extend 360 degrees around the entire sleeve in one embodiment. The longitudinal passages may be arrayed in a staggered pitch and may be tightly packed in one embodiment such that pitch spacing between adjacent perforations is not greater than the diameter of the smallest adjacent perforation. Accordingly, in one preferred pattern and pitch or hole spacing between perforations, a radial reference line drawn from the geometric center of the perforated sleeve outwards through the sleeve will intersect at least one perforation regardless of angular orientation of the reference line. In other words, the reference line cannot be drawn through any angular position from 0 to 360 degrees which will not pass through at least one perforation. The solidity ratio, "S" (defined as the ratio of the solid metal area formed by webs of material between the perforations to the total transverse cross-sectional area of the sleeve), provides the parameter that can be varied to achieve the required crush force resistance/crush performance.

In contrast to the cross-core honeycomb panel constructions of the past as previously described herein, solid aluminum as a non-limiting metal of choice in one preferred embodiment is universally commercially-available in a host of product forms and is obtainable in numerous common alloy compositions with well-characterized and known precise mechanical properties. Advantageously, this makes the crush or impact resistance of the impact limiter more readily amendable to engineering analysis and computer modeling, and more predictable in impact performance than composite structures such as the past honeycomb design. In contrast to wood-based impact limiters, the present aluminum impact limiter is essentially temperature-insensitive in the range applicable to cask transport conditions (−40 C to 100 C) and subject to only minimal change in their strength moduli under dynamic (impact) conditions.

The present perforated aluminum impact limiter has several critically important advantages over its honeycomb predecessor. Because aluminum is an isotropic material (i.e. identical values of mechanical properties in all directions), the impact limiter is assured to have essentially a radially symmetric crush property. In contrast, the honeycomb is an orthotropic material which imparts a certain variation in the crush characteristic of the impact limiter in the circumferential direction. Advantageously, an impact limiter with a radially symmetric crush strength provided by the present perforated aluminum sleeve design will deform uniformly regardless of the location of the impact force on the impact limiter unlike the honeycomb design. Unlike the honeycomb product, the present perforated aluminum impact limiter does not require any adhesives which therefore does not suffer in impact performance effectiveness in the event of a fire during transport or otherwise compared to its honeycomb counterpart.

FIGS. 1-24 depict various aspects of a nuclear waste transport cask 20 with impact protection according to the present disclosure. Cask 20 may be used for storing any type of radioactive high level nuclear waste, including spent nuclear fuel (SNF) or other forms of radioactive waste. The cask is constructed to provide radiation shielding to ameliorate the gamma and neutron radiation emitted by the decaying spent nuclear fuel (SNF) or other high level radioactive waste held in the inner fuel storage canister 30 contained inside the cask. Cask 20 may be any commercially-available storage and/or transport cask, such as for example without limitation HI-STAR or HI-STORM casks available from Holtec International of Camden, New Jersey or other. The SNF canister 30 may be any commercially-available waste canister such as a multi-purpose canister (MPC) also available from Holtec International or other.

Cask 20 has a vertically elongated and metallic cylindrical body including an open top end 21, a bottom end 23, a cylindrical sidewall 24 extending between the ends, and an internal cavity 28. The cylindrical metallic SNF canister 30 (represented schematically by dashed lines and well known in the art) containing radioactive SNF fuel assemblies or other nuclear waste W is insertable into cavity 28 through top end 21, which is then closed by a bolt-on top lid assembly 25 to seal the cask 20. Cavity 28 extends for a full height of the cask in one embodiment. The cavity 28 is configured (e.g. transverse cross-sectional area) to hold only a single SNF canister 30 in one embodiment.

The upper and lower extremities of cask 20 further include top and bottom end forgings 37, 38. Top end forgoing 37 has an annular structure defining a central opening for inserting the SNF canister 30 therethrough into cavity 28 of the cask. Bottom end forgoing 38 has a solid disk-like structure defining a centrally-located and circular bottom baseplate 29. Baseplate 29 disposed at the bottom end of the cask body forms a floor and support surface inside cavity 28 on which the SNF canister is seated. The cask body 21 including the forgings 37, 38, and inner shell 24a (described below) may be formed of steel, such as stainless steel which is effective at blocking gamma radiation.

In one embodiment, baseplate 29 (bottom end forging 38) defines a downwardly open recess 29a which receives a circular disk-shaped radiation shielding plate 31 formed of radiation shielding material. The shielding material may be a boron-containing material such as Metamic® or Holtite™ (each a proprietary product of Holtec International of Camden, New Jersey); the latter of which generally comprises hydrogen rich polymer impregnated with boron carbide particles for neutron shielding. Metamic® is a discontinuously reinforced aluminum boron carbide metal matrix composite material designed for neutron radiation shielding. Either shielding material is effective for neutron scattering/attenuation. Other neutron scattering/attenuation material may be used. In one embodiment, the radiation shielding plate 31 may be Holtite™.

Top lid assembly 25 may include a inner lid 26 and outer lid 27 in one embodiment. Both the inner and outer lids are recessed into the top end of the cask body 21, more particularly top end forging 37, such that the lids do not protrude above the top end 21 of the cask. Lids 26 and 27 may be stacked on top of each other in abutting contact in one arrangement. Inner lid 26 may have a smaller outer diameter than the outer lid 25 which allows each lid to be fastened to a different circumferentially-extending annular surface of the top end forging 37. Inner lid 26 may be bolted onto the top end forging 37 by a first circumferential array of threaded fasteners 28 such as bolts. Outer lid 27 may be bolted onto the top end forging of the cask by a second circumferential array of threaded fasteners 28 such as bolts which fall on a different bolt circle outside the bolt circle formed by the bolts for the inner lid. Inner and outer lids 26, 27 may be formed of metal such as steel (e.g. stainless steel in one embodiment) and has a substantial thickness selected to effectively block gamma radiation emitted by the canister 30. The inner and outer lids 26, 27 may be formed of steel such as stainless steel in some embodiments.

The sidewall 24 of cask 20 may be formed by multiple vertically elongated cylindrical shells and radiation shielding materials. Alternatively, sidewalls 24 may be collectively formed by a plurality of axially aligned and vertically stacked cylindrical shell segments seal welded together at the joints therebetween to form an elongated shell assemblage. In one embodiment, the cask body may be a composite construction generally comprising a structural inner shell 24a, intermediate gamma shield 24b, and outer neutron shielding jacket 40. Shell 24a, gamma shield 24b, and jacket 40 may be generally annular and cylindrical in shape, and are concentrically aligned with each other and longitudinal axis LA of cask 20.

Inner shell 24a may be formed of a structural metal such as steel (e.g. stainless steel or other) which forms the innermost part of sidewall 24 whose interior surface forms the cavity 28 of the cask which holds nuclear waste canister 30. The intermediate gamma shield 24b may be formed of a radiation shielding material, and more particularly a gamma shielding material effective for blocking gamma radiation emitted by the SNF stored in nuclear waste container 30 held inside the cask 20. Intermediate shield 24b may be formed of lead of suitable thickness in some embodiments. However, other dense gamma blocking materials such as concrete, copper, suitably thick steel, etc. may alternatively be used as some non-limiting additional examples. The inner shell 24a and gamma shield 24b may be in substantial conformal contact in some embodiments as shown, or alternatively may be radially spaced apart forming an annular gap therebetween. Both the inner shell and gamma shield formed of dense steel and lead material types described above are each effective for gamma blocking applications. The inner steel shell 24a provides the bulk of the structural support of the cask sidewall 24 and is welded to top and bottom end forgings 37, 38.

The cylindrical outer neutron shielding jacket 40 extends perimetrically and circumferentially around the sidewall 24 of cask 20 between the top and bottom ends of the cask. The jacket may extend longitudinally for substantially the entire height of the cask. The jacket 40 may be formed of a boron-containing neutron shielding material such as Metamic® or Holtite™ (each a proprietary product of Holtec International of Camden, New Jersey). These materials were previously described herein and are effective for neutron scattering/attenuation. In one embodiment, the jacket may be formed of Holtite™. Other neutron scattering/attenuation material may be used. In some constructions, the jacket 40 may be formed by two or more arcuate segments which are coupled together such as via welding or mechanical fastening methods. An outer metallic shell enclosure 41 which encases the neutron shielding jacket 40 may be provided in some embodiments for protection of the neutron shielding material.

Outward facing upper and lower impact load bearing surfaces 35, 36 are formed by exposed side portions of top and bottom end forgings 37, 38 of cask 20 above and below the neutron shielding jacket 40 in one embodiment as shown. The end forgings may be seal welded to the top and bottom ends of the inner shell 24a. Bearing surfaces 35, 36 extend circumferentially around the entire perimeter of the cask and face radially/laterally outwards. In one embodiment, the bearing surfaces may be formed by annular stepped portions 22 of the cask sidewall 24 at the top and bottom ends 21, 23 of the cask 20. The bearing surfaces 35, 36 represent reduced diameter stepped end portions of the cask 20 formed by the end forgings 37, 38 having a smaller outside diameter than the outside diameter of shielding jacket 40 on the main middle portion of the cask sidewall. Bearing surfaces 35, 36 are therefore recessed radially inwards from the adjoining full diameter portions of the cask sidewall 24 below the upper bearing surface 35 and above the lower bearing surface 36 as shown.

Pairs of upper and lower lifting lugs or trunnions 32 may be provided for lifting, transporting, and loading the cask 20 onto the rail car or other movable carrier via a motorized cask crawler typically driven by tank-like tracks for hauling the extremely heavy casks (e.g. 30 ton or more). Such robust cask crawlers are well known in the art without need for further elaboration and conventionally used for transporting and raising/lowering casks at a nuclear reactor facility (e.g. power generation plant or other) or interim nuclear waste storage facility. Cask crawler transporters are commercially-available from manufacturers such as J&R Engineering Co. of Mukwonago, Wisconsin (e.g. LIFT-N-LOCK®) and others. The trunnions 32 are rigidly attached to the inner steel shell 24a of the cask 20 such as via welding or another rigid coupling method.

The top and bottom impact limiters 50 according to the present disclosure will now be described. FIGS. 13-24 show the impact limiters and aspects thereof in greater detail.

Each impact limiter 50 generally comprises an outer protective cap shell 51, impact-absorbing core comprising perforated sleeve 80, and annular closure plate 70. Cap shell 51 in one embodiment includes a circular end wall 52 and a cylindrical sidewall 53 extending longitudinally from the end wall parallel to longitudinal axis LA of cask 20. End wall 52 defines an outer surface 58 including a plurality of fastener openings 57 to access fasteners used to secure the impact limiters 50 to cask 20, as further described herein. An innermost end of sidewall 53 opposite the end wall 52 (i.e. end of the sidewall proximate to cask 20 when impact limiter is mounted) defines an annular edge 59.

Cap shell 51 defines an internal end cavity 51a which is filled with a suitable energy absorbing material 45 that is crushable to dissipate external impact forces which might be caused by an end drop of the cask 20 (i.e. vertical drop on cask on end or slight oblique angle thereto). The energy absorbing material 45 may be a suitable preferably fire-resistant energy absorbing substance or structural assemblage. In one embodiment, the energy absorbing material may be a conventional honeycomb impact limiter formed by cross-laid corrugated aluminum panels 10 as previously described herein and shown in FIG. 29. In this application, the honeycomb arrangement of panels is used for cask end impact situations while side drop impact protection is provided by the perforated sleeves 80 further described herein collectively forming a hybrid impact limiter. The panels 10 would be oriented such that the plane of each panel is oriented perpendicularly to longitudinal axis LA of the cask (i.e. cross-wise). Open areas between the panels would therefore be arranged in the lateral/radial direction, not longitudinally. In another embodiment, the energy absorbing material 45 may be a crushable polymeric foam material of suitable density (e.g. polyethylene, etc.). In one embodiment, the energy absorbing material 45 may fill the end cavity 51a such that the material has a longitudinal thickness substantially greater than perforated sleeve 80, and may comprise a majority of the total longitudinal height of the cap shell 51. In some cases, the shell 51 may further provide structural support to the impact limiter assembly. In one construction, an annular spacer 71 may be provided which forms an annular gap between the end wall 52 of the cap shell 51 and the perforated sleeve 80 to space the sleeve longitudinally apart from the end wall (see, e.g. FIGS. 14-15).

Cap shell 51 may be formed of a suitable metal, such for example without limitation thin gauge stainless steel. Other metal materials including suitable gauge aluminum or other can be used. The cap shell provides a protective outer skin that encloses the energy-absorbing perforated sleeve 80 and energy absorbing material 45 at the outboard ends of the impact limiters 50 which shields the sleeve and energy absorbing material from minor damage, fire, and weather during transport and handling.

Cap shell 51 includes a centrally-located cylindrical collar 55 defining an open circular receptacle 56. Collar 55 projects inwardly in a longitudinal direction from the end wall 52 of the cap shell towards the cask 20. Collar 55 is spaced radially inward from sidewall 53 to define an open annulus 54 configured for receiving and mounting perforated sleeve 80 therein. Sleeve 80 becomes fully nested within the annulus 54 and cap shell 51 when positioned in the impact limiter 50. Perforated sleeve 80 is located inboard of end wall 52 for both the top and bottom impact limiters. Once the perforated sleeve is mounted in annulus 54, closure plate 70 may be welded to annular edge 59 and/or collar 55 to retain the sleeve in the cap shell.

The impact limiters 50 may be detachably mounted to the lid assembly of the cask 20 via a plurality of threaded fasteners 60 such as bolts. Fasteners 60 may be supported by a circular metallic bolting plate 64 positioned inside circular receptacle 56 formed in the cap shell 51 by collar 55. Fasteners 60 project towards the cask 20 from bolting plate 64 in receptacle 56 to threadably engage corresponding threaded sockets or bores 61 formed in the upper outer lid 27 and the baseplate portion of the bottom end forging 38 when the top and bottom end forgings of cask 20 are insertable received in central receptacle 56 of the impact limiters. The enlarged heads of the bolts do not pass through bolting plate which may be welded to the collar 55 while the threaded shanks of the bolts pass through respective openings in the bolting plate to project inwards from the bolting plate to threadably engage the cask (see, e.g. FIGS. 14 and 15). Bolting plate 64 may be formed of a suitably strong metal, such as without limitation carbon or stainless steel for strength. The bolting plate 64 is compressed by the impact limiter fasteners 60 against the uppermost exposed outer lid 27 of cask 20 at top and radiation shielding plate 31 at the bottom of the cask when the impact limiter 50 is detachably coupled thereto.

Bolting plate 64 may be spaced longitudinally apart from energy absorbing material 45 in one embodiment. A circular radiation shielding disk 63 with bolt holes may be interposed between bolting plate 64 and the energy absorbing material. Radiation shielding disk may be formed of a radiation shielding material effective for neutron attenuation, such as without limitation Holtite™ previously described herein. Other neutron absorbing materials or gamma blocking materials such as lead may be used in other embodiments depending on the radiation shielding needs. In other embodiments, the shielding disk 63 may be replaced by a disk of thermal fire-resistance insulation for added protection of the cask against a fire event. Longitudinally-extending fastener openings 57 formed through the energy absorbing material 45 of each impact limiter provide access to the fasteners 60 for tightening and coupling the impact limiters 50 to the cask 20. The bottom radiation shielding plate 31 of cask 20 may also include a plurality of longitudinally-extending fastener openings 62 which permit the fasteners to reach and access the threaded bores 61 in the bottom end forging 38 (see, e.g. FIG. 15).

Figure 13:
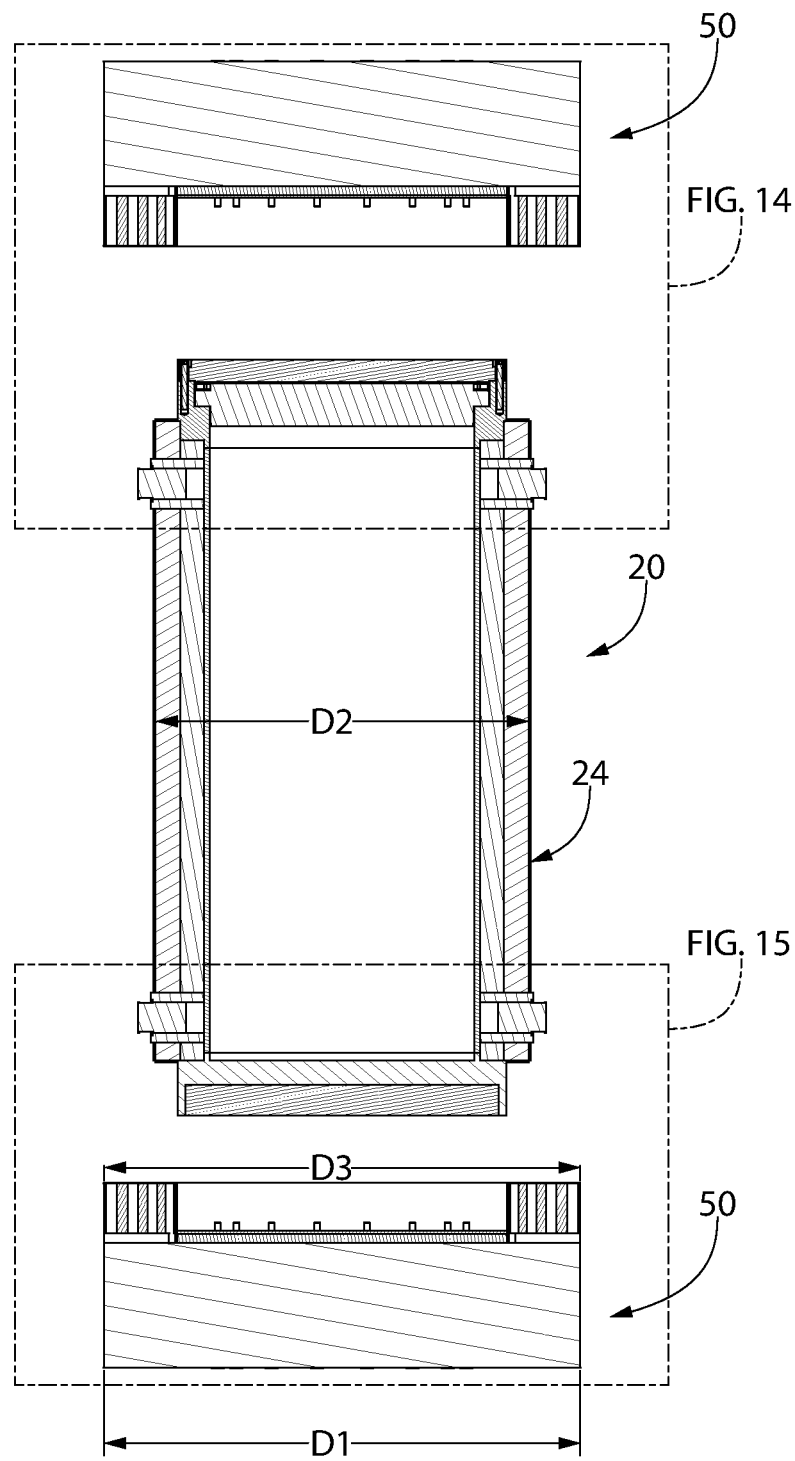
FIG. 13 is a longitudinal cross sectional view thereof.
Figure 14:
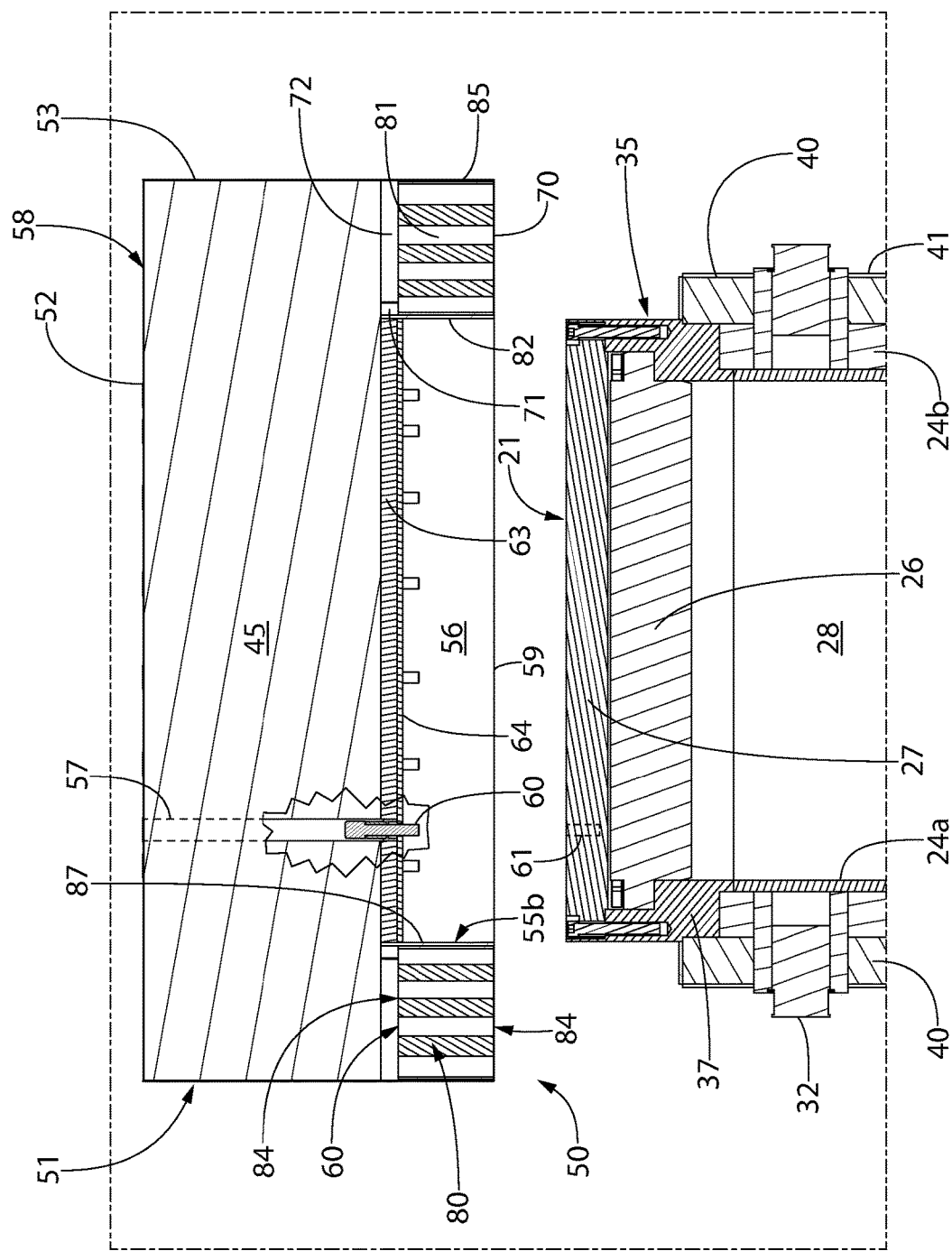
FIG. 14 is an enlarged top detail taken from FIG. 13.
Figure 15:
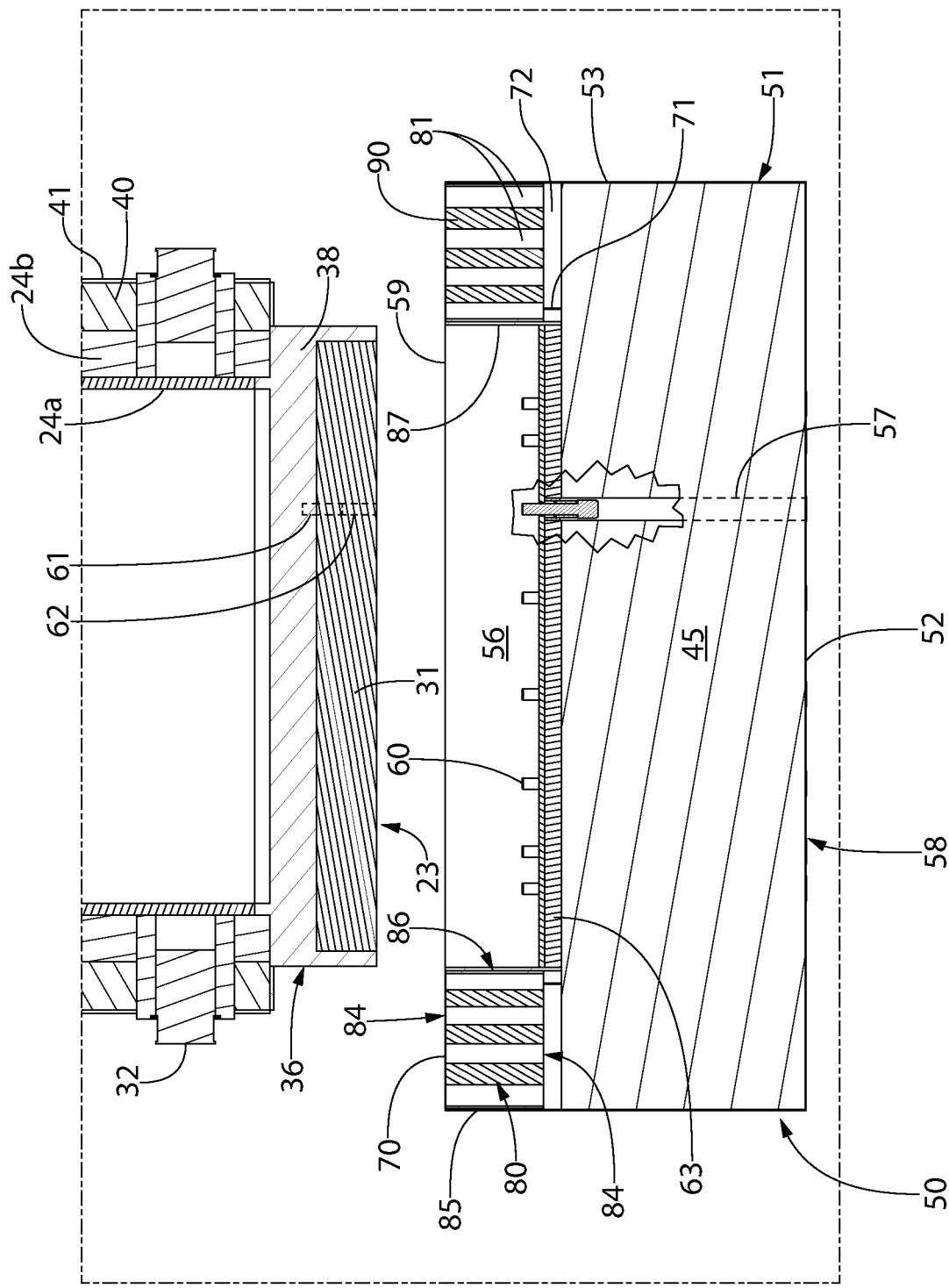
FIG. 15 is an enlarged bottom detail taken from FIG. 13.
Figure 16:
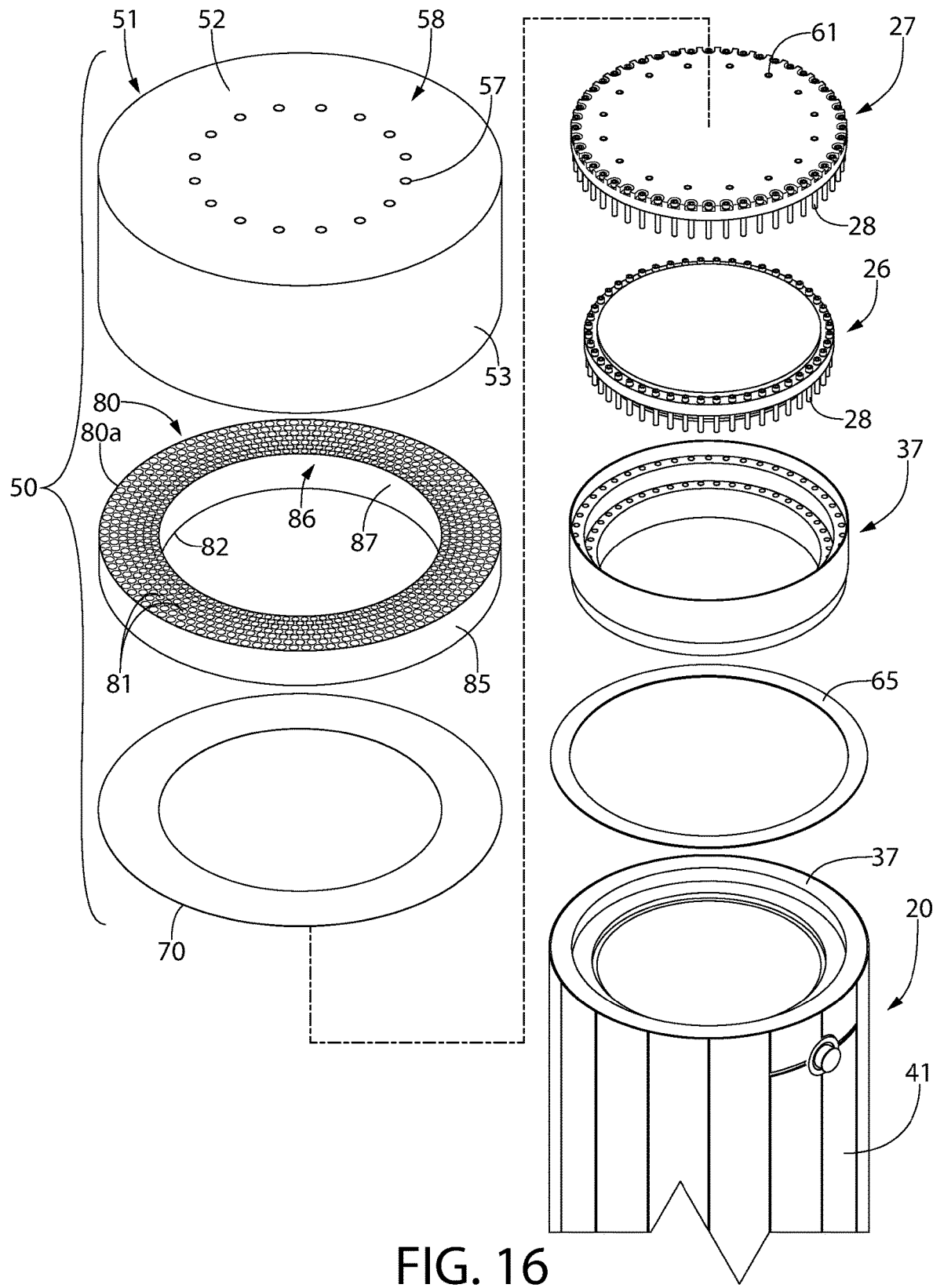
FIG. 16 is an exploded top perspective view of the upper portion of the cask and impact limiter.
Figure 17:
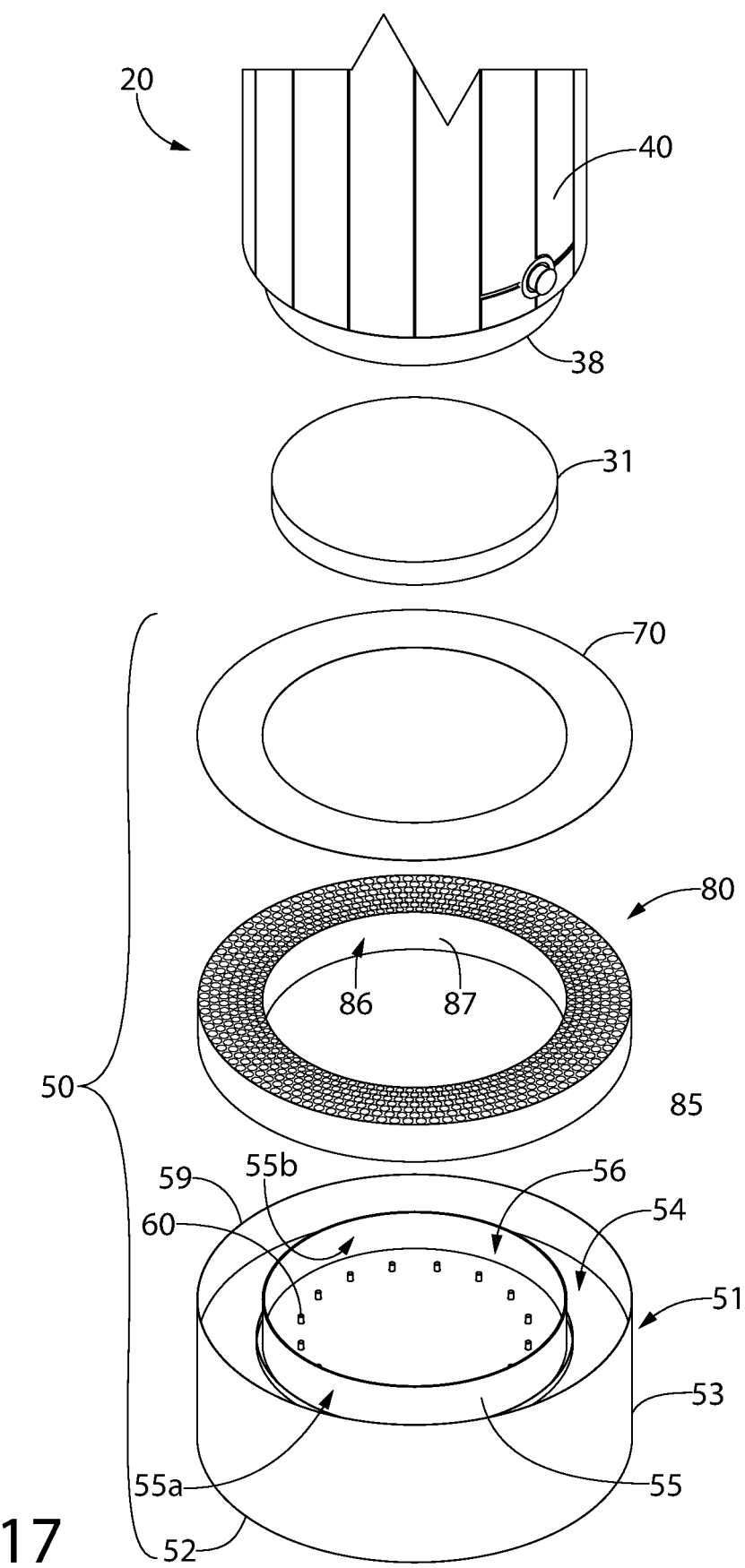
FIG. 17 is an exploded bottom perspective view of the lower portion of the cask and impact limiter.
Figure 18:
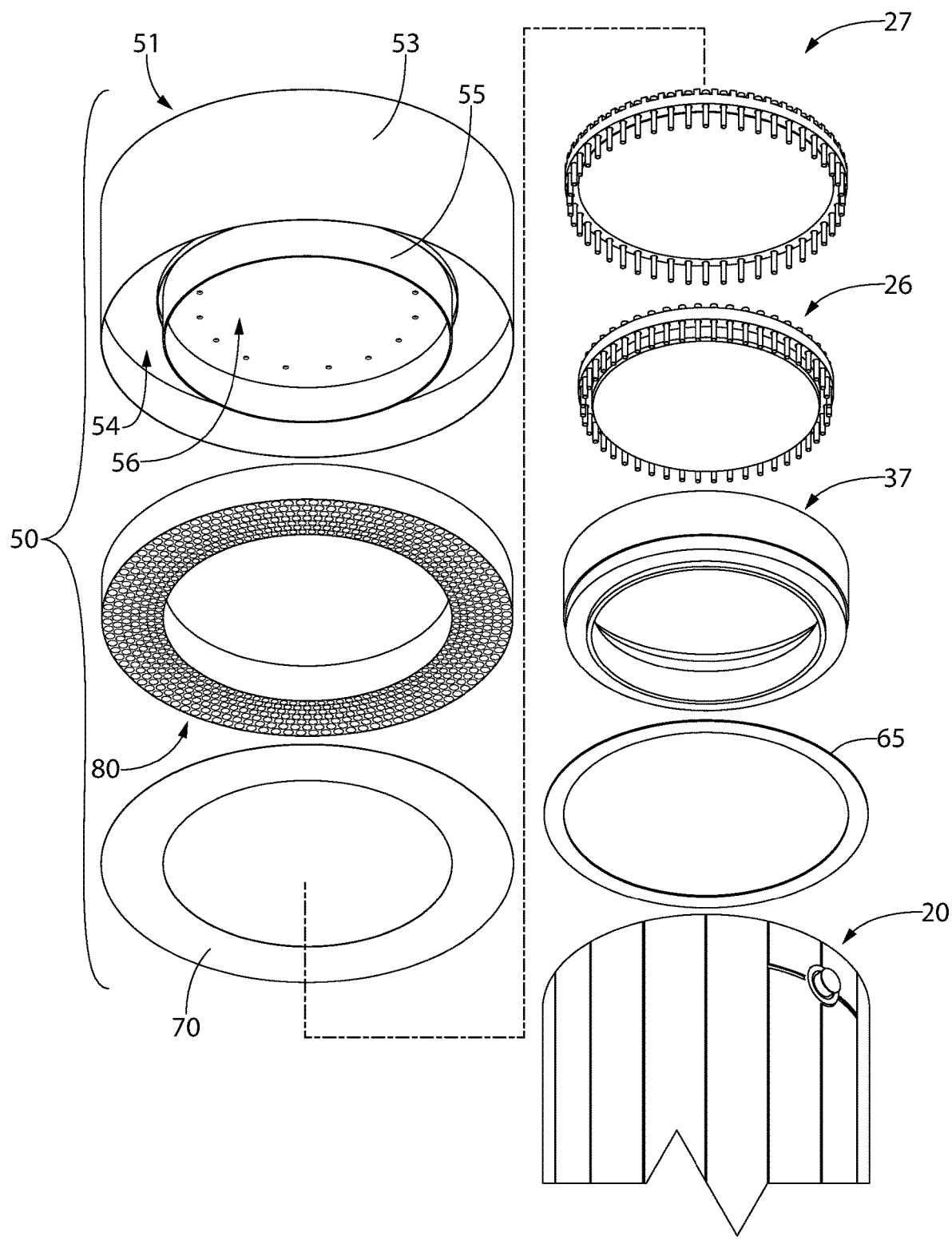
FIG. 18 is an exploded bottom perspective view of the upper portion of the cask and impact limiter.
Figure 19:
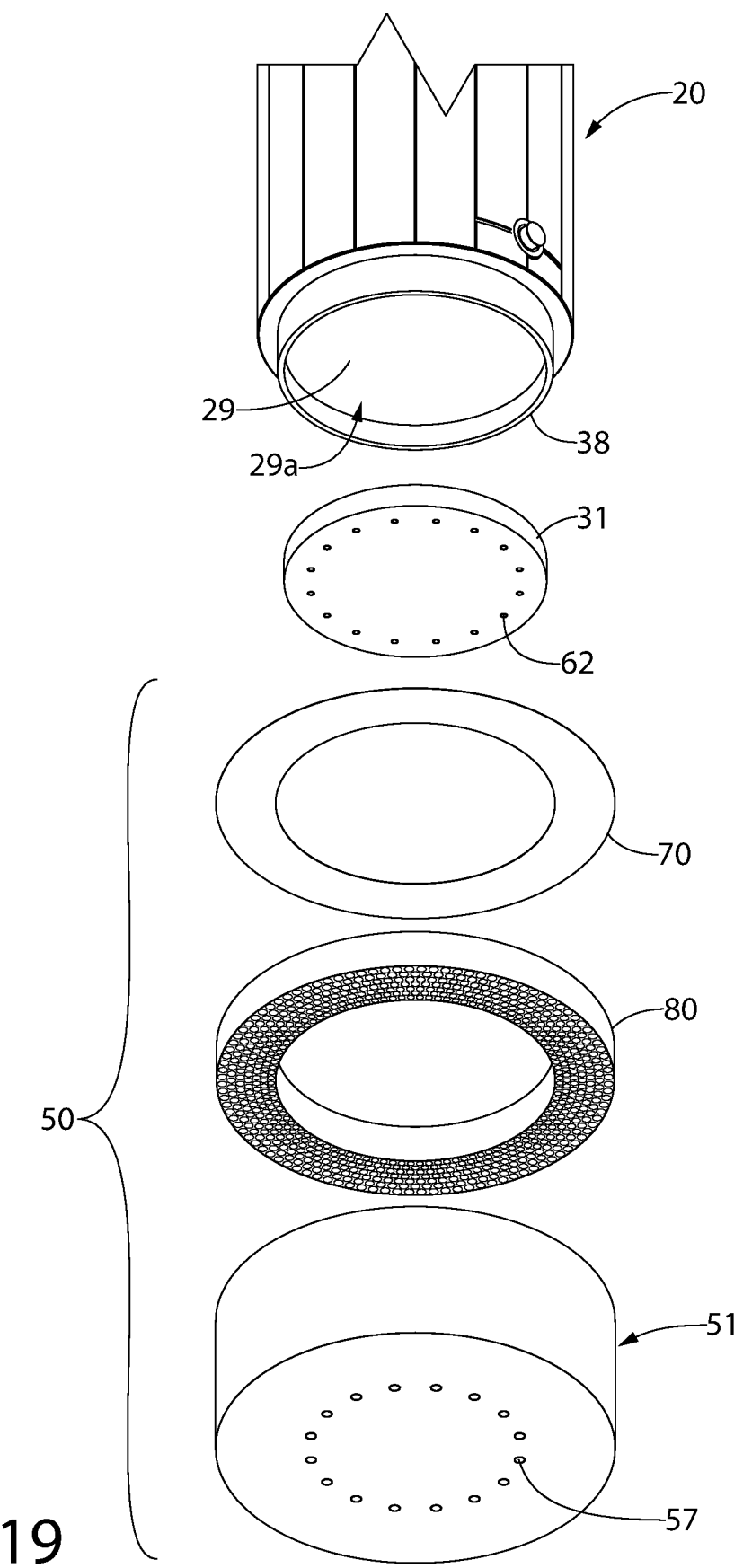
FIG. 19 is an exploded bottom perspective view of the lower portion of the cask and impact limiter.
Figure 20:
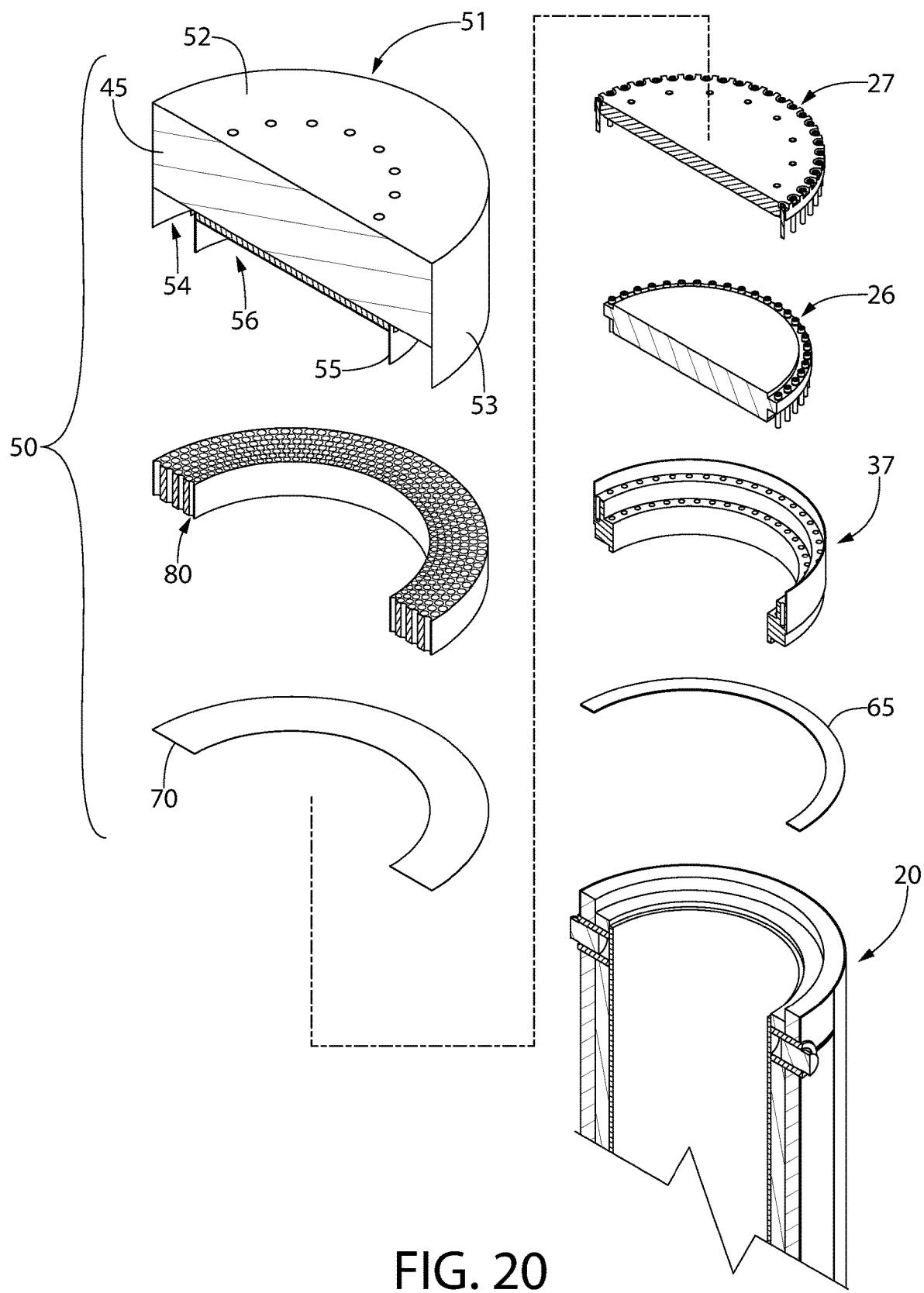
FIG. 20 is an exploded top cross-sectional perspective view of the upper portion of the cask and impact limiter.
Figure 21:
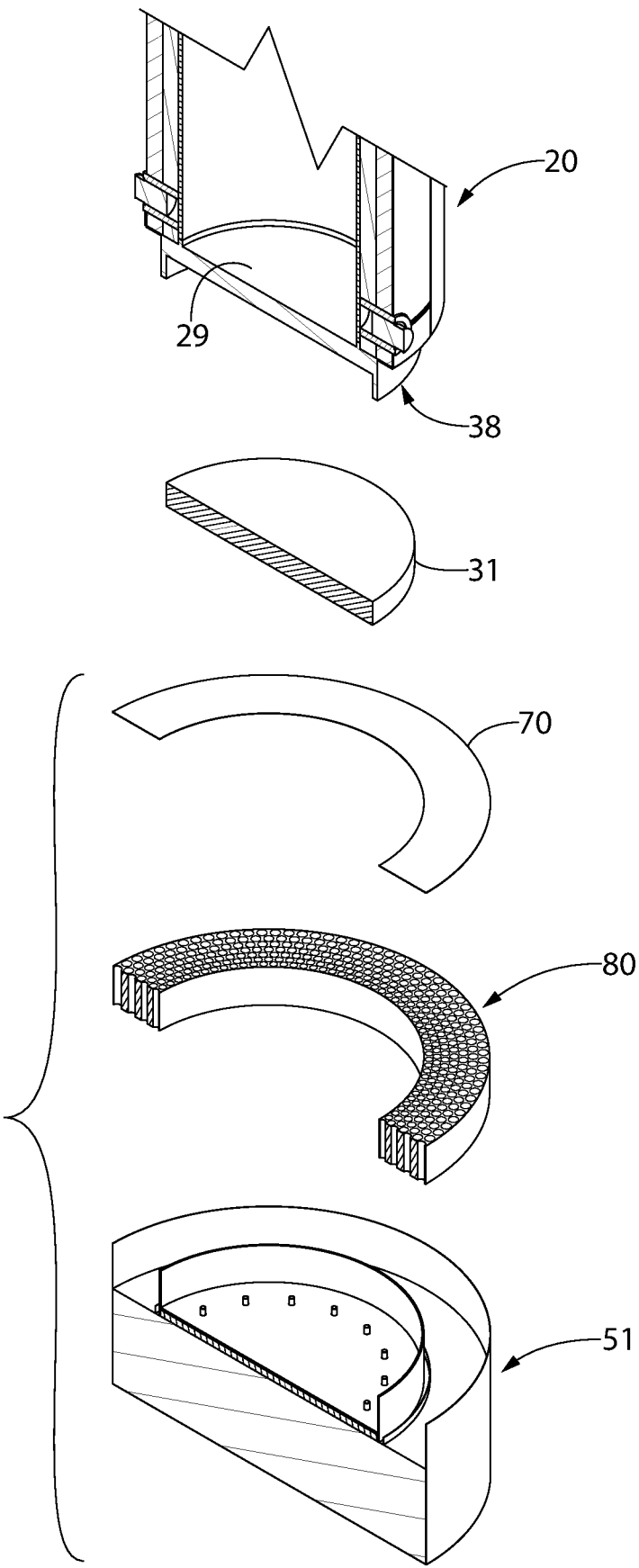
FIG. 21 is an exploded top cross-sectional perspective view of the lower portion of the cask and impact limiter.

When mounted on cask 20, the impact limiters 50 have an outside diameter D1 which is larger than the outside diameter D2 of the cask (defined by the exterior surface of radiation shielding jacket 40 (identified in FIG. 13). The outside diameter D3 of the perforated sleeve 80 similarly is larger than cask outside diameter D2. Accordingly, the impact limiters are configured to each protrude radially outward beyond the body of cask to protect the cask if dropped. The deformable impact limiters, and not the cask, will first strike the impact surface (e.g. ground or concrete slab generally) to absorb and dissipate he impact force or kinetic energy of the fall.

Perforated sleeve 80 may have an annular body 80a formed of a base metal such as without limitation aluminum or aluminum alloy in one non-limiting preferred embodiment. The body may be a solid metal monolithic body of unitary structure in one embodiment. This construction advantageously allows the perforated sleeve to absorb and mechanically deform in in response to an external impact force as an integral solid unit in a directionally uniform manner.

Figure 30:
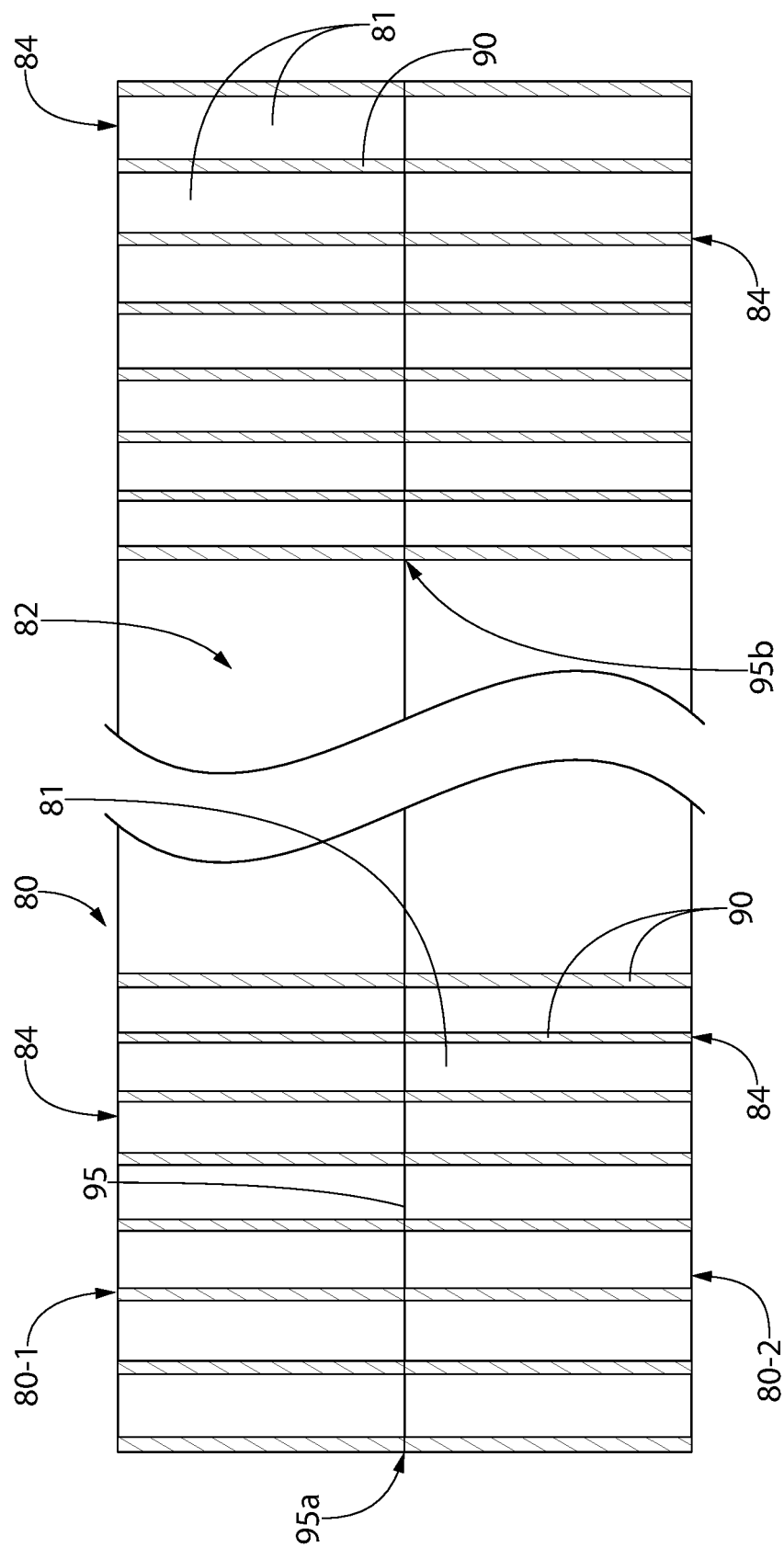
FIG. 30 is a side cross-sectional of another embodiment of a perforated sleeve of the impact limiter having a composite construction formed by welding multiple ring segments of sleeves together at their inner and outer peripheries.

In other possible constructions, the body of perforated sleeve 80 may be formed by composite construction formed by multiple stacked and welded annular metal ring segments having the same mounting and impact absorbing features as the monolithic sleeve described further below. FIG. 30 shows one non-limiting example of such a composition construction. The segmented perforated sleeve comprises at least two ring segments 80-1, 80-2 which are abuttingly engaged and stacked upon each other at a flat-to-flat interface between mating major end surfaces 87 of the ring segments which form a joint 95 therebetween. The segments 80-1, 80-2 may be welded together at their inner and outer circumferential peripheries. More specifically, welds may be formed between the annular abutting outer circumferential walls 85 of the abutted segments at the exposed outboard portions 95a of the joint 95. Welds may also be formed between the annular abutting inner circumferential wall 87 within central opening 82 of the segments 80-1, 80-2 at the exposed inboard portions 95b of the joint. Intermittent stitch welds spaced circumferentially apart or full circumferential welds may be used to permanently join the ring segment; both welding methods of which are well known in the art without further explanation. The composite perforated sleeve 80 may be built in segments to the desired height of the sleeve by permanently joining a suitable number of segments together of individual height. The array of collapsible perforations in each ring segment would be concentrically aligned with each other in the stack to form continuous longitudinal passages 81 which extend for the full height of the stack and perforated sleeve 80.

With continuing general reference now to FIGS. 1-24, the perforated sleeve body 80a may comprise a central opening 82 and a circumferential array of perforations comprising elongated longitudinal passages 81 formed between flat and parallel opposing major end surfaces 84 of the body. Central opening 82 receives the top and bottom ends 21, 23 of cask 20. Passages 81 may extend completely through the major end surfaces in one non-limiting preferred embodiment; however, in other possible embodiments the passages 81 may extend only partially through annular body of the sleeve. Cylindrical outer circumferential wall 85 and inner circumferential wall 87 extend longitudinally between the major end surfaces 84 of the perforated sleeve 80 parallel to longitudinal axis LA. The inner circumferential wall 87 of perforated sleeve 80 defines an inward facing annular load transfer surface 86 which engages the annular outer surface 55a of collar 55 facing outward towards annulus 54 when the sleeve is positioned in the annulus of impact limiter 50. The opposite annular inner surface 55b of collar 55 facing inward toward receptacle 56 is positioned to engage the top and bottom outward facing annular impact load bearing surfaces 35, 36 of cask 20 when the impact limiters 50 are installed on the cask.

Figure 10:
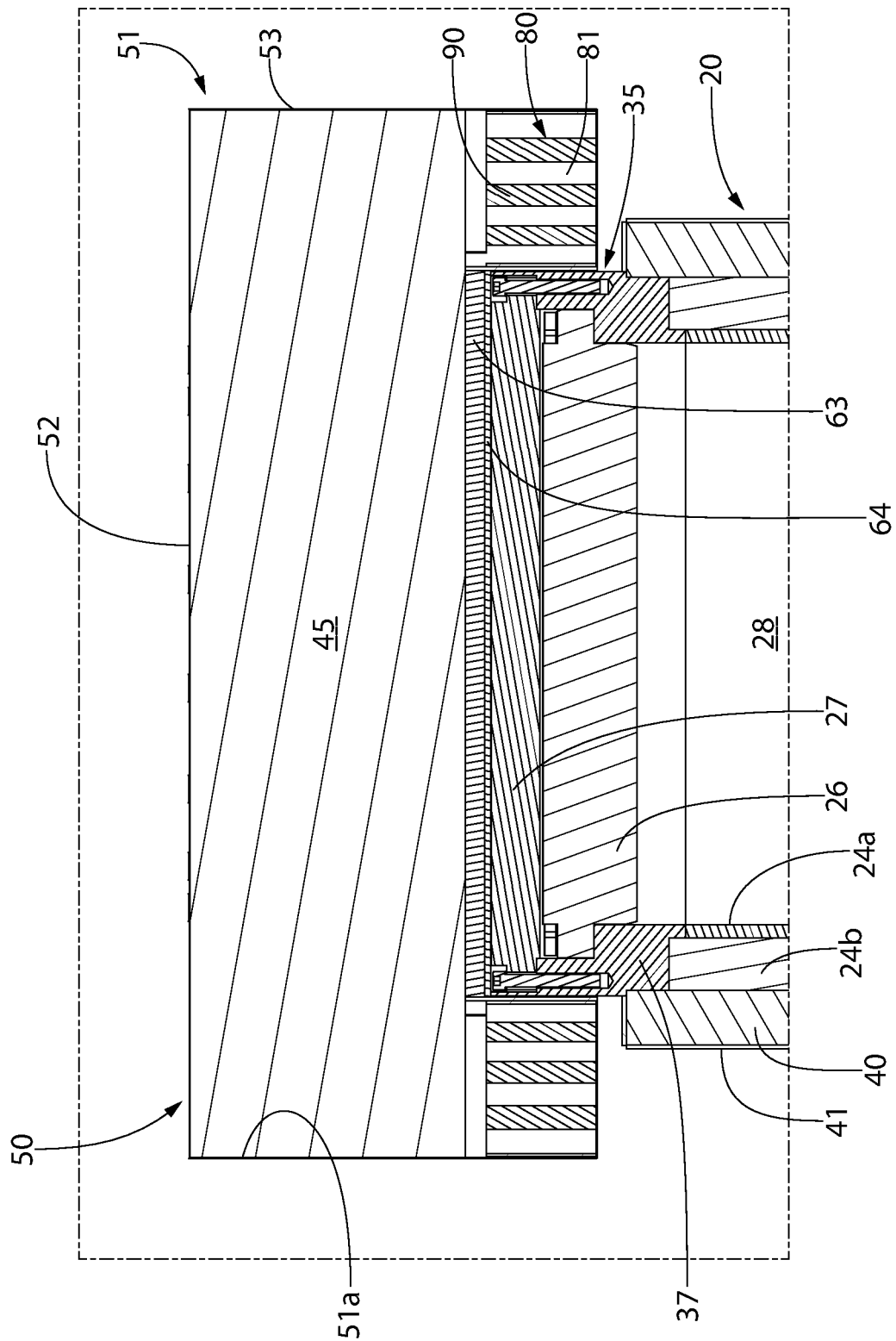
FIG. 10 is an enlarged top detail taken from FIG. 9.
Figure 11:
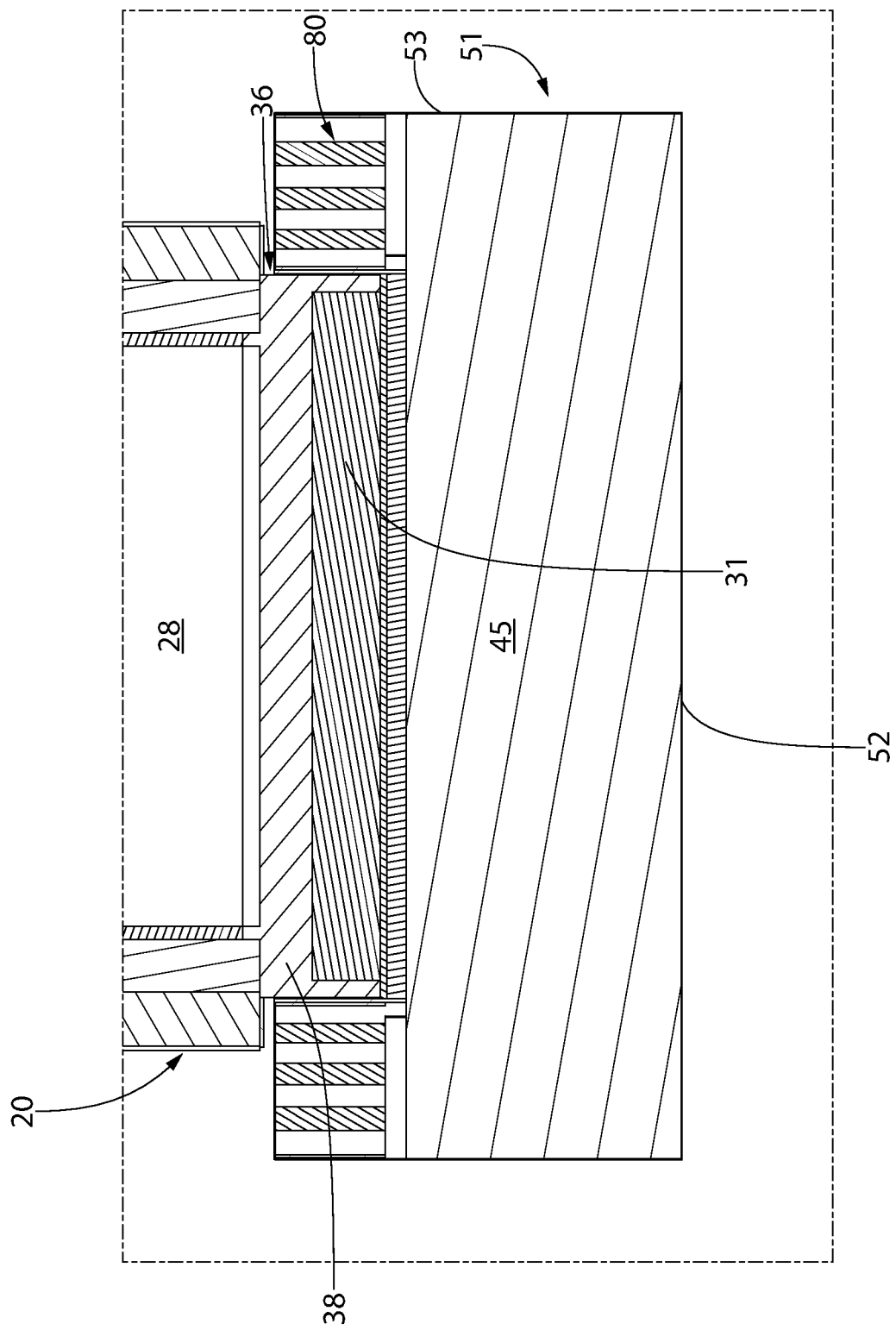
FIG. 11 is an enlarged bottom detail taken from FIG. 9.
Figure 12:
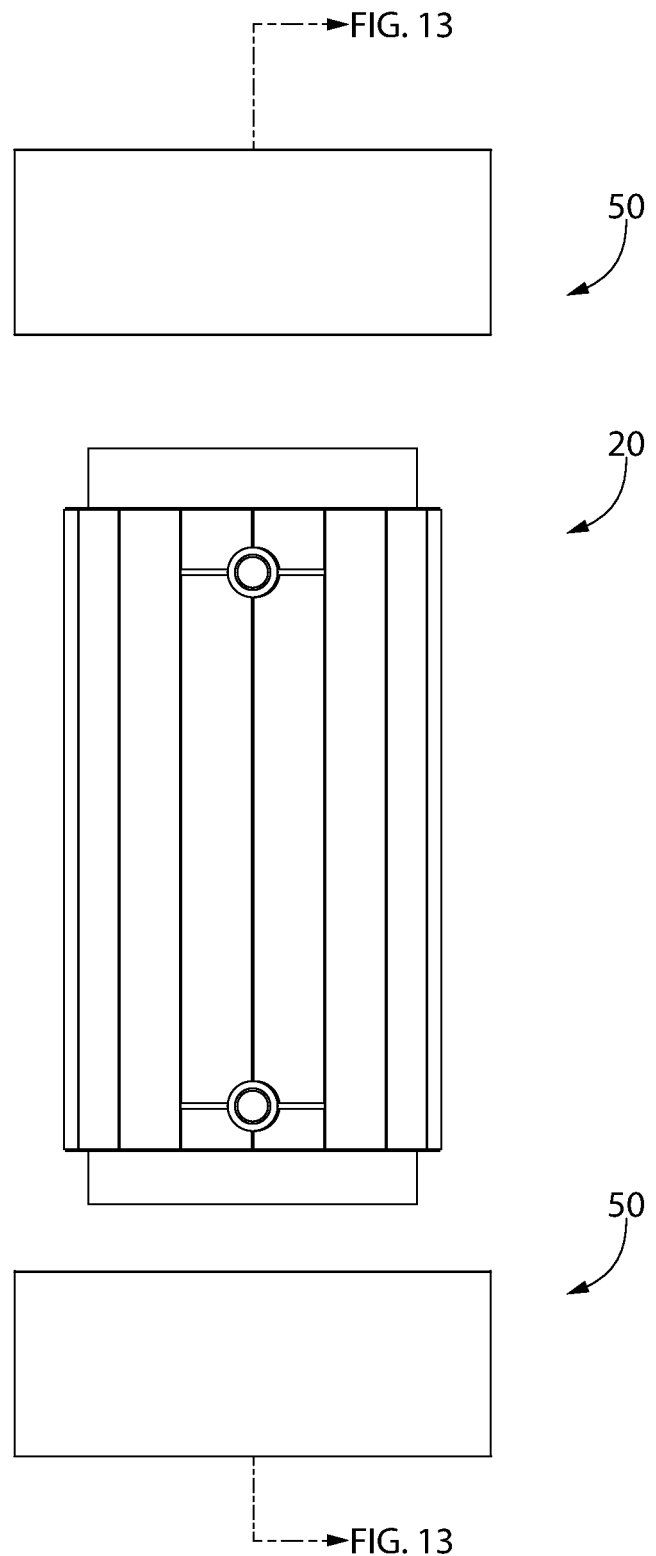
FIG. 12 is an exploded side view of the cask and impact limiters of FIG. 1.

The impact sleeve 80, collar 55, and bearing surfaces 35, 36 of the cask are laterally/radially aligned when the impact limiters 50 are mounted on the top and bottom ends of the cask (see, e.g. FIGS. 10-11). This allows the radially inward directed impact load or force resulting from an impact event to be distributed radially through the impact sleeve 80 to the cask to be absorbed by the more structurally robust top and bottom end forgings 37, 38 rather than the steel inner shell 24a, lead intermediate gamma shield 24b, and outer boron-containing neutron shielding jacket 40. These latter components are structurally weaker in the radial/lateral direction and/or thinner in lateral thickness than the end forgings 37, 38 as shown, and hence are more susceptible to damage due to impact loads which could breach the nuclear waste containment package (i.e. cask). Radially acting external impact forces are transmitted through in turn (from outside to inside) the impact sleeve 80, to collar 55, and finally to the cask load bearing surfaces 35, 36 of the cask end forgings 37, 38.

With continuing reference to FIGS. 13-24, the longitudinal passages 81 may be oriented parallel to each other and extend between major end surfaces of the perforated sleeve 80. Accordingly, none of the passages may intersect any other passages. In one embodiment, the longitudinal passages may further be oriented parallel to the longitudinal axis LA of the cask when mounted thereon. In such an orientation, passages 81 are oriented perpendicular to the opposing major end surfaces 84 of the perforated sleeve 80. Longitudinal passages 81 may have a circular transverse cross section which allows them to be readily formed by drilling the solid metallic body of the perforated sleeve. However, other cross-sectional shapes are possible. The passages may each have a longitudinal length Lp which is greater than their respective diameter Dp (see, e.g. FIGS. 23-24). In some non-limiting preferred embodiments, the longitudinal passages each have a length Lp greater than at least two times their respective diameter Dp. This allows formation of a longitudinally thick perforated sleeve 80 for greater lateral and oblique impact resistance, and protection of the cask 20 in surviving falls. The end wall 52 of impact limiter 50 may have a longitudinal thickness which is at least twice the longitudinal thickness of perforated sleeve 50 in some embodiments.

Figure 23:
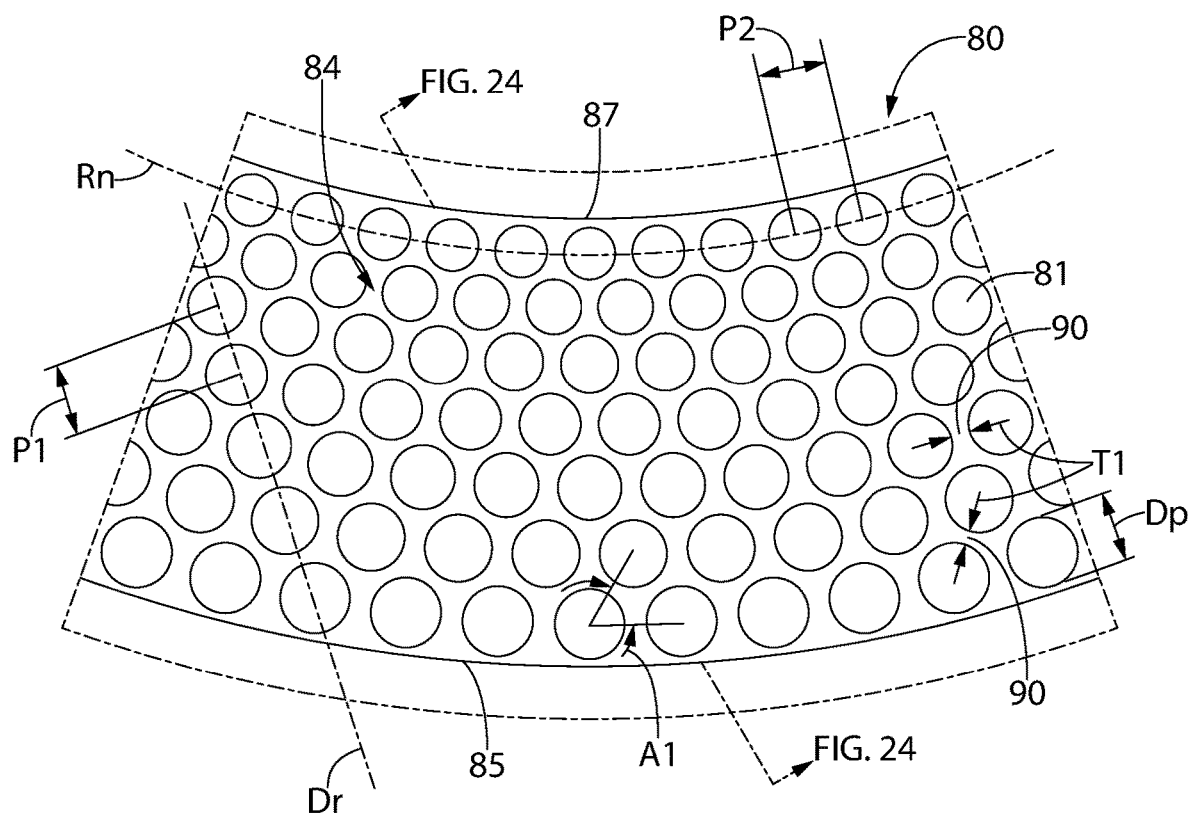
FIG. 23 is an enlarged detail taken from FIG. 22.

The array of longitudinal passages 81 of perforated sleeve 80 may be dispersed in a full 360 degree pattern around an entirety of the perforated sleeve as best shown in FIG. 23. In one embodiment, the array of longitudinal passages 81 may be arranged in multiple circumferentially-extending concentric rings Rn of longitudinal passages which extend circumferentially around the perforated sleeve. In some embodiments, at least 3 rings Rn may be provided. In the non-limiting illustrated embodiment, 7 rings are shown. Any suitable number of rings may be provided depending on the radial width of the perforated sleeve 80, diameter Dp of the longitudinal passages 81, and other design factors. Longitudinal passages 81 in each ring Rn may be uniformly spaced apart in one implementation.

The longitudinal passages 81 may be arrayed in a triangular staggered pitch or hole pattern as best shown in FIG. 23. In certain embodiments, a 60 degree hole pattern may be used in which passages 81 in adjacent rings Rn are located at an acute angle A1 of 60 degrees to each other. Other angles and hole patterns may be used. The staggered hole pattern allows a maximum number of passages 81 to be formed in perforated sleeve 80 due to the circumferentially offset positioning of passages between adjacent rings Rn (i.e. a passage 81 in the next inward or outward adjacent ring Rn to a present first ring under consideration is located between each of two passages in a first ring as shown). The result is a tightly packed pattern of longitudinal passages 81 in the perforated sleeve 80, thereby concomitantly maximizing the open area which can be provided to control and maximize the deformability of the sleeve to absorb lateral drop-induced impact loads/forces.

The longitudinal passages 81 in each concentric ring Rn may have progressively larger diameters than the inwardly immediate adjacent ring of longitudinal passages such that the diameters increase in size moving radially outwards from the geometric center C of perforated sleeve 80 through the rings. Accordingly, in such a constructions, longitudinal passages 81 of an outermost ring Rn each have larger diameters than those in an innermost ring of longitudinal passages closest to the geometric center C and central opening 82 of perforated sleeve 80. Longitudinal passages 81 in diagonal rows Dr of passages 81 in the sleeve may be spaced at a hole pitch P1 which progressively gets larger between each adjacent ring Rn of passages moving in a radially outward direction from the central opening 82. In additional, the pitch P2 between longitudinal passages 81 in each concentric ring of passages may also become progressively larger moving in a radially outward direction. Accordingly, the pitch P2 between passages 81 in the outermost ring Rn is larger than pitch P2 between passages in the innermost ring.

Figure 22:
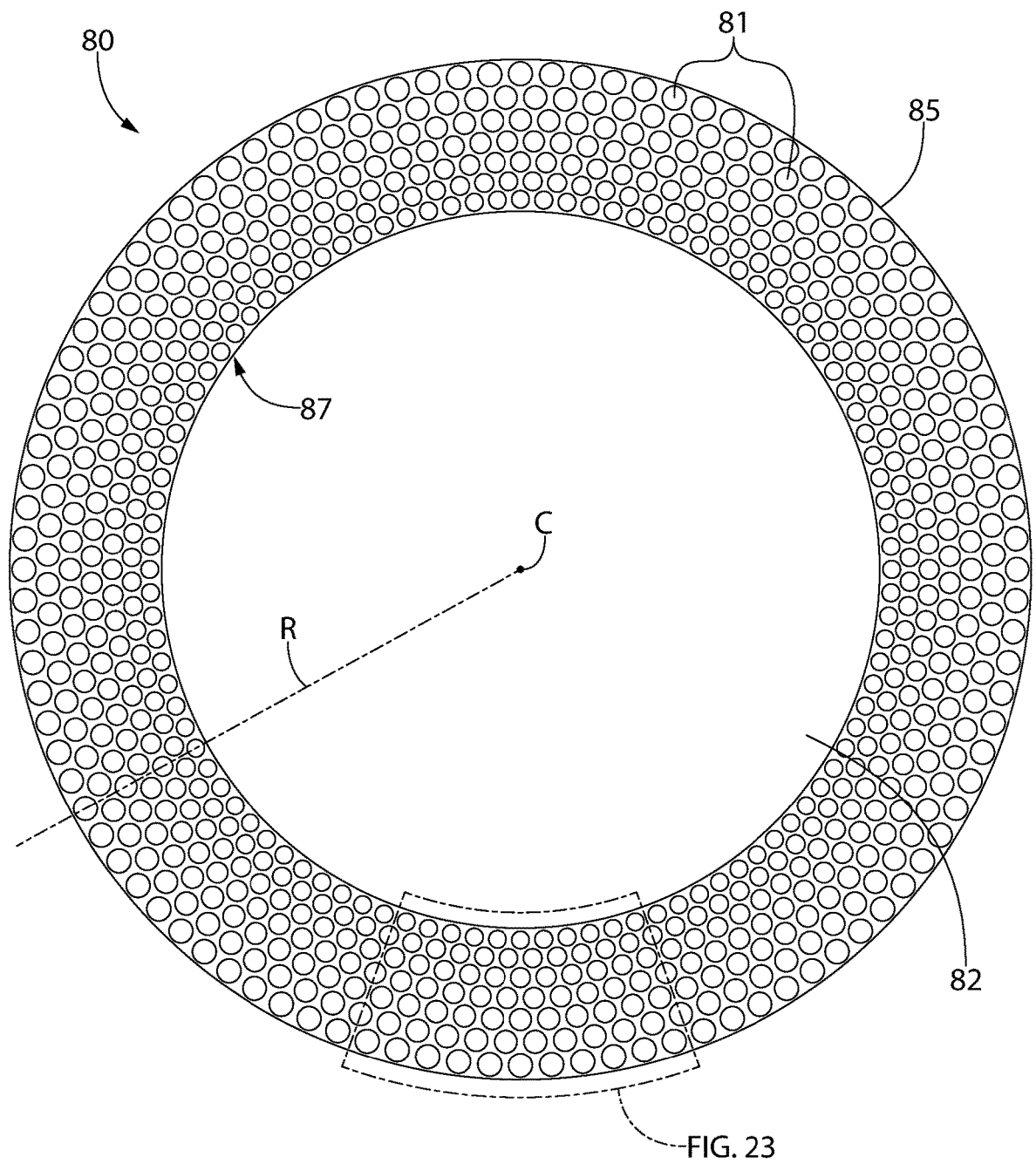
FIG. 22 is a top plan view of the perforation sleeve of the impact limiter.
Figure 24:
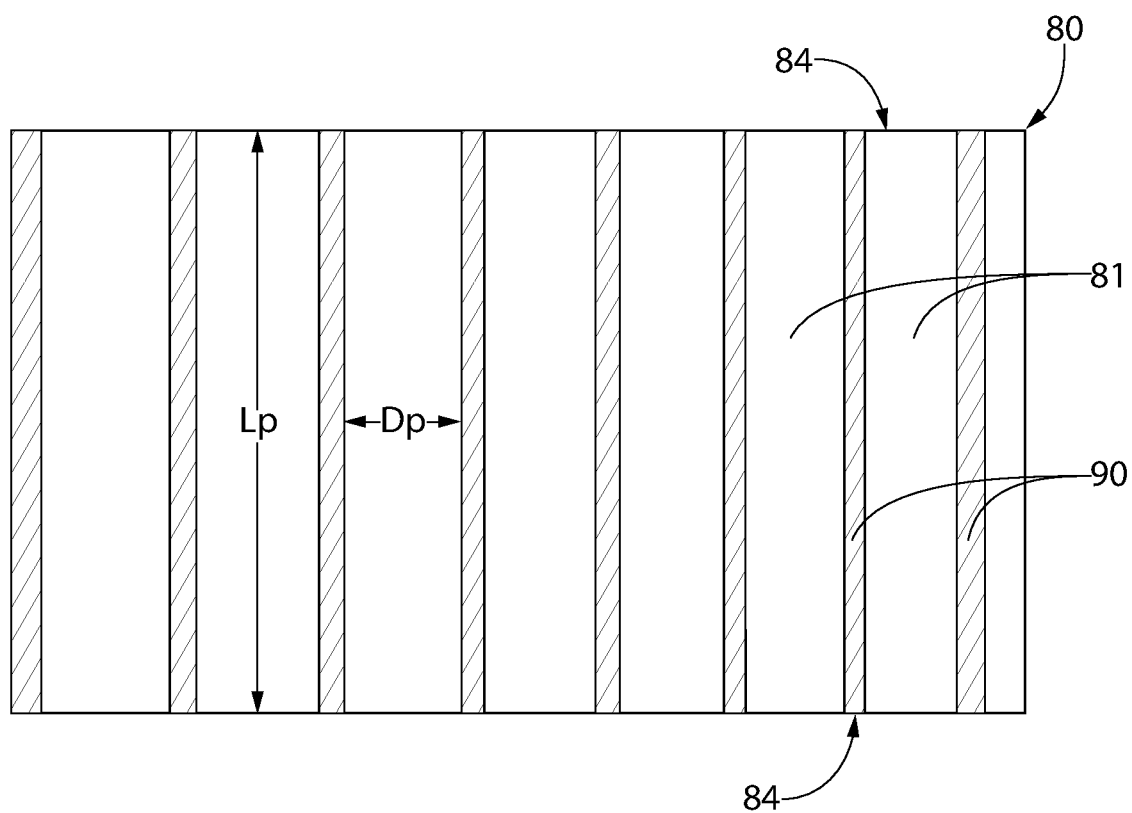
FIG. 24 is transverse cross sectional view taken from FIG. 23.

Referring to FIGS. 22-24, longitudinal passages are separated by a relatively thin ligament or web 90 of material of the solid metallic body of the perforated sleeve 80. A web thickness T1 is defined between adjacent longitudinal passages 81 which is measured perpendicularly to the passage lengths Lp as shown in FIG. 23 (perpendicularly to longitudinal axis LA of cask). The webs 90 extend fully between the opposing major surfaces 84 of the perforated sleeve between the passages 81. In various embodiments, the webs 90 between adjacent passages 81 may preferably be smaller in thickness T1 than the diameter Dp of the largest diameter longitudinal passage, and more preferably smaller than the smaller diameter longitudinal passage (i.e. innermost ring Rn of passages). The thin webs 90 in conjunction with the hole pattern and pitch (spacing) between longitudinal passages 81 result in a tightly packed perforations such that a radial reference line R drawn from the geometric center of the perforated sleeve 80 outwards through any portion of the sleeve will intersect at least one perforation regardless of angular orientation of the reference line.

The solidity ratio "S" is defined as the ratio of the solid metal area formed by the webs 91 of material between the longitudinal passages 81 divided by the total transverse cross-sectional area of the perforated sleeve 80 (calculated across major end surfaces 84 perpendicular to longitudinal axis LA). In one non-limiting preferred embodiment, the solidity ratio S may be less than 0.5 resulting in an open area of the sleeve 80 collectively formed by the longitudinal passages 81 being greater than 50% and solid areas concomitantly being less than 50%. The greater the open area, the generally greater the ability of the perforated sleeve to deform under lateral impact loads or forces acting perpendicularly (lateral/horizontal cask drop) or obliquely (angled cask drop) to the longitudinal axis LA of cask 20. In other embodiments where less deformability might be required, the open area of sleeve 80 may be less than 50% and solid area greater than 50% resulting in more solid area (i.e. solidity ratio greater than 0.5). As previously noted herein, the solidity ratio provides the engineering parameter that can be varied to achieve the required crush force resistance/crush performance of the perforated sleeve.

It bears noting that other hole patterns (e.g. square, etc.), other non-polygonal or polygonal hole shapes (e.g. oblong slots, ellipses, squares, rectangles, triangles, hexagons, etc.) and hole pitches may be used in other embodiments contemplates. Accordingly, the invention is not limited to the hole shape, hole pattern, or pitches described herein.

Computer Testing/Analysis of Perforated Sleeve

To evaluate the crush performance of the perforated aluminum perforated sleeve 80 of impact limiter 50 disclosed herein in lateral drop scenarios, a 109 metric ton cask protected during a lateral (horizontal) drop event (per 10 CFR 71.73) by the perforated sleeve was computer analyzed. This so-called free drop accident postulates a fall from 30 feet onto an essentially rigid surface. The following impact limiter geometry was computer modeled: Inner diameter of cylinder=86.75 inches; Outer diameter=123.75 inches; and Longitudinal Thickness (longitudinal major end surface to major end surface=13.0 inches"). The raw workpiece comprising a 6061-T6 aluminum ring (illustrated in FIGS. 22-24) was drilled with 7 rows of circular longitudinally-extending holes to form the longitudinal passages 81. The diameters of the passages range from 2.125 inches (innermost passages) to 2.875 inches (outermost passages) with an increment of 0.125 inch between adjacent circumferential concentric rings Rn previously described herein. There are 100 longitudinal passages 81 of same diameter in each row. The solidity ratio "S" of the perforated aluminum ring or sleeve used for the impact limiter was 0.455.

Figure 25:
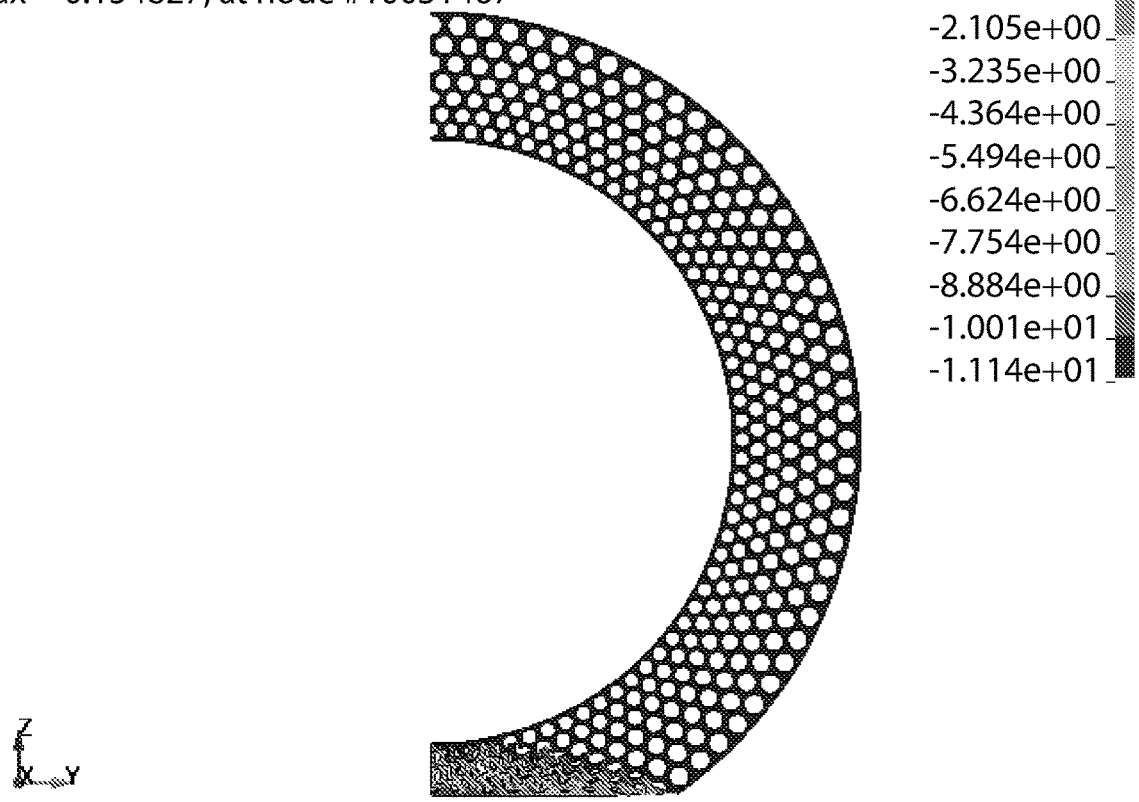
FIG. 25 is a computer generated image of the perforated sleeve after a drop test showing the deformed shape of the sleeve in the impact/crush zone.
Figure 26:
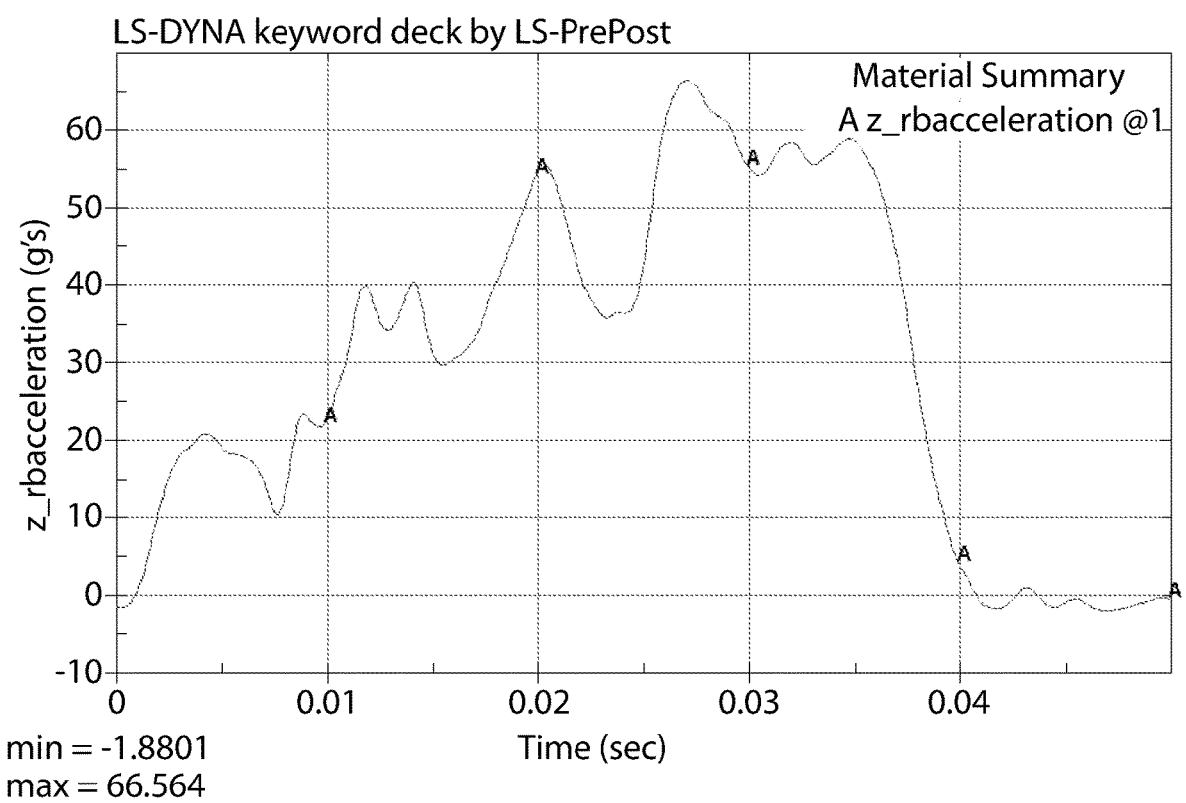
FIG. 26 is a computer generated graph from the drop test showing the impact deceleration time history of the cask.
Figure 27:
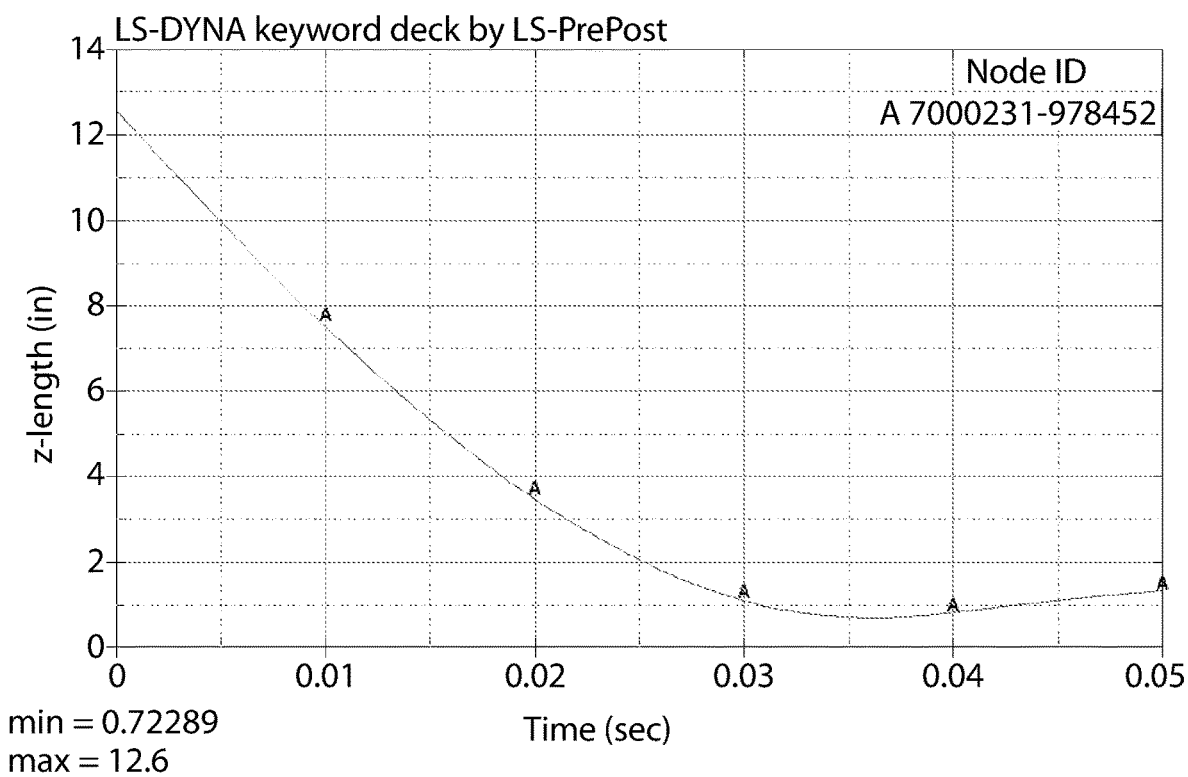
FIG. 27 is a computer generated graph from the drop test showing the cask to ground (impact surface) time history.

The 30-feet lateral (horizontal) drop event is simulated on the computer code LS-DYNA. FIG. 25 shows the deformed crushed shape of the impact limiter after the impact event. FIGS. 26 and 27 respectively show the impact deceleration-time history plot of the cask and the cask to ground (target surface) time history (a zero gap at the end of the impact is undesirable). FIG. 26 shows the peak deceleration to be limited to about 65 g's which indicates excellent impact limiter performance for this class of problems.

Figure 28:
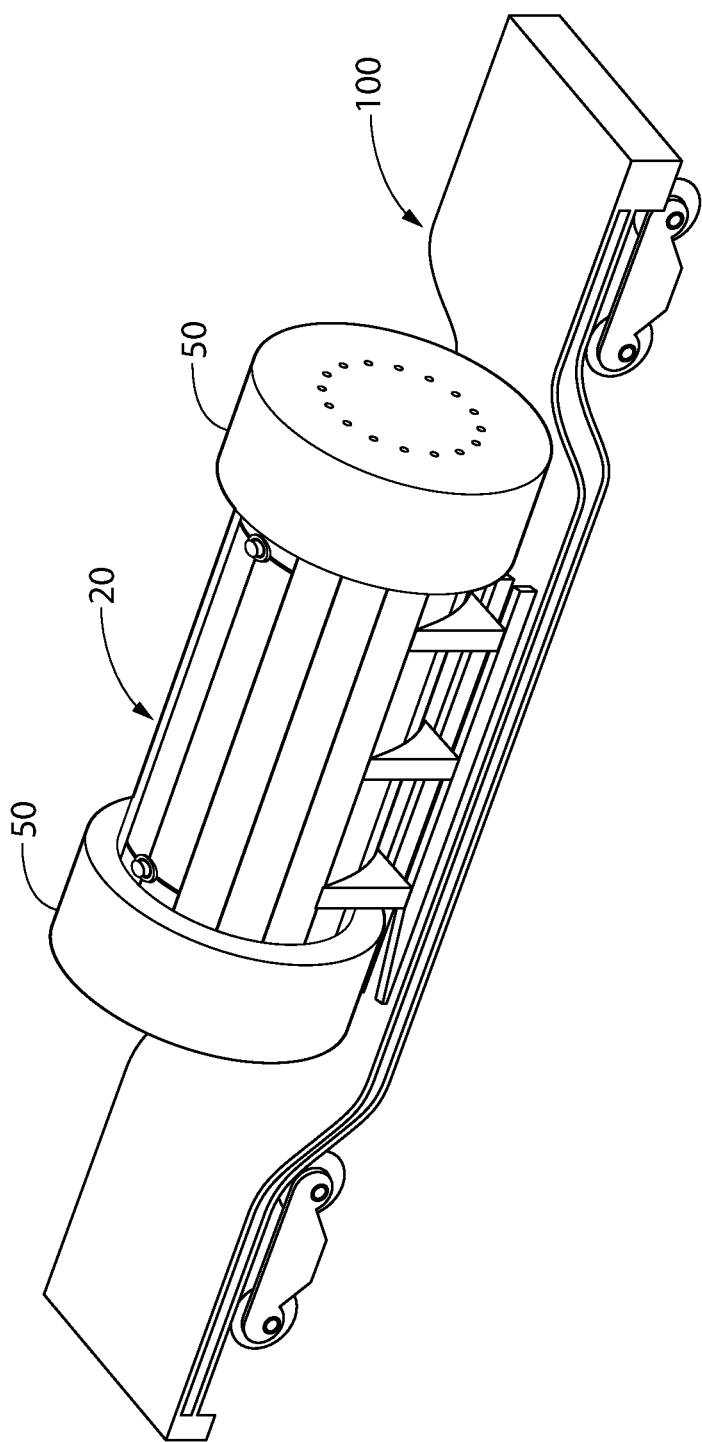
FIG. 28 shows the cask with installed impact limiter loaded on a transport rail car.
Figure 29:
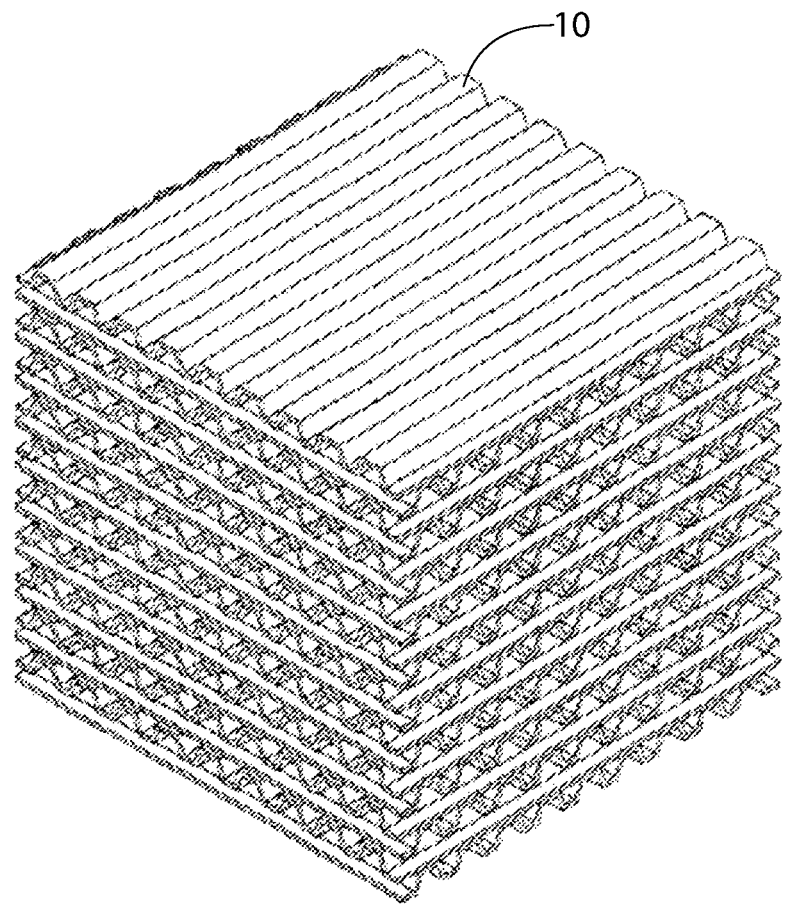
FIG. 29 shows the core structure of a prior impact limiter design.

FIG. 28 shows cask 20 with impact limiters 50 on each end loaded onto a typical low-body rail car 100 ("low boy") for transport. Cask 20 is transported in the horizontal position as shown to the intended destination site.

Aspects and contemplated variations of the impact limiter 50 utilizing the perforated ring or sleeve 80 are as follows. The perforated sleeve 80 may be made of a perforated aluminum that can be used to efficiently extract the kinetic energy from a falling transport package—cask, so as to limit the deceleration suffered by its contents including the nuclear waste container 30 with spent fuel assemblies (SNF) contained therein. Typical aluminum materials that are suited for this application inn constructing the perforated sleeve 80 include without limitation pure aluminum (Al 1100), alloy 5052, alloy 6061 and alloy 6063, among others. Collectively, these materials are referred to as "soft isotopic" metallic materials. The perforated sleeve 80 can be manufactured by machining (e.g. drilling or other method) the soft-isotopic material castings or plates to form the longitudinal passages 81. Extruding blocks of the soft-isotopic material to form the ring shaped base material or workpiece prior to machining the passages may also be used. While circular perforations (longitudinal passages 81) in transverse cross section are desirable due to simplicity in their formation, the perforations in sleeve 80 can be other cross-sectional shaped including without limitation square, hexagonal or another fabricable geometric shape. Finally, in lieu of a cylindrical sidewall 85 as shown herein (i.e. straight and parallel to longitudinal axis LA), the perforated sleeve 80 can have other shaped sidewalls such as without limitation a frustoconically tapered or stair-cased (multi-stepped) sidewall in the radial direction to obtain the desired crush-force relationship.

Second Inventive Concept

Impact Amelioration System for Nuclear Fuel Storage

Reference is made generally to FIGS. 31-44 which are relevant to the Second Inventive Concept described below.

FIGS. 31-44 depict various aspects of an impact amelioration or limiter system associated with nuclear waste storage systems comprising vessels used in the storage of spent nuclear fuel (SNF) or other irradiated high level radioactive waste materials removed from the nuclear reactor containment. The amelioration system generally comprises an outer transfer overpack or cask 2100 and a waste fuel (e.g. SNF) canister 2120 configured for storage inside the cask. Features of each storage vessel and the impact amelioration system will now be further described.

Canister 2120 may be used for storing any type of high level radioactive nuclear waste, including without limitation spent nuclear fuel (SNF) or other forms of radioactive waste materials removed from the reactor. The SNF or simply fuel canister for short may be any commercially-available nuclear fuel/waste storage canister, such as a multi-purpose canister (MPC) available from Holtec International of Camden, New Jersey or other.

Canister 2120 has a vertically elongated and metallic body comprised of a cylindrical shell 2121 extending along a vertical centerline Vc which passes through the geometric center of the shell. Canister 2120 includes a bottom baseplate 2122 seal welded to a bottom end of the shell, and an open top 2126 which may be closed by an attached lid 2125 (schematically shown in dashed lines in FIG. 33 to avoid obscuring other aspects of the image). Lid 2125 may be seal welded to a top end 2126 of the canister shell 2121 to form a hermetically sealed cavity 2127 inside the canister. The foregoing canister parts may be formed of any suitable metal, such as for example without limitation steel including stainless steel for corrosion protection.

Fuel basket 2123 is disposed in cavity 2127 of the canister 2120 and is seated on the bottom baseplate 2122 as shown. The fuel basket may be welded to the baseplate for stability in some embodiments. In some embodiments, the baseplate 2122 may extend laterally outwards beyond the sides of the fuel basket 2123 around the entire perimeter of the fuel basket as shown.

Figure 44:
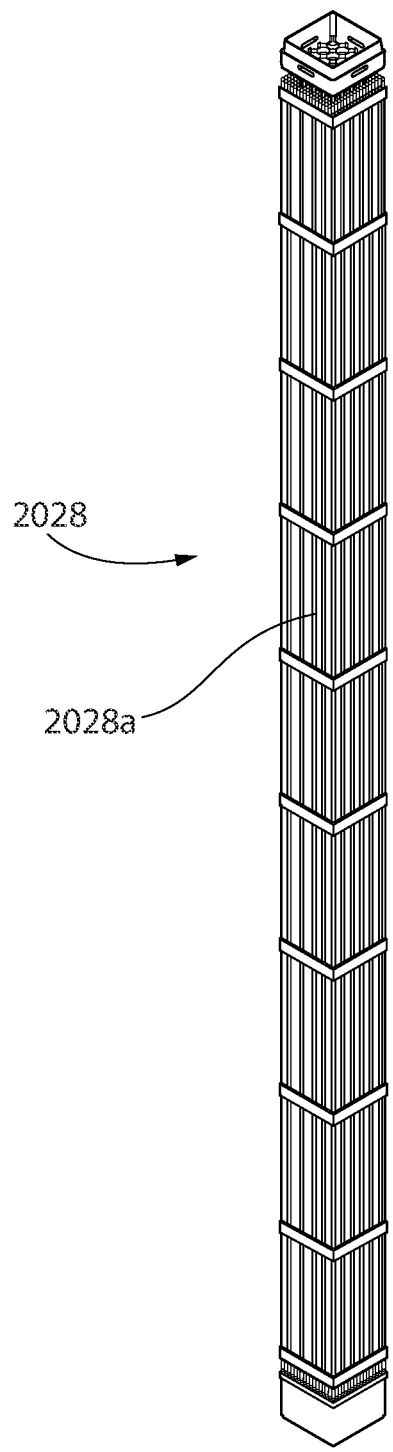
FIG. 44 is a perspective view of an exemplary nuclear fuel assembly of the type which may be stored in the canister.
Figure 45:
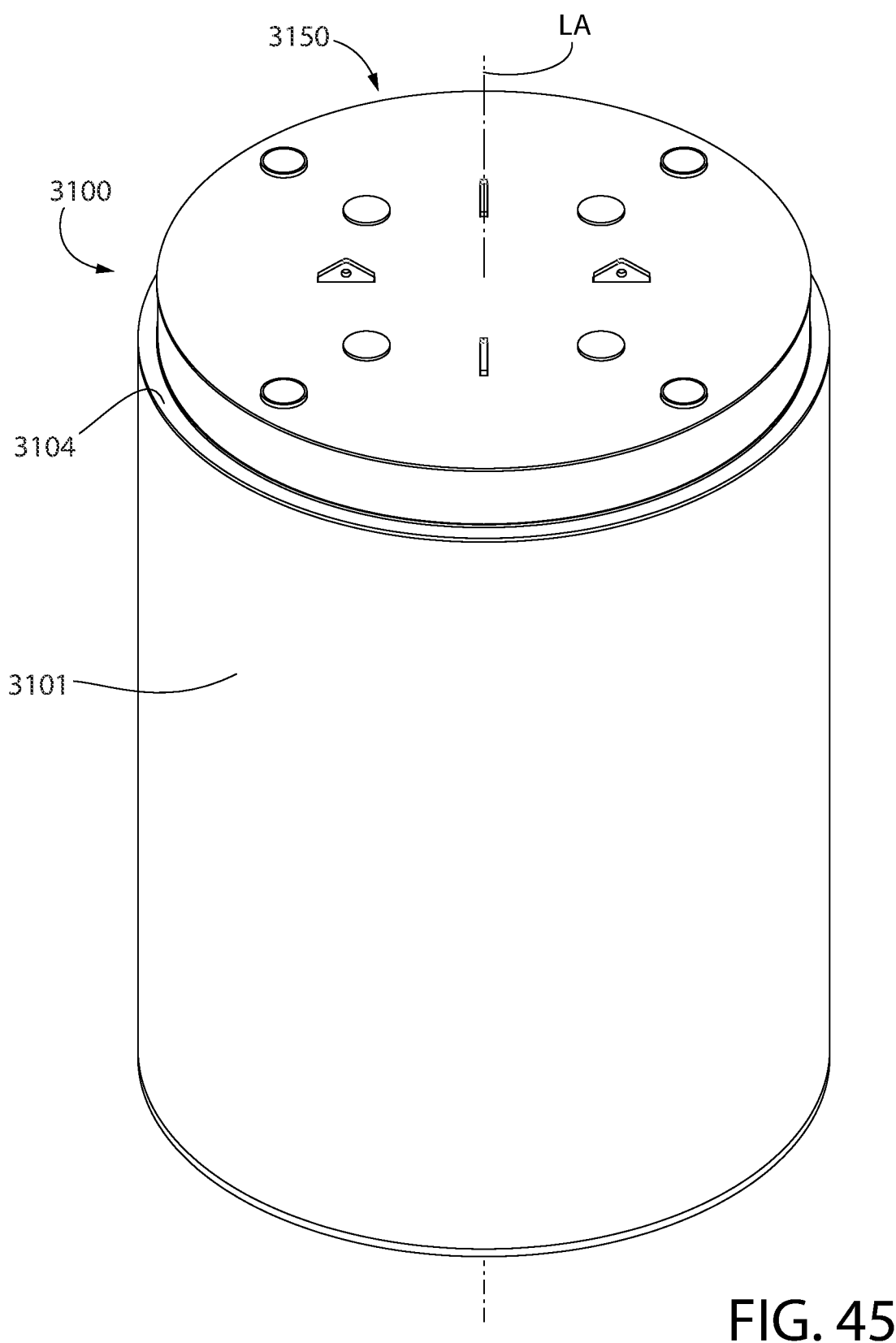
FIG. 45 is perspective view of a pressure vessel in the form of an unventilated cask for nuclear waste fuel storage according to the present disclosure.
Figure 46A:
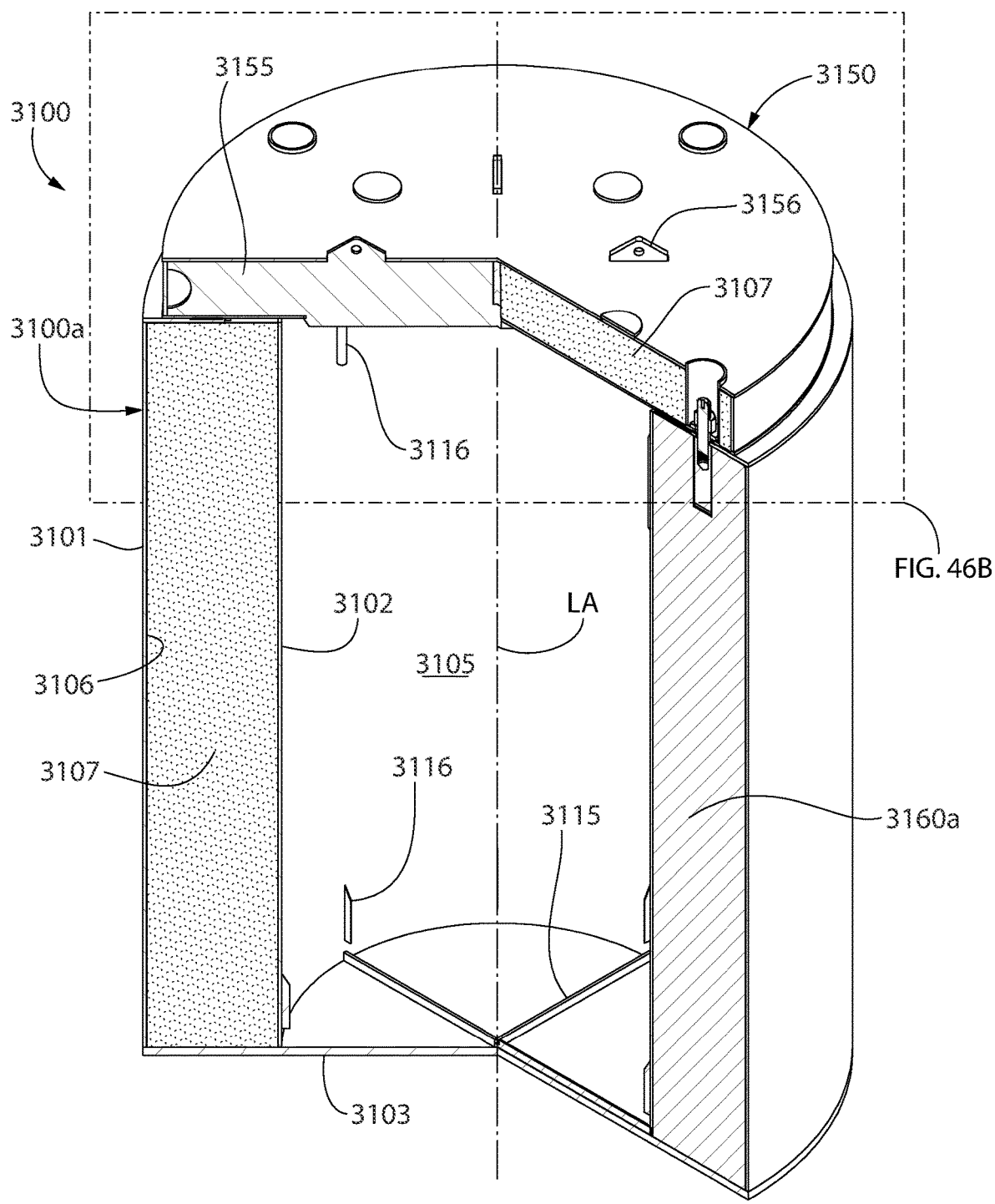
FIG. 46A is a partial cross sectional view thereof.
Figure 46B:
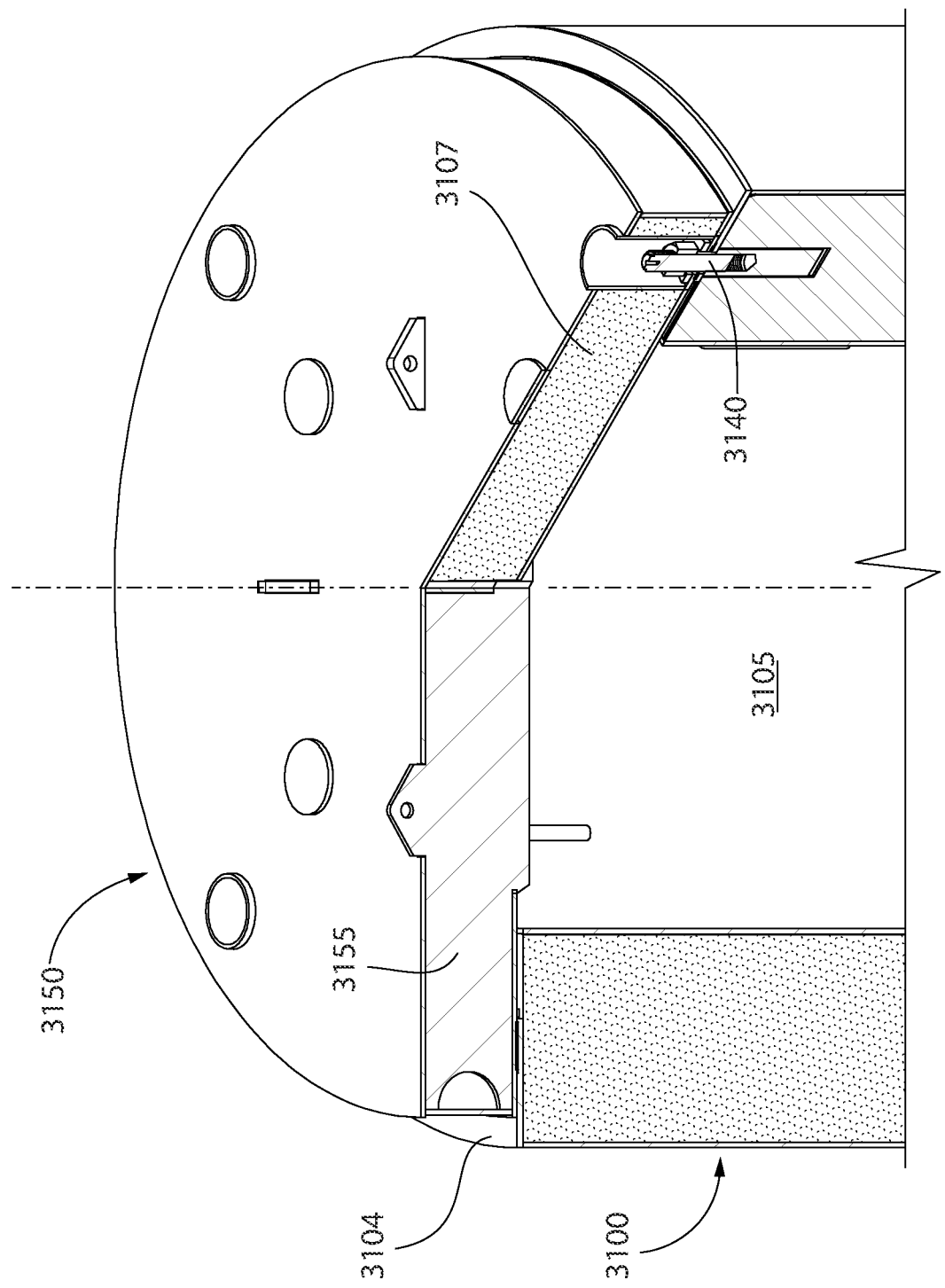
FIG. 46B is an enlarge detail taken from FIG. 46A.
Figure 47:
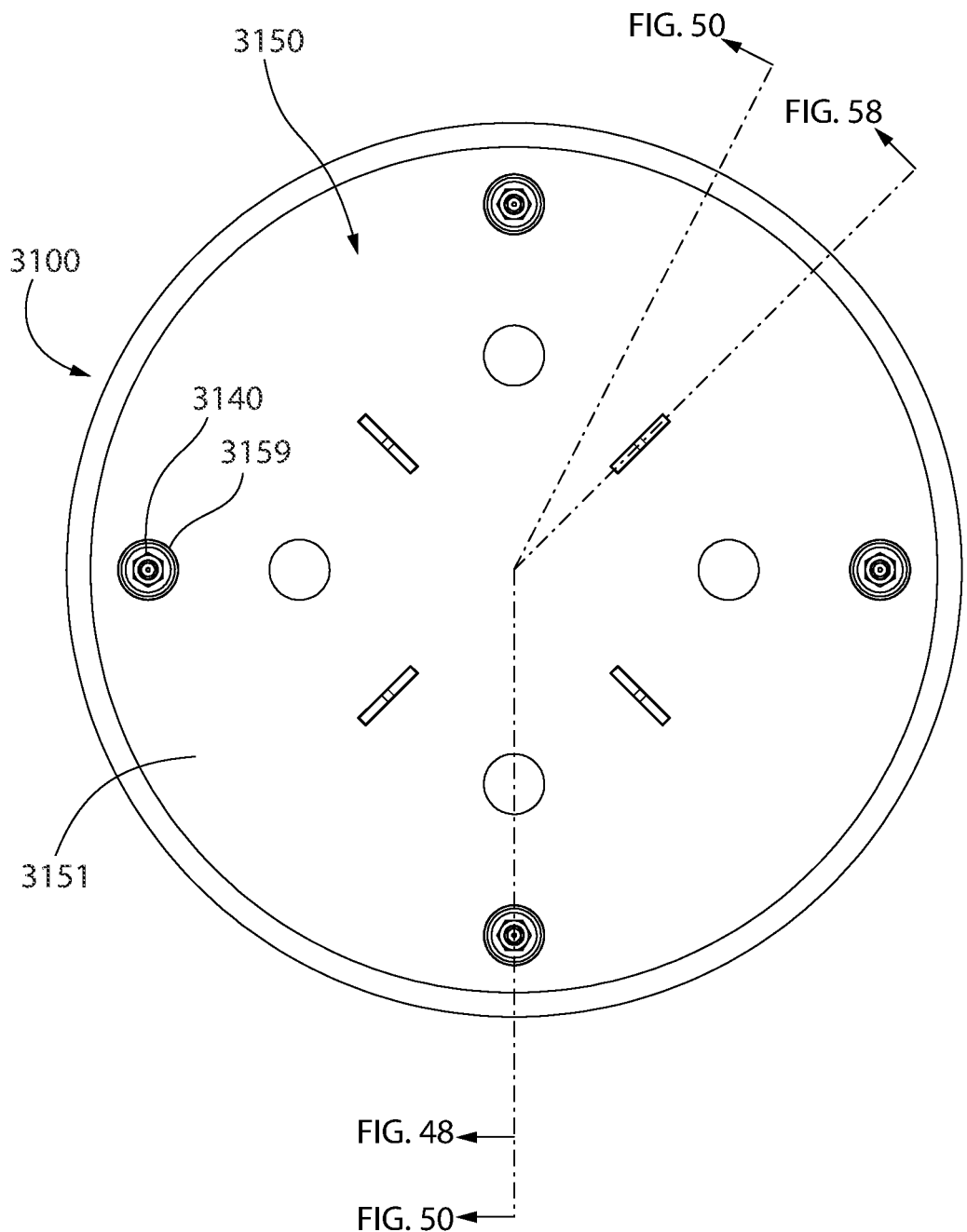
FIG. 47 is a top view of the cask.
Figure 48:
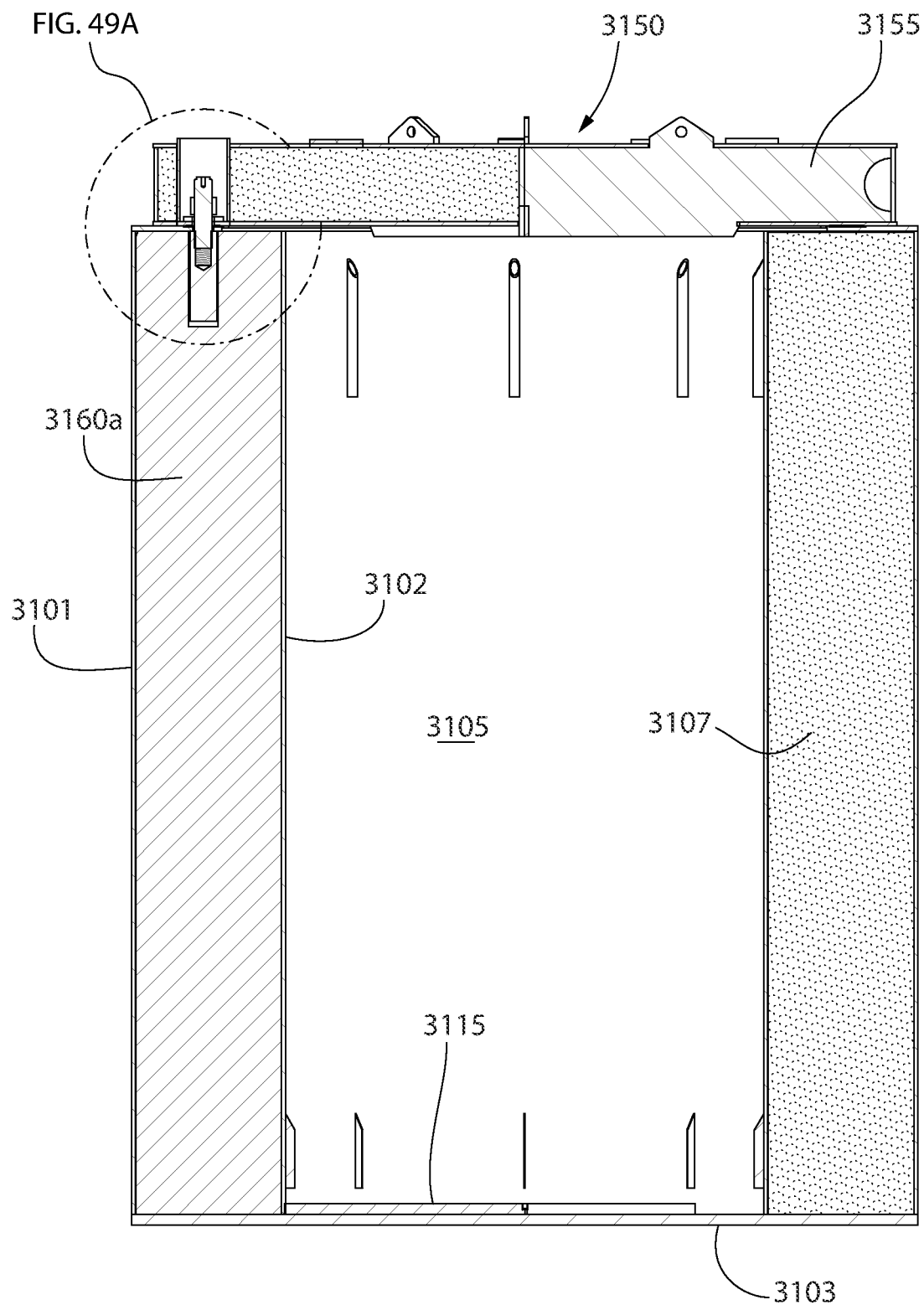
FIG. 48 is a longitudinal cross sectional view of the cask taken from FIG. 47.

The fuel basket 2123 is a honeycomb prismatic structure which in one embodiment may be formed by a plurality of interlocked and orthogonally arranged slotted plates 2123a built up to a selected height in vertically stacked tiers. The plates of fuel basket 2123 define a grid array of plural vertically-extending openings forming fuel assembly storage cells 2124. Each cell is configured in cross-sectional area and shape to hold a single U.S. style fuel assembly 28, which contains multitude of spent nuclear fuel rods 28a (or other nuclear waste). An exemplary fuel assembly of this type having a conventional rectilinear cross-sectional configuration is shown in FIG. 44. Such fuel assemblies and the foregoing fuel basket structure are well known in the industry. The open cells 2124 of the fuel basket are defined by the orthogonally intersecting slotted plates 2210, and therefore have a concomitantly rectilinear cross-sectional shape (e.g. square). This gives the fuel basket an overall compound rectilinear polygonal shape in transverse cross section as shown which includes multi-faceted and stepped exterior peripheral side surfaces collectively defined by the flat lateral peripheral sidewalls of the outermost exterior slotted plates 2123a.

Transfer cask 2100 has a vertically elongated metallic body including a cylindrical shell 2101, circular top closure plate 2102 attached to the top end of the shell, and a circular bottom closure plate 2103 attached to the bottom end of the shell. A top ring plate 2107 may be provided which is fixedly attached to the top end of shell 2101 such as via welding. A bottom ring plate 2106 may be fixedly attached (e.g. seal welded) to the upper or top surface 2105 of the bottom closure plate 2103 at its periphery; which ring plate in turn is fixedly attached (e.g. seal welded) to the bottom end of the shell 2101. The top closure plate 2102 may also be seal welded to the shell 2101, or in some embodiments may instead be bolted and gasketed to the cask instead to provide easier access to the canister 2120. An internal cavity 2104 is defined by the cask which extends for a full height of the cask. The cavity 2104 is configured in dimension and transverse cross-sectional area to hold only a single fuel canister 2120 in some embodiments as is conventional practice in the art.

Figure 31:
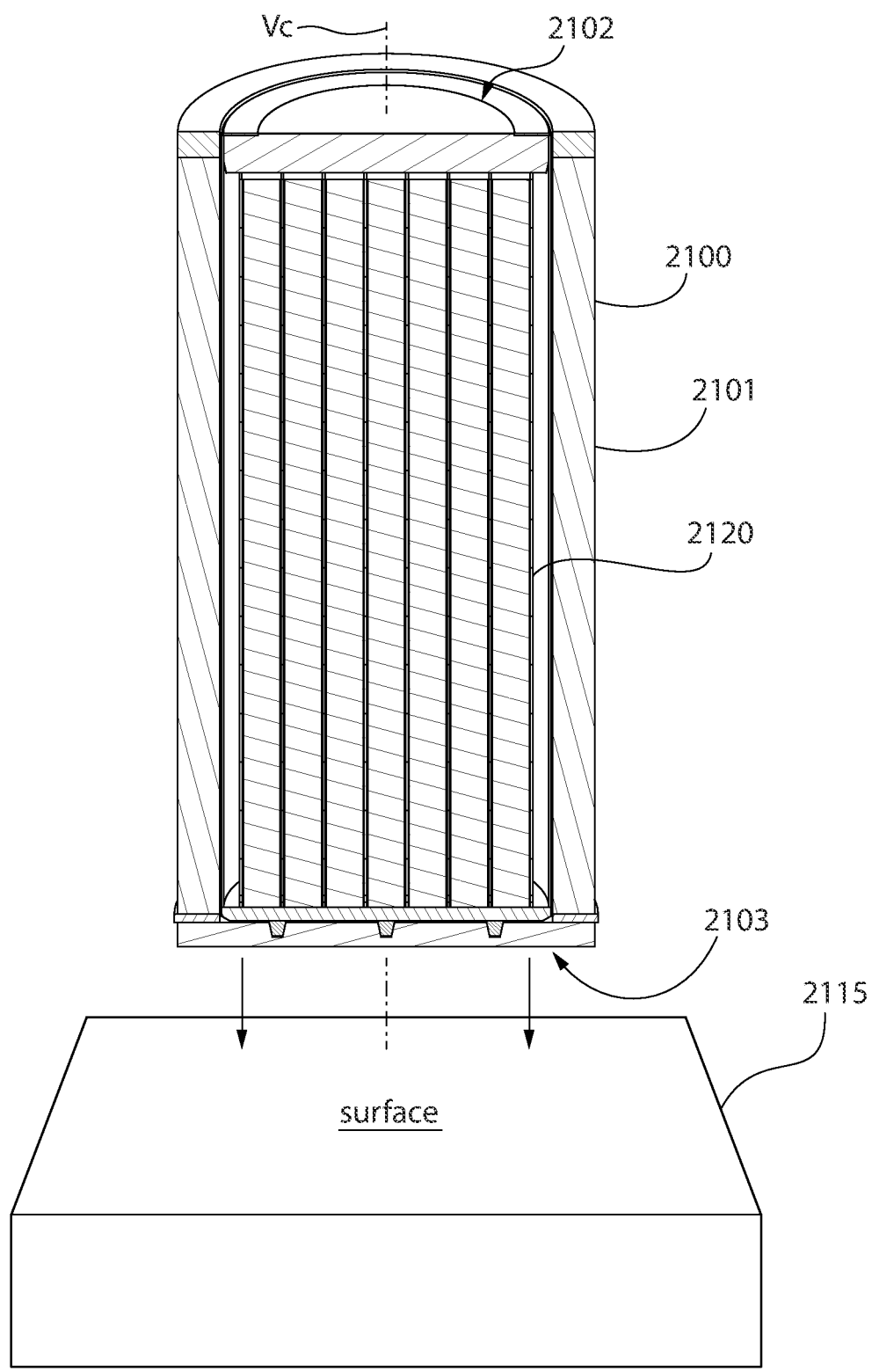
FIG. 31 is a front cross-sectional perspective view of an impact amelioration system for nuclear fuel storage according to the present disclosure including a transfer cask and fuel canister.
Figure 32:
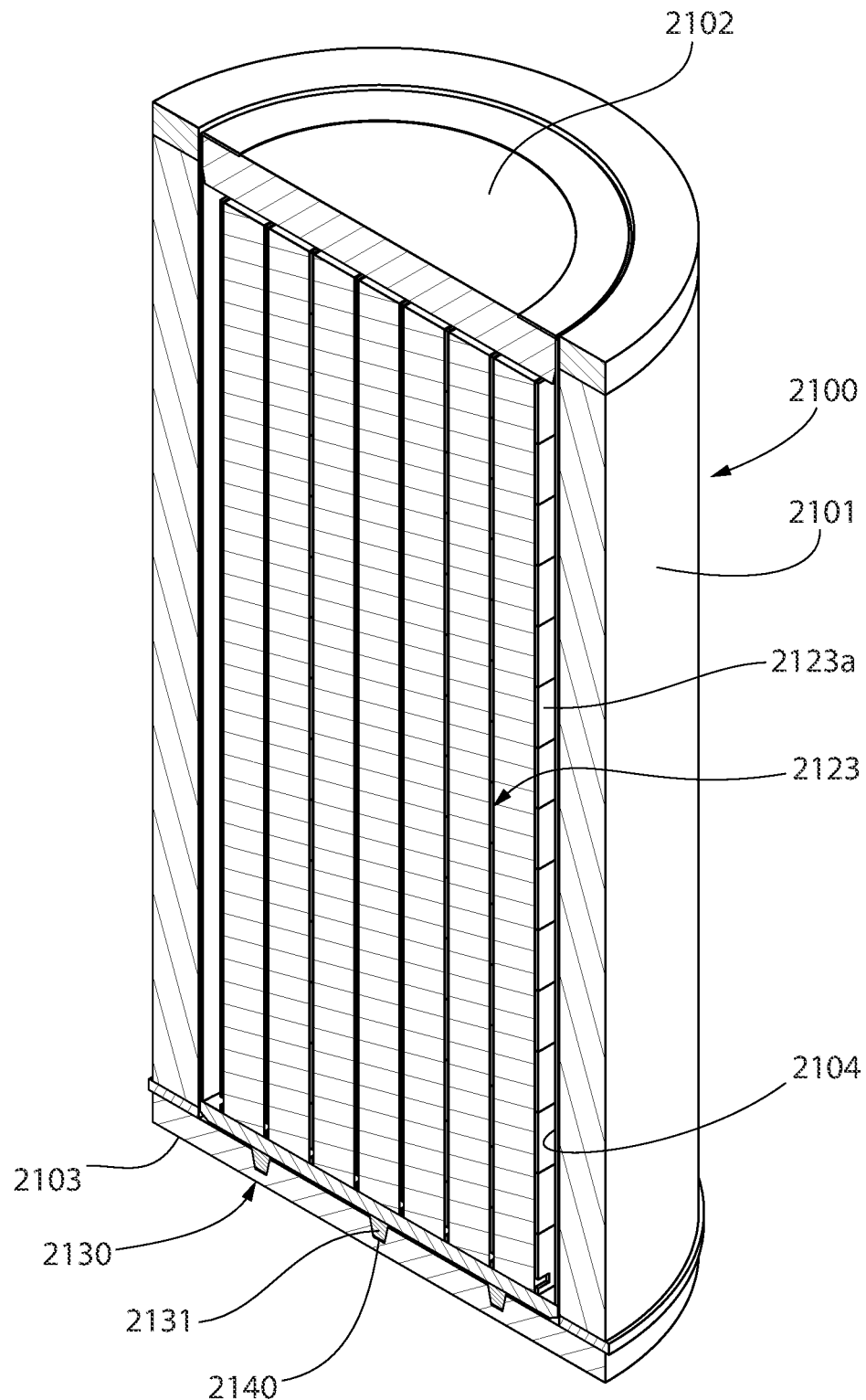
FIG. 32 is a side cross sectional view thereof.
Figure 33:
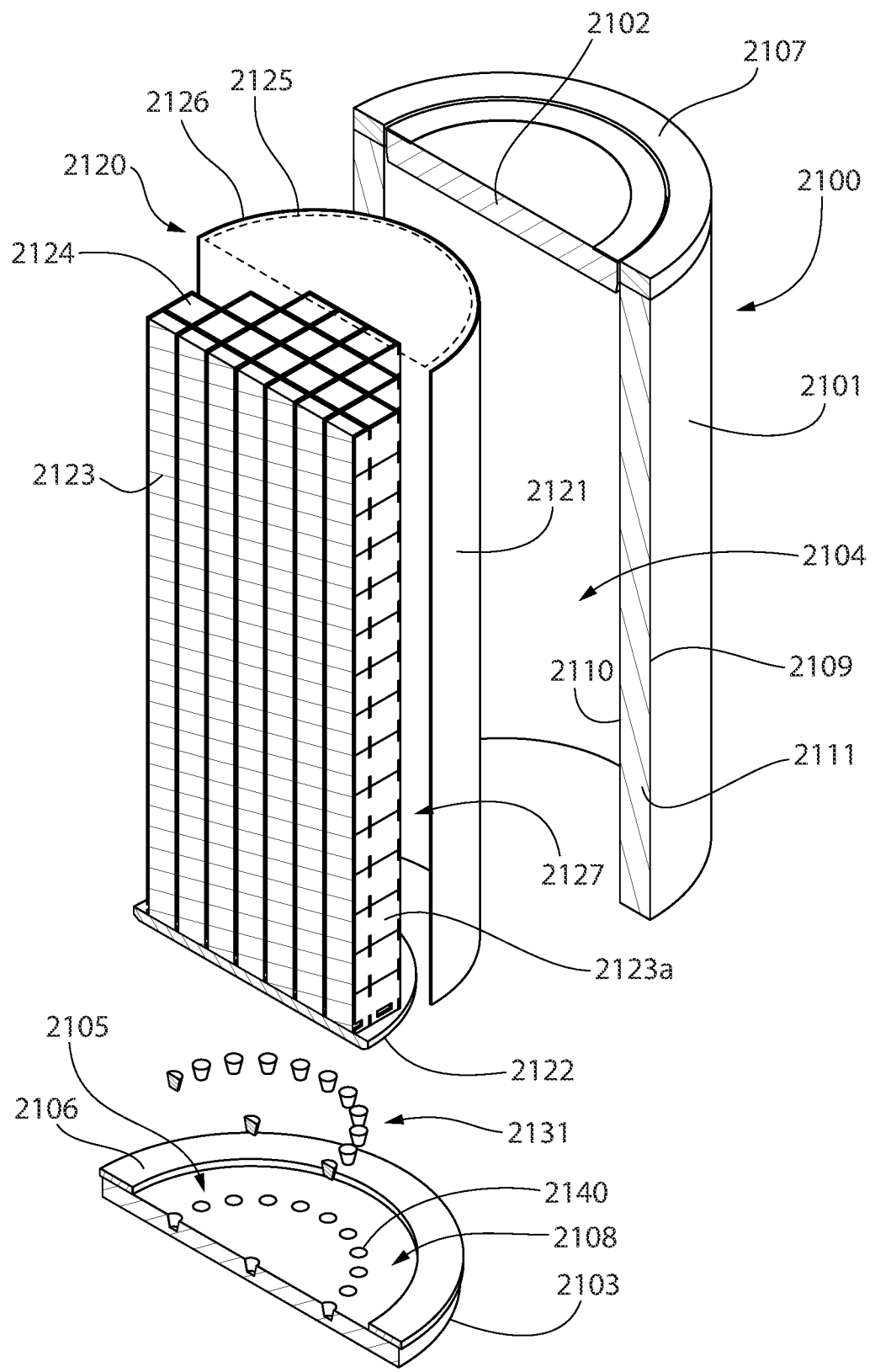
FIG. 33 is an exploded view thereof.
Figure 34A:
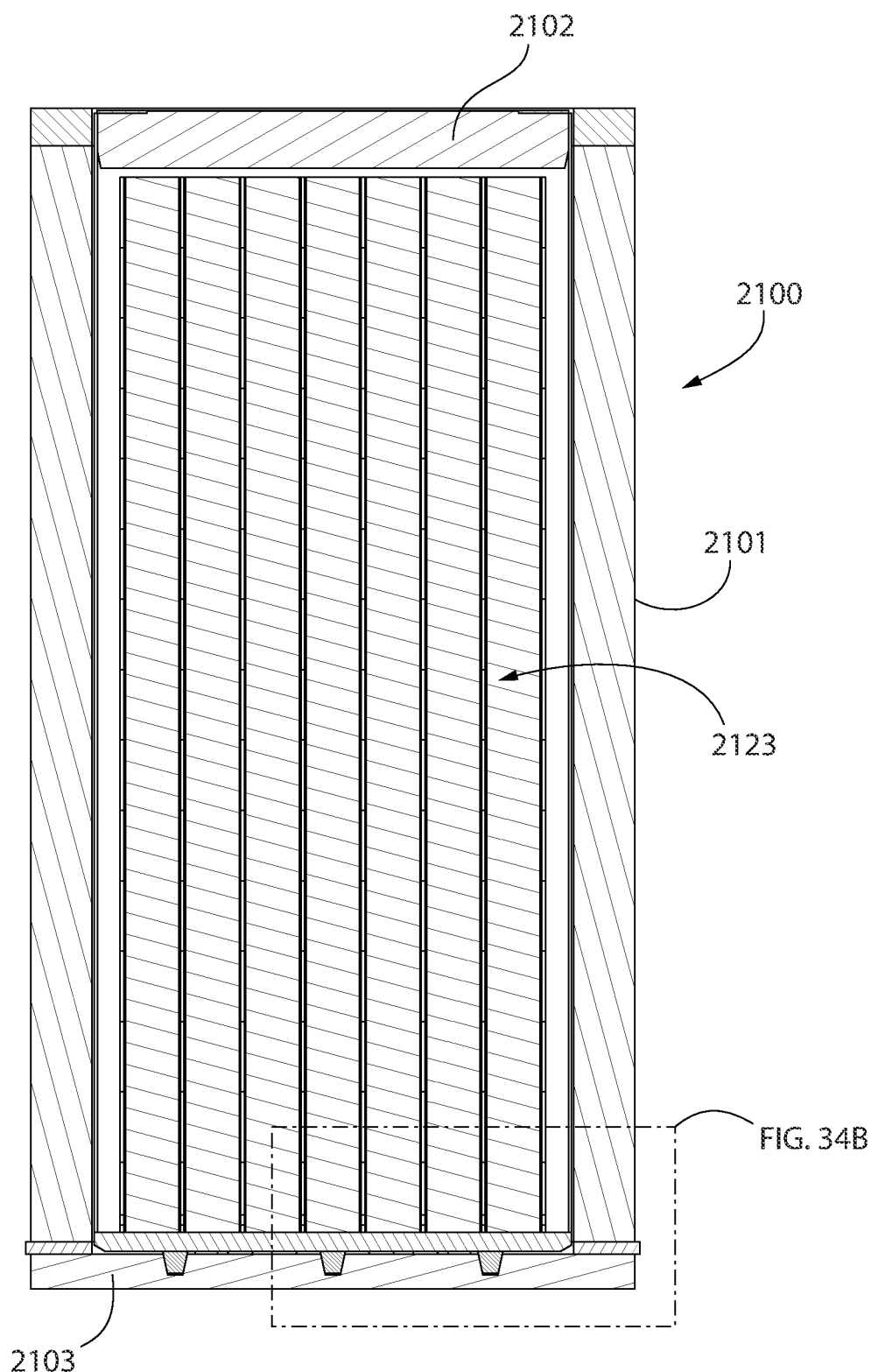
FIG. 34A is a front elevation view thereof.
Figure 34B:
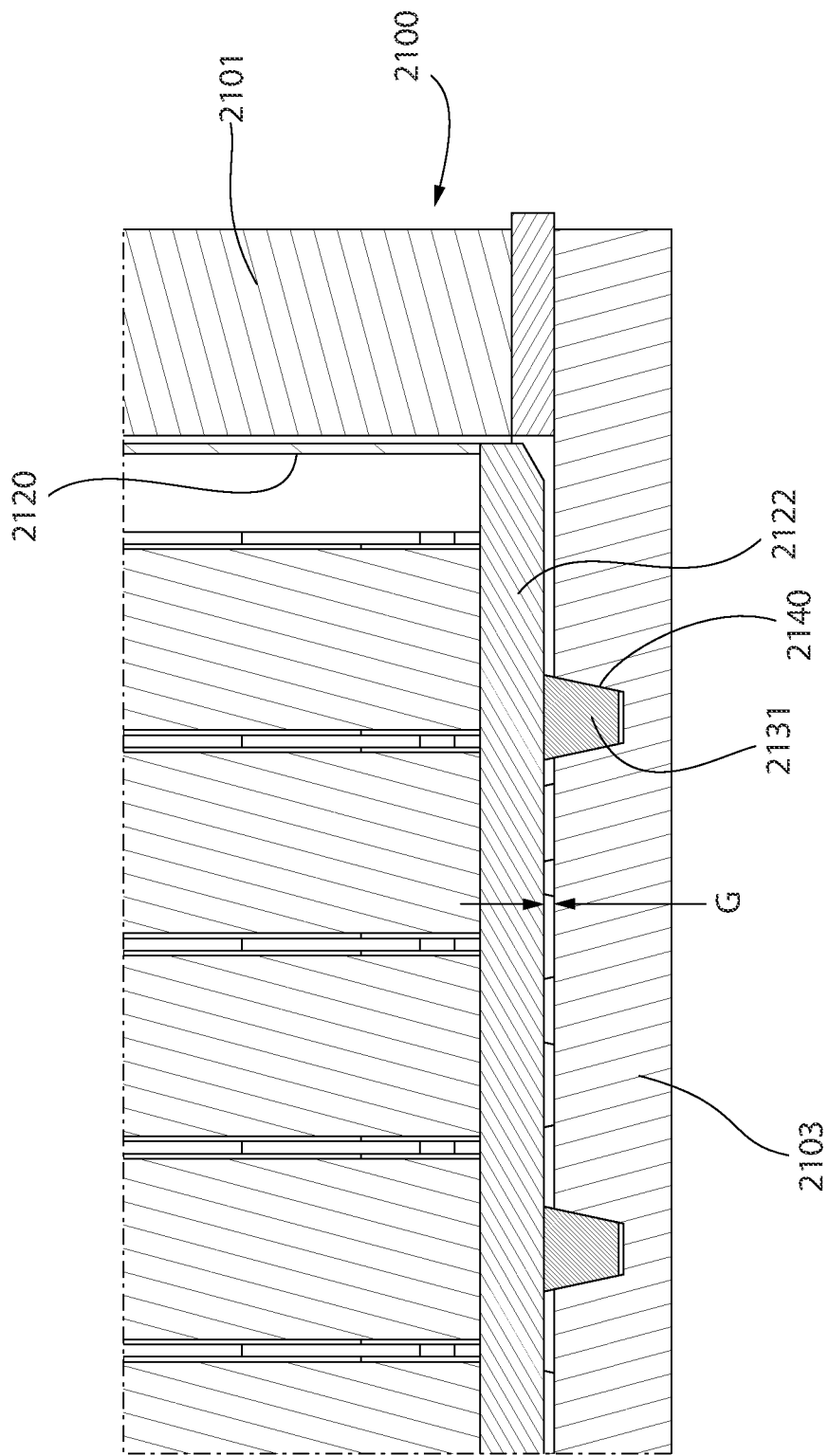
FIG. 34B is a detail taken from FIG. 34A.
Figure 35:
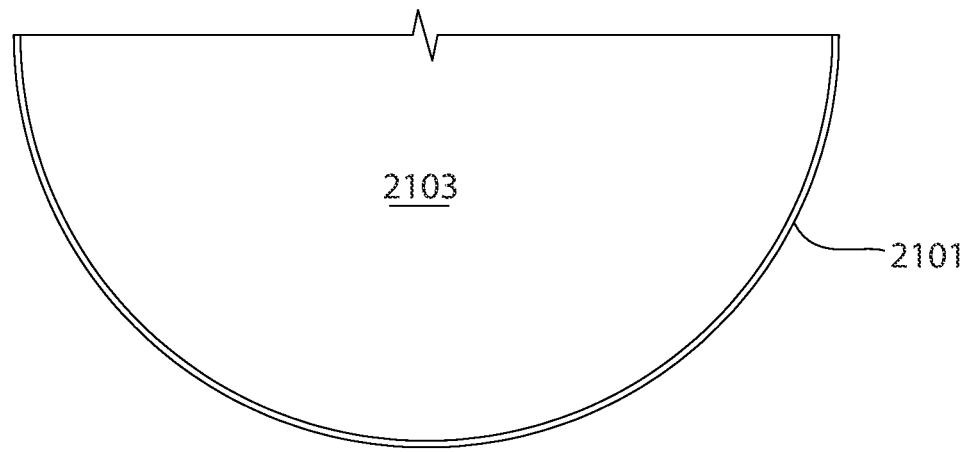
FIG. 35 is a partial bottom view of the cask.
Figure 36:
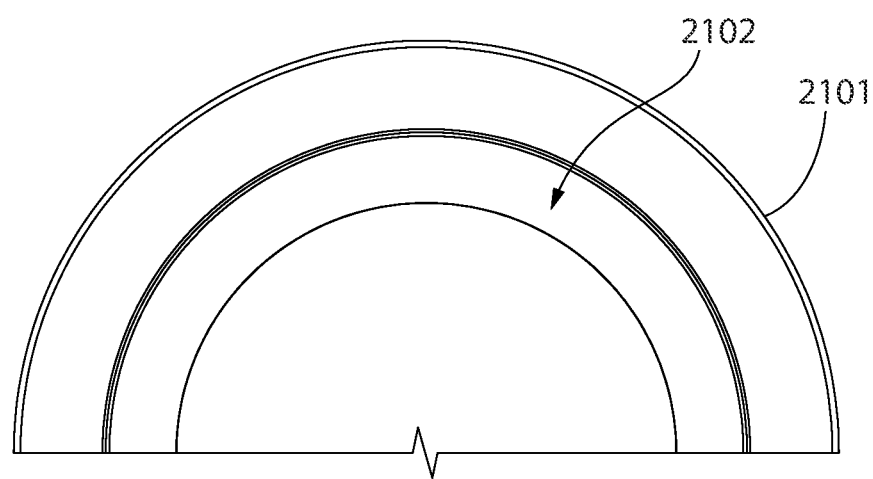
FIG. 36 is a partial top view of the cask.
Figure 37:
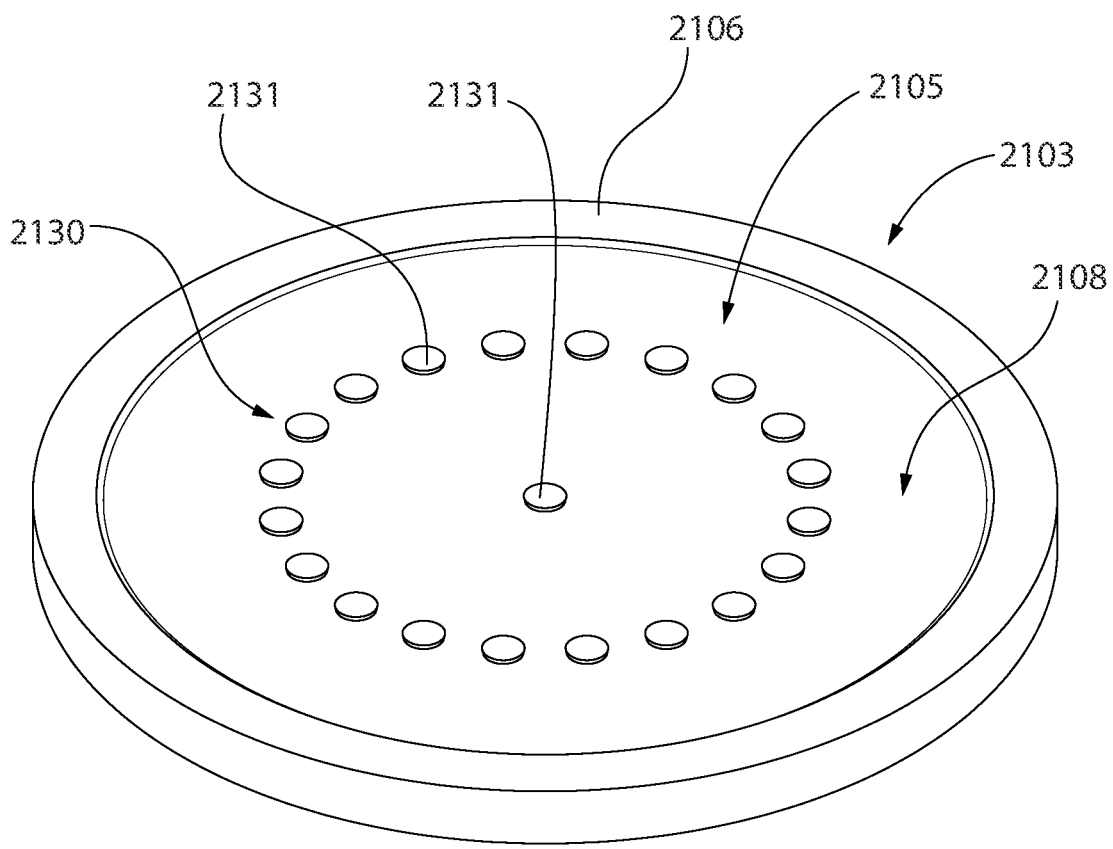
FIG. 37 is a top perspective view of the bottom closure plate of the cask.
Figure 38:
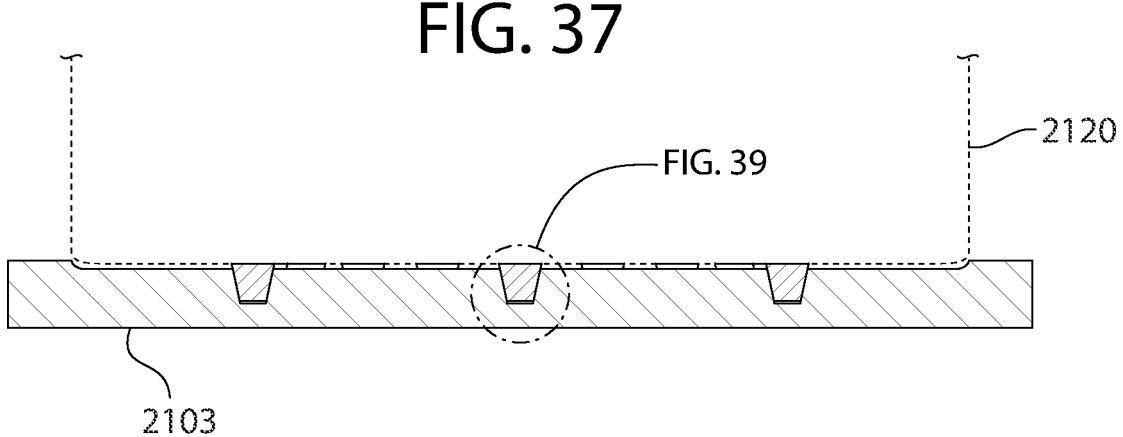
FIG. 38 is a side cross-sectional view of the bottom closure plate.

The circular bottom closure plate 2103 of cask 2100 may be considered somewhat cup-shaped in one embodiment in view of the raised bottom ring plate 2105 which rises up a short distance above the horizontal flat top surface 2105 of the bottom closure plate. This construction defines a recessed canister seating area 2108 which helps center and stabilize the canister 2120 when loaded into the cask. The bottom baseplate 2122 of canister 2120 is at least partially received in the recessed canister seating area as shown in FIGS. 31 and 32.

The cask 2100 is a heavy radiation shielded storage vessel. The cylindrical shell 2101 of cask 2100 forms a sidewall which may have a composite construction including an outer shell member 2109, inner shell member 2110, and radiation shielding material(s) 2111 disposed between the shell members. In some embodiments, the shielding material 2110 may comprise concrete, lead, boron-containing materials, or a combination of these or other materials effective to block and/or attenuate gamma and neutron radiation emitted by the nuclear waste (e.g. fuel assemblies) stored in canister 2120 when loaded into the cask 2100. Any suitable types, thicknesses, and arrangement of shielding materials may be used to provide the necessary degree of shielding.

The outer and inner shell members 2109, 2110 of the cylindrical shell 2101 of cask 2100 may be formed of a suitable metal such as steel. The top and bottom closure plates 2102, 2103, and the top and bottom ring plates 2107, 2106 may similarly be formed of metal such as steel.

In conventional cask construction and deployment, the canister is seated directly onto the bottom closure plate of the cask 2100 in an abutting relationship. A flat to flat interface is formed between the entirety of the bottom baseplate of the canister and the bottom closure plate of the cask. In the event the cask with canister loaded therein is dropped onto an immovable/stationary hard surface (e.g. top of concrete slab 2115 or other relatively hard/compacted material) as shown in FIG. 31, there is no impact protection for the canister which might decrease the g-load or force resulting from the impact force of the cask striking the surface. The kinetic energy of the resultant impact force generated by the drop is transmitted through the bottom closure plate of the cask directly to the baseplate of the canister and then to fuel assemblies therein, which typically rest directly on the baseplate. The structural integrity of the nuclear fuel assemblies and SNF therein are therefore exposed to damage due to the unmitigated g-load or forces resulting from the drop event.

The present disclosure provides an impact amelioration or limiting system configured to absorb and minimize the actual g-load/force transmitted through the cask 2100 during a drop event to protect the fuel canister 2120. With continuing general reference to 31-43, the amelioration system may comprise a plurality of impact limiter assemblies arranged at the lower canister to cask interface (i.e. bottom of canister baseplate 2122 to top of cask bottom closure plate 2103).

In one embodiment with specific initial reference to FIGS. 31-39C, the impact limiter assemblies 2130 each comprise an impact limiter rod or plug 2130 and a corresponding plug hole 2140. Plug holes 2140 may be complementary configured to the plugs 2131 in shape/profile. In one embodiment, the sides of the plugs and plug holes may each be tapered. In one embodiment, the plugs 2131 may have a frustoconical shape and at least a portion of the plug holes 2140 may have a complementary frustoconical shape. In the embodiment shown in FIGS. 39A-C, the entire plug hole 2140 is frustoconical in shape from top to bottom.

The impact limiter plugs 2131 may comprise a solid body including a top surface 2132, bottom surface 2133, and sides 2134 extending therebetween. The top surface may be flat and larger in surface area than the bottom surface defining an overall wedge-shaped plug. The bottom surface 2133 may also be flat as shown and parallel to the top surface 2132. Accordingly, sides 2133 may be tapered having an angle of taper A1 which defines a plug body having a frustoconical shape as shown.

Plug holes 2140 may be complementary configured to the plugs 2131. Plug holes 2140 comprise an open top 2141 configured for at least partially receiving and embedding the plugs 2131 therein, a flat closed bottom 2142 formed by the cask bottom closure plate 2103, and tapered sidewalls 2143 extending therebetween. The open top may have larger projected open area than the closed bottom defined by bottom surface 2144 of the plug hole defining a wedge-shaped hole. Accordingly, sidewalls 2143 of plug hole 2140 may be tapered having an angle of taper A2 which defines a plug hole having a frustoconical shape as shown. In certain embodiments, angle of taper A2 of the plug holes 2140 may be the same as the angle of taper A1 of the impact limiter plugs 2131. The plugs however may have a maximum diameter D1 defined by the top surface 2132 which is slightly larger than the diameter D2 of the open top 2141 of plug holes 2140 such that the plugs cannot fully enter the plug holes and contact their bottom surfaces 2144 (see, e.g. FIG. 39B in the pre-impact embedment position of the plugs in the holes). The slight oversizing of the plugs 2131 and mating tapers of the plugs and their associated plug holes 2140 create frictional engagement therebetween the mutually engaged plug sides 2134 and plug hole sidewalls which retains the plugs in position spaced vertically above from the bottom surface 2144 of the plug holes. The bottom surface 2133 of plugs 2131 may also be larger in diameter than the bottom surface 2142 of the plug holes 2140. Accordingly, the slightly larger diameter plugs 2131 are prevented from slipping completely into the plug holes 2140 to the bottom even though the angle of tapers A1, A2 may be the same for each feature (see, e.g. FIG. 39B pre-impact frictionally engaged position of plugs).

In certain exemplary embodiments, the angles of taper A1 and A2 of the plugs 2131 and plug holes 2140 respectively may be between 30 and 90 degrees, and more preferably between 60 and 90 degrees. The angles of taper A1 and A2 may be about 82 degrees (+/−3 degrees to account for fabrication tolerances) as one non-limiting example. Other suitable taper angles may be used.

When the impact limiter plugs 2131 are securely embedded in and frictionally engaged with the plug holes 2140 such that the plugs are retained and cannot easily be removed by hand (see, e.g. FIG. 39B), the upper portions of the plugs protrude upward above the top surface 2105 of the cask bottom closure plate 2103 as shown. Top surfaces 2132 of the plugs 2131 are therefore elevated above the closure plate 2103 forming plateaus or pedestals which collectively act as a seating surface to engage and support the bottom baseplate 2122 of the canister 2120 in a raised manner elevated above the top surface of the bottom closure plate. When the canister is positioned on the plugs 2131, the canister is therefore spaced apart from the bottom closure plate 2103 (i.e. top surface 2105 thereof) by a vertical space or gap G (see, e.g. 34B). The gap G advantageously provides a buffer or cushion zone allowing the canister to gradually move downwards in the cask 2100 as the plugs 2131 elastoplastically deform while moving deeper into the plug holes under the kinetic impact forces generated by the cask striking a hard surface during a drop event (see, e.g. FIG. 31). The impact limiter plugs 2131 deform and progress deeper in plug holes 2140 due to the resultant impact forces (i.e. canister against the plugs) to decelerate the canister motion and reduce the g-load which protects the canister 2120 and fuel assemblies therein. This is demonstrated in the test example described further below.

Figure 39A:
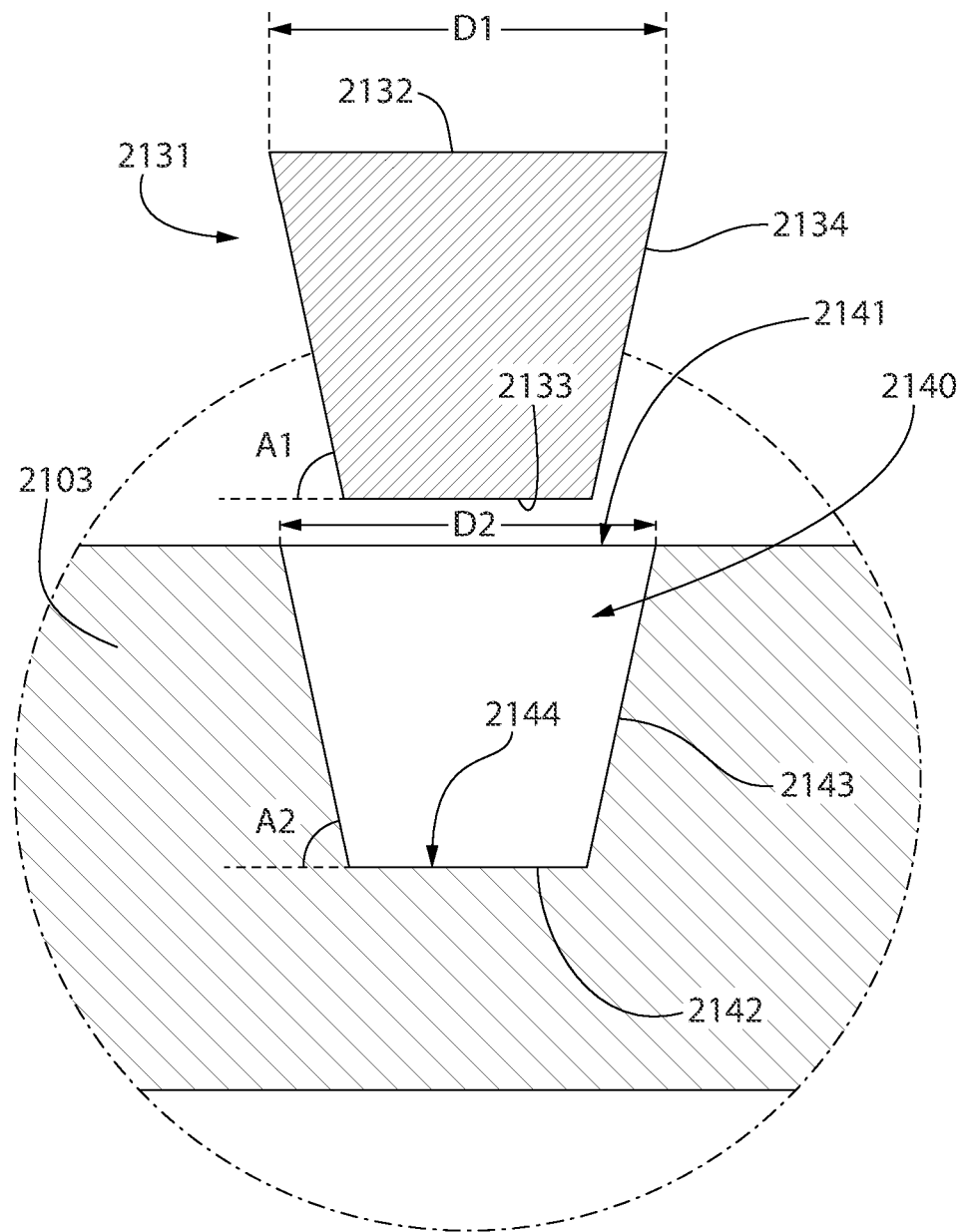
FIG. 39A is a side cross-sectional view showing an impact limiter assembly of the system comprising an impact limiter plug and mating plug hole shown in FIGS. 31-34B.
Figure 39B:
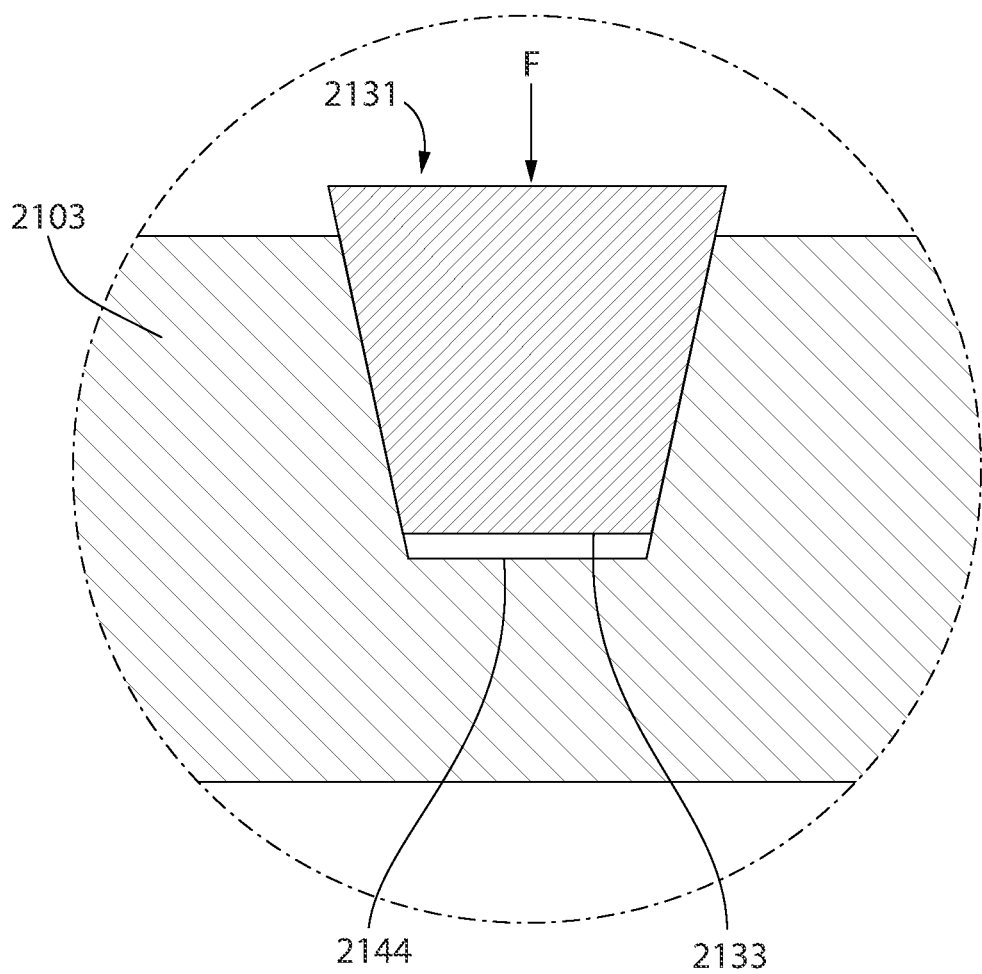
FIG. 39B is a side cross-sectional thereof showing the plug in an installed pre-impact position.

FIG. 39A shows a single impact limiter plug 2131 positioned above and ready for insertion/embedment in its mating plug hole 2140. To install the plug, the plug is loosely inserted and then partially driven into the plug hole by a striking device such as a hammer or other device until the plug becomes snuggly fitted in and frictionally engaged with the sidewalls 2143 of the hole. This eliminates looseness of the plugs while the canister 2120 is loaded into the cask 2100. The frictionally and mutually engaged tapers of the sides 2134 of plugs 2131 and plug hole sidewalls 2143 thus retain the fitted plugs in the holes via a friction fit. The plugs therefore are not loosely placed in the plug holes, but rather cannot be removed by hand when properly installed. The plugs are now partially embedded in their respective plug holes as shown in FIG. 39B and ready for service to receive and seat the canister 2120 thereon when loaded into the cask 2100. In this pre-impact position shown, the bottom surface 2133 of plug 2131 is spaced vertically apart from the bottom surface 2144 of the plug hole 2140. This provides space for the plug to move deeper into the plug hole as the plug is forced inwards into the hole as it undergoes elastoplastic deformation due to impact forces generated by the drop event.

Figure 39C:
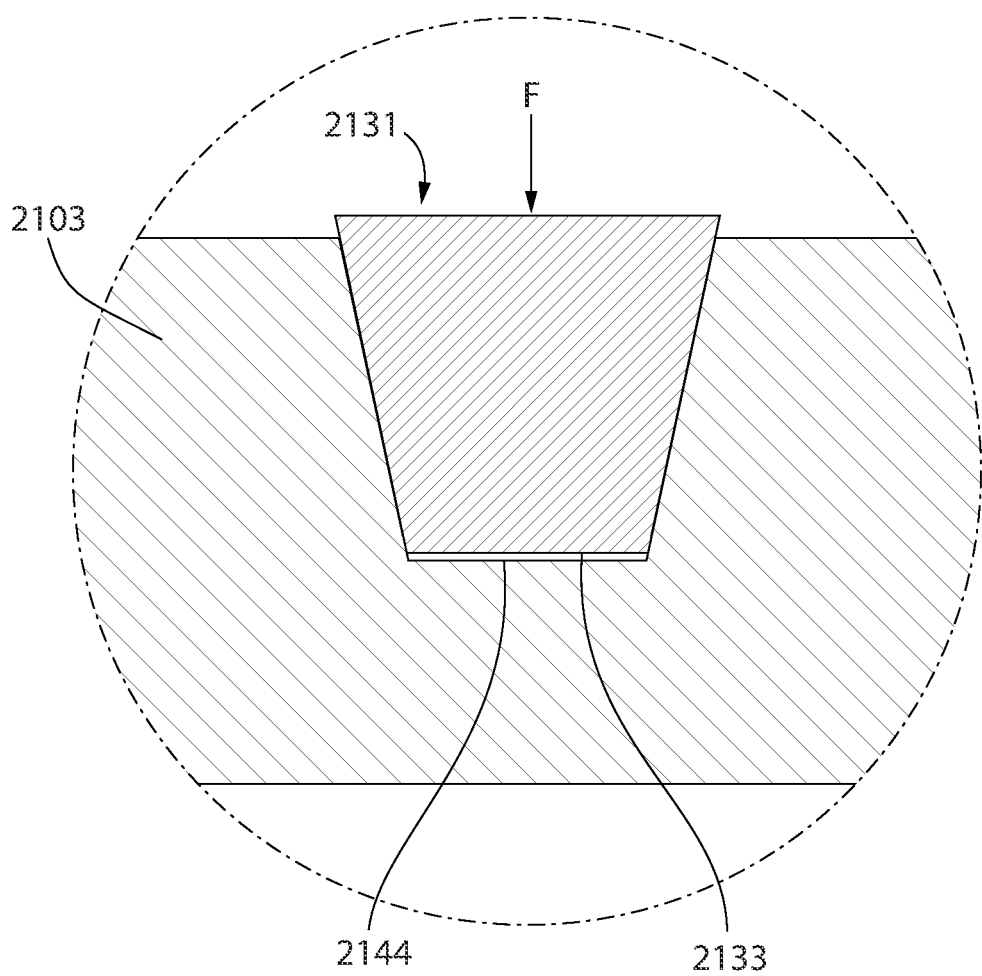
FIG. 39C is a side cross-sectional thereof showing the plug in a deeper post-impact position in the plug hole after application of an impact force resulting from a cask drop event.

In the occurrence of a cask drop event (see, e.g. FIG. 31), the cask 2100 falls vertically for a distance and may strike/impact a hard surface such as that defined by a. concrete pad/slab 2115. This accident may occur if the cask rigging or hoist mechanism associated with a track-driven cask crawler, which is commonly used in the industry for lifting/lowering and transporting the cask with fuel canister 2120 therein, were to fail. However, other scenarios of dropping the cask, or dropping canister into the cask while loading it therein, are possible as well. The bottom closure plate 2103 of the cask is the first containment vessel to impact the immovable hard surface and decelerate to zero acceleration due to gravity. The momentum of the falling canister 2120 inside the cask 2103 resulting from the drop causes the canister to continue its downward motion momentarily (e.g. fraction of a second) until its movement is in turn fully arrested by engagement with the impact limiter plug assemblies 2130 on the bottom closure plate 2103 of cask 2100. The baseplate 2122 of the canister 2100 may remain engaged with the impact limiter plugs 2131 during the fall or may slightly move ajar, depending on the height of the drop and relative weights of the cask and canister (cask typically being heavier due to its thick sidewalls which may include concrete for radiation shielding). In either event, the impact force F (g-load/force) of the canister against the impact limiter plugs 2131 illustrated in FIG. 39B causes the plugs to become driven deeper into their respective plug holes 2140 by overcoming the interfacial frictionally engagement forces between the sides 2134 of the plugs and corresponding hole sidewalls 2143 and elastoplastic deformation of the metallic plugs. This deeper second position of the plugs 2131 in the holes 2140 is shown in FIG. 39C. In this figure, the bottom surfaces 2133 of the now more deeply embedded plugs after impact ("post-impact position") are separated from the bottom surface 2144 of the plug holes by a lesser distance or space by comparison than the "pre-impact" plug position shown in FIG. 39B. Similarly, the tops of the impact limiter plugs may still protrude upward beyond the top surface 2105 of the cask bottom closure plate 2103, but also by a lesser amount or distance than pre-impact. In some impact events scenarios and embodiments, the tops of the plugs may be driven completely flush with the top surface of the bottom closure plate.

Due to the impact of the falling cask scenario (drop event), the plugs 2131 concomitantly undergo some degree of elastoplastic deformation as they are driven deeper into their respective plug holes 2140. In some cases depending on the angles of tapers A1, A2 and sizes used for the plugs and holes, and other parameters such as the metal material selected for the plugs versus the cask bottom closure plate 2103, the plugs may possibly contact the bottom surface 2144 of the holes depending on the magnitude of the kinetic impact force (which equates to the height of drop). In some instances, the tops of the plugs may possibly deform and mushroom due to the impact force which may reduce the penetration depth of the plugs in the holes. In either case, the deformation and frictional engagement of the plugs 2131 with the sidewalls 2143 of the plug holes 2140 absorbs at least some of the impact force and causes the canister 2120 to more gradually decelerate, thereby decreasing the g-load imparted on the canister to better protect the structural integrity of the canister and fuel assemblies stored therein. In sum, under impact, the tapered plugs 2131 would advance inside the tapered holes 2140 as the kinetic impact energy is dissipated by the combined action of interfacial friction therebetween and the elastic/plastic expansion action or deformation of the plugs in the plug holes.

The principal engineering parameters of the impact amelioration system such as the material selected for the tapered impact limiter plugs 2131 in contrast to the cask bottom closure plate 2103 which defining the corresponding plug holes 2140, angle of taper A1 and A2 of the plugs and holes, plug diameter, and the number and pattern/arrangement of plugs on the bottom closure plate make possible to decrease the peak g-load imparted to the canister 2120 during a cask drop event significantly.

In one non-limiting arrangement, a first group or cluster of impact limiter plug assemblies 2130 (pairs of tapered plugs 2131 and mating plug holes 2140) may be arranged in a circular array on the bottom closure plate 2103 of the cask 2100 (see, e.g. FIGS. 33-34 and 37-38). The plug assemblies are circumferentially spaced apart as shown. Depending on the diameter D1 of the plugs 21131, additional circular arrays may be added inside and/or outside of the array shown. In some embodiments, one or more a center plug assemblies 2130 may be located centrally with respect to and inside of the circular array. A single plug assembly located at and intersecting the vertical centerline Vc of the canister may be provided in some embodiments. In other embodiments, a cluster of center plug assemblies 2130 may be provided and arranged in any suitable pattern within the outer circular array of assemblies. The plug assemblies 2130 are located within the recessed canister seating area 2108 of the cask bottom closure plate 2103 inside the raise annular bottom ring plate 2106 as shown. This is the area which receives the bottom baseplate 2122 of the fuel canister 2120.

In other less preferred but possible embodiments contemplated, the arrangement of the plug assemblies 2130 may be reversed to that shown. Accordingly, the plug holes 2140 may be downward facing openings formed in the base plate 2122 of canister 2120 provided if the base plate is sufficiently thick. The tapered plugs 2131 may be embedded in the holes and protrude downwards from the base plate to engage the top surface of the cask bottom closure plate 2103 when the canister is loaded therein.

Test Example

To demonstrate the impact amelioration system concept, the case of a falling transfer cask 2100 containing an MPC (canister 2120) is considered with reference to FIG. 31. The transfer cask is assumed to fall from a height of 6.56 feet in this postulated scenario onto a reinforced concrete pad or slab 2115. The following data characterizes the physical/mechanical parameters of the computer simulated drop test: weight of transfer cask 2100 body: 120,000 pounds; weight of the loaded MPC 2120: 90,000 pounds; MPC diameter 75¾ inches; thickness of the transfer cask baseplate 2103: 5½ inches; Material of impact limiter rod or plug: ASME/ASTM SA479 stainless steel; Material of cask bottom closure plate 2103: ASME/ASTM SA516 Grade 70.

Calculations using LS-DYNA (a state-of-the-art impact dynamics code widely used in the industry) showed the peak deceleration of the MPC to be 262 g's when the transfer cask is dropped with the MPC resting directly onto the transfer cask baseplate without impact limiter assemblies 2130. Next, using the present impact amelioration system disclosed herein, the cask's bottom closure plate 2103 was equipped with 16 circumferentially arranged impact limiting plugs 2131 of 4-inch diameter (D1) and 82 degree included angle of taper (A1) each situated in frustoconical plug holes 2140 also with 82 degree included angle of taper (A2). An equal sized impactor at the centerline Vc of the MPC 2120 was also employed. When this second configuration with impact limiter assemblies 2130 was employed, the peak deceleration of the MPC dropped down to 180 g's. The impact limiter plugs 2131 were driven into and advanced in the holes by only 0.13 inch to achieve this substantial reduction in g-load. Therefore, by reducing the angle of taper in other configurations, the penetration of the plugs 2131 into the plug holes 2140 can be further increased, and the g-load correspondingly reduced further. Accordingly, the foregoing analysis demonstrates the benefits of present impact amelioration system for reducing the g-load on the canister and protecting the canister and fuel assemblies stored therein.

Figure 40:
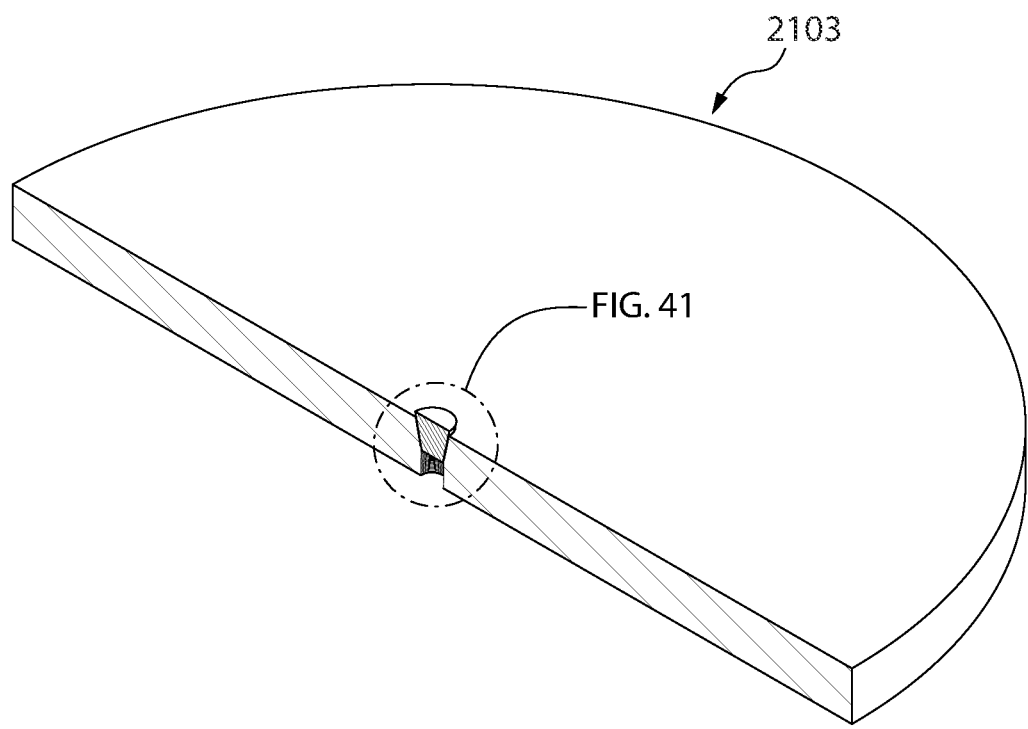
FIG. 40 is a cross-sectional perspective view of the cask bottom closure plate showing a second embodiment of a impact limiter assembly.
Figure 41:
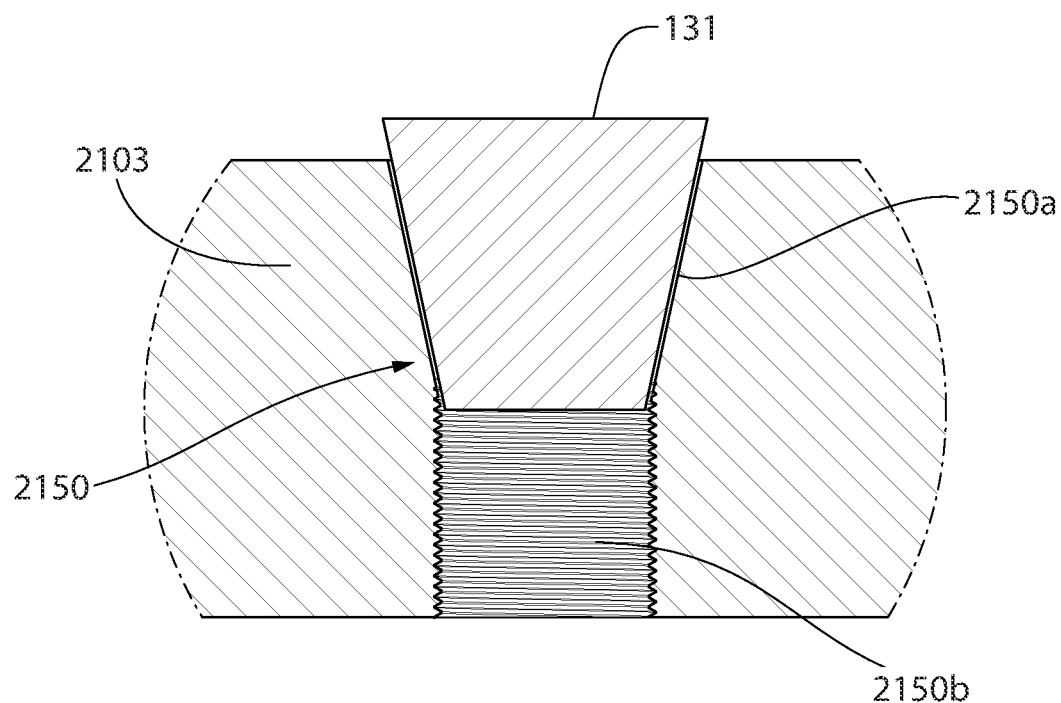
FIG. 41 is a detail taken from FIG. 40.

FIGS. 40 and 41 show an alternate embodiment of an impact limiter assembly. In this embodiment, the plug hole 2150 includes an upper tapered portion 2150*a* similar to that previous described herein which is frustoconical shaped. The adjoining lower portion 2150*b* of the plug holes 2150 comprises sacrificial threads configured to deform under shear forces imparted by the plugs 2131 when the plugs are driven deeper into the plug holes under impact during a cask drop event. The plugs 2131 have a mating threaded bottom extension 2131*a* engaged with the threaded hole. Shearing of the threads as the plug 2131 is driven deeper into the plug hole 2150 after a cask drop event serves to extract impact energy from the fall. The deformation of sacrificial threads in conjunction with the frictional forces acting between the plug and hole sidewalls mutually contribute and act in unison to absorb the g-forces acting on the canister 2100 during the drop event. The threaded lower portion 2150*b* of the plug holes 2150 may extend complete through the bottom surface of the cask bottom closure plate 2103, or in other embodiments may have a closes bottom which does not penetrate the bottom surface of the closure plate. Either embodiment may be used. It bears noting that the threaded impact limiter plugs 2131 also facilitate installation of the plugs by simply rotating the plugs to threadably engage the threaded plug holes 2150, thereby retaining the plugs until the canister 2120 is loaded into the transfer cask 2100.

Figure 42:
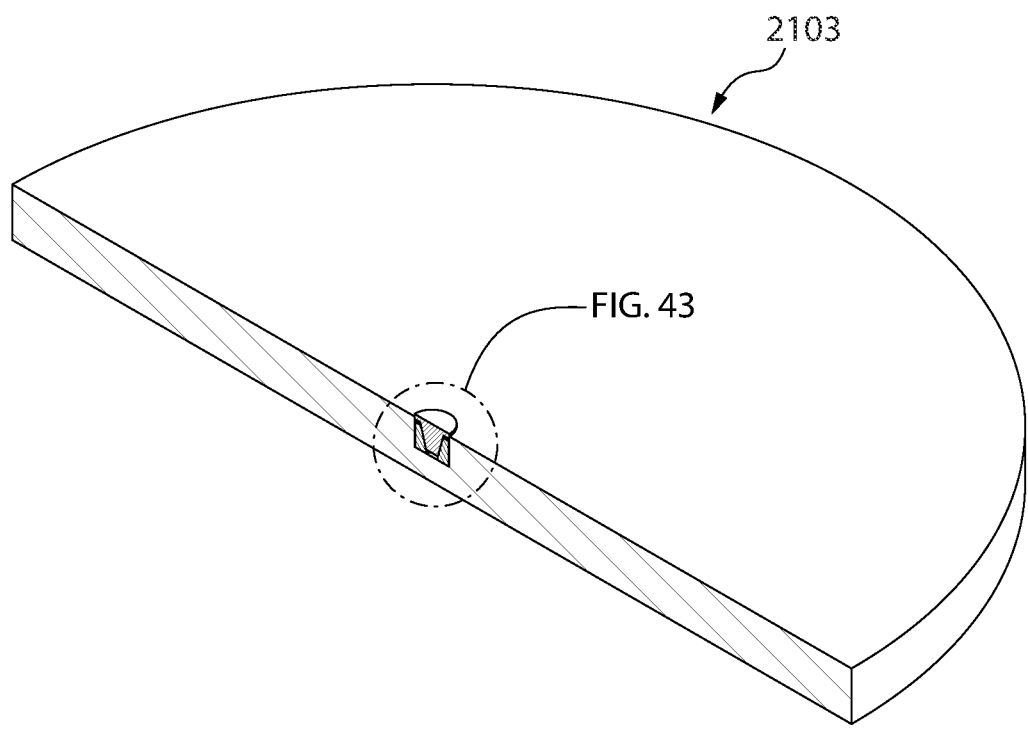
FIG. 42 is a cross-sectional perspective view of the cask bottom closure plate showing a third embodiment of the impact limiter assembly.
Figure 43:
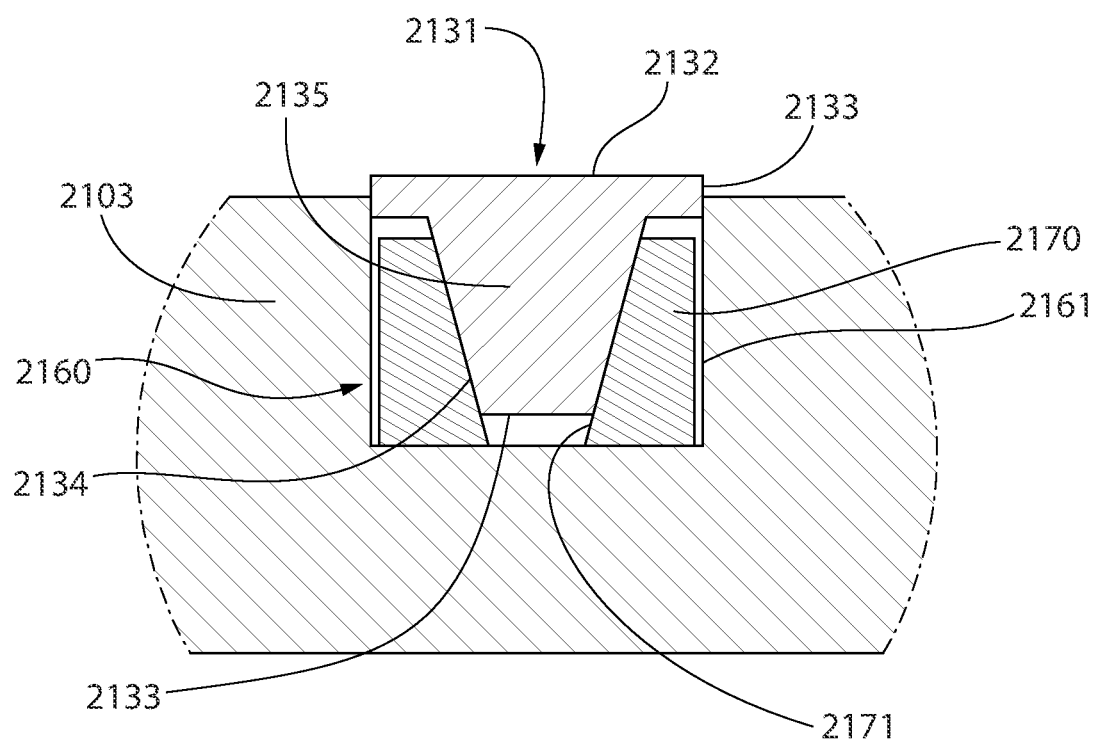
FIG. 43 is a detail taken from FIG. 42.

FIGS. 42 and 43 show yet another embodiment of an impact limiter assembly. In this embodiment, the plug hole 2160 has straight sidewalls 2161 and a closed bottom. An annular expansion ring 2170 is seated in plug hole 2160. Expansion ring 2170 includes straight exterior sides 2170*a* and a vertical tapered central opening 2171 of frustoconical shape which may extend completely through the ring as shown. The opening 2171 defines corresponding frustoconical walls which may be complementary configured in angle of taper to the angle of taper A1 of the plug 2131. The top surface of the expansion ring 2170 may be recessed within in plug hole 2160 below the top surface 2105 of the cask bottom closure plate 2103 as shown.

In this present embodiment of FIGS. 42 and 43, impact limiter plug 2131 retains a frustoconical shaped central portion 2135 but adds a radially protruding peripheral flange 2133 at the top of the plug as shown. The plug with flange may have a diameter measured at its top surface (similar to diameter D1) which in this case is smaller than the top opening of the plug hole 2160 such that the flange can at least enter the plug hole 2160 as shown. The central portion 2135 of plug 2131 still frictionally engages the central opening 2171 of the expansion ring 2170 to retain the plug in place in the pre-impact position shown. Preferably, the expansion ring 2170 is sized in outer diameter so that a small annular space is formed between the sides of the ring and the sidewalls 2161 of plug hole 2160. This provides room for the ring 2170 to expand under impact forces after a cask drop event.

In operation after the cask 2100 is dropped, the impact limiter plug 2131 is driven deeper into tapered central opening 2171. The impact force F acting on the mating tapered/angled surfaces of the plug and expansion ring 2170 within the central opening 2171 has a lateral/horizontal force component (in additional to a vertical force component) as well understood by those skilled in the art. The horizontally acting force component deforms and expands the ring radially outwards as it is squeezed between the plug 2131 and plug hole 2160 to close the annular space between the ring and plug hole 2160 sidewalls 2161. In some instances, the ring may possibly engage the sidewalls 2161 as it radially expands. The expansion ring in combination with mating tapered surfaces of the impact limiter plug 2131 and expansion ring 2170 act in unison to absorb and reduce the g-load imparted to the canister 2120 during the cask drop event. The peripheral flange 2133 of plug 2131 may completely enter the plug hole 2160. FIG. 43 shows the pre-impact position of the plug in the impact limiter assembly. Expansion ring 2170 may be formed of any suitable metallic or non-metallic material. Preferably, the ring is formed of a material having greater ductility (i.e. softer) than the plug 2131 to facilitate the expansion of the ring. In one embodiment, the expansion ring 2170 is formed of metal such as steel or aluminum. In other embodiments, the ring may be formed a non-metallic material such as a dense polymer.

In view of all the foregoing embodiments of an impact amelioration system, the included taper angles of the tapered plugs 2131 and plug holes 2140, their material of construction and dimensions, number and arrangement/pattern of impact limiter assemblies 2130 on the cask bottom closure lid 2130, number and type of threads used in the embodiment of FIGS. 40-41, the height/thickness and material of the optional expansion ring 2170 used in the embodiment of FIGS. 42-43, and other aspects are among the parameters that can be varied to obtain the optimal energy extraction for a specific impact scenario to protect the canister 2120 and its waste fuel contents from severe damage.

The impact limiter plugs 2131 can generally advance in the hole primarily by expanding/deforming the plugs in an elastoplastic manner which exceeds the yield stress of the material, and by overcoming the friction at the tapered/angled interface between the plug and mating plug holes. The plugs are therefore preferably formed of a metallic elastoplastic material such as without limitation steel which undergoes elastic and plastic deformation when the load/force exceeds the yield stress of the material. Plastic deformation beyond the yield stress connotes that the plug will retain permanent deformation and not return to its original condition (e.g. shape and dimensions). Depending on the material selected for the cask bottom closure plate 2103, the sidewalls of the plug holes may similarly undergo elastic-plastic deformation to absorb some of the kinetic impact energy resulting from a cask drop event.

Third Inventive Concept
Unventilated Cask for Storing Nuclear Waste

Reference is made generally to FIGS. 45-60 which are relevant to the Third Inventive Concept described below.

FIGS. 45-60 show various aspects of the nuclear fuel storage system comprising an unventilated nuclear fuel storage pressure vessel with a self-regulating pressure relief mechanism and integral heat dissipation system. The nuclear fuel storage system in one embodiment generally comprises a pressure vessel in the form of an outer unventilated storage cask 3100 and a high level radioactive nuclear waste (e.g., SNF) canister 3120 configured for storage inside the cask. Features of each storage vessel and other features thereof will now be further described.

Canister 3120 may be used for storing any type of high level radioactive nuclear waste, including without limitation spent nuclear fuel (SNF) or other forms of radioactive waste materials removed from the reactor. The SNF or simply fuel canister for short may be any commercially-available nuclear waste fuel canister, such as a multi-purpose canister (MPC) available from Holtec International of Camden, New Jersey or other.

Figure 57:
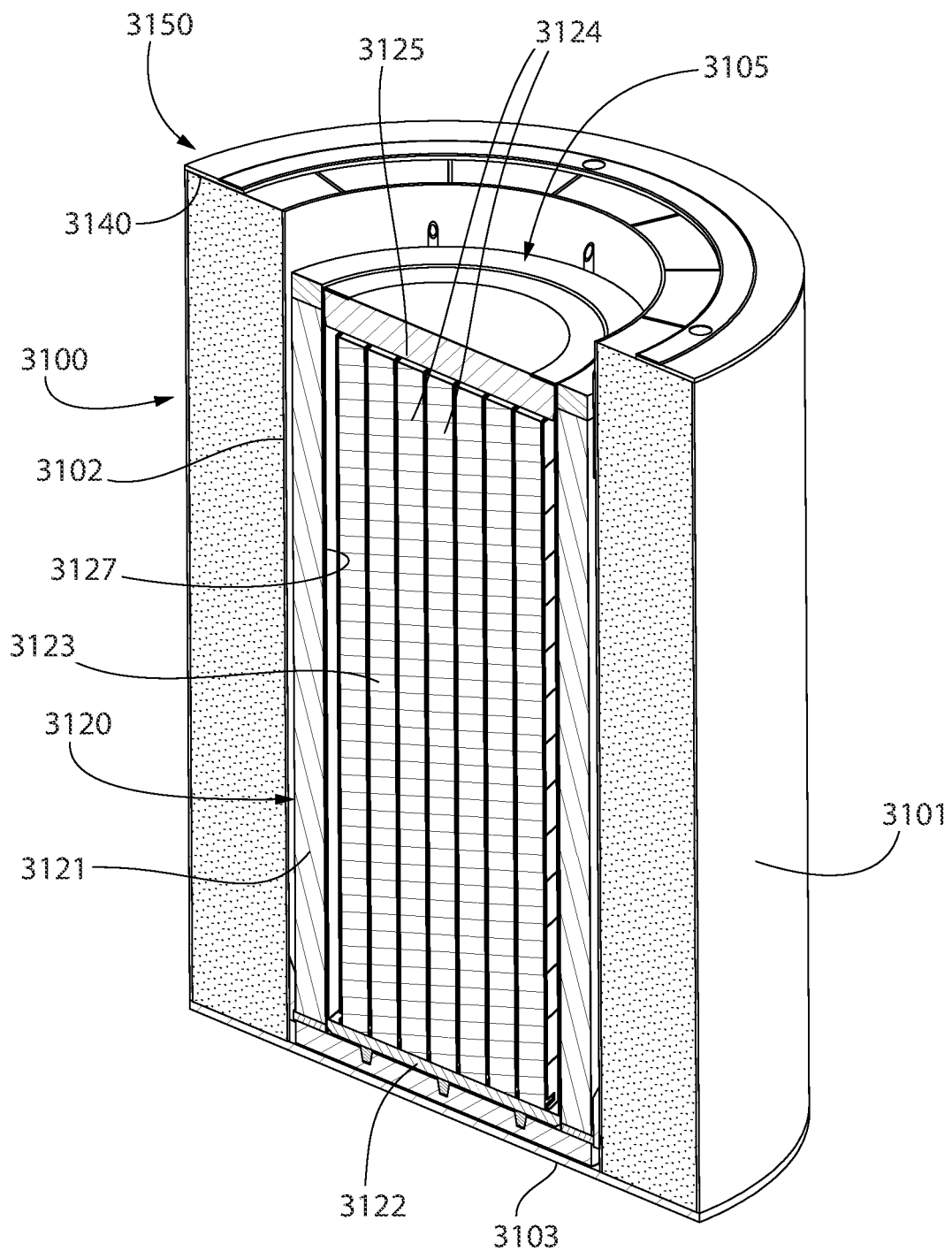
FIG. 57 is a partial longitudinal cross sectional view of the cask showing the nuclear waste fuel canister positioned in the internal cavity of the cask.

Referring momentarily to FIG. 57, waste fuel canister 3120 has a vertically elongated and metallic body comprised of a cylindrical shell 3121. Canister 3120 further includes a bottom baseplate 3122 seal welded to a bottom end of the shell, and an open top closed by an attached lid 3125. Lid 3125 may be seal welded to a top end 3126 of the canister shell 3121 to form a hermetically sealed cavity 3127 inside the canister. The foregoing canister parts may be formed of any suitable metal, such as for example without limitation steel including preferably stainless steel for corrosion protection.

Fuel basket 3123 is disposed in cavity 3127 of the canister 3120 and is seated on the bottom baseplate 3122 as shown. The fuel basket may be welded to the baseplate for stability in some embodiments. In some embodiments, the baseplate 3122 may extend laterally outwards beyond the sides of the fuel basket 3123 around the entire perimeter of the fuel basket as shown.

Figure 58:
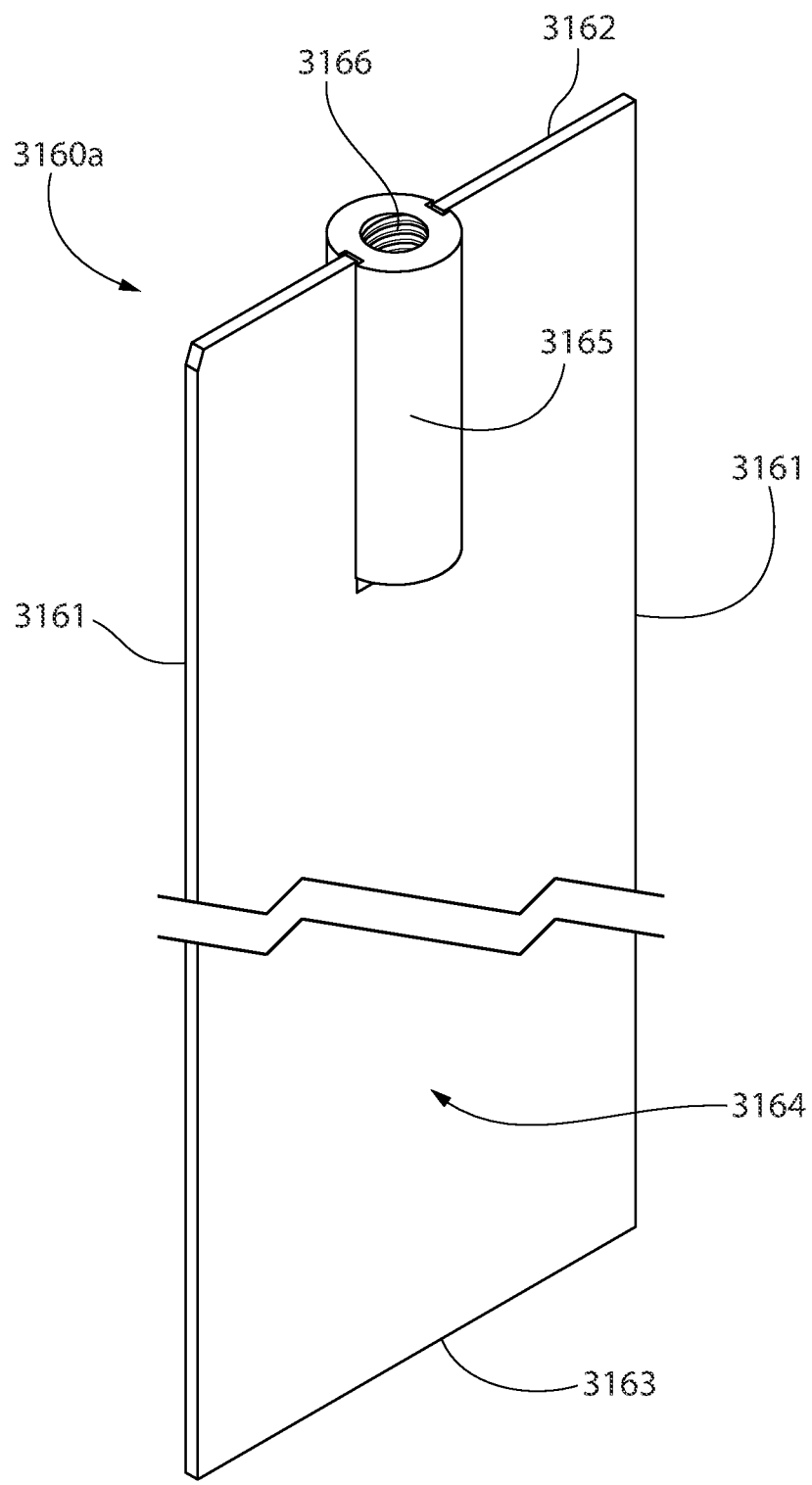
FIG. 58 is a perspective view of one of the lifting rib plates of the cask configured for use with the lid bolt assembly.

The fuel basket 3123 is a honeycomb prismatic structure comprising an array of vertically-extending openings forming a plurality of vertical longitudinally-extending fuel assembly storage cells 3124. Each cell is configured in cross-sectional area and shape to hold a single U.S. style fuel assembly, which contains multitude of spent nuclear fuel rods (or other nuclear waste). An example of fuel assembly of this type having a conventional rectilinear cross-sectional configuration is shown in FIG. 58 of U.S. patent application Ser. No. 17/132,102 filed Dec. 23, 2020, which is incorporated herein by reference. Such fuel assemblies and the foregoing fuel basket structure are well known in the industry. The fuel basket may be formed in various embodiments by a plurality of interlocked and orthogonally arranged slotted plates built up to a selected height in vertically stacked tiers. Other constructions of fuel baskets such as via joining multiple vertically extending tubes or other structures to the canister baseplate may be used and others used in the art may be used. The fuel basket construction is not limiting of the present invention.

With continuing reference to FIGS. 45-60, the unventilated storage cask 3100 in one embodiment is a double-walled pressure vessel comprising a vertically elongated metallic cylindrical body 3100a defining a vertical longitudinal axis LA passing through the vertical centerline and geometric center of the body. The cask body is an annular structure including an outer shell 3101, an inner shell 3102 spaced radially inwards therefrom and defining an annular space 3106 between the shells, a circular bottom baseplate 3103 coupled to the bottom ends of the shells, and an annular top closure plate 3104 coupled to the top ends of the shells.

The shells are arranged coaxially relative to one another. Baseplate 3103 may be fixedly attached to the top and bottom ends of the shells preferably by via seal welding to form a hermetic bottom seal of the cask body. Accordingly, continuous circumferential seal welds may preferably be used to permanently join the bottom baseplate 3103 to the shells 3101, 3102.

The circumferential outer edge 3104*b* of top closure plate 3104 may be welded to a top end of the outer shell 3101 of the cask 3100. The top closure plate has a radially broadened ring-like plate structure which projects radially inwards from the outer shell towards the inner shell 3102. In one embodiment, as shown, top closure plate 3104 projects radially inwards towards but does not contact or engage the inner shell 3102 of the cask 3100 to partially close the annular space 3106 at top between the shells of the cask body. This arrangement provides additional space for a pressure release/relief passageway to quickly release excess pressure from the cask in the event of an internal cask overpressurization condition, as further described herein.

Figure 54:
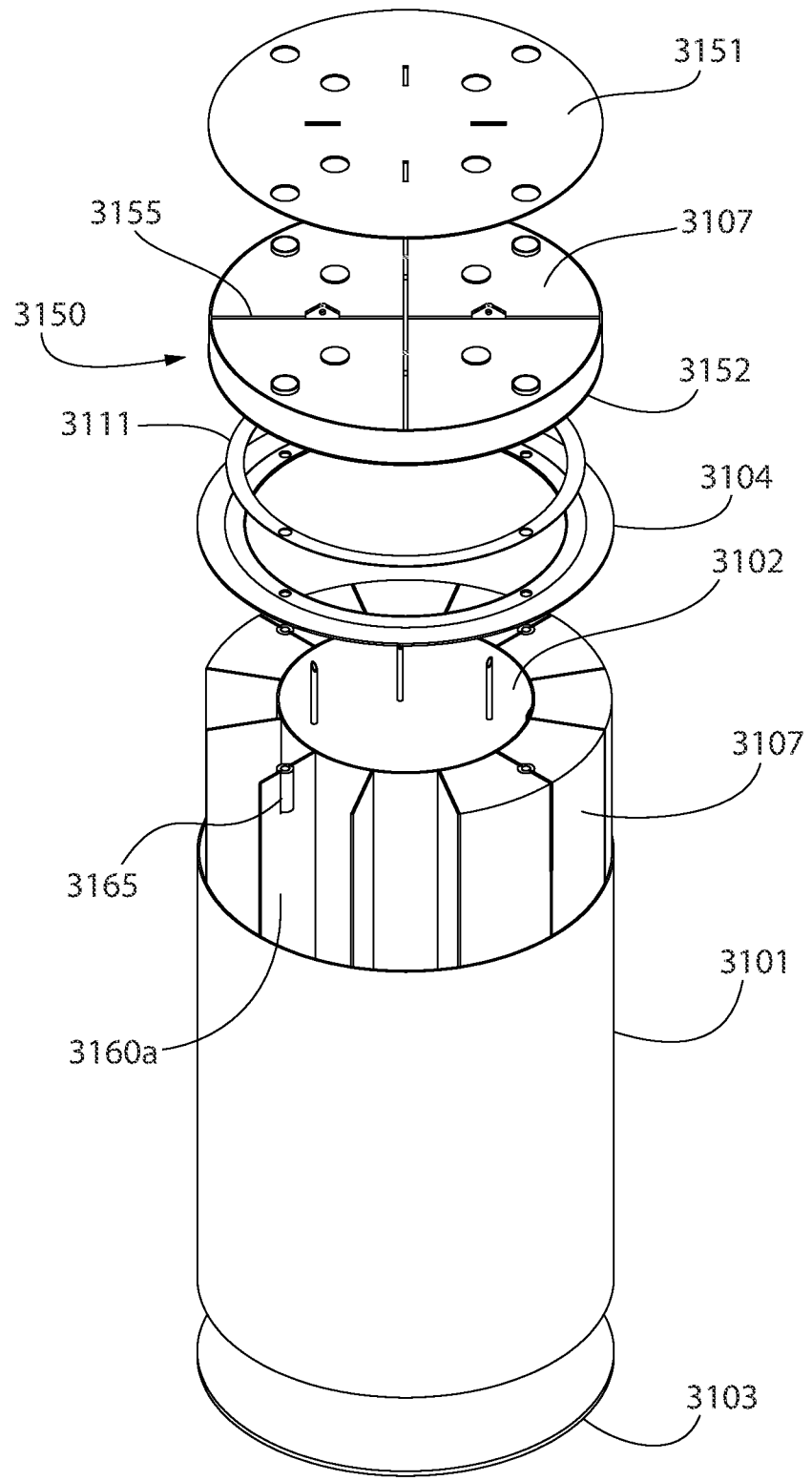
FIG. 54 is an exploded perspective view of the cask.
Figure 55:
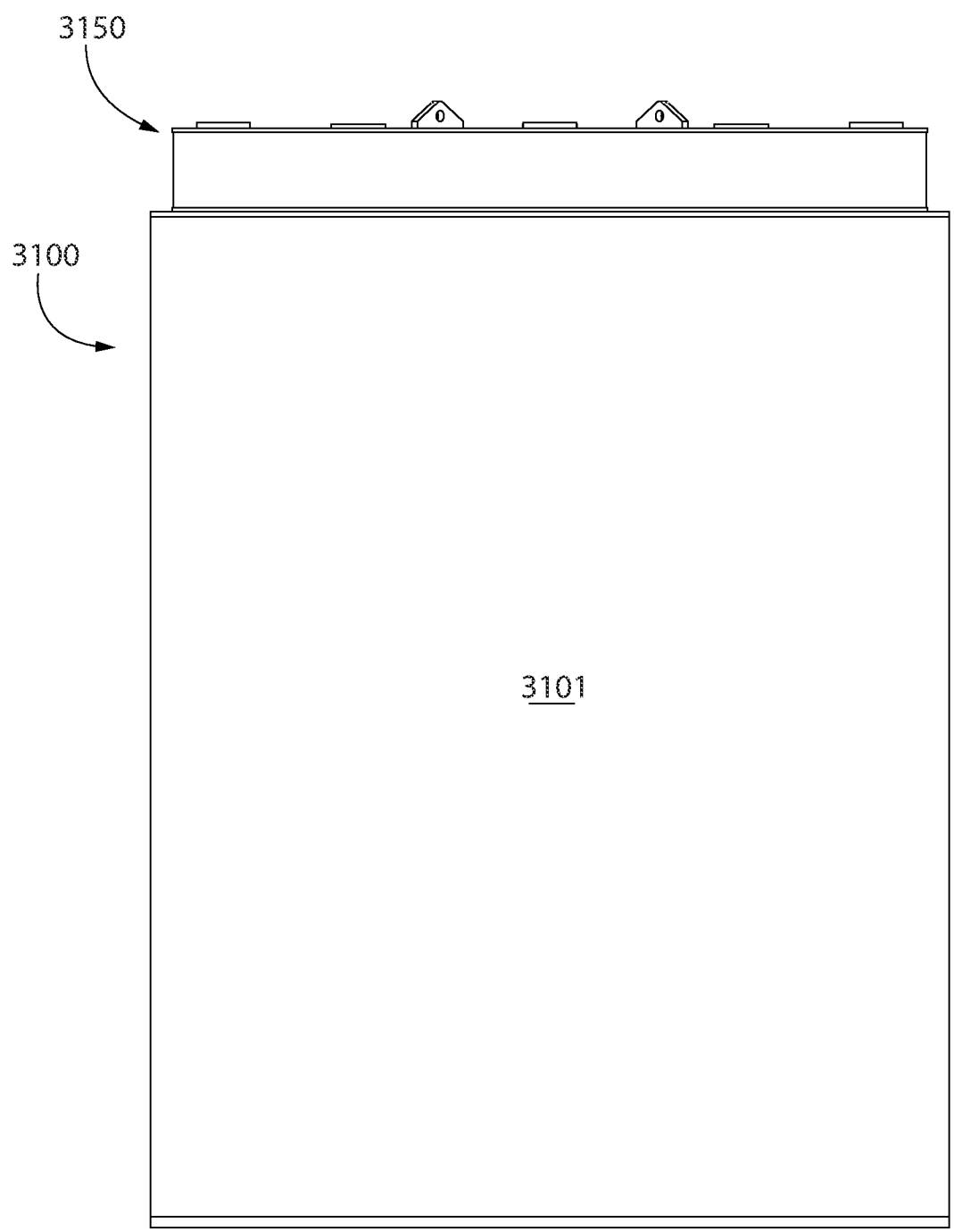
FIG. 55 is a side elevation view of the cask.
Figure 56:
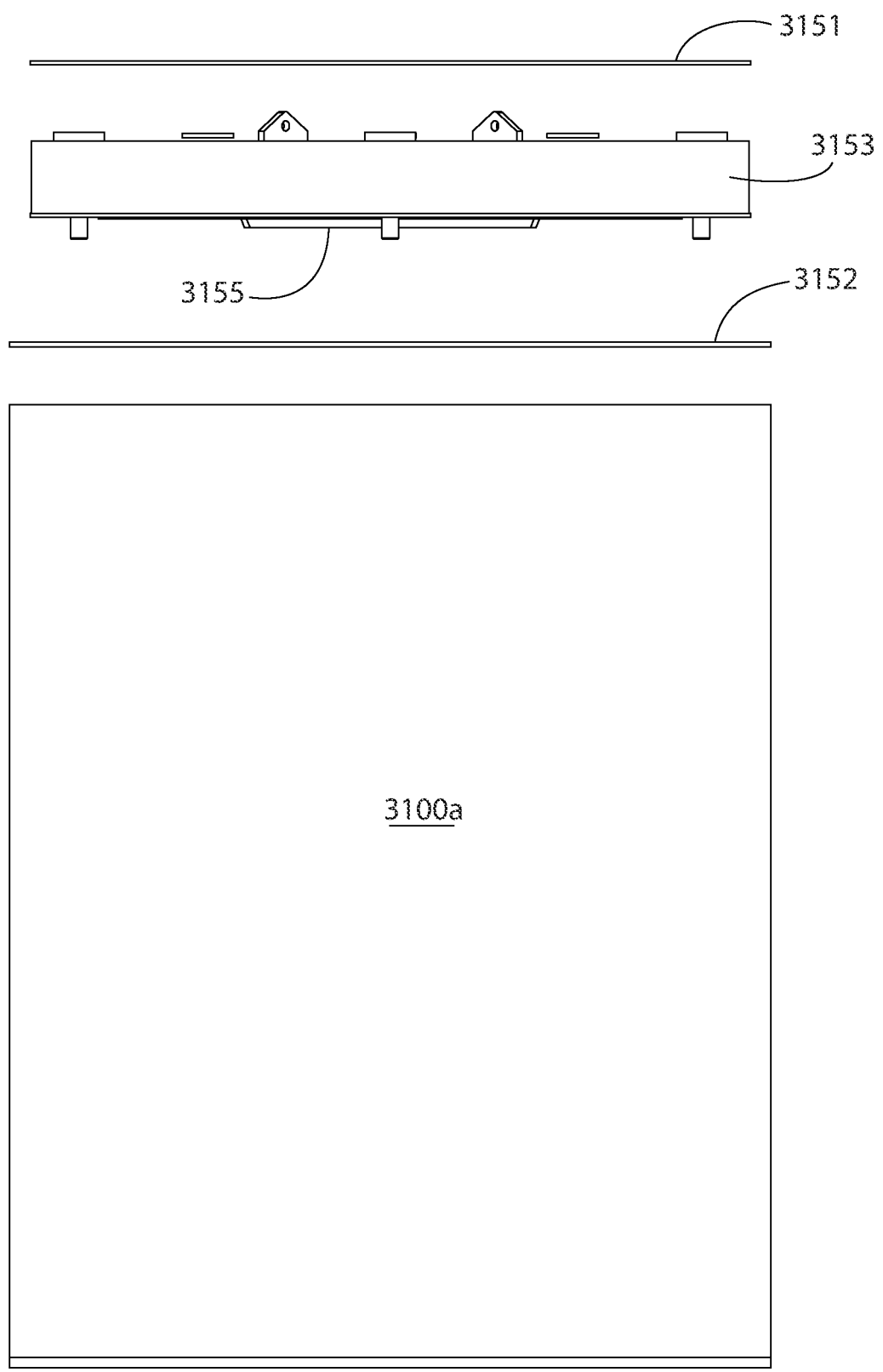
FIG. 56 is a side elevation view thereof showing parts of the cask closure lid in exploded view.
Figure 59:
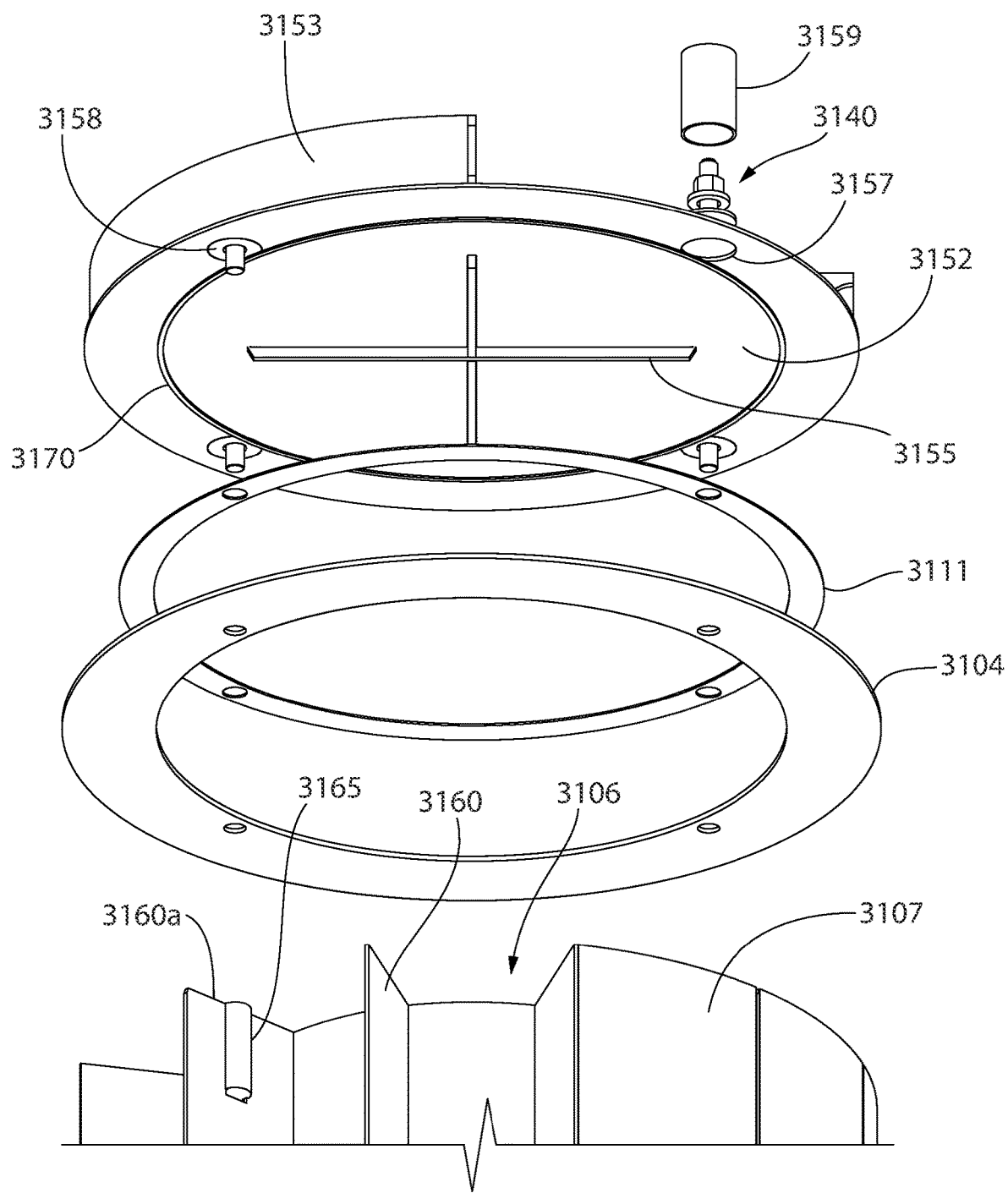
FIG. 59 is a bottom exploded perspective view of the lid and upper portion of the cask.
Figure 60:
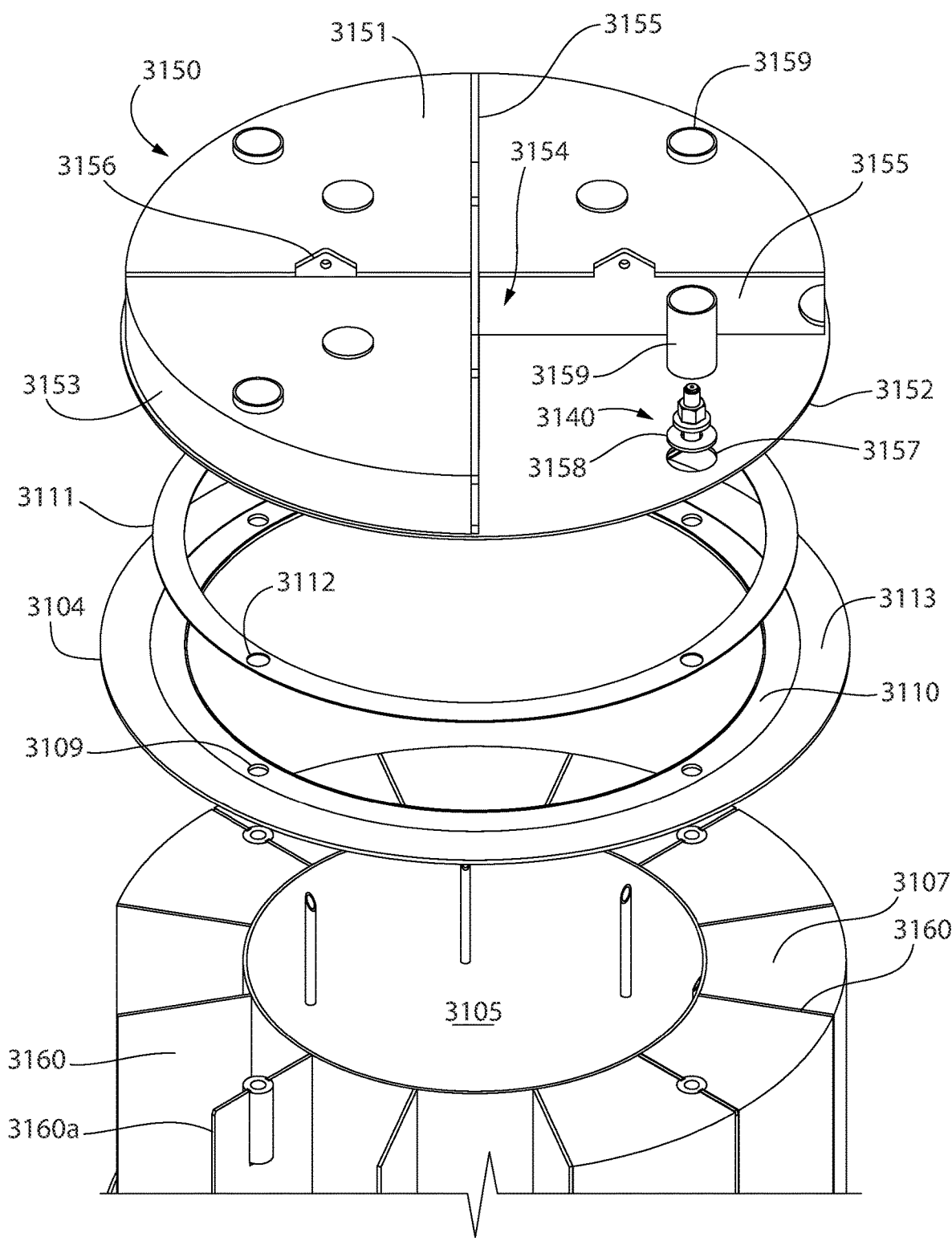
FIG. 60 is a top exploded perspective view of the lid and upper portion of the cask.
Figure 61:
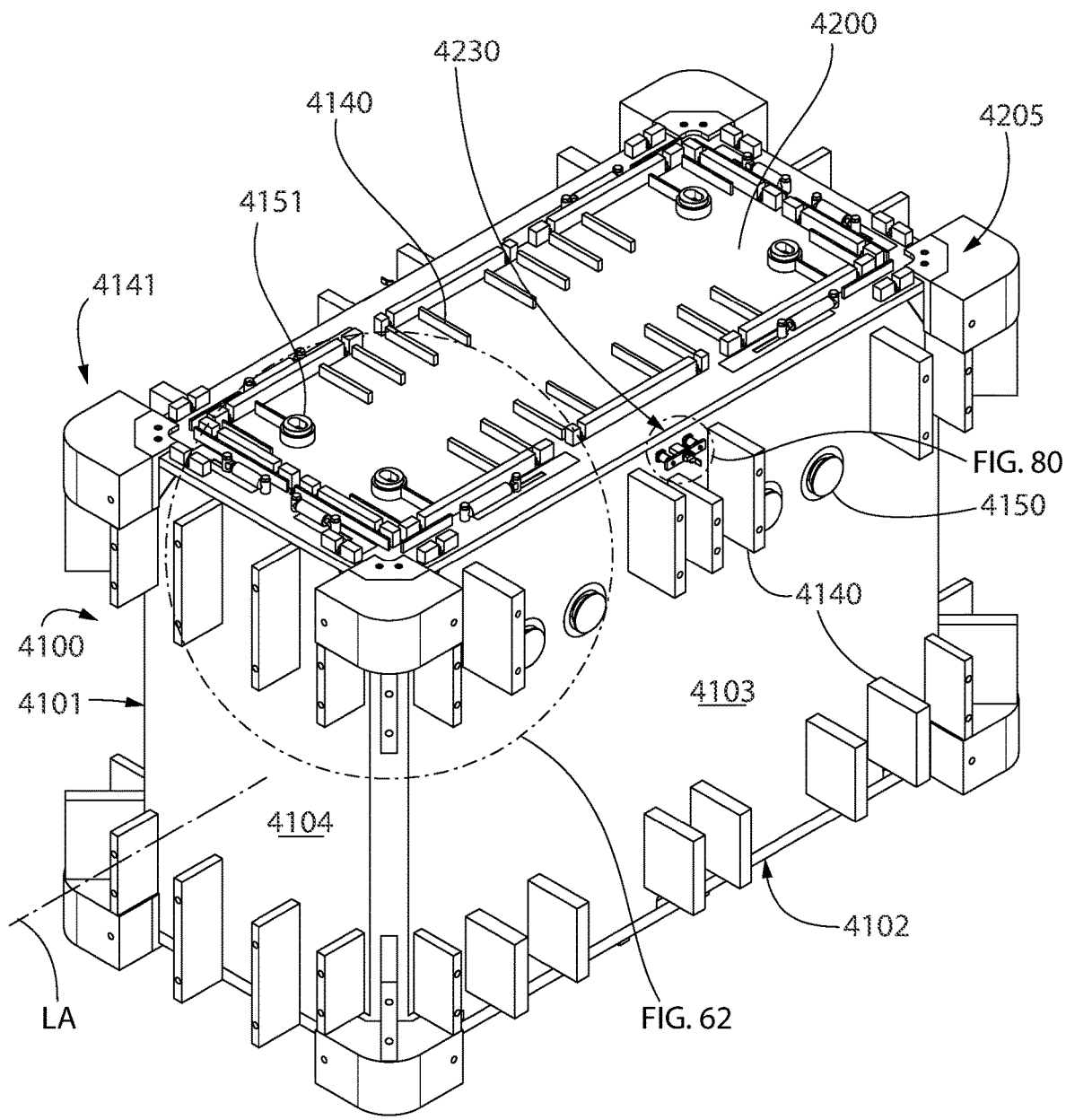
FIG. 61 is top perspective view of a polygonal cask configured for storage of nuclear waste materials according to one embodiment of the present disclosure.
Figure 62:
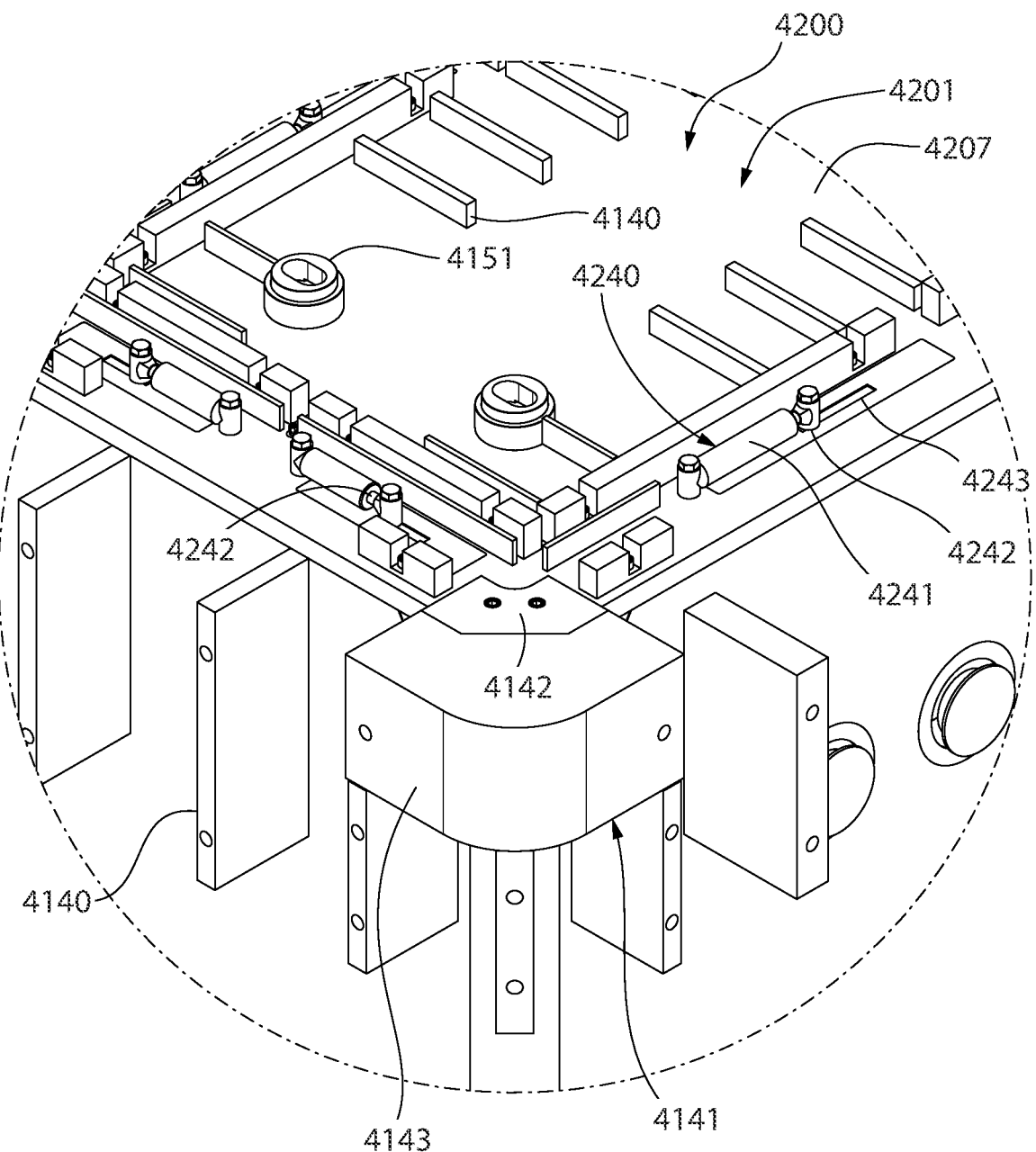
FIG. 62 is an enlarged detail taken from FIG. 61.
Figure 63:
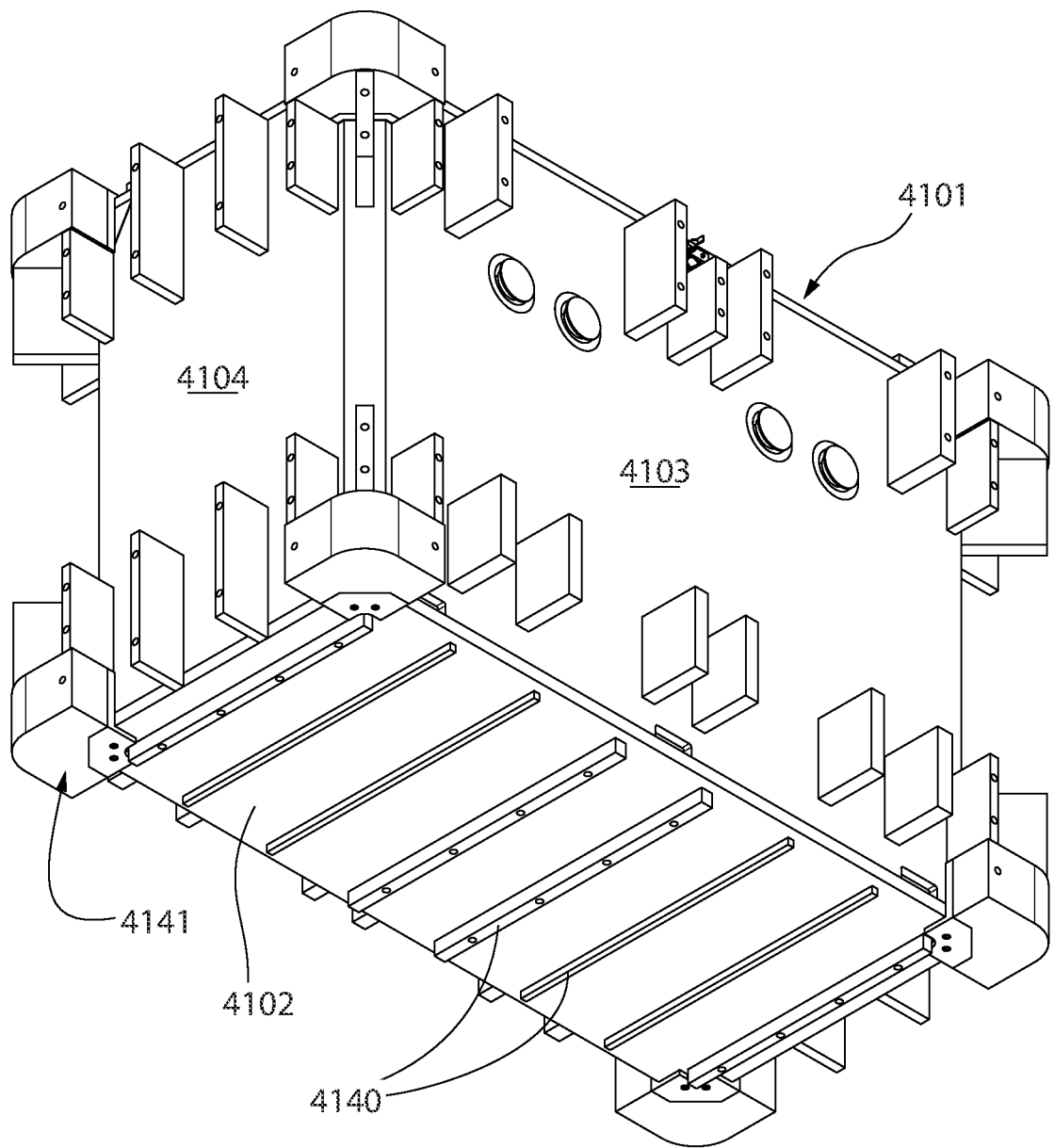
FIG. 63 is a bottom perspective view of the cask of FIG. 61.
Figure 64:
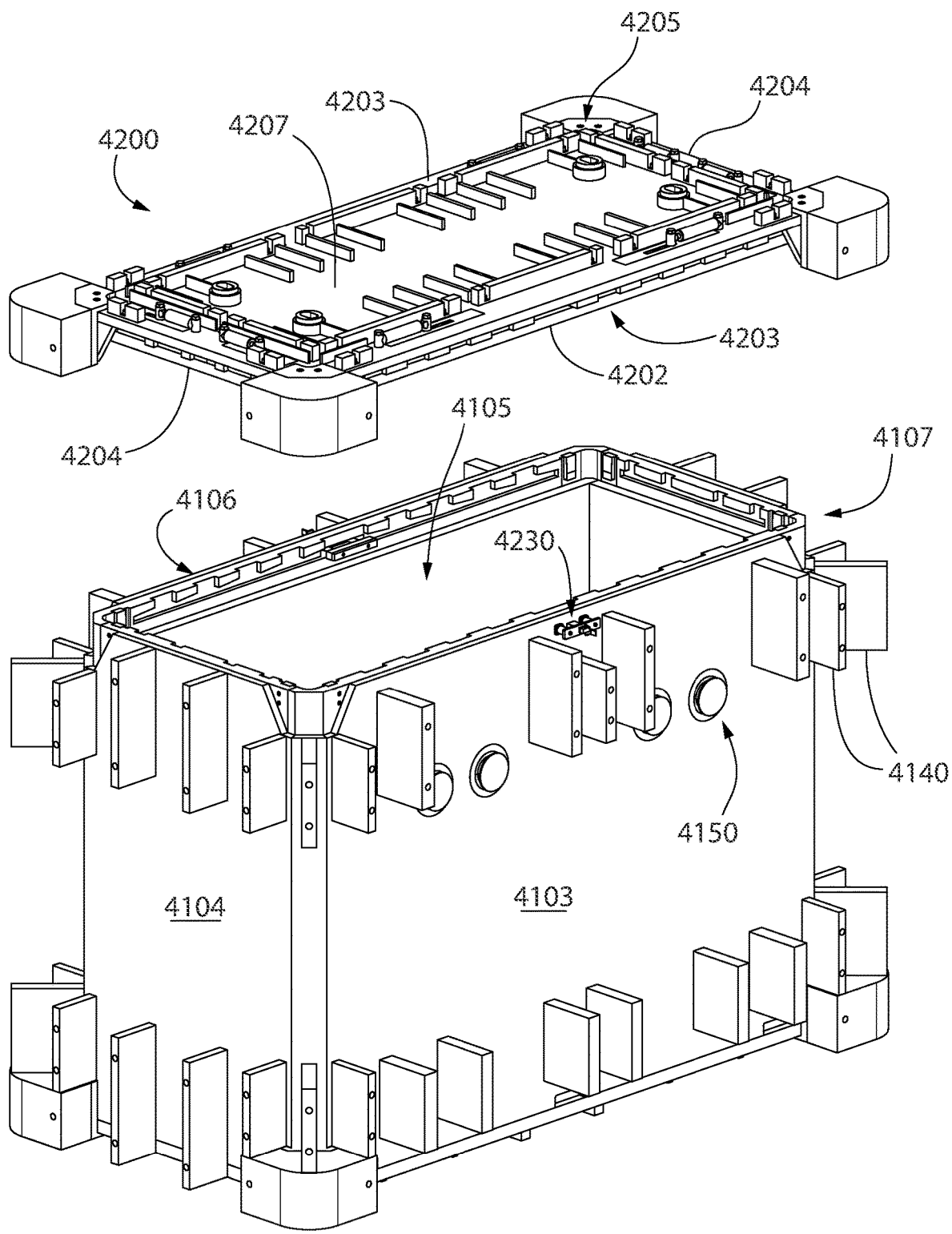
FIG. 64 is an exploded top perspective view thereof showing the lid removed.
Figure 65:
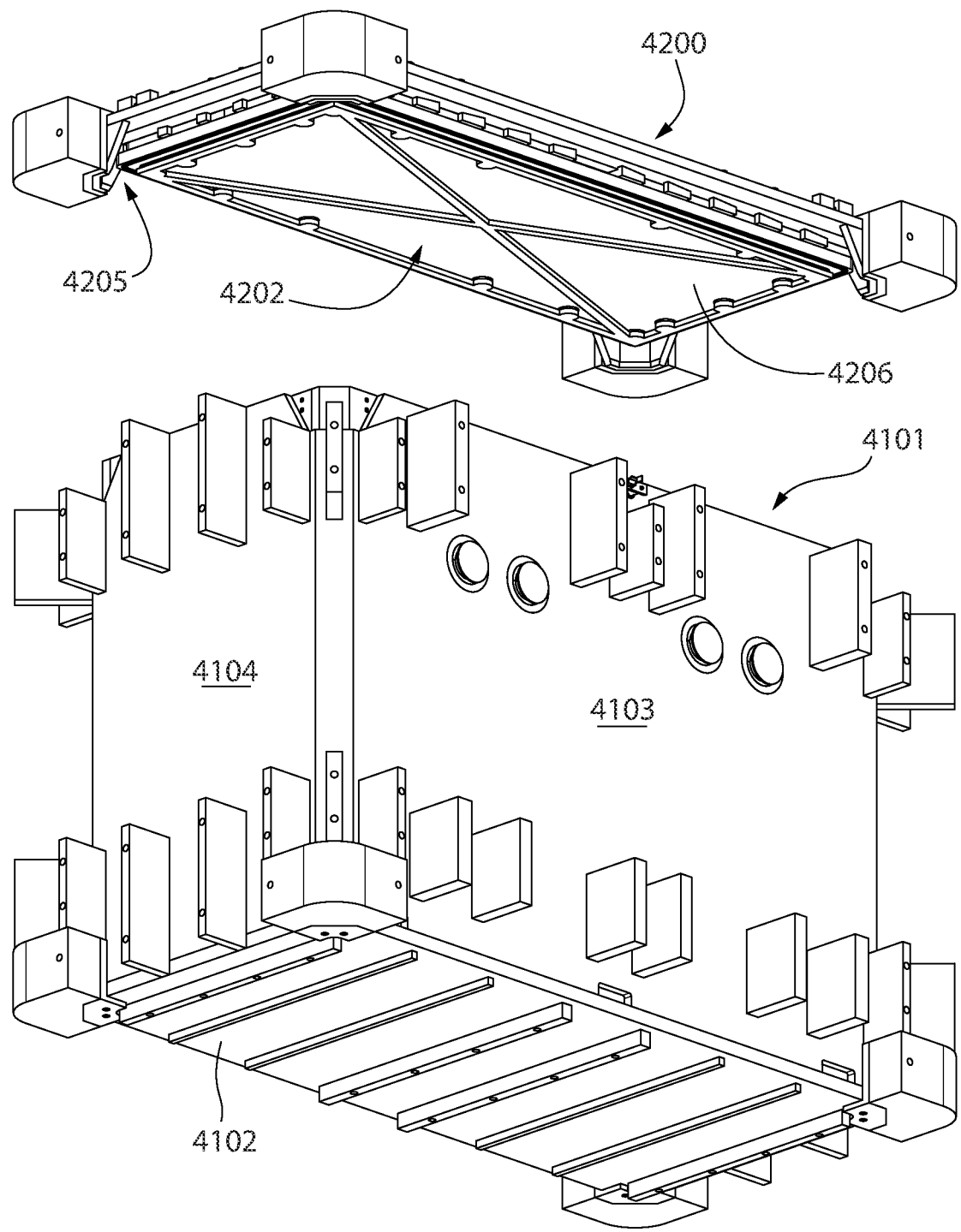
FIG. 65 is an exploded bottom perspective view thereof.
Figure 66:
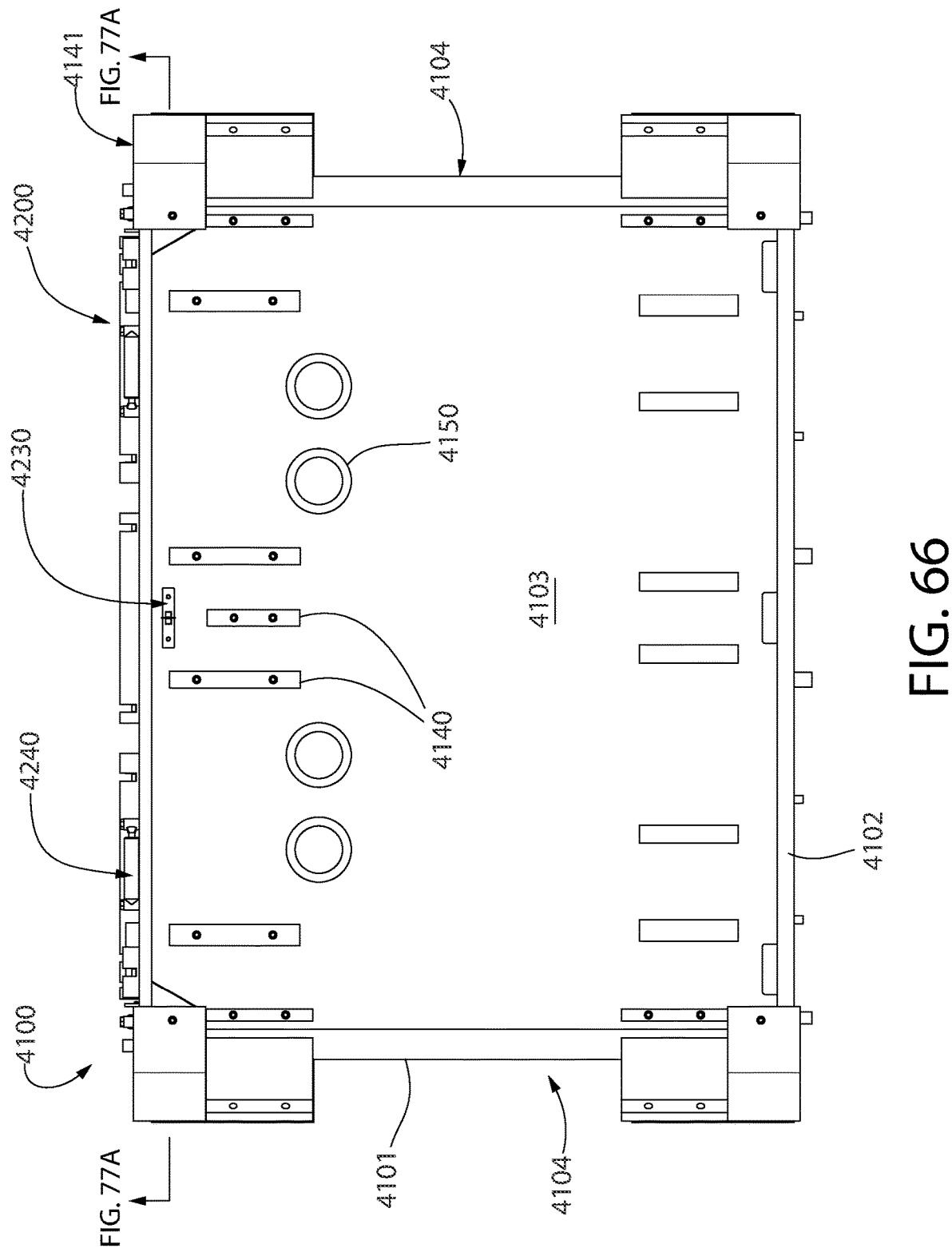
FIG. 66 is a longitudinal side elevation view thereof.
Figure 67:
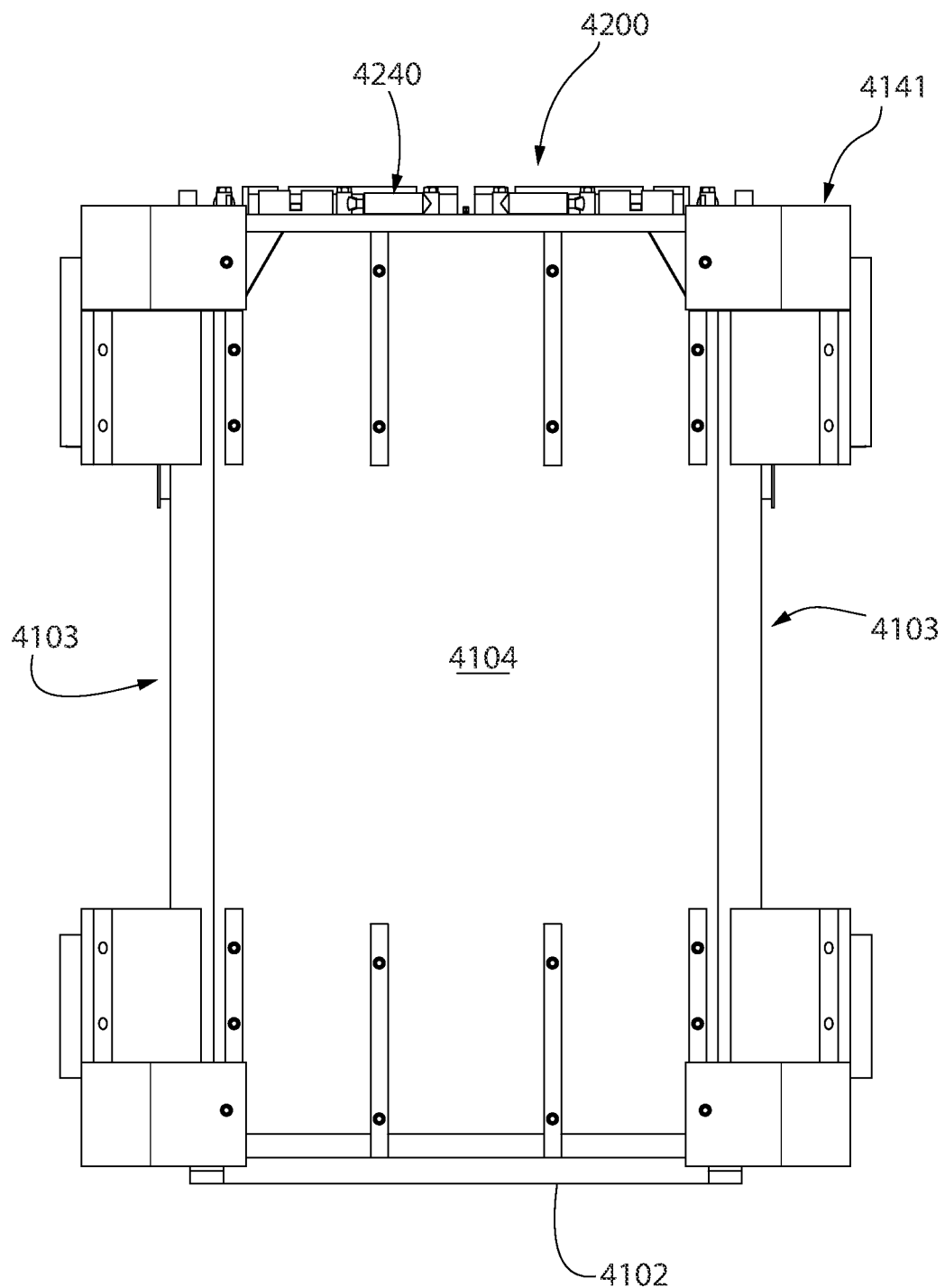
FIG. 67 is a lateral end elevation view thereof.
Figure 68:
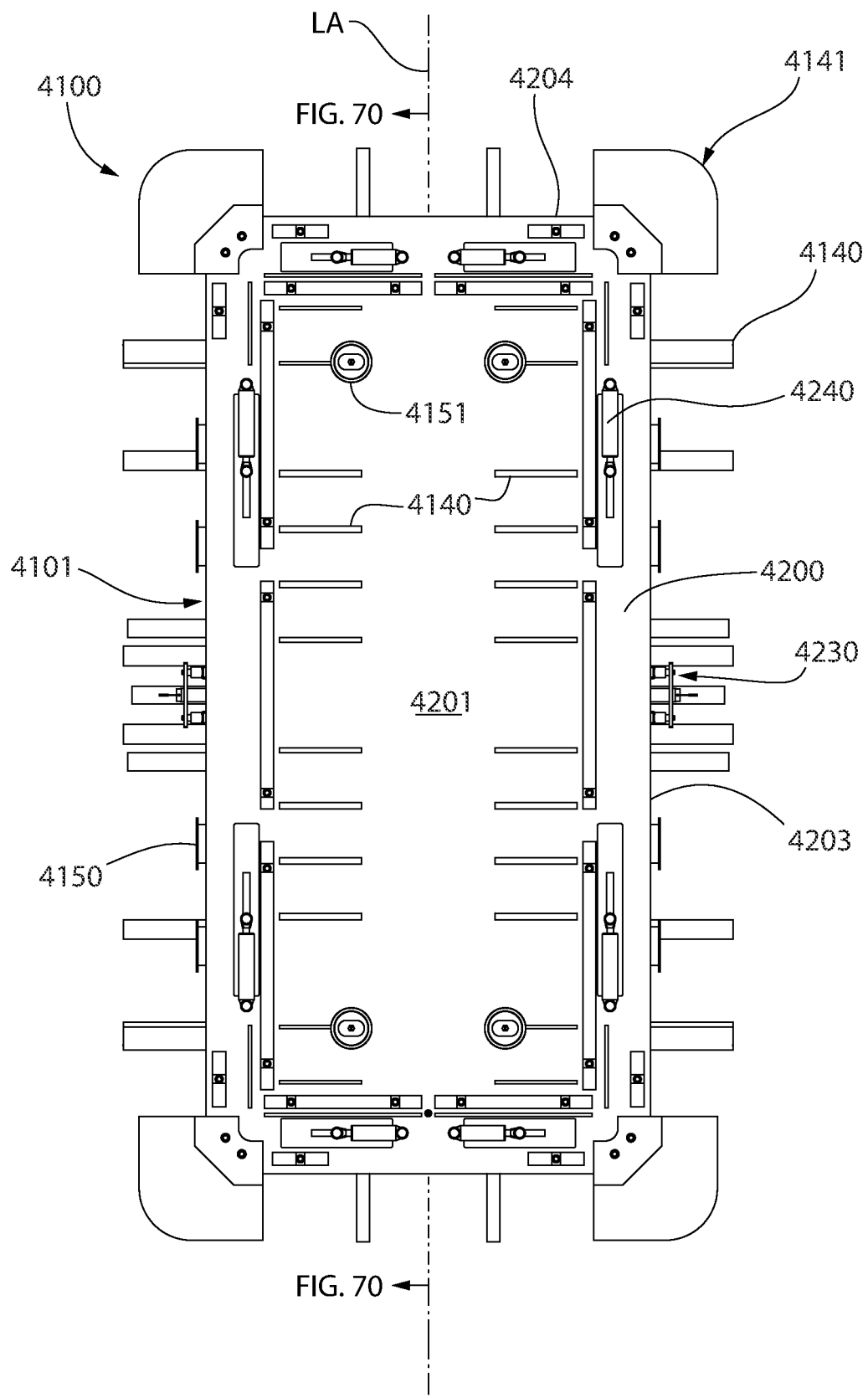
FIG. 68 is a top plan view thereof.
Figure 69:
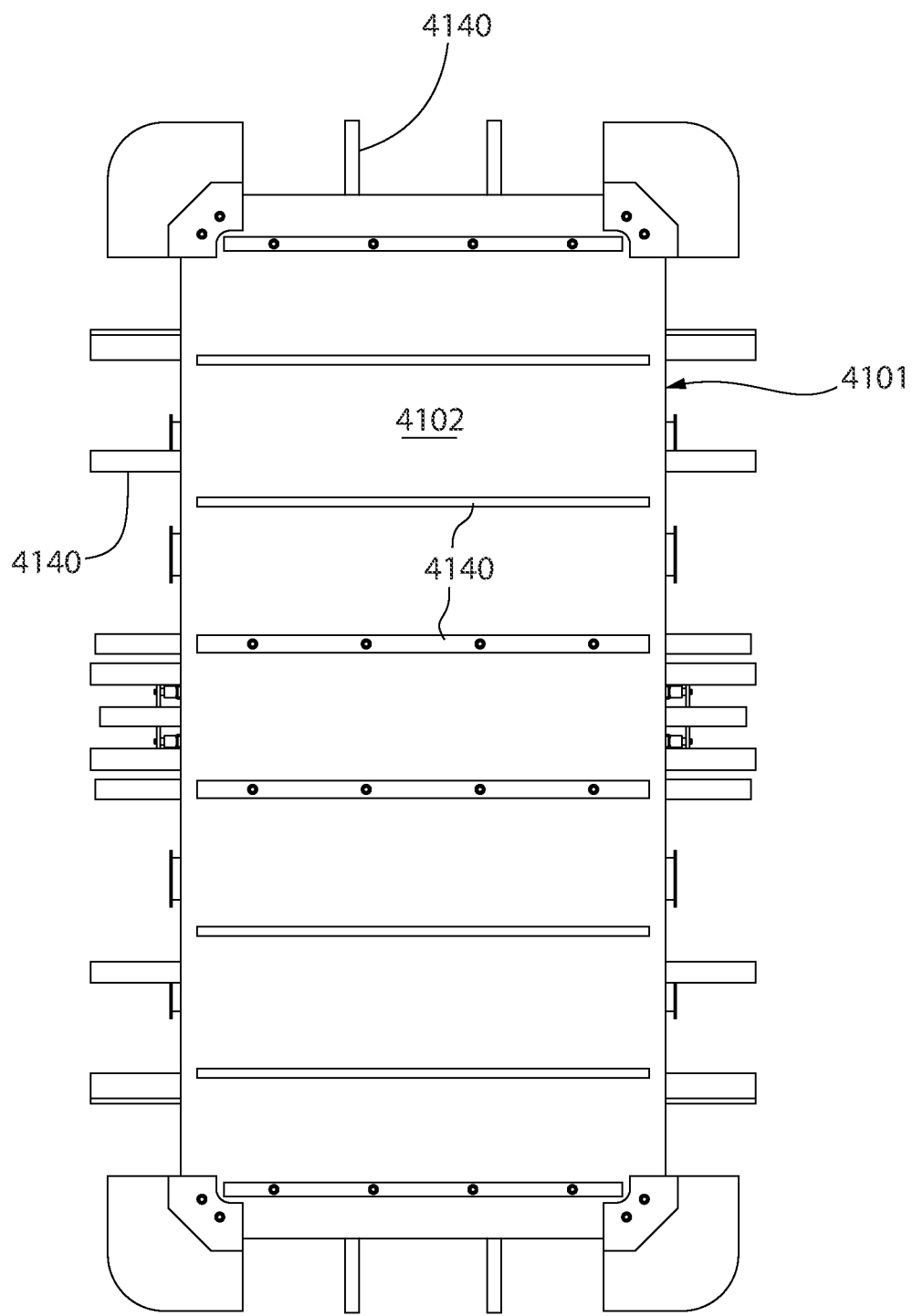
FIG. 69 is a bottom plan view thereof.
Figure 70:
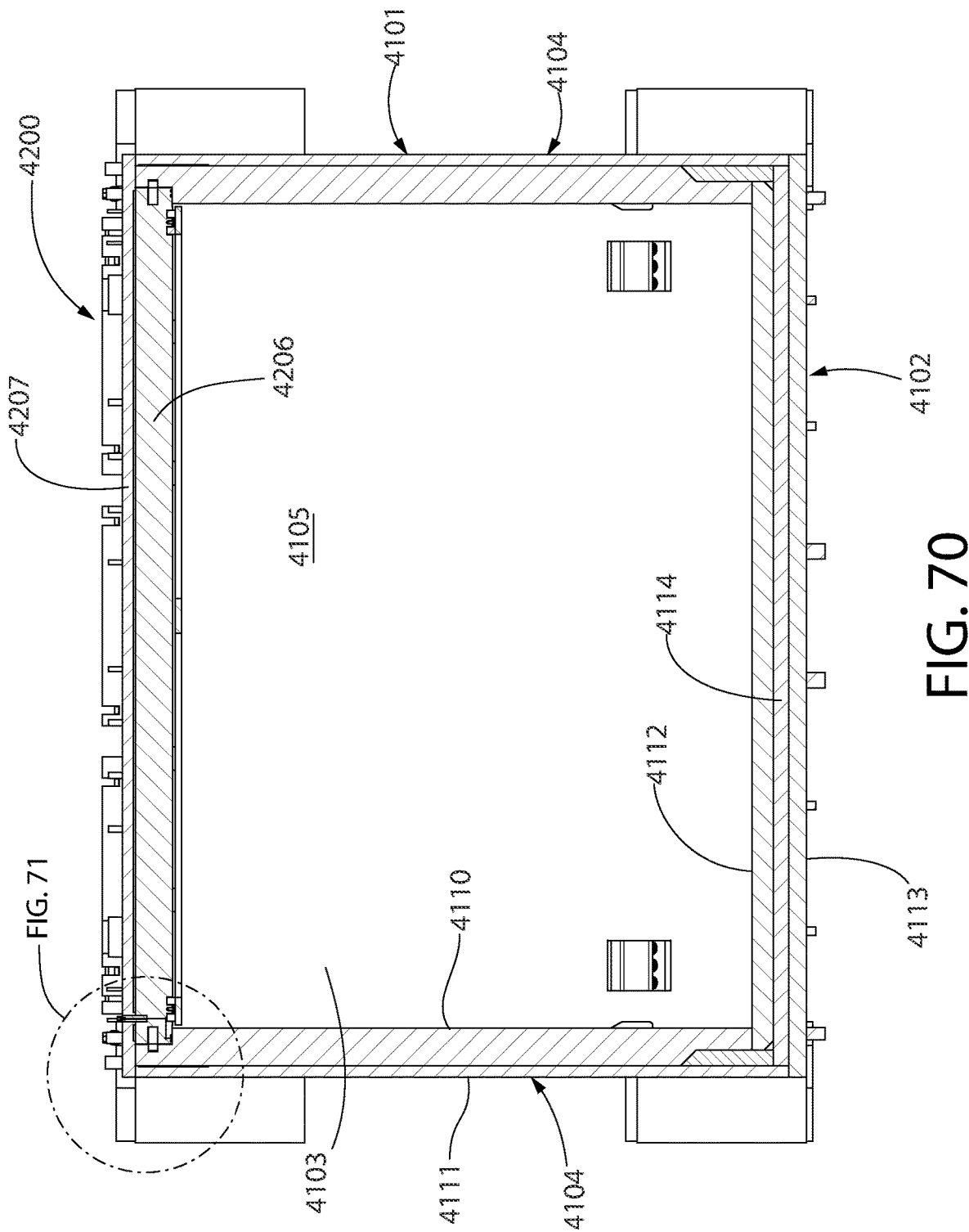
FIG. 70 is a longitudinal transverse cross-sectional view thereof.
Figure 71:
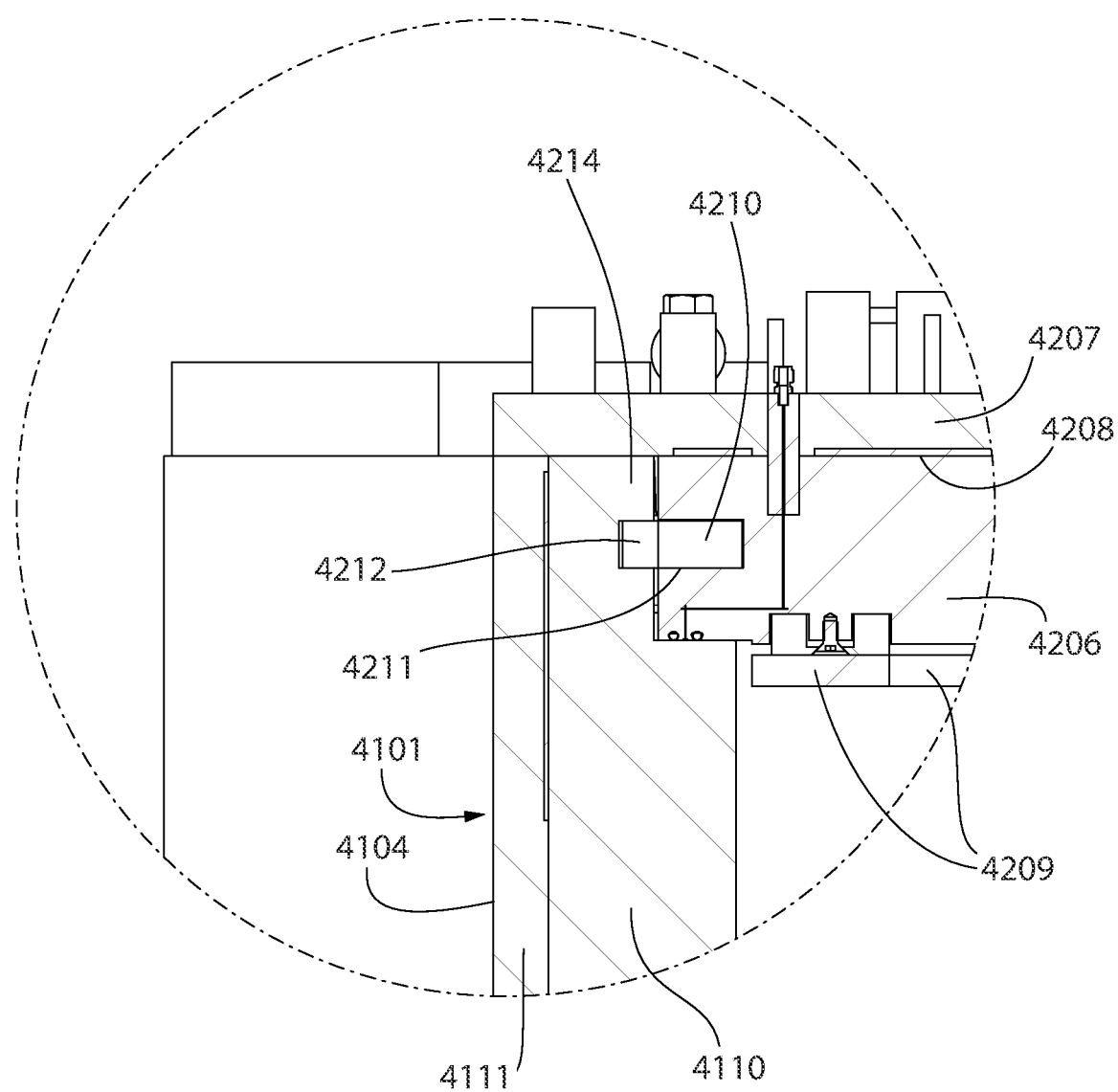
FIG. 71 is an enlarged detail taken from FIG. 70.
Figure 72:
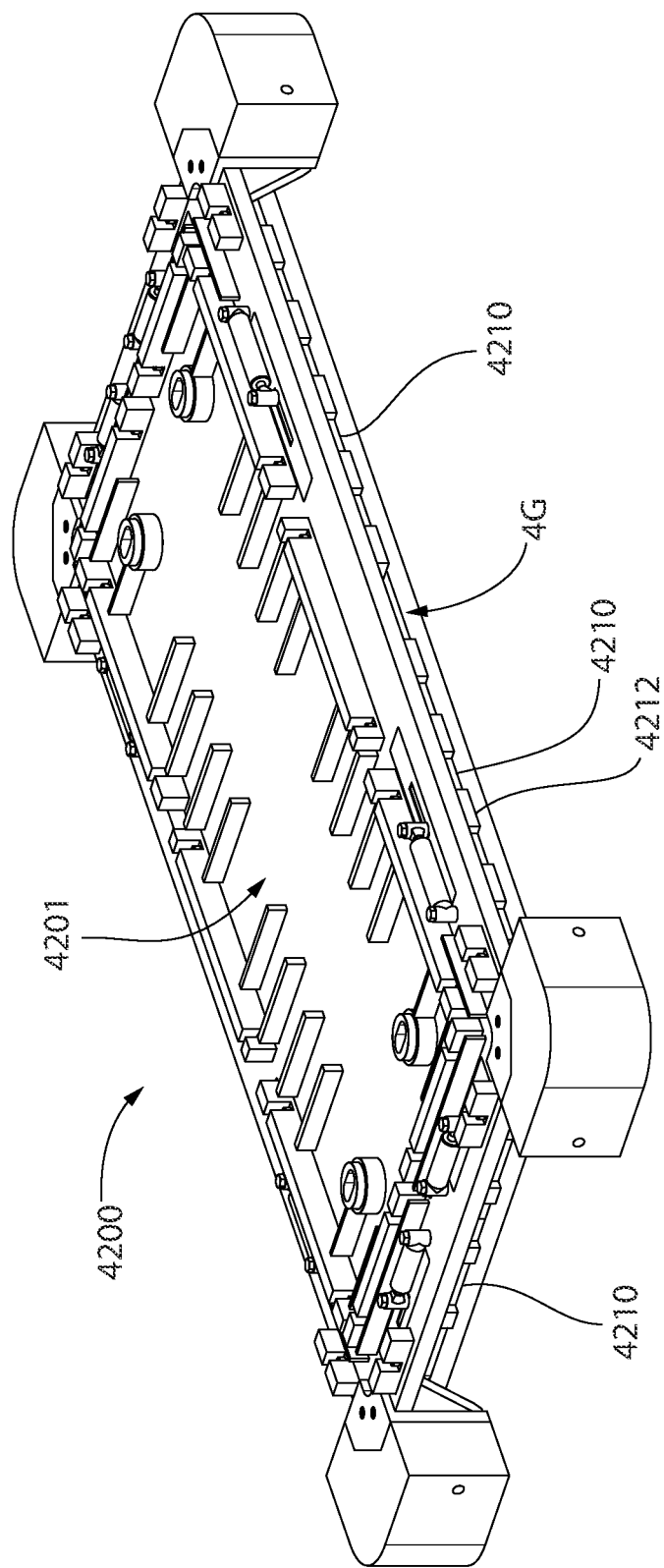
FIG. 72 is a top perspective view of the closure lid.
Figure 73:
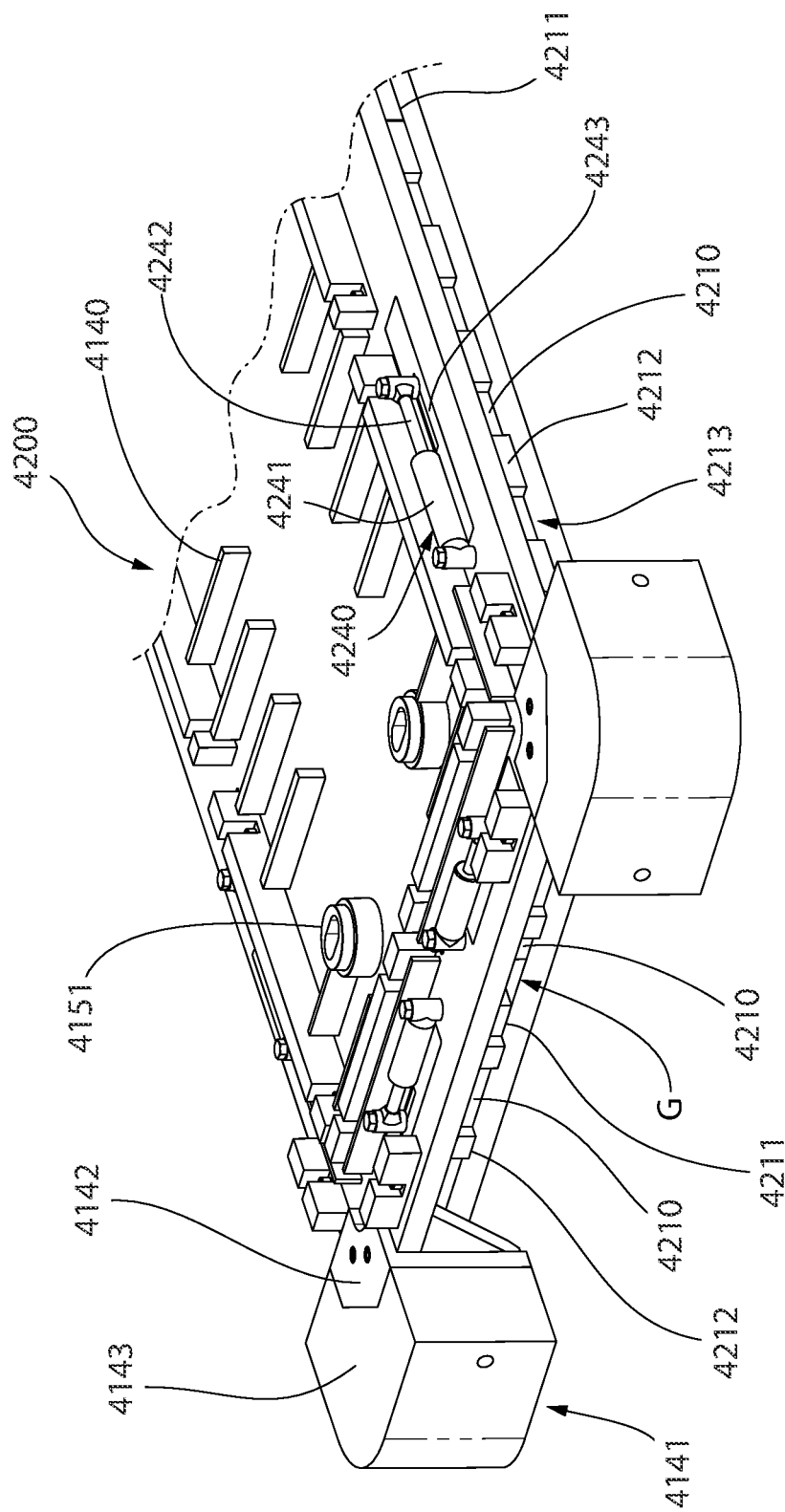
FIG. 73 is an enlarged top perspective view of an end portion of the lid.
Figure 74:
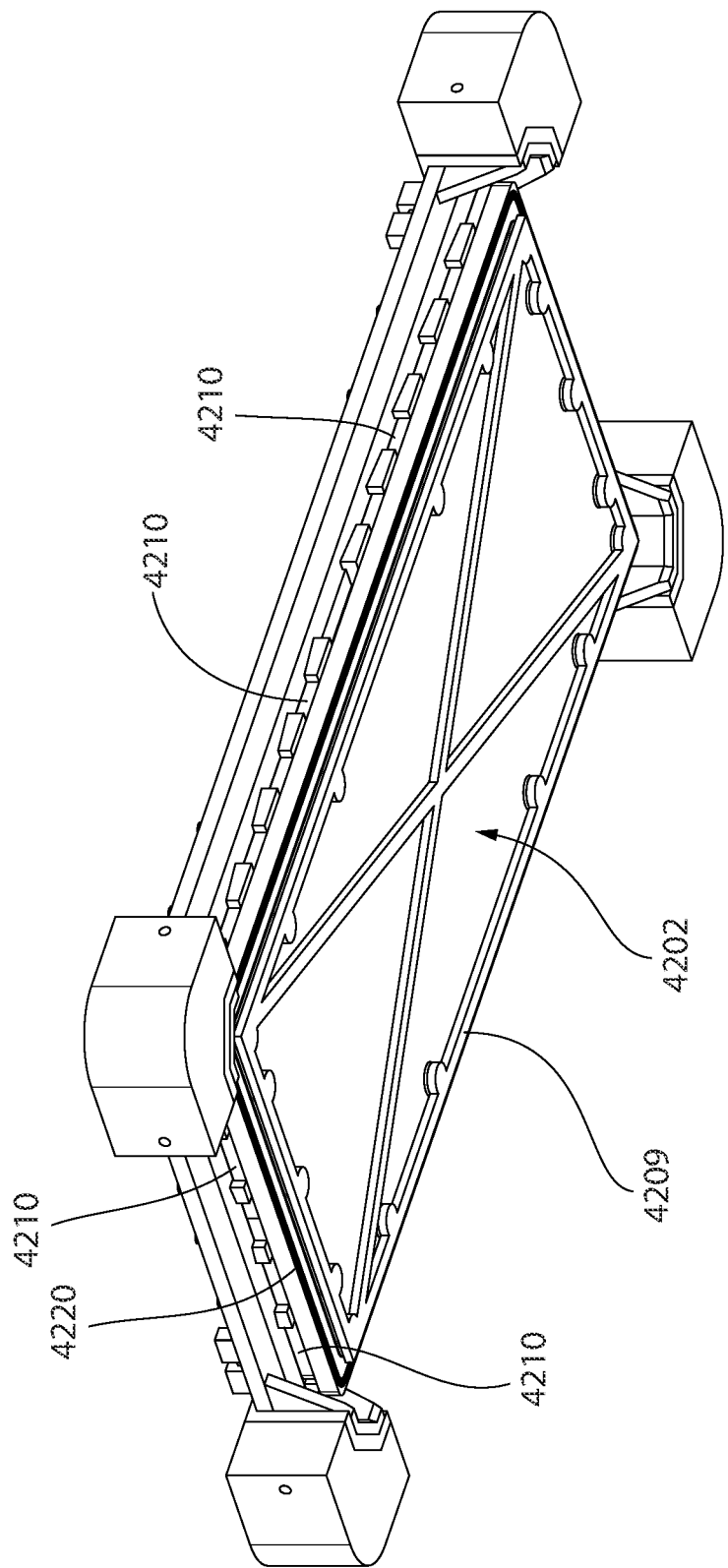
FIG. 74 is a bottom perspective view of the lid.
Figure 75A:
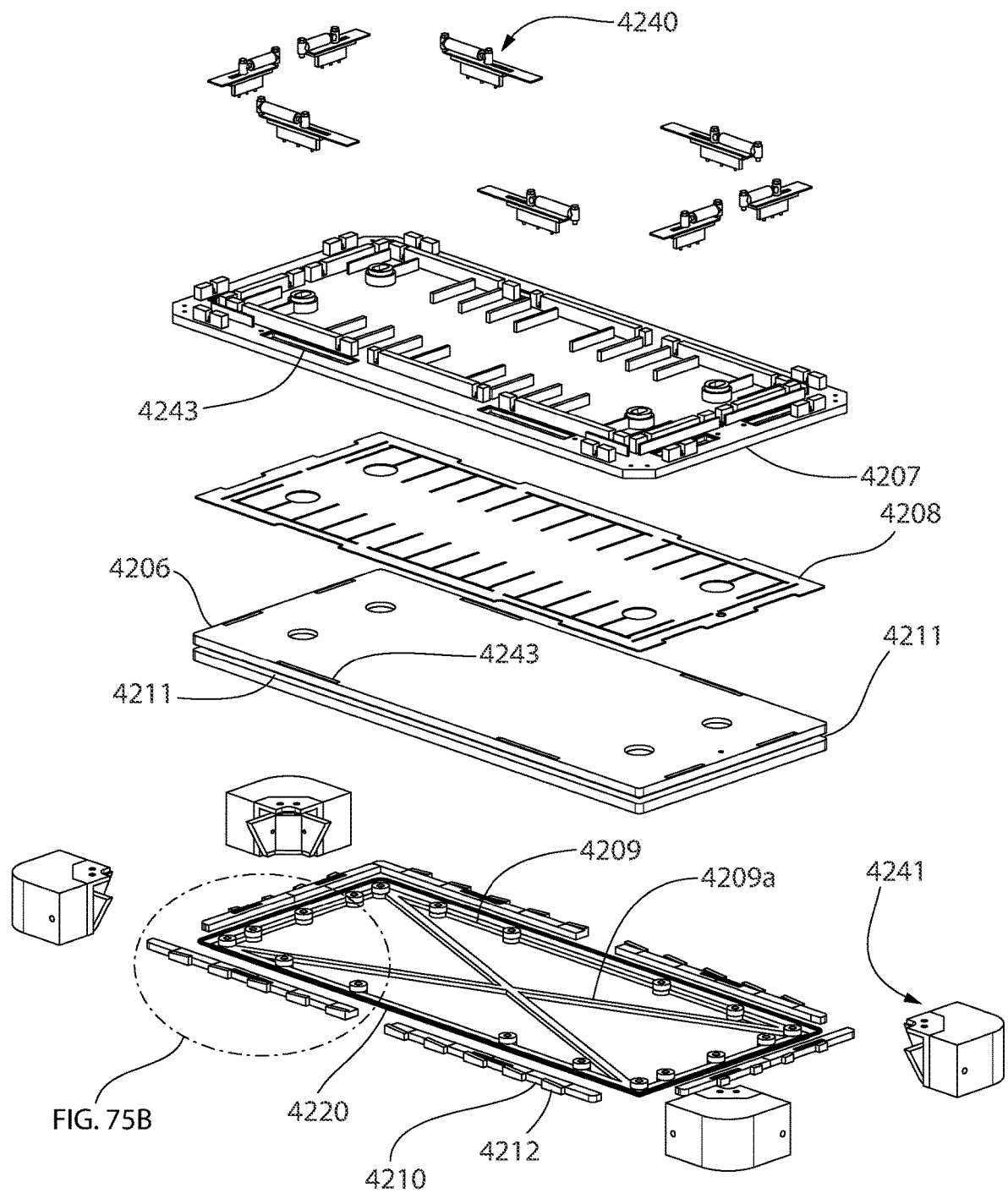
FIG. 75A is a top exploded perspective view of the lid.
Figure 75B:
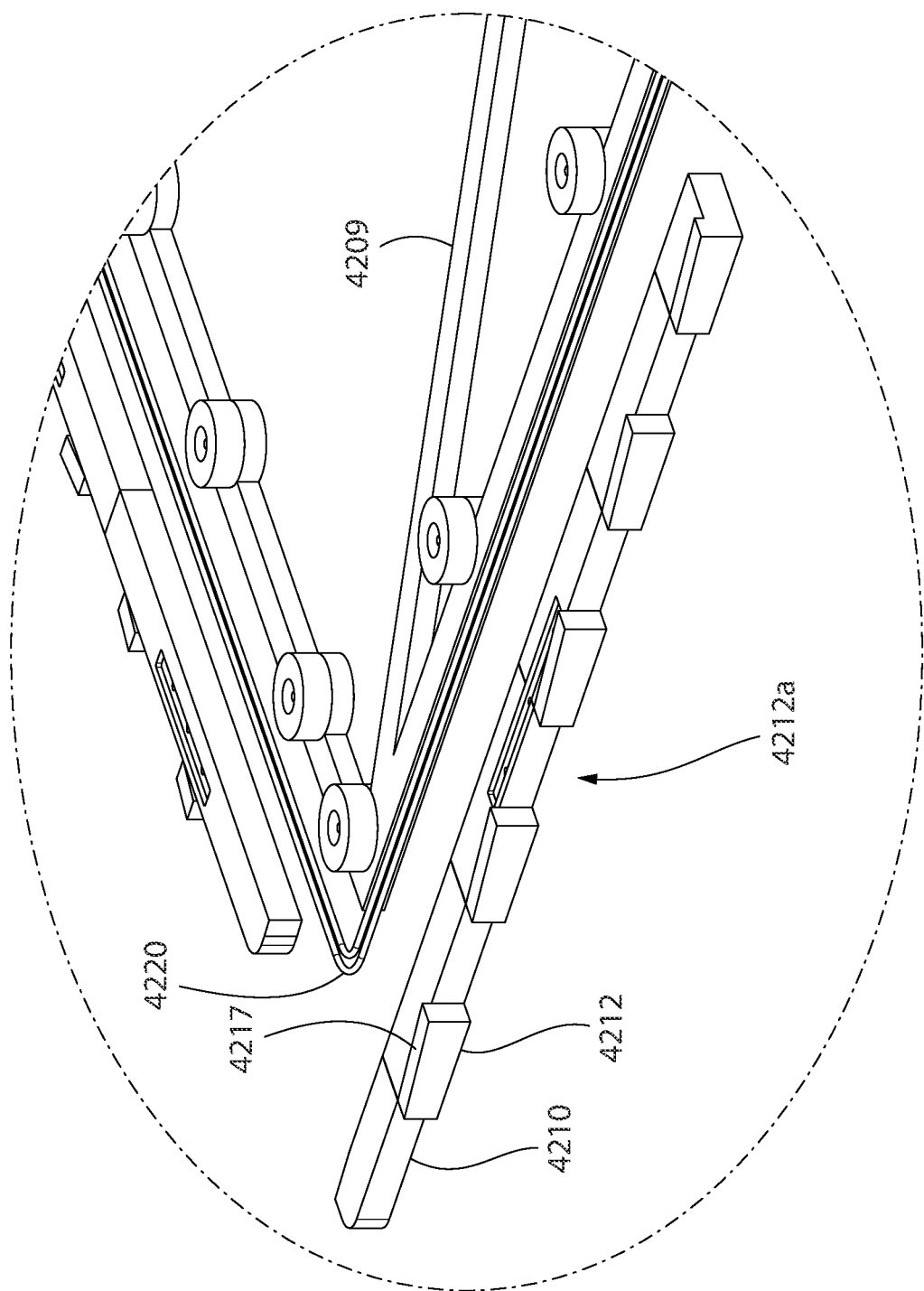
FIG. 75B is an enlarged detail taken from FIG. 75A.
Figure 76:
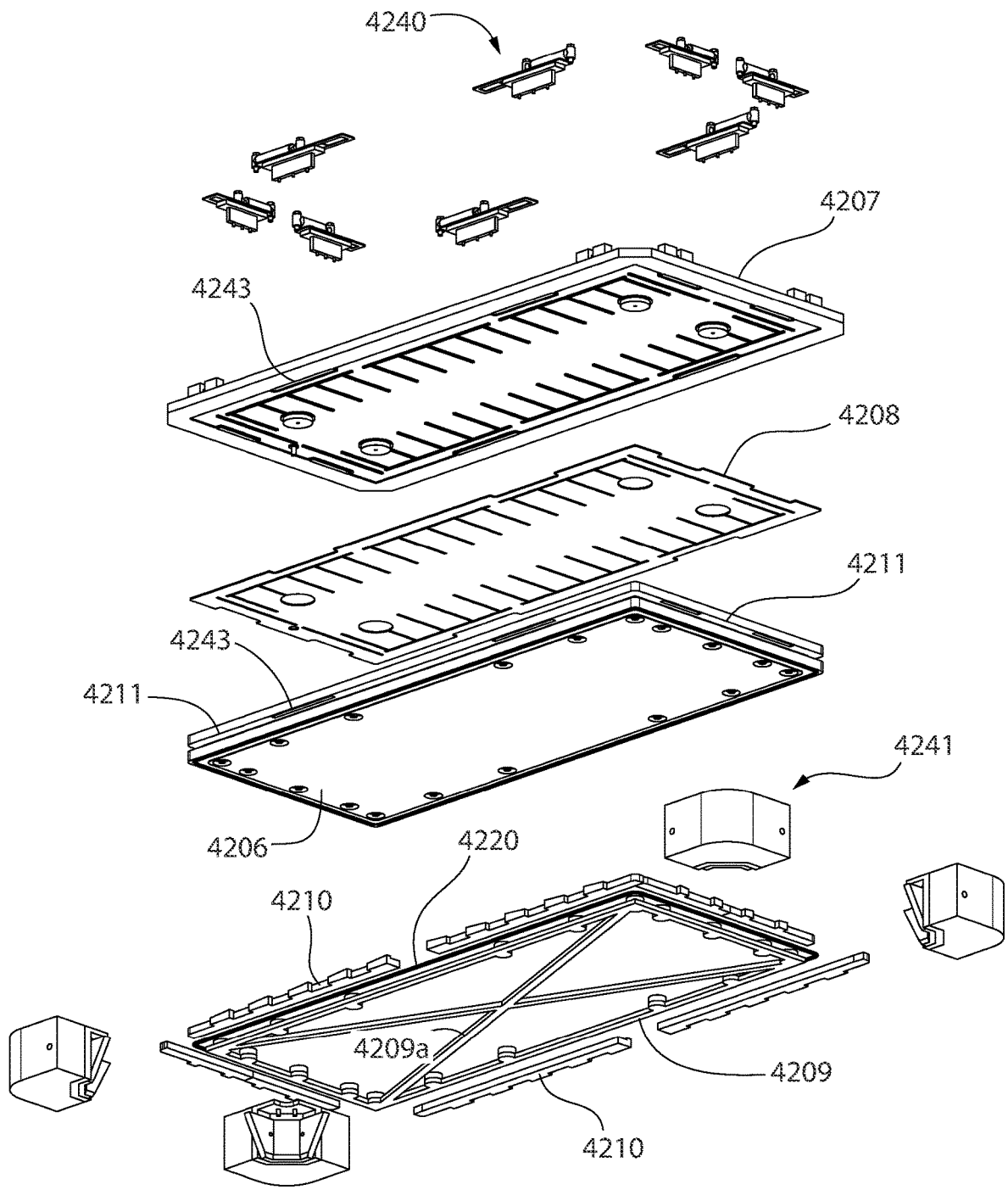
FIG. 76 is a bottom exploded perspective view of the lid.

With particular emphasis on FIGS. 54 and 59-60 the top closure plate 3104 of cask 3100 comprises a plurality of fastener holes 3109 which receive bolt assemblies 3140 therethrough to threadably engage circumferentially spaced anchor bosses 3165 fixedly mounted to the top end of the cask body 3100*a*, as further described herein. Fastener holes 3109 are circumferentially spaced apart along a bolt circle of suitable diameter. In one embodiment, fastener holes 3109 may be circular and formed through an annular recessed gasket seating surface 3110 formed on the inner annular portion of the top closure plate 3104. The raised outer annular portion 3113 of the top closure plate may be flat and plain as shown without openings. A compressible annular gasket 3111 containing circumferentially spaced apart circular fastener apertures 3112 is received on gasket seating surface 3110. When mounted thereon, fastener apertures 3112 are concentrically alignable with fastener holes 3109 of the cask top closure ring 3104. Gasket 3111 forms a circumferential hermetic seal between the lid 3150 and top closure plate 3104 of the cask body 3100*a*. Any suitable natural or man-made compressible material (e.g., elastomeric, rubber, etc.) material suitable for the intended service conditions (e.g., temperature, pressure, environment, etc.) may be used.

The cask body 3100*a* defines an internal cavity 3105 which extends longitudinally for a full height of the cask from baseplate 3103 at bottom to the top ends of outer and inner shells 3101, 3102. The cavity 3105 is configured in dimension and transverse cross-sectional area to hold only a single fuel canister 3120 in some embodiments, as is conventional practice in the art. Cavity 3105 is hermetically sealed when lid 3150 is mounted to the cask body 3100*a* and may therefore be pressurized to pressures above atmospheric, thereby categorizing cask 3100 as a pressure vessel for ASME code purposes. The stress field in the cask's pressure retention boundary may be qualified to the limits of Section III Subsection ND of the ASME Boiler and Pressure Vessel Code.

The cask 3100 is a heavy radiation shielded nuclear waste fuel storage pressure vessel operable to ameliorate the gamma and neutron radiation emitted by the nuclear waste fuel canister 3120 to safe levels outside the cask. Accordingly, annular space 3106 formed between outer and inner shells 3101, 3102 is filled with appropriate radiation shielding material(s) 3107. In some embodiments, the shielding material 3110 may comprise plain or reinforced concrete. Concrete densities up to 3230 pounds/cubic feet or more may be used. However other or additional shielding materials and combinations thereof may be used including without limitation lead, boron-containing materials, or a combination of these and/or other materials effective to block and/or attenuate gamma and neutron radiation emitted by the nuclear waste (e.g., fuel assemblies) stored in canister 3120 when loaded into the cask 3100. Any suitable types, thicknesses, and arrangement of shielding materials may be used to provide the necessary degree of shielding.

The outer and inner shell members 3101, 3102 of the cask 3100 may be formed of a suitable metal such as for example without limitation painted steel. The top closure plate 3104 and bottom baseplate 3103 may similarly be formed of the same metal for welding compatibility and strength.

In one embodiment, a plurality of steel canister cross supports 3115 may be welded to the top surface of the baseplate 3103 (see, e.g., FIG. 46) inside internal cavity 3105 to support the canister 3120. The cross supports elevate the bottom of the canister above the baseplate. Cross supports 3115 may be arranged in an intersecting X-pattern (cruciform) as shown; however, other suitable arrangements of the supports may be provided. In certain embodiments, a plurality of circumferentially spaced apart metallic seismic restraint tubes 3116 may be welded to the interior surface of inner shell 3102 inside cavity 3105. The tubes keep the canister 3120 centered and reduce radial/lateral movement during occurrence of a seismic event. A grouping of restraint tubes 3116 may be provided in both the upper and lower portion of cask cavity 3105 to restrain the top and bottom portions of the canister 3120.

In contrast to vertical ventilated overpacks or casks, it bears noting that the present unventilated cask 3100 has no provisions which allow for the exchange of ambient cooling air through the internal cavity 3105 of the cask to cool the canister by natural thermo-siphon convective airflow. As previously noted herein, such ventilated cask designs may be unsuitable for storage of spent nuclear fuel (SNF) in a stainless steel canister within the cask in corrosive atmospheric environments and conditions. Many SNF canisters are made of austenitic stainless steel, which is susceptible to stress corrosion cracking (SCC) in humid corrosive environments in the presence of residual tensile surface stresses remaining from the fabrication of the canisters. In coastal environments, the presence of airborne salts can be especially problematic and render a stainless steel SNF canister susceptible to chloride-induced SCC.

Because the internal cavity 3105 of the present unventilated cask 3100 is gas-tight and forms a pressure vessel, a heat dissipation mechanism is necessary to cool the canister within this hermetically sealed storage environment within the cask. In addition, further structural reinforcement of the cask's skeletal steel structure is desired to enable safe lift and transport of the cask with a motorized cask crawler in view of the heavy concrete laden cask body which can readily weight in excess of 3100 tons.

To provide both additional structural strength to the cask and a heat transfer mechanism to cool the nuclear waste fuel canister 3100 in cask 3100, the cask may include a plurality of longitudinally-extending rib plates 3160. FIG. 58 shows one form of rib plate 3160*a* in isolation and greater detail which contains lid mounting bosses 3165. Plain rib plates have a similar construction minus the mounting bosses, as further described below.

With continuing general reference to FIGS. 45-60, the longitudinal rib plates 3160 are flat sheet-like rectangular structures disposed inside annular space 3106 of cask 3100 between the inner and outer shells 3102, 3101. The ribs plates are circumferentially spaced apart and welded along opposing longitudinal edges 3161 of the plates to at least the inner and outer shells 3102, 3101. In one embodiment, longitudinally continuous fillet welds may be used which extend along the entire height of the rib plate to shells joint Rib plates 3160 further include a top edge 3162, bottom edge 3163, and opposed flat and parallel major surfaces 3164. The rib plates extend radially between the inner and outer shells 3102, 3101, and in some embodiments may be arranged in diametrically opposed pairs of plates (see, e.g., FIG. 53). Rib plates 3160 extend for a full longitudinal height of the annular space 3106 of the cask from the baseplate 3103 to a top end of the cask body at the bottom surface of the top closure plate 3104 (see, e.g., FIGS. 46A-B, 48, and 49A). In certain embodiments, the rib plates 3160 may be welded at their top and bottom edges 3162, 3163 to the baseplate 3103 and/or top closure plate 3104 to further strengthen the cask skeletal structure. The circumferential gaps formed between rib plates 3160 within the annular space 3106 are filled with the radiation shielding material 3107, such as without limitation concrete.

It bears noting that the rib plates 3160 each provide a conductive heat transfer path between the inner shell 3102 and outer shell 3101. The interior surface of inner shell 3102 is heated by direct exposure to the waste fuel canister 3120. The heat flows radially outward through the rib plates 3160 via conduction to heat the outer shell 3101, which then becomes hot and dissipates heat to the atmosphere via convective cooling and radiation.

Some of the rib plates 3160 are configured to act as load transfer members used in lifting the cask 3100. Accordingly, lifting rib plates 3160a each comprise a threaded anchor boss 3165 fixedly attached at a top end thereof (see, e.g., FIG. 58). Anchor boss 3165 comprises a cylindrical body defining an upwardly open threaded bore 3166 positioned to threadably engage a respective mounting bolt 3140. assembly. The top of the mounting boss may be flush with the top edge 3162 of the lifting rib plate in some embodiments as shown which allows the height of the rib plate to be maximized, which in turn maximizes its heat transfer capacity. A plurality of lifting rib plates 3160a are preferably provided and spaced apart in circumferentially around the top end of the cask body. In the non-limiting illustrated embodiment, four lifting rib plates 3160a are provided spaced 90 degrees apart around the cask body as shown (see, e.g., FIG. 53); however, a greater or few number may be provided in other implementations of the cask. The lifting rib plates 3160a provide a load transfer interface with the lid 3150.

Lid 3150 is a radiation shielding structure with outer metallic casing (e.g., steel) comprising a circular top plate 3151, opposing circular bottom plate 3152, and a cylindrical outer lid shell 3153 welded to the top plate and the bottom plate of the lid forming an internal cavity 3154. Cavity 3154 is filled with radiation shielding material 3107, which may comprise concrete in some embodiments. Various other shielding materials and combinations thereof may be used as previously described herein with respect to the cask radiation shielding.

Lid 3150 further comprises a plurality of radially/laterally elongated lid lifting plates 3155, which may be arranged in an orthogonal cruciform pattern intersecting at the center of the lid (see, e.g., FIGS. 54, 59, and 60). The lifting plates are embedded in the concrete fill and comprise a lifting lug 3156 protruding upwards beyond the top plate 3151. Lifting lugs 3156 are configured with holes for rigging to an overhead hoist or crane for raising, lowering, and transporting the unventilated storage cask 3100. Accordingly, lifting plates 3155 may be welded to the top plate 3151, bottom plate 3152, and/or outer shell 3153 to provide a rigid skeletal frame for the lid 3150 capable of handling the cask 3100 which generally weights in excess of 3100 tons.

Importantly, the lifting plates 3155 and the foregoing welded lid construction further act as a heat transfer mechanism to dissipate heat emitted by the canister 3120 in the cask cavity 3105 through the lid to the ambient environment. To further enhance heat transfer, the lifting plates may penetrate the bottom plate 3152 of lid 3150 for direct exposure to the cask cavity 3105 (see, e.g. FIG. 59). Lifting plates may protrude downwards below the bottom surface of the bottom lid plate in some embodiments as shown for this purpose and also to vertical stabilize the canister 3120 within the cask against vertical movement either during transport of the cask or a seismic event.

By virtue of the thermosiphon effect occurring inside the waste fuel canister 3120 (e.g., MPC) through the fuel basket 3123, the top lid 3125 of the canister seen in FIG. 57 is the hottest part of the canister's exterior surface. The hot canister heated by heat emitted by the decaying spent fuel assemblies therein rejects heat to the bottom plate 3152 of the cask's closure lid 3150 directly above and proximate to the top of the canister by direct radiation and convection. The lid lifting plates 3155 and the physical connectivity they provide between the bottom plate 3152 and top plate 3151 of the lid directly exposed to the ambient environment thus are important to the cask's thermal performance for cooling the canister. From a personnel safety standpoint, having the hottest surface of the cask (i.e., lid 3150) located at the very top of the cask (away from the reach of surveillance personnel) is an advantageous operational feature of the nuclear waste fuel storage system.

Figure 49A:
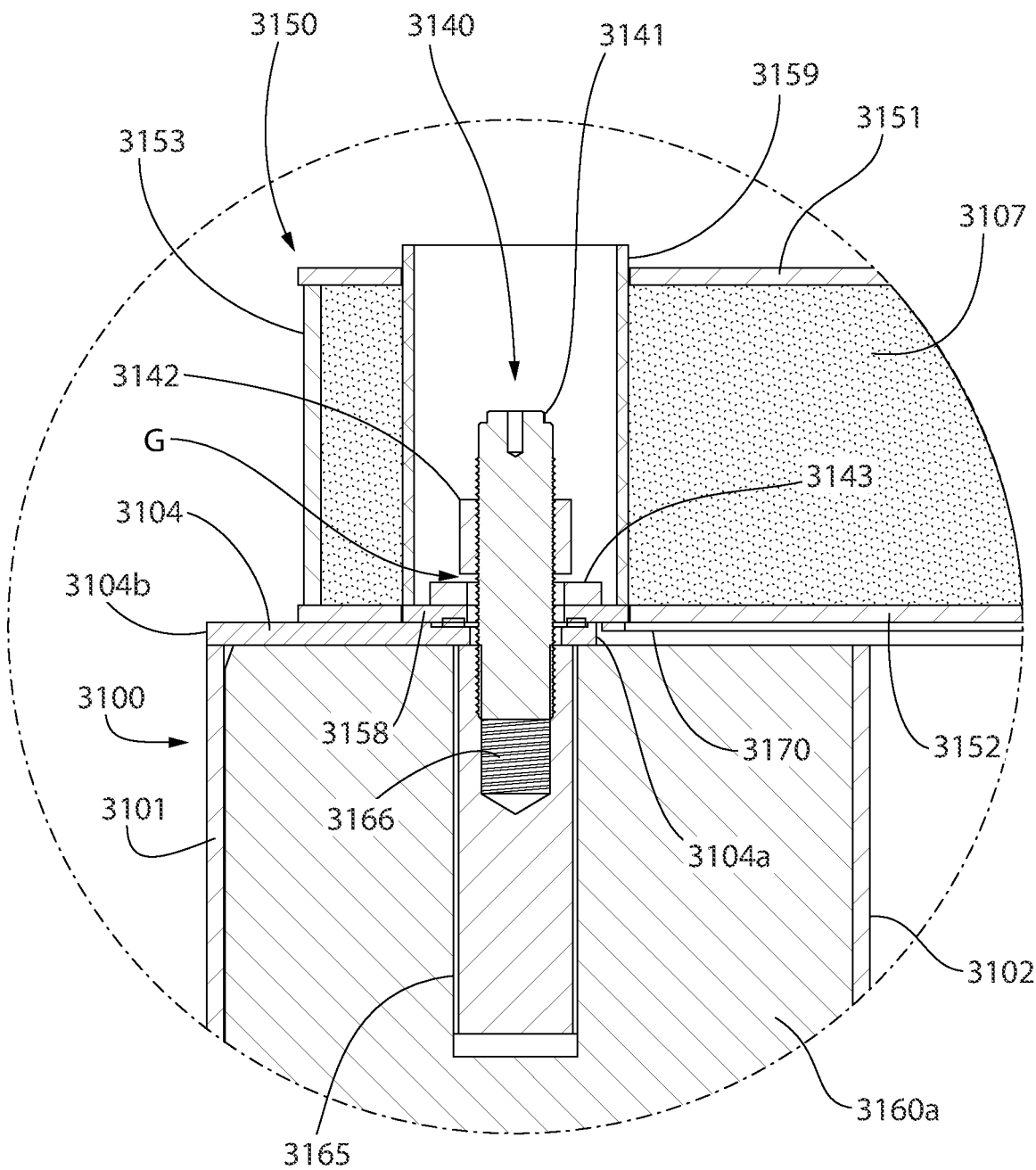
FIG. 49A is an enlarged detail showing the closure lid to cask interface and mounting details for securing the lid to the cask in a free floating manner, the lid being shown in a downward sealed position.
Figure 49B:
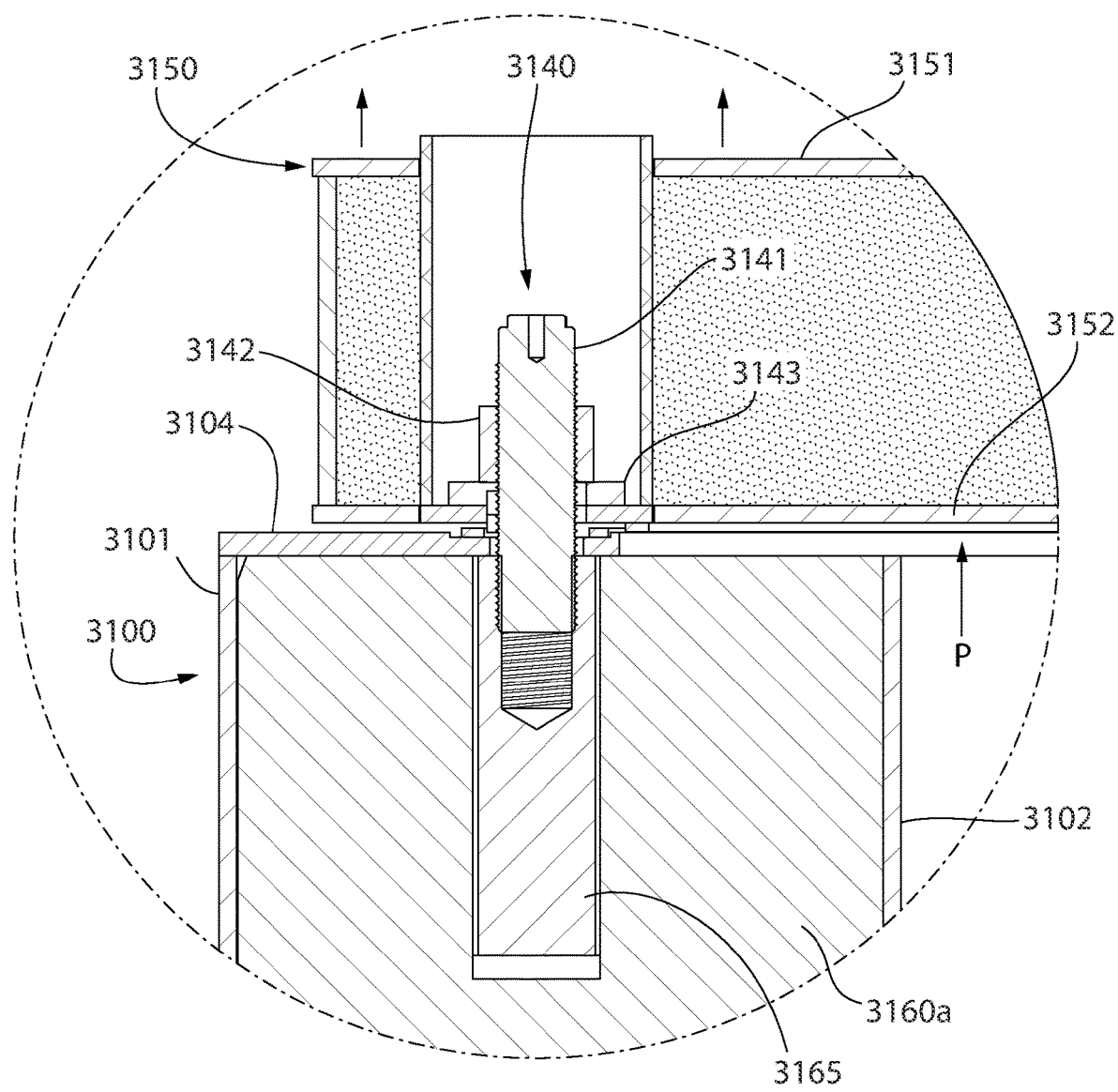
FIG. 49B is a similar view to FIG. 49A, but showing the lid in a raised pressure relief position ajar from the cask.
Figure 49C:
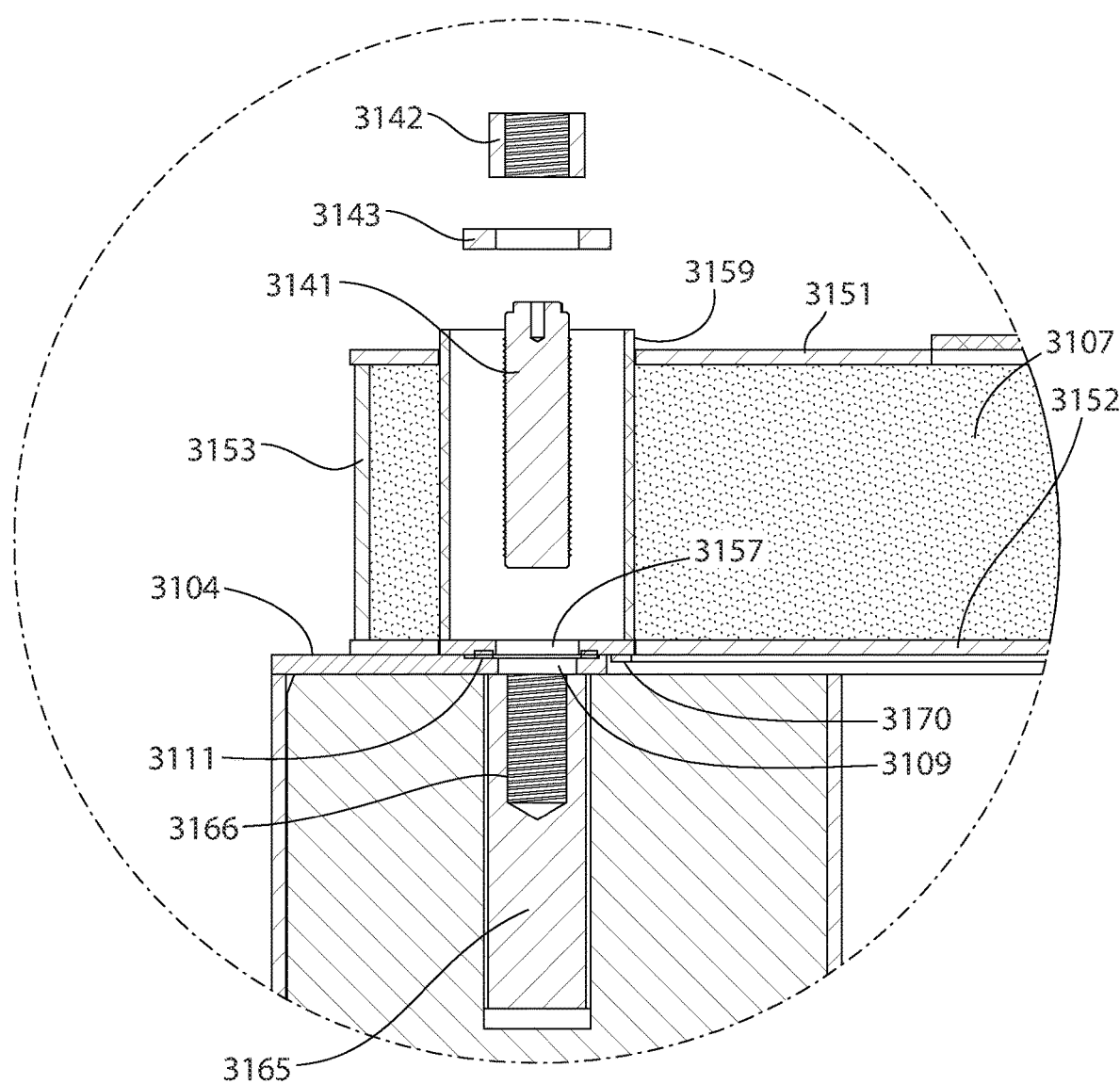
FIG. 49C is a similar view to FIG. 49A, but showing one of the lid bolt assemblies in exploded view.
Figure 50:
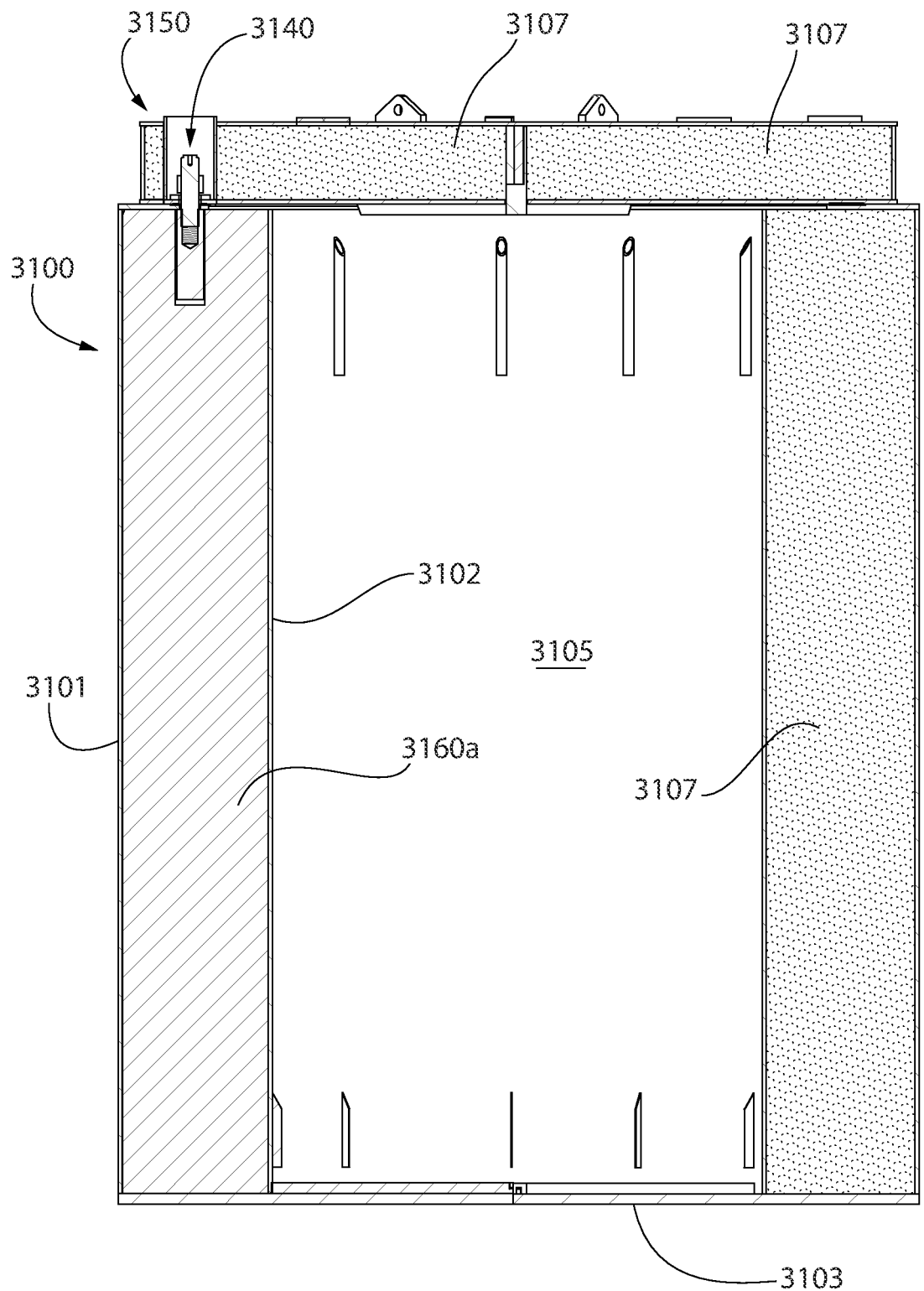
FIG. 50 is a longitudinal cross sectional view of the cask taken from FIG. 47.
Figure 51:
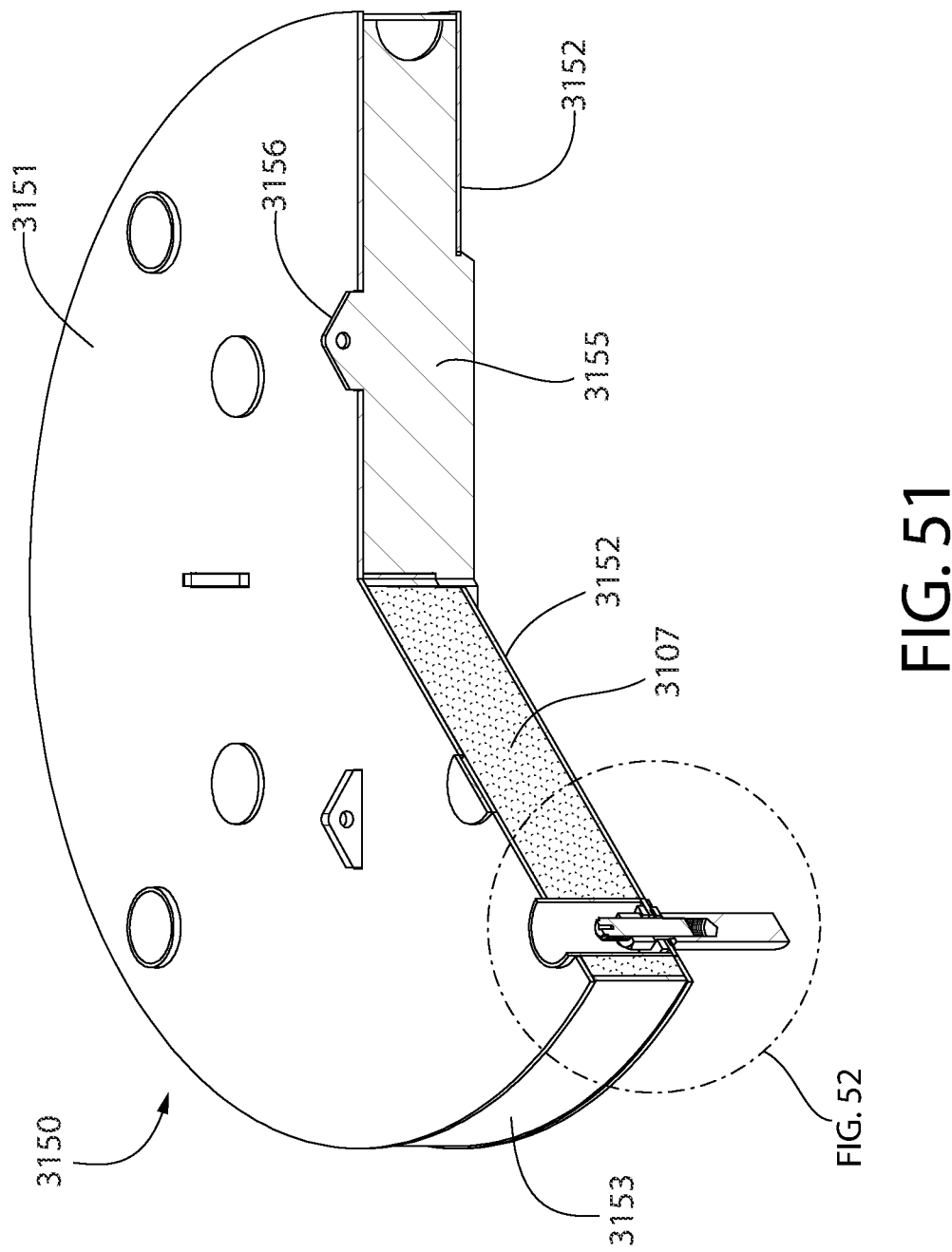
FIG. 51 is a partial cross-sectional view of the cask closure lid.
Figure 52:
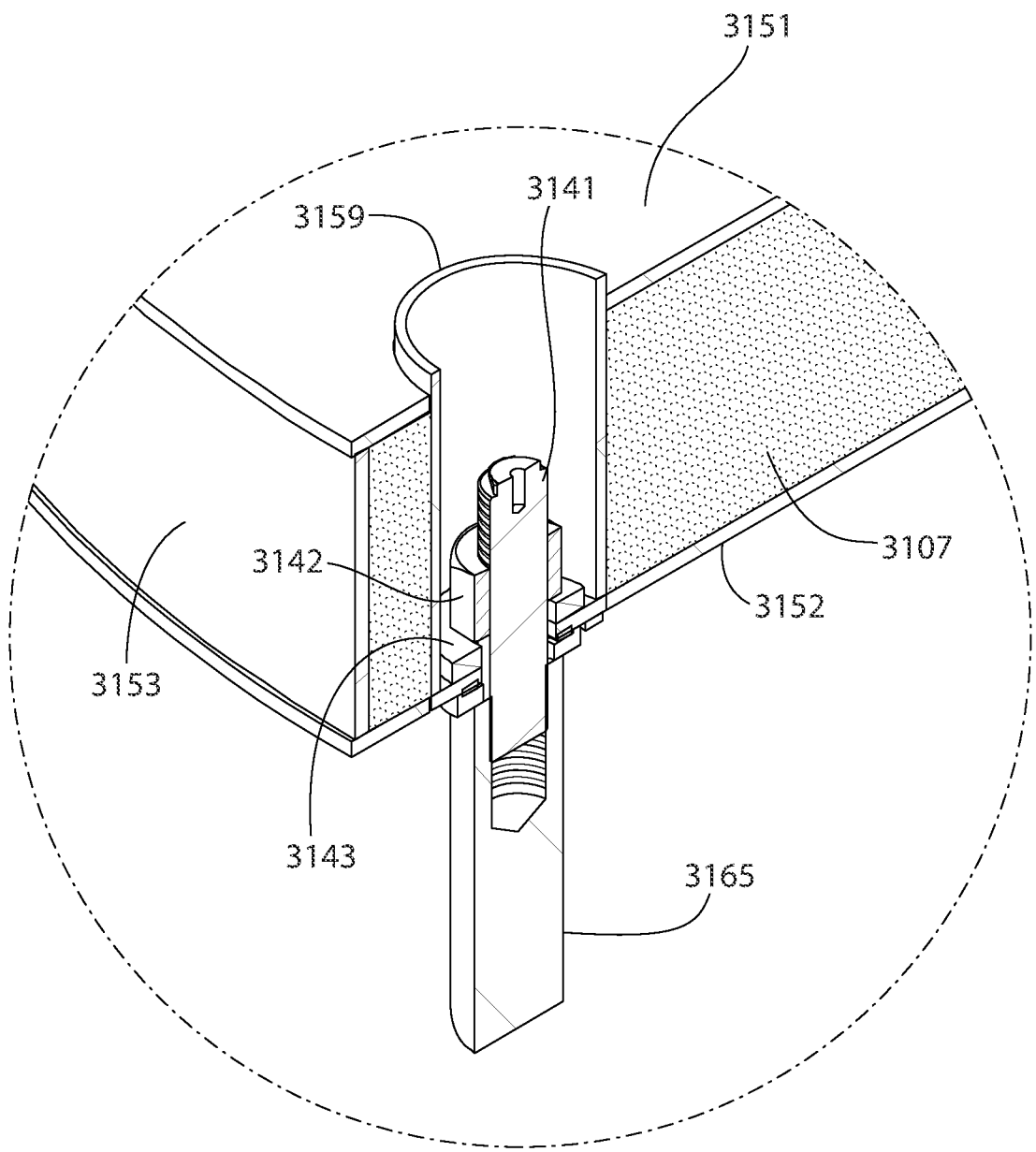
FIG. 52 is an enlarged detail taken from FIG. 51.
Figure 53:
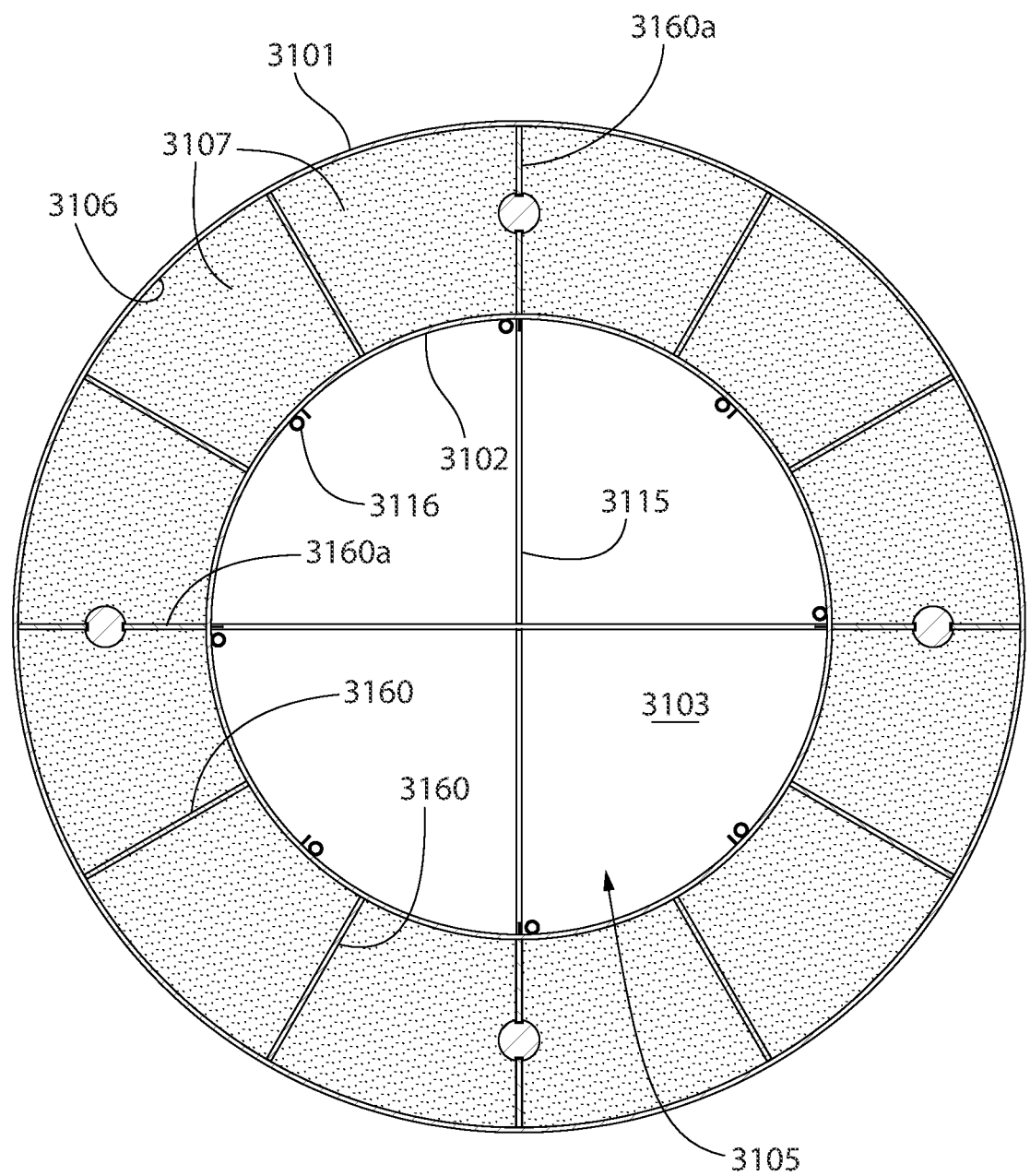
FIG. 53 is a transverse cross sectional view of the lid.

Referring specifically to FIGS. 49B and 60, bottom plate 3152 of the lid 3150 comprises a plurality of circumference lid fastener holes 3157 arranged to be concentrically aligned with fastener holes 3109 of cask top closure plate 3104 and threaded bosses 3165 of lifting rib plates 3160a. Each lid fastener hole 3157 is accessible through a respective access tube 3159 welded to bottom plate 3152. Access tubes 3159 project upwards passing through lid top plate 3151, and preferably protruding beyond and above the top plate as shown to prevent the ingress of standing water from the top surface of the lid into the tube. The access tubes are formed of steel, preferably stainless steel to prevent corrosion and accumulation of rust which might adversely affect the sliding motion of the floating lid along the bolt assemblies 3140 (e.g., the threaded studs 3141). The tubes 3159 be further be welded to the top plate 51 in some embodiments. Access tubes 3159 are embedded in the concrete radiation shielding material in the lid 3150 (see, e.g., FIGS. 49A and 60).

For cask lid constructions where the bottom closure plate may be formed of steel which may corrode and rust, an annular hole insert plate 3158 may optionally be used which is formed of stainless steel similarly to the bolting assembly access tubes 3159. The hole insert plate is welded partially or fully around its circumference to the lid bottom plate to eliminate any pressure passage into the interior of the lid. The fastener holes 3157 of lid 3150 in this case are formed by the hole insert plates. In other embodiments, however, the insert plates 3158 may be omitted and fastener holes 3157 may be formed directly in the lid bottom plate 3152 within the access tubes 3159. Either construction may be used. The use of stainless steel to construct the access tubes 3159, hole insert plates 3158, and preferably the bolting assembly 3140 components mitigates the formation of rust which might interfere with smooth sliding movement of the floating lid 3150 along the bolt assemblies during cask overpressurization conditions. This is an exposure since rainwater will tend to accumulate inside the access tubes 3159 until the heat dissipated through the lid 3150 from the internal cavity 3107 of cask 3100 eventually evaporates the water.

Referring to FIGS. 49A-C and 59-60, the threaded bolt assemblies 3140 each include a cylindrical threaded stud 3141 threadably engageable with the anchor bosses 3165 (i.e., threaded bore 3166) of the lifting rib plates 3160 through the top closure plate 3104 of the cask 3100, an internally threaded adjustable limit stop 3142 rotatably coupled to the stud for upward/downward positioning thereon, and optionally a washer 3143 which receives the stud. In one embodiment, the limits stop 3142 may be a threaded hex nut adjustable in position along the threaded stud to change a height of an installer-adjustable vertical travel gap G formed between the limit stop and bottom plate 3152 of the lid 3150. Where the optional washer 3143 is provided, travel gap G is formed between the top of the washer and the bottom surface of the lid bottom plate. Travel gap G defines a range of vertical travel of the lid along stud 3141. In some embodiments, travel gap G may be about ⅜ inch or more. Even such a small gap between the lid when raised and the cask body is effective to relieve excess internal pressure from the cask. Accordingly, lid 3150 is vertically movable relative to the cask body within a range defined by the travel gap. The forgoing bolt assembly components (stud, limit stop, and washer) are preferably formed of stainless steel to prevent corrosion and rust formation on the threaded stud 3141 which might inhibit the lid from freely sliding along the studs when rising during a cask overpressurization condition.

To provide a self-regulating cask overpressurization relief system, the radiation shielding lid 3150 is a free-floating design which is movably coupled to the top end of the cask 3100 in a hermetically sealable manner by bolt assemblies 3140. Accordingly, the bolt assemblies 3140 are configured to loosely mount the lid to the cask body, thereby allowing limited vertical movement of the lid relative to the cask body via the foregoing installer-positionable limit stops 3142 of the bolt assemblies to adjust the travel gap G. The weight of the lid acts in conjunction with the annular compressible gasket 3111 which forms a circumferential seal between the lid and the top end of the cask body to maintain a hermetic seal of the cask body. This forms the gas tight cavity 3105 which houses canister 3120 under normal cask operating pressures. The cask 3100 is therefore operable to retain an internal pressure within the gas tight cavity 3105 above atmospheric pressure. When the internal pressure P of the cask acting on the bottom surface area of the lid bottom plate 3152 exposed to the cask cavity 3105, this creates an upward acting lifting force which exceeds the weight of the lid, the lid will rise and become slightly ajar from the top closure plate 3104 of the cask to relieve the cask excess pressure (see, e.g., FIG. 49B).

Lid 3150 may further comprise a metallic raised annular shear ring 3170 protruding downwardly from a bottom surface of the lid bottom plate 3152. The shear ring is designed such that if the cask 3100 tips over, the lid will contact the cask body top plate 3104 to absorb the shear forces instead of the bolt assemblies 3140. This protects the structural integrity and lid-to-cask seal of the cask cavity 3105. Shear ring 3170 is arranged proximate to a circumferential inner edge 3104a of the top closure plate 3140 as shown in FIG. 49A for mutual engagement therebetween in the event of a cask tipping event.

Lid 3150 is slideably movable in a vertical direction by a limited amount along the bolt assemblies 3140 (i.e., threaded stud 3141 particularly) dictated by travel gap G. Lid 3150 is movable between: (1) a downward sealed position engaged with the cask body which seals the gas tight cavity of the cask (see, e.g., FIG. 49A); and (2) an adjustable raised relief position engaged with the bolt assemblies but ajar from the cask body to partially open the gas tight cavity thereby defining a gas overpressurization relief passageway to ambient atmosphere extending circumferentially and perimetrically around the top end of the cask body (FIG. 49B).

When an internal cask overpressurization condition occurs, the lid 3150 rises under pressure P to close the travel gap G and engage the threaded limit stop 3142 on stud 3141 with the bottom plate 3152 of the lid which arrests upward movement of the lid. The heating of the trapped volume of gas in the cask cavity 3105 (i.e., air or an inert gas pumped into the cask cavity after placement of and sealing by the lid) by the fuel assemblies stored within the SNF canister 3120 will on its own cause an increase in internal cask pressure P to the point limited by the weight of the free-floating lid. Such an overpressurization condition may also be associated with spent nuclear fuel dry storage system (i.e., cask) Design Basis Fire Event, or other abnormal operating condition within the cask. The U.S. NRC (Nuclear Regulatory Commission) mandates dry storage systems to meet stringent safety requirements at all times, including during the occurrence of postulated cask design basis accident events. A design basis accident is any event that could significantly affect the integrity of the storage system, such as an external fire, fuel rod rupture, and natural phenomena such as earthquakes, lightning strikes, projectile impacts, and others.

When the cask overpressurization condition abates, the relieved internal cask pressure drops back down within the cask and lid 3150 automatically returns to the downward position under its own weight to re-engage the cask body and reseal the gas tight hermetically sealed cavity 3105. In the event an overpressurization condition occurs again, the lid 3150 will again rise to relieve the excess pressure and repeat the cycle without manual intervention, thereby forming a self-regulating cask overpressurization relief system.

In view of the foregoing, a method or process for protecting an unventilated nuclear fuel storage cask from internal overpressurization will now be briefly summarized. The method includes providing the unventilated cask 3100 comprising the sealable internal cavity 3105 and a plurality of threaded anchor bosses 3165. The cavity of the cask remains upwardly open at this juncture. The method continues with lowering canister 3120 containing high level nuclear waste into the cavity 3105, and then positioning the radiation shielded lid 3150 on the cask. The lid is now in the downward sealed position engaged with the cask thereby making the cavity gas tight to retain pressures exceeding atmospheric. The method continues with aligning the plurality of fastener holes 3109 formed in the lid 3150 (e.g., in lid bottom plate 3152) with the anchor bosses. Next, the method includes threadably engaging a threaded stud 3141 of the bolt assemblies 3140 with each of the cask anchor bosses 3165 through the fastener holes 3109 of the lid, and then rotatably engaging a threaded limit stop 3142 with each of the threaded studs. This last step may be preceded by sliding a washer 3143 over each threaded stud 3141 to rest on the lid (e.g., lid bottom plate 3152 at the base of access tubes 3159) if washers are optionally used. The final step comprises rotating and positioning the limits stops 3142 on the studs 3141 such that a vertical travel gap G is formed between the lid and the limit stops. This position of the lid 3150 is shown in FIG. 49A. During a cask overpressurization condition wherein the upward force exerted on the bottom surface of the free-floating lid 3150 by the internal pressure of the cask exceeds the weight of the lid, the lid slideably moves upward along the studs 3141 to the relief position ajar from the cask to vent excess pressure to atmosphere. As previously described herein, when the cask overpressurization condition abates, the lid automatically returns to the downward position to re-engage the cask body and reseal the gas tight cavity for continued operation.

In some embodiments, the pressure of the cask cavity 3105 which holds the waste fuel canister 3120 air may be reduced to a low enough value such that it will remain below the ambient pressure under all service conditions. To ensure that the cask operates under sub-atmospheric conditions, it would be necessary to pump out the ambient air in the cask cavity 3105 after the canister 3120 and lid 3150 are in place. Typically, an initial pressure of about ½ atmosphere would generally be sufficient to ensure that the internal pressure of the cask 3100 remains sub-atmospheric under all operating conditions. Suitable piping connections and valving may be provided to pump the air out of the cask and establish the sub-atmospheric cask operating pressure. The cask cavity 3105 may next be optionally filled with an inert gas after mounting the lid 3150 tot the cask 3100 in some embodiments. This added safety measure to protect the long term integrity of the canister confinement barrier may be used where the onset of SCC at the exterior surfaces of the canister 3120 may be an operational issue.

Fourth Inventive Concept

Storage and Transport Cask for Nuclear Waste

Reference is made generally to FIGS. 61-92 which are relevant to the Fourth Inventive Concept described below.

FIGS. 61-88 show various aspects of the nuclear waste transport and storage system. The system includes nuclear waste transfer and storage cask 4100 (hereafter nuclear waste cask for brevity) which is usable transport and/or store high level nuclear waste materials. Cask 4100 comprises an elongated rectilinear-shaped cask body 4101 defining a longitudinal axis LA and the lower part of the containment barrier for the nuclear waste. The body 4101 may have a rectangular cuboid configuration in one embodiment (as shown) comprising an axially elongated bottom wall 4102, a parallel pair of longitudinal sidewalls 4103 attached to the bottom wall, and a pair of lateral end walls 4104 attached to opposite ends of the bottom wall between the sidewalls. The longitudinal sidewalls are attached to the longitudinal sides or edges of the bottom wall. End walls 4104 are oriented transversely and perpendicularly to longitudinal axis LA and longitudinal sidewalls 4103, and the longitudinal sidewalls are oriented parallel to the axis to form the box-like structure shown. In one embodiment, the sidewalls and end walls may be welded to each other and in turn to the bottom wall to form a weldment. Four corners 4107 are formed at the intersection of the sidewalls 4103 and end walls 4104 which extend vertically along the height of the cask body 4101.

Bottom wall 4102 has a flat top surface 4102a and parallel opposing flat bottom surface 4102b. The bottom wall is configured to be seated on a horizontal support surface such as a concrete pad. The interior and exterior surfaces of each of the longitudinal sidewalls 4103 and end walls 4104 may be generally flat and parallel to each other as well.

Cask 4100 may be used in horizontal position as shown when transporting and storing nuclear waste. In this case, the vertical direction is defined for convenience of reference as being transverse and perpendicular to the longitudinal axis LA. A lateral direction is defined for convenience of reference in the horizontal direction as being transverse and perpendicular to the longitudinal axis.

The bottom wall 4102, longitudinal sidewalls 4103, and end walls 4104 collectively define an internal storage cavity 4105 configured for storing nuclear waste materials previously described herein. The bottom wall, longitudinal sidewalls, and end walls define and circumscribe an axially elongated top opening 4106 forming an entrance to the cavity for loading nuclear waste materials therein. The longitudinally-extending top opening 4106 extends for a substantial majority of the entire length of the cask body (less the thicknesses of the sidewalls and end walls). This provides a large opening which facilitates loading many different shapes and sizes nuclear waste materials into the cask 4100.

Longitudinal sidewalls 4103 and lateral end walls 4104 of the cask may each have a composite construction comprising a metallic inner containment plate 4110 adjacent to the storage cavity 4105 and a metallic outer radiation dose blocker plate 4111 abutted thereto. Bottom wall. 4102 may similarly have a composite construction comprising a metallic inner containment plate 4112 adjacent to the storage cavity and a metallic outer radiation dose blocker plate 4113. In some embodiments, as shown, an intermediate dose blocker plate 4114 may be sandwiched between the inner containment plate and outer dose blocker plate when needed to provide additional radiation shielding. In some non-limiting embodiments, the containment plates may be formed of steel alloy and the radiation dose blocker plates may be formed of a different steel material such as for example stainless steel for protection against corrosion by the exterior ambient environment. A suitable thickness of the containment and blocker plates may be used as needed to effectively reduce the radiation emitted from the cask to within regulatory compliant exterior levels for containment casks. As noted, the bottom wall and walls of cask 4100 may have an all metal construction without use of concrete. However, in other possible embodiments, concrete and additional or other radiation shielding materials including boron-containing materials for neutron attenuation and various combinations thereof may be provided if additional radiation blocking is needed. The bottom wall and wall construction materials used therefore do not limit the invention.

With continuing reference to FIGS. 61-88, cask 4100 further includes a longitudinally elongated closure lid 4200 which forms the upper containment barrier. Lid 4200 may be of rectangular shape in one embodiment to match the rectangular cuboid configuration of the cask body 4101 shown. Lid 4200 has a length and width sufficient to form a complete closure of the top opening of the cask in order to fully enclose and seal the internal storage cavity 4105 of the cask and nuclear waste materials. Lid 4200 includes an outward facing top surface 4201 and parallel bottom surface 4202 facing cavity 4105 of the cask body 4101 when positioned thereon, parallel longitudinal sides 4203 (i.e., long sides of the lid), parallel lateral ends 4204 (i.e., short sides of the lid) extending between the longitudinal sides, and corners 4205 (four as shown) at the intersection of the longitudinal sides and lateral ends. Top and bottom surfaces 4201, 4202 are the major surfaces of the lid having a greater surface area than other surfaces on the lid.

Referring additionally to FIGS. 70-77B, closure lid 4200 may have a composite construction comprising a metallic inner containment plate 4206 at bottom located adjacent to the storage cavity 4105 when the lid is position on the cask body 4101, and a top metallic outer radiation dose blocker plate 4207. Containment plate 4206 defines bottom surface 4202 of the lid and blocker plate 4207 defines top surface 4201. An insulation board 4208 may be sandwiched between plates 4206 and 4207 for protection against fire event.

In one embodiment, a peripheral lid spacer frame 4209 may be attached to the bottom containment plate 4206 of lid 4200. Frame 4209 has an open space-frame structure which extends perimetrically around the bottom surface 4202 of the lid. The frame 4209 may include an X-brace 4209a extending through the interior space defined by the peripheral linear members of the frame to add structural reinforcement and bracing. When lid 4200 is positioned on cask body 4101, inner containment plate 4206 and frame 4209 are received completely into storage cavity 4105 of the cask (see, e.g., FIGS. 70 and 71).

A compressible gasket 4220 may be disposed on the bottom surface 4202 of the lid 4200 to form a gas-tight seal at the interface between the lid and cask body. Gasket 4220 has a continuous perimetrically extending shape which is complementary configured dimensionally to conform to and circumscribed the top end of the cask body 4101 on all sides. Gasket 4220 therefore extends perimetrically along the tops of the longitudinal sidewalls 4103 and lateral end walls 4104 of the cask to form an effective seal. Gasket 4220 may be formed of any suitable compressible material, such as elastomeric materials in some embodiments.

According to one aspect of the disclosure, a bolt-free cask locking mechanism provided to lock and seal lid 4200 to cask body 4101. FIGS. 70-78 and 82-88 in particular show various aspects of the bolt-free cask locking mechanism, which will now be further described in detail.

Lid 4200 and cask body 4101 include a plurality of locking features which cooperate to form the locking mechanism. The cask locking mechanism may comprise a plurality of first locking protrusions 4212 spaced apart on the lid which are selectively and mechanically interlockable with a plurality of second locking protrusions 4214 spaced apart on the cask body to lock the lid to the cask body. First locking protrusions 4212 are movable relative to the lid and cask body 4101, whereas second locking protrusions 4214 are fixed in position on and stationary with respect to the cask body.

The locking features of the lid 4200 comprises at least one first locking member 4212a, which may be in the form of a linearly elongated locking bar 4210 for locking the lid to the cask body (see, e.g., FIGS. 75B and 89-92). 1n one embodiment, a plurality of elongated locking bars 4210 are arranged perimetrically around the outer peripheral portions of the lid on longitudinal sides 4203 and lateral ends 4204. First locking protrusions 4212 are formed on and may be an integral unitary structural part of the locking bars in one embodiment being formed of single monolithic piece of cast or forged metal. In other possible less preferred but satisfactory embodiments, locking protrusions 4212 may be discrete elements separately attached to the locking bars 4210 via mechanical fasteners or welding.

Locking bars 4210 are slideably disposed in corresponding outward facing elongated linear guide channels 4211 formed in the longitudinal sides and lateral ends of the lid 4200. The locking bars are movable back and forth in opposing directions within the guide channels relative to the lid. Each locking bar 4210 includes a plurality of the first locking protrusions 4212 which project outwardly from the bar beyond the outward facing surfaces of the longitudinal sides 4203 and lateral ends 4204 of the lid. The linear array of locking protrusions 4212 are spaced apart to form openings 4213 between adjacent locking protrusions for passing the second locking protrusions 4214 on the cask body 4101 therethrough, as further described herein.

The longitudinal sides 4203 and lateral ends 4204 of the lid 4200 may each include at least one locking bar 4210. In one preferred but non-limiting embodiment, as illustrated, the lateral ends 4204 of the lid may include a pair of the locking bars 4210 and the longitudinal sides 4203 of the lid may similarly include a pair of locking bars. This forms a unique arrangement and interaction between the locking bars to maintain a locked position, as further described herein.

The corresponding locking features of the bolt-free cask locking mechanism on cask body 4101 include at least one second locking member 4214a comprising the second locking protrusions 4214. Locking member 4214a may comprise upper portions of cask body 4101 in which the second locking protrusions 4214 and related features such as locking slot 4216 described below are integrally formed with the cask body inside storage cavity 4105. Locking protrusions 4214 are fixedly disposed in linear arrays on the cask body adjacent to top ends of the longitudinal sidewalls 4103 and lateral end walls 4104 of the body and cask body top opening 4106. The second locking protrusions 4214 are therefore stationary and not movable relative to the cask body. The second locking protrusions 4214 project inwardly into the nuclear waste storage cavity 4105 from the interior surfaces of the longitudinal sidewalls 4103 and lateral end walls 4104 of the cask body. Second locking protrusions 4214 therefore are arranged around the entire perimeter of the cask body to interface with the first locking protrusions 4212 of lid 4200.

The linear array of second locking protrusions 4214 are spaced apart to form openings 4215 between adjacent locking protrusions for passing the first locking protrusions 4212 on the lid therethrough. A linearly elongated locking slot 4216 is formed and recessed into the cask body 4101 immediately below the second locking protrusions 4214 on each of the longitudinal sidewalls 4103 and end walls 4104 of the cask body. The locking slots 4216 form continuous and uninterrupted inwardly open structures having a length which extends beneath at least all of the second locking protrusions on each of the longitudinal sidewalls 4103 and lateral end walls 4104 of the cask body as shown. Locking slots 4216 therefore extend for a majority of the lengths/widths of the cask body longitudinal sidewalls and end walls. Locking slots 4216 are in communication with the openings 4215 between the second locking protrusions 4214 to form an insertion pathway for the first locking protrusions 4212 of lid 4200 to enter the locking slots.

In one preferred but non-limiting construction, the openings 4215 between the second locking protrusions 4214 and the elongated locking slots 4216 may be formed as recesses machined into the cask body 4101 by removing material from longitudinal sidewalls 4103 and lateral end walls 4104. The material remaining therefore leaves the second locking protrusions 4214 in relief. Second locking protrusions 4214 therefore in this case are formed as integral unitary and monolithic parts of the cask body material. In other possible constructions, however, the second locking protrusions 4214 may be separate structures which are welded or otherwise fixedly attached to the cask body 4101. In this latter possible construction, no locking slot 4216 is formed but the cask locking mechanism may nonetheless still function satisfactorily to lock the lid to the cask body. In yet other possible constructions, the second locking protrusions 4214 and locking slots 4216 may be formed on linearly elongated closure bars of metal having the same composite construction as the longitudinal sidewalls 4103 and end walls 4104 previously described herein. The closure bars are in turn welded onto the tops of each longitudinal sidewalls and end walls to produce the same structure in the end as illustrated herein.

With continuing reference to FIGS. 70-78 and 82-88, the first and second locking protrusions 4212, 4214 may be generally block-shaped structures having a rectangular configuration. In one preferred but non-limiting embodiment, the first and second locking protrusions may each be wedge-shaped defining locking wedges having at least one tapered locking surface 4217 or 4218. The locking protrusions may be configured and arranged such that the tapered locking surfaces 4217 of the first locking protrusions 4212 on lid 4200 are each slideably engageable with one of the tapered locking surfaces 4218 of a corresponding second locking protrusion 4214 of the cask body 4101. In one embodiment, the tapered locking surfaces 4217 of the first locking protrusions 4212 on lid 4200 may be formed on a top surface thereof, and the tapered locking surfaces 4218 of the second locking protrusions 4214 on cask body 4101 may be formed on a bottom surface thereof. When the first and second locking protrusions are engaged to lock the lid to the cask body, the tapered locking surfaces 4217, 4218 become slideably engaged forming a generally flat-to-flat interface therebetween. This creates a wedging-action which draws the lid 4200 towards against the cask body 4101 to fully compress the gasket 4220 therebetween which forms a gas-tight seal of the cask internal storage cavity 4105 and its nuclear waste material content.

The tapered locking surfaces 4217 and 4218 preferably have the same taper angle A1 (see, e.g., FIG. 89) to form the generally flat-to-flat interface therebetween when mutually and frictionally engaged via the wedging action. Any suitable taper angle A1 may be used. In one representative but non-limiting examples, the taper angle A1 preferably may be between about 2 and 20 degrees. Other tapered angles may be used where appropriate.

The locking bars 4210 with first locking protrusions 4212 on lid 4200 thereon are slideably movable between a locked position or state (see, e.g. FIG. 77A) in which the first and second protrusions 4212, 4214 are mutually engaged to prevent removal of the lid 4200 from the cask body 4101 (see, e.g. FIG. 71), and an unlocked position or state (see, e.g. FIG. 77B) in which the first and second protrusions are disengaged to allow removal of the lid from the cask body in a vertical direction transverse to longitudinal axis LA of the cask.

To move the locking bars 4210 with sufficient applied force to frictionally interlock the first and second locking protrusions 4212, 4214, and to concomitantly minimize radiation dosage to operating personnel, a remote lid operating system may be provided. This system is operably coupled to each of the locking bars 4210 and configured to advantageously move the locking bars 4210 between the locked and unlocked positons from a remote radiation safe distance and area. This obviates the need for operators to manually operate the locking bars directly at the cask during the lid-to-cask body closure and locking process.

Figure 87:
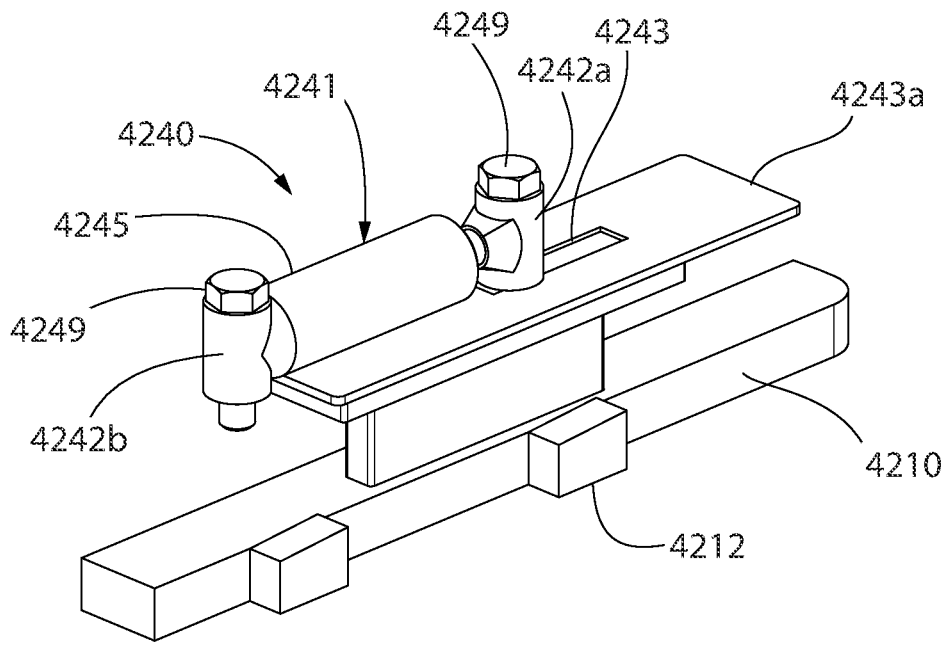
FIG. 87 is a perspective view of an actuator assembly for moving locking bars of the lid.
Figure 88:
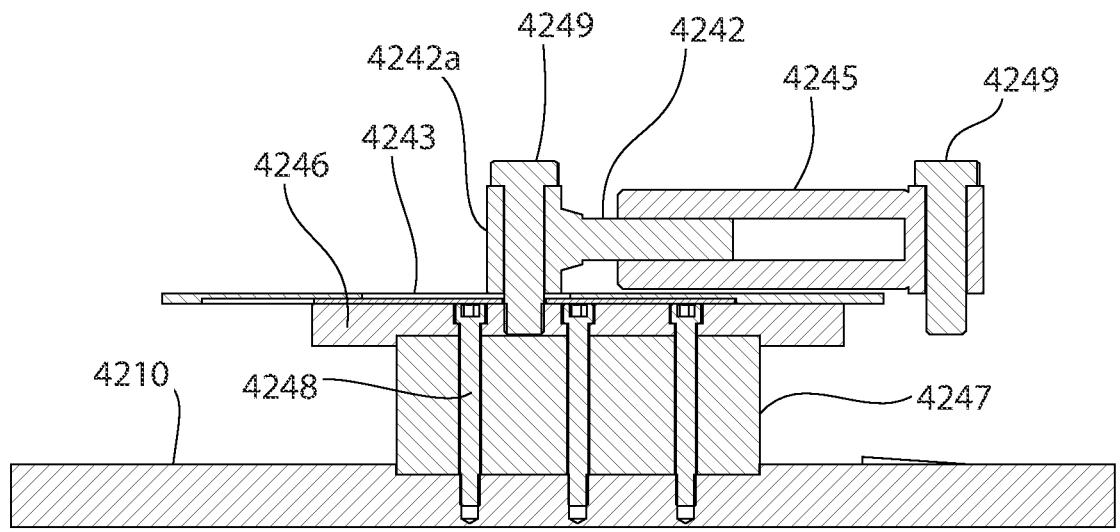
FIG. 88 is a cross sectional view thereof.

In one embodiment, the remotely-operated lid operating system comprises a local actuator 4240 mounted on the top surface 4201 of lid 4200 for and coupled to each of the locking bars 4210. FIGS. 87 and 88 show actuators 4240 in isolation and detail. Each actuator 4240 is an assembly which may generally comprise a cylinder-piston assembly 4241 including cylinder 4245 and an extendible/retractable piston rod 4242 slideably received inside the cylinder. The cylinder-piston assembly is fixedly attached to lid 4200. Cylinder 4245 may be fixedly mounted to the lid via a bolt 4249 passing through a tubular proximal mounting end 4242b as shown. Pistol rod 4242 has a tubular distal working end 4242a fixedly coupled to the locking bar 4210 through an elongated operating slot 4243 formed through the lid. The piston rod 4242 is therefore moves the locking bar 4210 in the manner described herein. In one embodiment, slot 4243 may be formed in a lid insert plate 4243a which in turn is mounted to the lid. A threaded bolt 4249 may be used to couple the piston rod to the locking bar 4210 via an intermediate block assembly comprising an upper mounting block 4246 and lower mounting block 4247. Upper block 4246 may be formed as integral part of lid insert plate 4243a in some embodiments. Piston rod 4242 is fixedly bolted to upper mounting block 4246. Upper mounting block 4246 is fixedly mounted to lower mounting block 4247 via a plurality of threaded fasteners 4248 which extend through the upper mounting block and are threadably engaged with the locking bar 4210 (see, e.g., FIG. 88). The mounting block assembly provides a robust coupling of the piston rods 4242 to the locking bars 4210 which can withstand the shear forces generated when the cylinder-piston assemblies 4241 are actuated to drive the locking protrusions 4212, 4214 of the lid 4200 and cask body 4101 into locking engagement.

The cylinder-piston assembly 4241 may be either (1) hydraulically operated wherein the working fluid is oil, or (2) pneumatically operated wherein the working fluid is compressed air. Oil or air hoses are fluidly coupled to the cylinder-piston assemblies (not shown) and operated from a remote hydraulic or pneumatic control unit in a conventional manner which comprises an air compressor or hydraulic pump with appropriate valving depending on the type of system provided. When actuated, the locking bar actuators 4240 function to slide the locking bars 4210 between the locked and unlocked positions (FIGS. 77A and 77B) via extending or retracting the piston rod 4242. It bears noting that the use of hydraulic or pneumatic means to move the locking bars 4210 applies a greater force to the locking bars to form tight locking engagement via the wedging-action between the first and second locking protrusions of the lid and cask body than could be provided by manually actuating the locking bars 4210. This advantage, coupled with avoiding exposure of operating personnel or workers to radiation dosage are notable benefits of the present remote lid operating system.

Interaction between the locking protrusions 4212, 4214 and a related process/method for locking the nuclear waste cask 4100 (i.e., lid 4200 to cask body 4101) are described farther below. The movement and functioning of the locking bars 42110, however, is first further described.

Figure 77A:
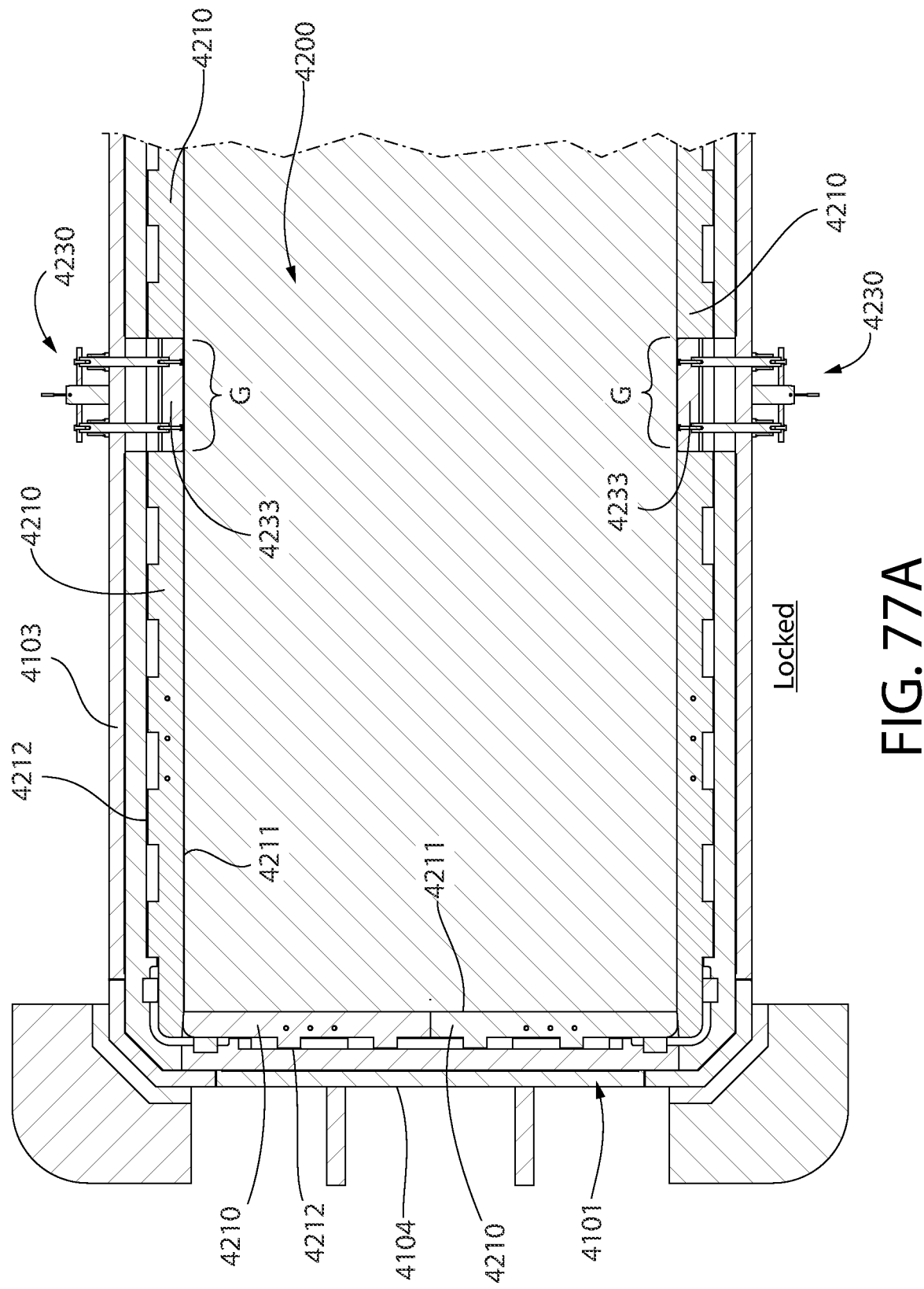
FIG. 77A is a partial longitudinal cross sectional view of the lid showing the cask locking mechanism in a locked position or state.
Figure 77B:
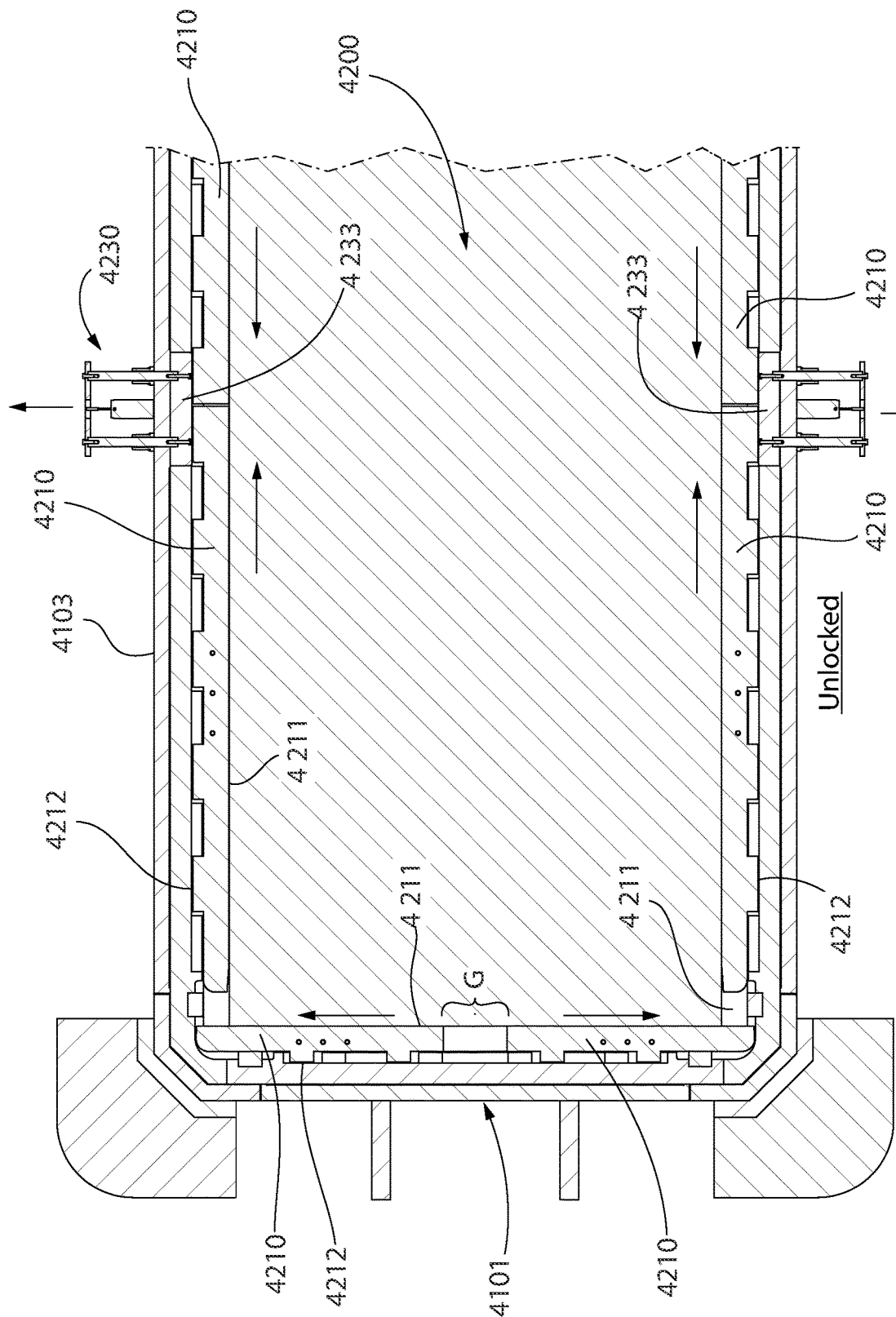
FIG. 77B is a partial longitudinal cross sectional view of the lid showing the cask locking mechanism in an unlocked position or state.
Figure 78:
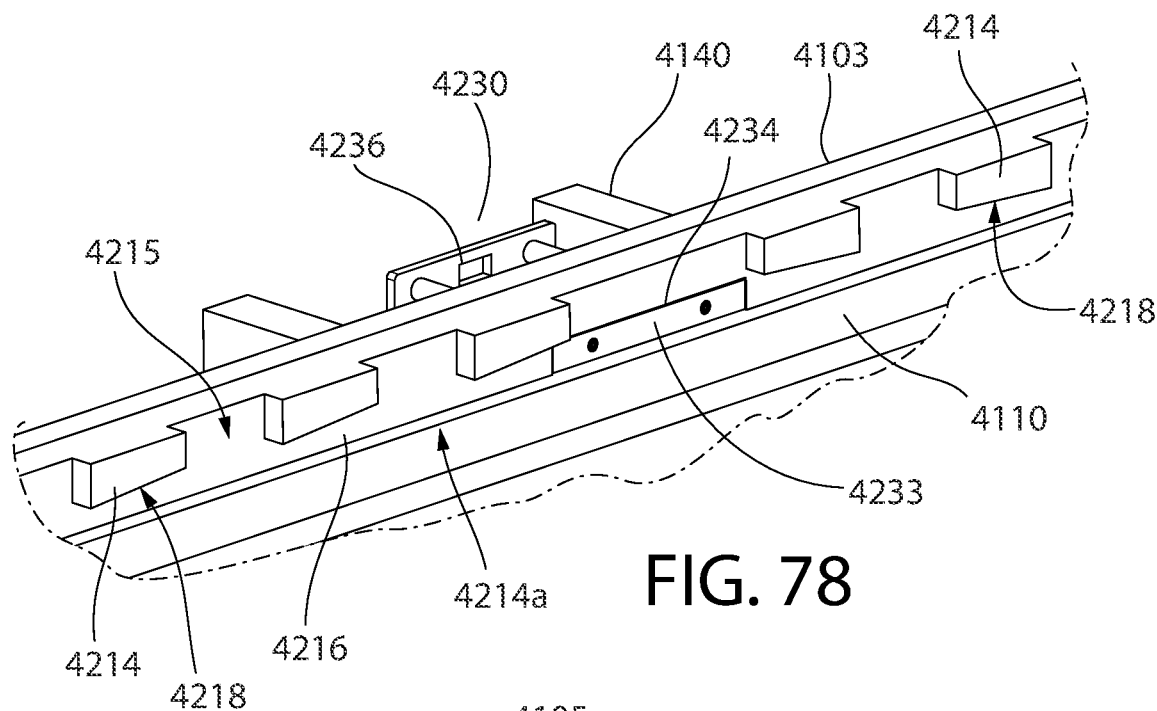
FIG. 78 is an enlarged detail in perspective view of a portion of the cask interior at the top opening showing the cask body locking protrusion arrangement.
Figure 79:
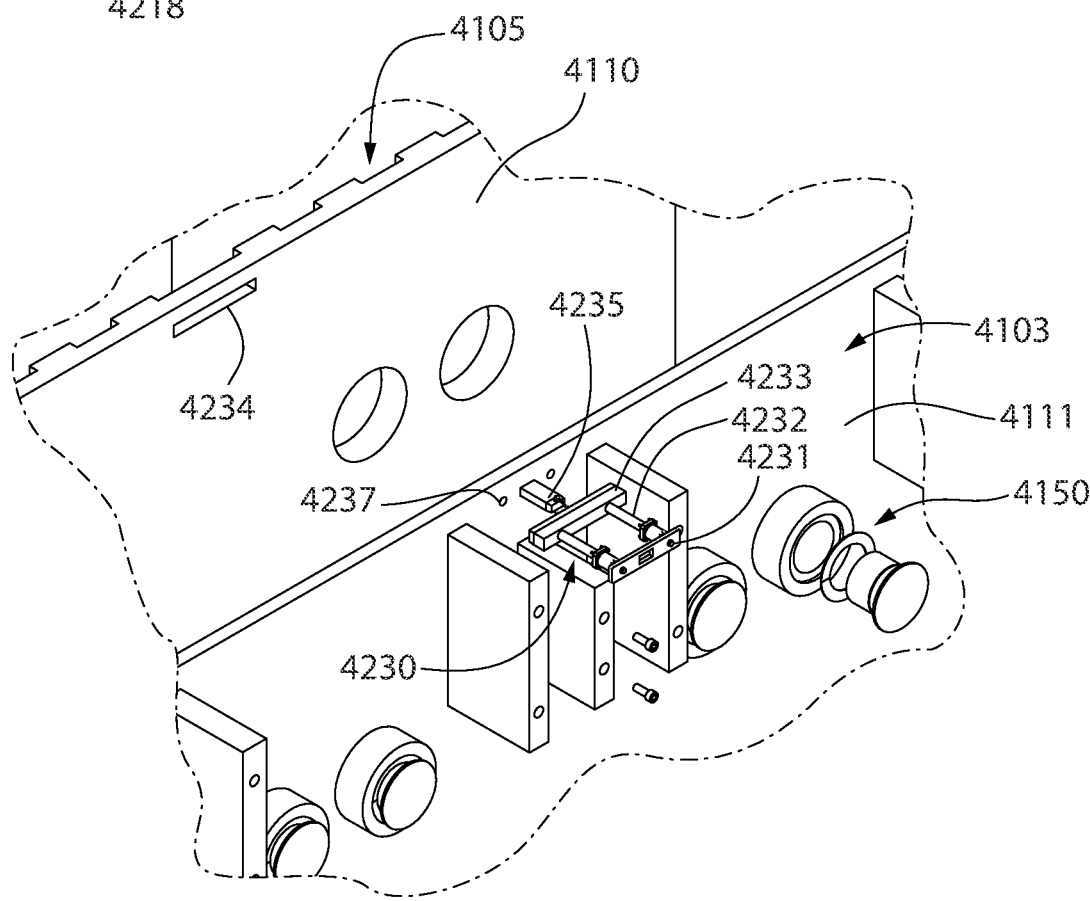
FIG. 79 is an exploded perspective view of a portion of a longitudinal sidewall of the cask body showing a locking handle assembly in exploded view as well.
Figure 80:
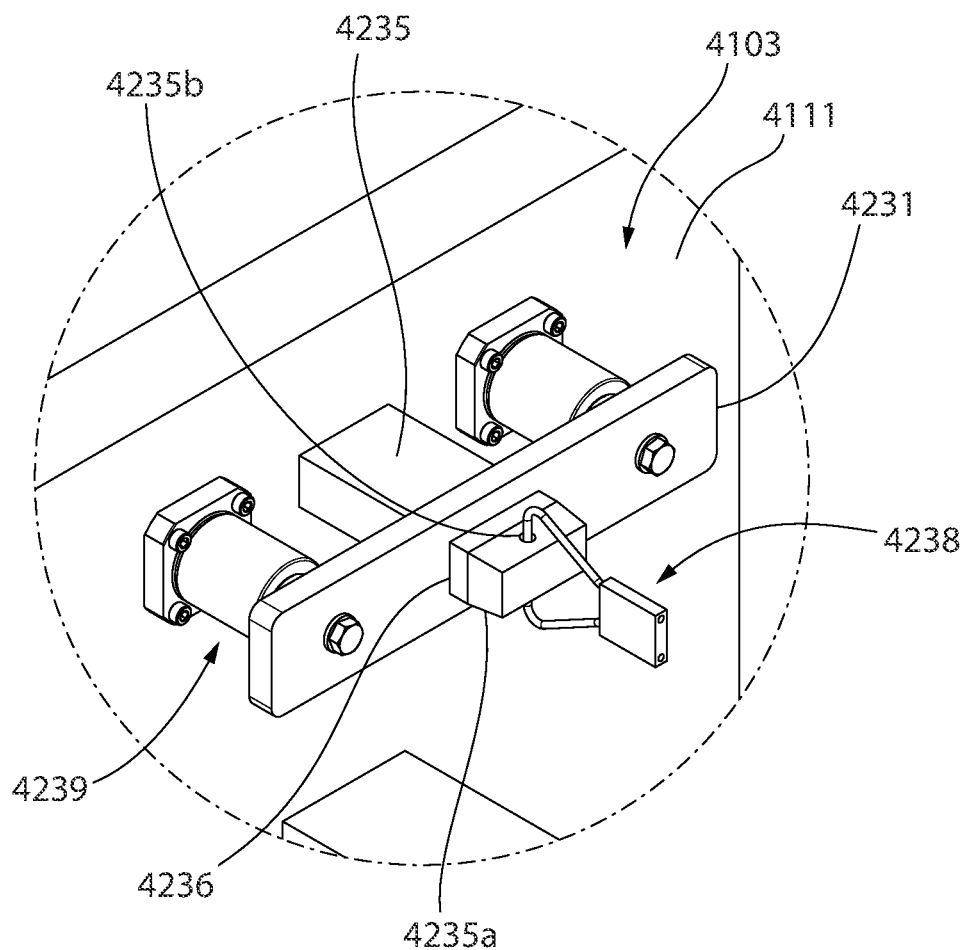
FIG. 80 is an enlarged perspective view of the locking handle assembly in the inward blocking position locked with a cable-lock security tag/seal in place.
Figure 81:
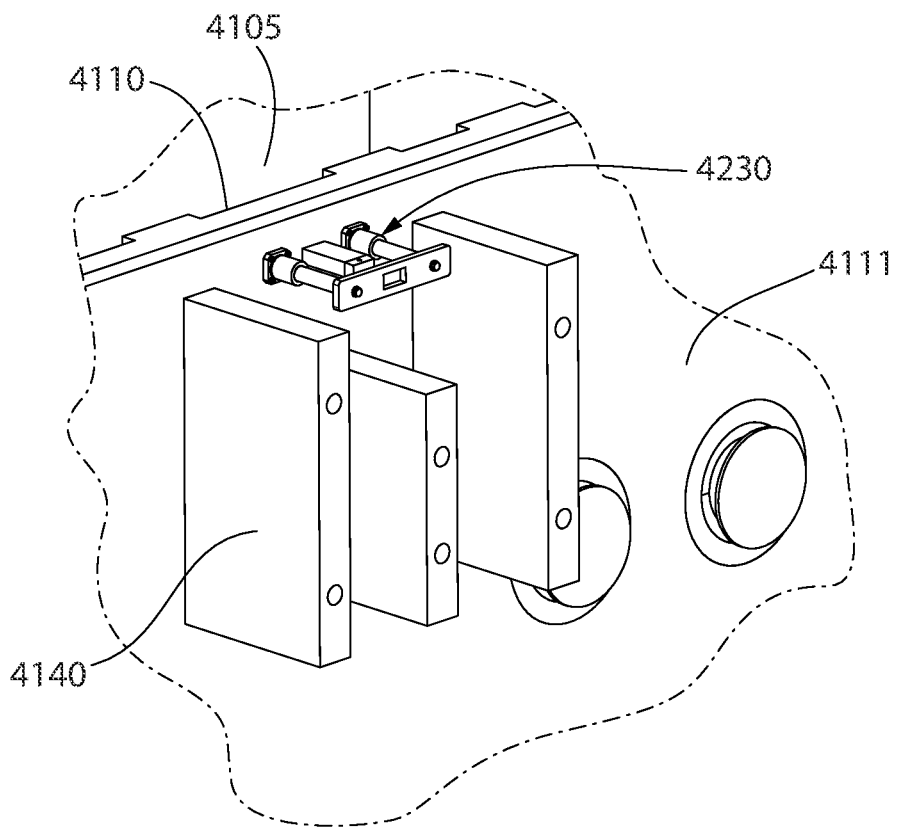
FIG. 81 is a second enlarged perspective view of the locking handle assembly in the outward non-blocking position on the cask body.
Figure 82:
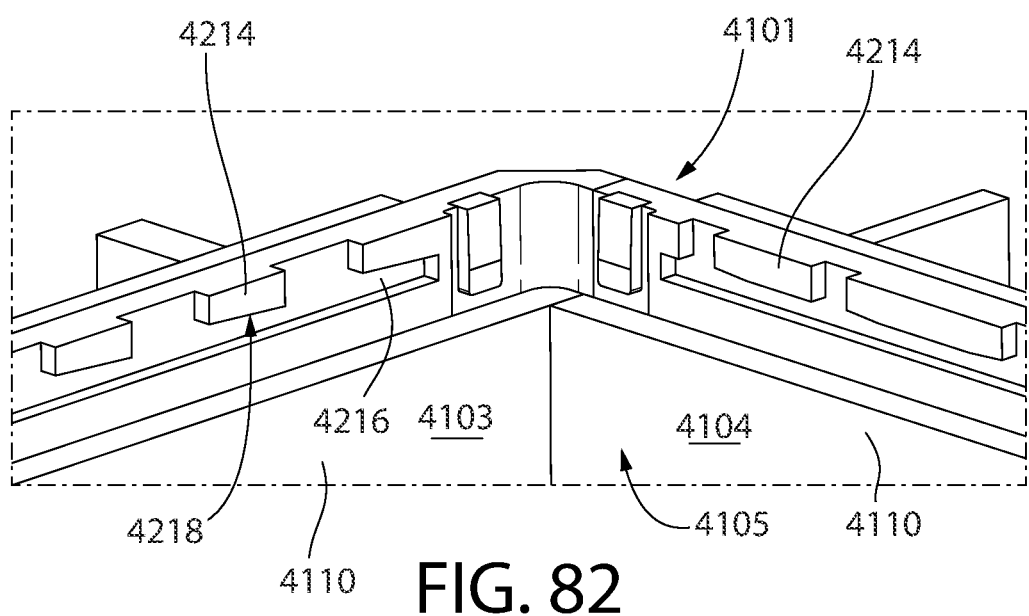
FIG. 82 is an enlarged detail in perspective view of a portion of the cask interior at the top opening in a corner region showing the cask body locking protrusion arrangement on adjoining walls of cask body.
Figure 83:
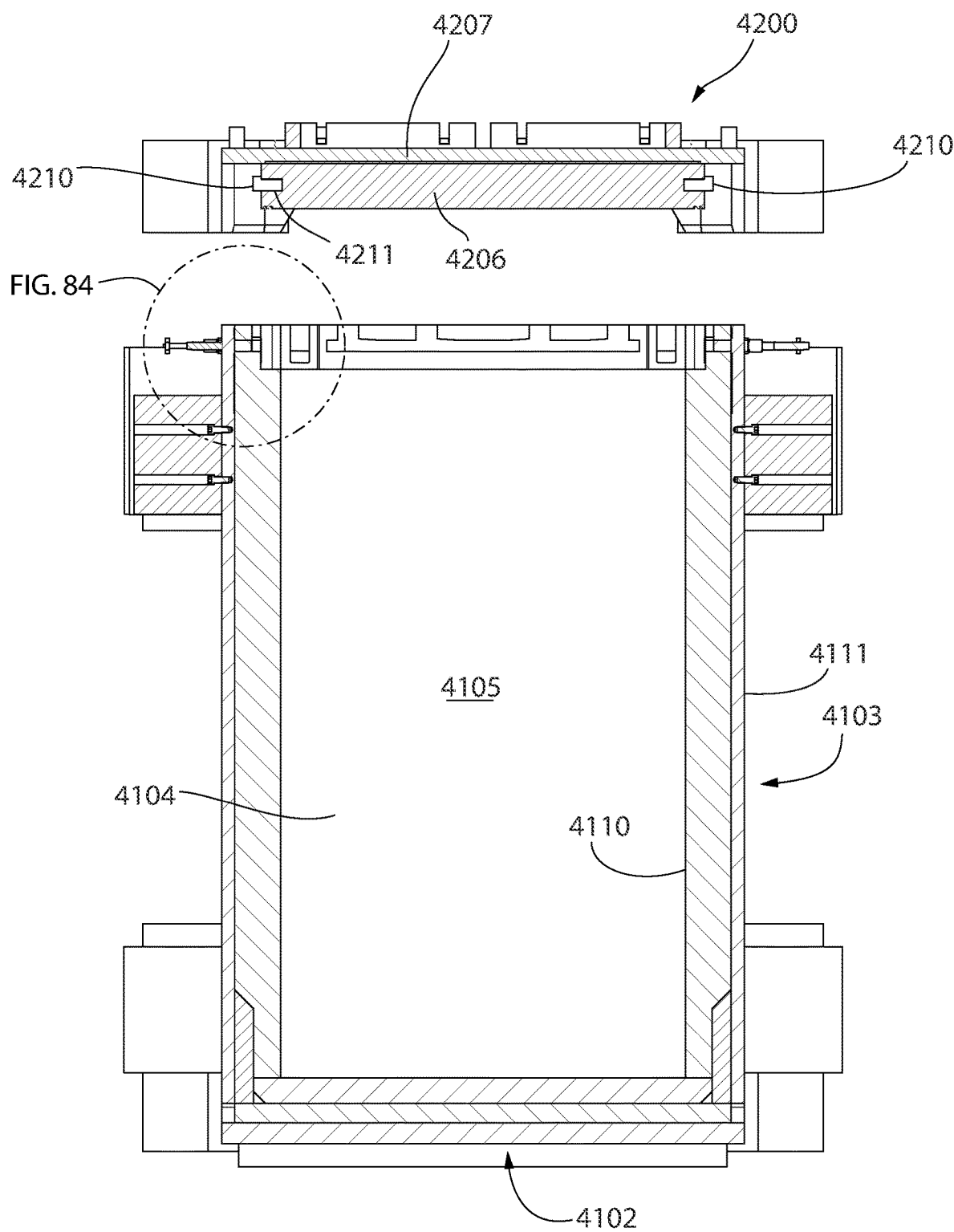
FIG. 83 is a transverse cross sectional view of the cask body and lid showing the lid removed.
Figure 84:
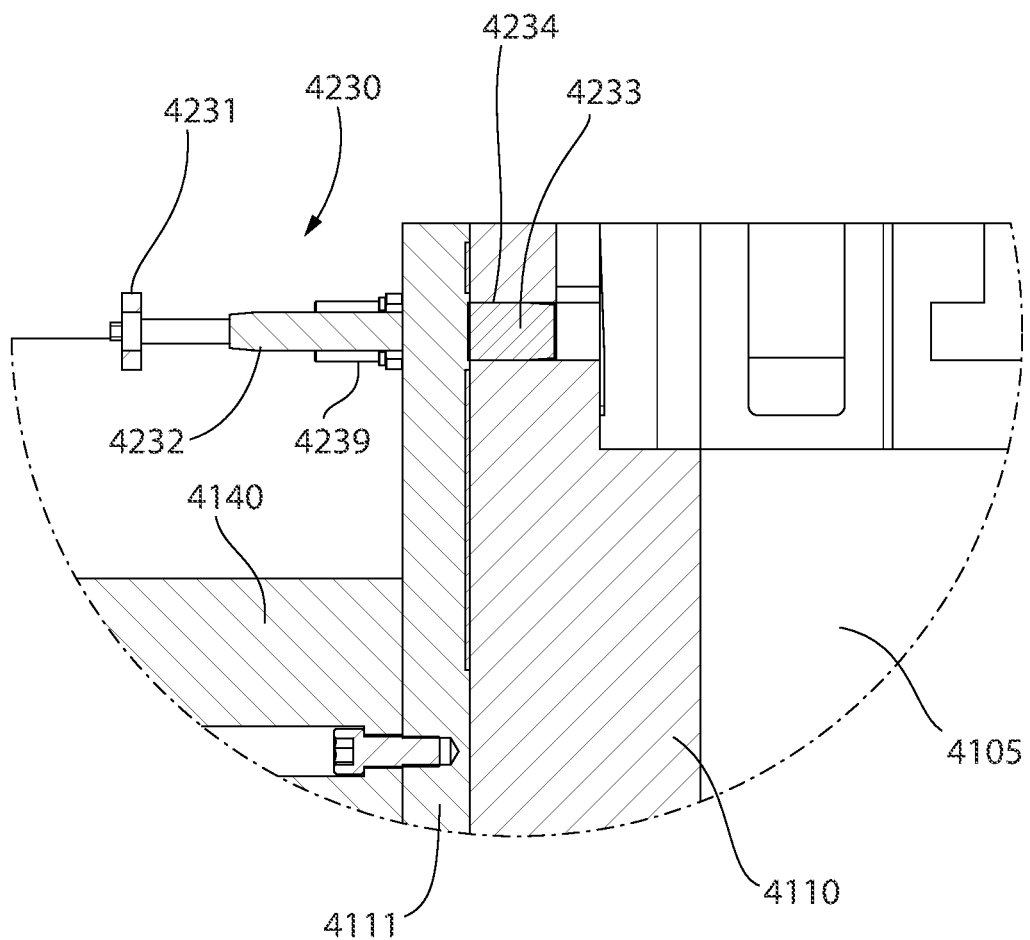
FIG. 84 is an enlarged detail taken from FIG. 83 showing the locking handle assemblies on the longitudinal sidewalls of the cask body in the outward non-blocking position.
Figure 85:
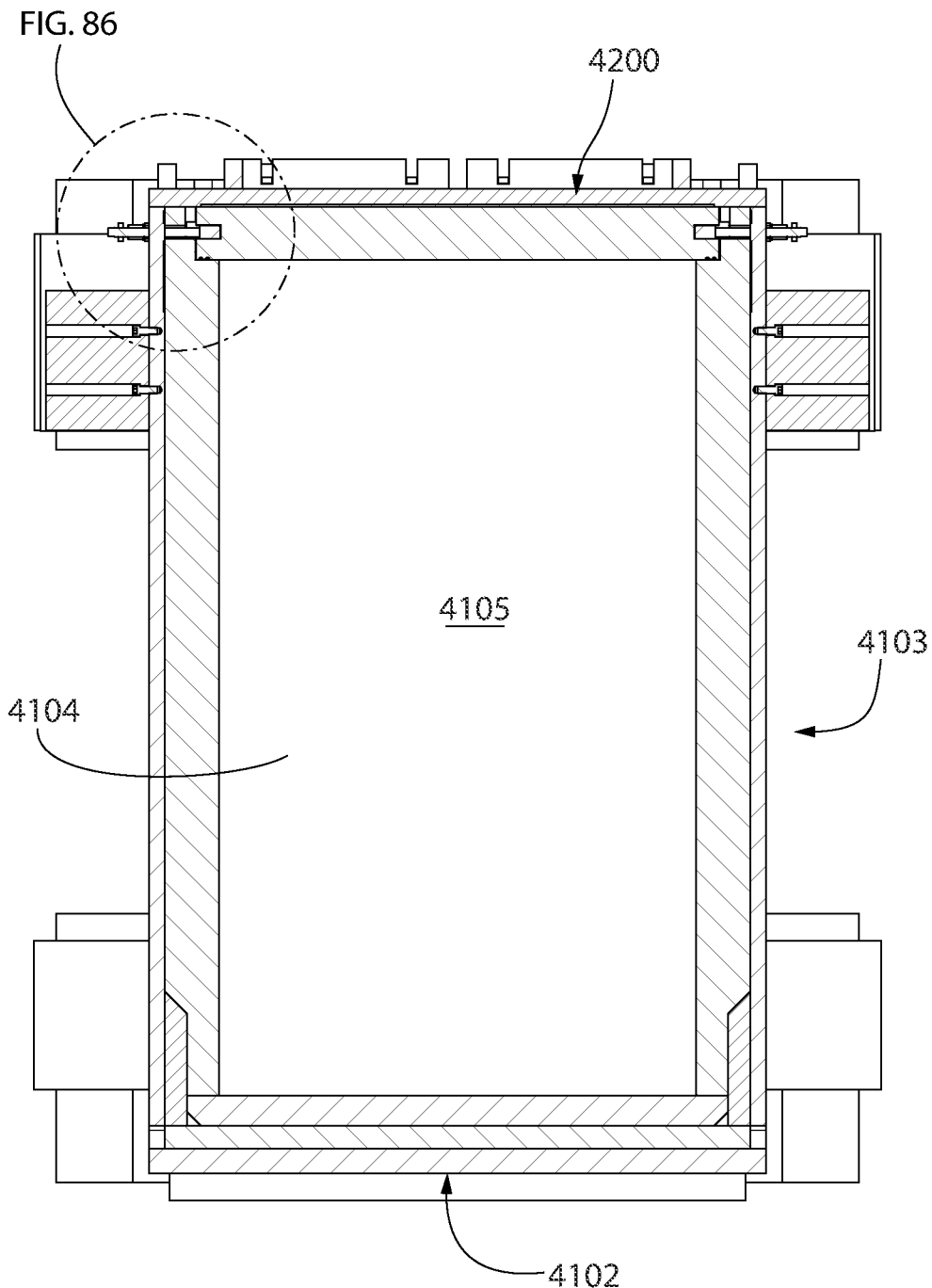
FIG. 85 is a transverse cross sectional view of the cask body and lid showing the lid in position on the cask body.
Figure 86:
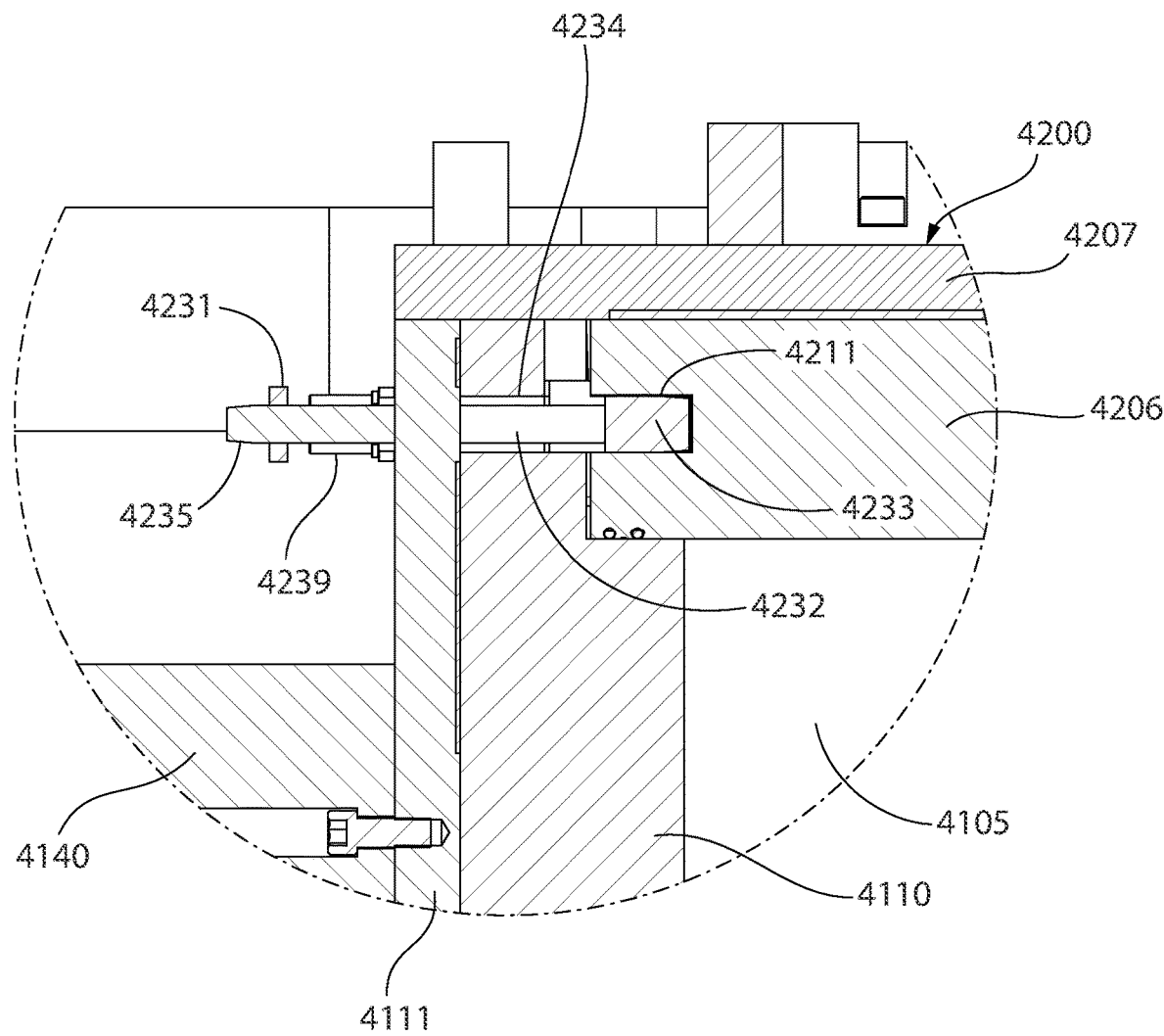
FIG. 86 is an enlarged detail taken from FIG. 85 showing the locking handle assemblies in the inward blocking position.

FIGS. 77A and 77B show the locked and unlocked positions of the locking bars 4210 on lid 4200. Retention features are provided as a safety mechanism which lock and retain the locking bars in the locked position to prevent the lid 4200 from being unintentionally unlocked from the cask body 4101, such as could potentially result from substantial force impacts occurring during transporting and handling the cask (e.g., lifting, lowering, or loading the cask onto a transport vehicle/vessel), or during a regulatory postulated cask drop event.

In one embodiment, the locking bars 4210 on the longitudinal sides 4203 of lid 4200 are moveable towards each other to form the unlocked position shown, and away from each other to form the locked position shown. Conversely, the locking bars 4210 on the lateral ends 4204 of the lid are moveable towards each other to form the locked position, and away from each other to form the unlocked position. This apparent dichotomy serves a purpose. When locking bars 4210 on the lateral ends 4204 of the lid are therefore positioned and abutted together in the locked position, terminal end portions 4210a of the locking bars on the longitudinal sides 4203 of the lid are positioned to overlap and engage/block the locking bars on the lateral ends 4204 of the lid from being moved apart to the unlocked position (see, e.g., FIG. 77A). This forms a first locking bar retention feature which locks the lid lateral end locking bars 4210 in the locked position.

The second locking bar retention feature acts on the locking bars 4210 on the longitudinal sides 4203 of the lid 4200 to lock the lid longitudinal side locking bars in the locked position. This retention feature comprises a locking handle assembly 4230 slideably mounted on each of the longitudinal sidewalls 4103 of the cask body 4101 (see, e.g., FIGS. 77A-B, 79-81, and 83-86). Each locking handle assembly 4230 includes an elongated proximal handle 4231 configured for receiving an applied force generated by a user such as via grasping or a tool, a distal elongated locking block 4233, and a securement bar 4235. The locking block 4233 is coupled to the handle 4231 by one or more elongated coupling rods 4232 of any suitable polygonal or non-polygonal cross-sectional shape. Preferably a pair of coupling rods 4232 are provided. Securement bar 4235 is fixedly attached to the exterior surface of the cask body longitudinal sidewalls 4103 (e.g., welded) and has a proximal end 4235a which is insertable through an aperture 4236 in the handle 4231. End 4235a may project through aperture 4236 when the handle assembly is fully inward and can be secured in place (e.g., FIG. 80 further described herein).

The locking handle assemblies 4230 are positioned on each longitudinal sidewall 4103 of the cask body 4101 to allow the locking block 4233 to be manually and selectively moved into and out of the locking slots 4216 on the cask body sidewalls. A windows 4234 formed in each longitudinal sidewall 4103 allows the locking block 4233 to access the guide channels 4216. More particularly, window 4234 is formed in and extends completely through inner containment plate 4110 of the longitudinal sidewalls 4103 of the cask body. Locking block 4233 is completely retractable from locking slot 4216 into the containment plate 4110 to allow insertion of first locking protrusions 4212 on locking bars 4210 into and slideably moved along the locking slot 4216 beneath second locking protrusions 4214 of the cask body. The outer radiation dose blocker plate 4111 comprises a pair of holes 4237 to permit the two coupling rods 4232 to be coupled to locking block 4233 located inside the blocker plate in window 4234 of the inner containment plate 4110 (see, e.g., FIG. 78). A pair of cylindrical mounting flange units 4239 may be used to fixedly mount each locking handle assembly 4230 to the dose blocker plate 4111 on the longitudinal sidewalls 4103 of cask body 4101 (see, e.g., FIG. 80). Flange units 4239 may be bolted/screwed or welded to the outer blocker plate 4111. The flange units 4239 further act as standoffs to limit the maximum inward projection of the locking block 4233 into the locking slot 4216 of the cask body. The coupling rods 4232 are slideably inward/outward through the flange units to change position of the locking handle assemblies 4230.

The locking handle assemblies 4230 are moveable via handles 4231 between (1) an inward blocking position in which the locking blocks 4233 project into the locking slots 4216 of the cask body 4101 beneath the second locking protrusions 4214, and (2) an outward non-blocking position in which the locking blocks 4233 are completely retracted from the locking slots. The non-blocking position allows locking bars 4210 with first locking protrusions 4212 thereon to enter and slide back and forth in the locking slots 4216 between the locked and unlocked positions (both previously described herein) when the lid 4200 is positioned on cask body 4101. Once the locking bars are in the locked position, a gap G is formed between each pair of locking bars on the longitudinal sides 4203 of the lid (see, e.g., FIGS. 72 and 77A). Moving the locking handle assemblies 4230 to the inward blocking position locates the locking blocks 4233 in and fills the gaps G on each longitudinal sidewall 4103 of the cask body (within guide channels 4211 of lid 4200). The locking bars 4210 therefore cannot be drawn back together to their unlocked position, thereby locking the locking bars in the locked position due to interference between the locking blocks 4233 and locking bars. To move the locking bars 4210 on longitudinal sidewalls 4103 to the unlocked position, the locking blocks 4233 are first withdrawn via handles 4231 of the locking handle assemblies 4230 to re-open gap G, thereby allowing the longitudinal sidewall locking bars to slide together again to the unlocked position.

When each handle assembly 4230 is in the inward blocking position, the securement end 4235a of securement bar 4235 is projected through apertures 4236 in handles 4231. Any suitable commercially-available cable-lock security tag or seal tag 4238 as shown may be coupled through hole 4235b in securement bar 4235 to lock the handle assemblies in the inward blocking position. Should the cask 4100 be impacted or dropped during handled, the lid 4200 will remain locked to the cask body 4101 since the handle assemblies 4230 cannot be moved outward to unlock the lid. The security tag also provides visual indication that the lid is in the locked position to operating personnel. This is especially helpful in situations where the cask lid 4200 may be loaded with radioactive materials and locked to the cask body 4101 at one location, and then the cask is transported to a more remote receiving location. The crew at the receiving location can readily confirm the lid is in the locked position or state.

A process or method for locking the nuclear waste storage cask 4100 using the foregoing features will now be briefly described. FIGS. 89-92 are sequential views showing the relationship between the first and second locking protrusions 4212, 4214 during the lid mounting and cask locking process.

The process or method generally includes first placing the locking bars 4210 on longitudinal sidewalls 4103 and lateral end walls 4104 of lid 4200 in their unlocked position and the locking blocks 4233 on locking handle assemblies 4230 in their non-blocking positions which retracts the locking blocks 4233 from the locking slots 4216 on the longitudinal sidewalls 4103 of the cask body 4101 (FIG. 77B). The locking bar actuators 4240 or manual means may be used to perform the foregoing step. The locking bars 4210 on longitudinal sides 4203 of lid 4200 are together, and locking bars on lateral ends 4204 of the lid are spaced apart forming gap G therebetween as shown. The lid is positioned over and align with the cask body 4101 wherein the lid first locking protrusions 4212 are vertically aligned with the openings 4215 between second locking protrusions 4214 on the cask body (FIG. 89).

Next, the closure lid 4200 is lowered and positioned on top of the cask body 4101 over the top opening 4106. This step first vertically inserts the peripheral array of first locking protrusions 4212 on locking bars 4201 of lid 4200 between the peripheral array of second locking protrusions 4214 disposed on the cask body 4101 around the top opening (FIG. 90). As the lid engages the top of the cask body 4101, the first locking protrusions pass completely through the openings 4215 between the second locking protrusions 4214 and enter the horizontally elongated locking slots 4216 in a position below the second locking protrusions (FIG. 91). In turn, the second locking protrusions 4214 pass through openings 4213 between the first locking protrusions 4212 and become positioned above the first locking protrusions.

The process or method continues with then sliding the locking bars 4210 to their locked positions (FIGS. 77A and 91), which moves the first locking protrusions 4212 beneath the second locking protrusions 4214 in a horizontal locking plane oriented parallel to the bottom wall 4102 and passing through the locking slots 4216. This step may be performed by actuating the hydraulic or pneumatic cylinder-piston assembles 4241 of the locking bar actuators 4240 from a location remote from the cask to minimize radiation exposure of operating personnel. Sliding the locking bars 4210 slideably and frictionally engages the first locking protrusions 4212 of the lid with bottom surfaces of the second locking protrusions 4214 of the cask body 4101. Specifically, the tapered locking surfaces 4217, 4218 of the wedge-shaped locking protrusions 4212, 4214 become mutually locked in increasingly tightening frictional engagement via the wedging-action produced. This draws lid 4200 downward with added force beyond the weight of the lid alone onto and against the cask body 4101 to fully compress gasket 4220 and seal the cask cavity 4105. The gasket is now compressed further than when the lid 4200 first engages the cask body before the cask locking mechanism is actuated to draw the lid farther downward.

Now that the lid 4200 is fully coupled to the cask body 4101, the locking handle assemblies 4230 may be moved to their inward blocking positions to insert the locking blocks 4233 between each pair of locking bars 4210 on the longitudinal sides 4103 of the lid, thereby preventing sliding and unlocking of the longitudinal side locking bars (FIG. 77A). The handle assemblies therefore retain the locked positions of the locking bars on the cask longitudinal sidewalls 4103, which in turn retains the locking bars on the cask end walls in the locked position as previously described herein.

It bears noting that although the locking bars 4210 with locking protrusions 4212 are shown and described herein as being slideably mounted to the lid 4200 and locking protrusions 4214 are shown and described as being fixedly mounted to the cask body 4101 in one embodiment, in other embodiment the arrangement may be reversed. Accordingly, the locking bars 4210 may be slideably mounted to guide channels 4211 formed in the cask body while the fixed locking protrusions 4214 may instead be fixedly mounted to the closure lid. This alternate arrangement provides the same benefits and is operated in the same manner previously described herein. The locking bar hydraulic or pneumatic actuators 4240 in turn would be mounted to the cask body for operating the locking bars 4210.

Although the cask locking mechanism with locking bars 4210 and locking protrusions 4212, 4214 are shown and described herein as being applied to a box-shaped rectangular cuboid cask body and rectangular lid, the locking mechanism may be applied with equal benefit to a conventional cylindrical cask body and circular lid. The fixed second locking protrusions 4214 may be arranged on either the cylindrical cask body or lid, and the locking bars 4210 may be mounted on the other one of the cask body or lid. The locking bars and guide channels for the cylindrical cask application may be arcuately curved and operated via the hydraulic or pneumatic locking bar actuators 4240 previously described herein if mounted on either the cask body or circular lid. Alternatively, both the locking protrusions 4212, 4214 may be fixedly mounted to the cylindrical cask body and lid, and the slideable locking bars may be omitted. In this case, the lid may simply be rotated relative to the cylindrical cask body to slideably and frictionally engage the wedge-shaped locking protrusions to form a breech lock type closure. The lid may be rotated via assistance form the hydraulic/pneumatic actuators. Based on the foregoing alternative embodiments of the cask locking mechanism and description already provided herein, it is well within the ambit of those skilled in the art to implement any of these options without undue experimentation.

With general reference to FIGS. 61-70 and 81-83, an impact absorption system is provided to protect the cask 4100 and containment barrier from undue damage should the cask be forcibly impacted or dropped during transport and handling. In one embodiment, each of the longitudinal sidewalls 4103 and lateral end walls 4104 of the cask body 4101 comprises a plurality of outwardly protruding impact absorber bars 4140 fixedly coupled thereto. The closure lid 4200 and bottom surface 4102 of the cask body may also include multiple impact absorber bars 4140 fixedly coupled thereto. The bars 4140 may be each configured and arranged in appropriate locations on and in a pattern appropriate to meet regulatory requirements (e.g., Nuclear Regulator Commission or NRC) for surviving a postulated cask impact/drop event. In one embodiment, the impact absorber bars 4140 may be configured as rectangular blocks of suitable thickness and dimension for the intended purpose. The locking handle assemblies 4230 on longitudinal sidewalls 4103 of cask body 4101 may each be protected between at least a pair of absorber bars 4140 located proximately to the assembly on each side. These protective impact absorber bars have depth measured perpendicularly to the exterior surface of the cask body longitudinal sidewalls 4103 such that the handle assemblies 4230 do not protrude outwards beyond the bars. In one embodiment, the impact absorber bars 4140 may be bolted to the cask body and lid (see, e.g., FIGS. 83-86). This allows the bars to be readily replaced if damaged during a cask drop/impact event. In other embodiments, the bars 4140 maybe welded thereto.

Each corner 4107 of the cask body 4101 and corners 4205 of lid 4200 may be protected by corner impact absorbers 4141 fixedly coupled to corner regions. Sets of upper and lower corner impact absorber are provided to cover and shield the lid and adjacent upper corner regions of the cask body, and the bottom wall 4102 and adjacent lower corner regions of the cask body, respectively. In one embodiment, the corner impact absorbers 4141 may be assemblies comprising an inner corner bracket 4142 and outer corner blocks 4143 fixedly coupled thereto. Inner corner brackets 4142 may be fixedly coupled to the cask body 4101 at the lower corners of the body, and the lid and/or cask body at the upper corners. In one embodiment, the inner corner brackets 4142 and corner blocks 4143 may be fixedly coupled to and movable with lid 4200 as shown herein. The inner corner brackets 4142 have inward facing concave recesses configured to conform to the perpendicular and squared off corners of the cask body and lid. The outer corner blocks 4143 have concave recesses configured to conform to the exterior shape of the inner corner brackets 4142. The upper corner impact absorbers 4141 extend vertically downwards from the lid over the upper corners of the cask body, and horizontally wrap longitudinally and laterally around the side regions of the corners on both the cask body 4101 and lid 4200. The upper corner impact absorbers also extend partially over the top of the lid at the corners. The lower corner impact absorbers 4141 horizontally wrap longitudinal and laterally around the side regions of the corners on the cask body 4101 and bottom wall 4102, and partially underneath the bottom wall. In one embodiment, the inner corner brackets 4142 and outer corner blocks 4143 may be bolted or screwed together via threaded fasteners. The inner corner brackets 4142 may in turn be bolted or screws to the cask body 4101 and cask body and/or lid 4200 vi threaded fasteners as applicable.

To facilitate handling the cask 4100, each of the longitudinal sidewalls 4103 of cask body 4101 may include a plurality of outwardly protruding lifting trunnions 4150 fixedly attached thereto. Lifting trunnions 4150 may be generally cylindrical in configuration and of the retractable type in one embodiment which are known in the art. The lid 4200 in turn may include a plurality of lifting lugs 4151 for handling the lid. Lugs 4151 are fixedly attached to the lid. Lifting lugs may be generally cylindrical in configuration in one embodiment. Any suitable number of lifting trunnions and lugs may be provided as needed to safely lift and maneuver the cask body and lid. Other configurations and constructions of the lifting trunnions and lugs may be provided which are suitable for lifting and maneuvering the weight of cask body and lid in a stable manner.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An impact limiter for a transport cask configured to hold nuclear waste, the impact limiter comprising:
   a body including a first end and an opposite second end configured for coupling to one end of the transport cask;
   an annular perforated sleeve coupled to the second end of the body;
   the perforated sleeve configured to surround an exposed side portion of the one end of the transport cask for protection against side impacts.

2. The impact limiter according to claim 1, wherein the second end of the body of the impact limiter comprises an outwardly open receptacle configured to receive the one end of the transport cask therein.

3. The impact limiter according to claim 2, wherein the perforated sleeve is disposed at least partially inside the receptacle.

4. The impact limiter according to claim 3, wherein the perforated sleeve has a ring-shaped body formed of solid metal defining a central opening configured to receive the one end of the transport cask therein and a circumferential array of elongated longitudinal passages formed through the solid metal spaced circumferentially around the central opening.

5. The impact limiter according to claim 4, wherein the ring-shaped body of the perforated sleeve has a composite construction which is collectively formed by multiple solid metal ring segments stacked and welded together, each ring segment defining a portion of the central opening and longitudinal passages which are concentrically aligned in each ring segment.

6. The impact limiter according to claim 4, wherein the longitudinal passages have a circular transverse cross section.

7. The impact limiter according to claim 6, wherein the longitudinal passages are distributed in a full 360 degree pattern around the central opening in the ring-shaped body of the perforated sleeve.

8. The impact limiter according to claim 7, wherein the circumferential array of longitudinal passages comprises multiple concentric rings of circumferentially spaced apart longitudinal passages.

9. The impact limiter according to claim 7, wherein the longitudinal passages are oriented parallel to each other and extend between a top major surface and a bottom major surface of the perforated sleeve.

10. The impact limiter according to claim 7, wherein the longitudinal passages each have a longitudinal length which is greater than their respective diameter.

11. The impact limiter according to claim 4, wherein the ring-shaped body of the perforated sleeve is formed of aluminum.

12. The impact limiter according to claim 4, wherein the longitudinal passages are oriented parallel to a longitudinal axis of the transport cask when the one end of the transport cask is positioned in the central opening of the perforated sleeve.

13. The impact limiter according to claim 4, wherein the body of the impact limiter comprises an outer cap shell including an end wall at the first end of the body, and a sidewall which defines the receptacle at the second end of the body, the perforated sleeve being nested inside the cap shell.

14. The impact limiter according to claim 13, wherein the impact limiter includes a centrally-located internal annular collar which defines the receptacle.

15. The impact limiter according to claim 14, wherein the collars spaced radially inwards m the sidewall of the cap shell cap to define an annulus adjacent to the receptacle, the perforated sleeve being nested in the annulus.

16. The impact limiter according to claim 13, wherein the outer cap shell defines an end cavity of the impact limiter opposite the receptacle, the end cavity containing an energy absorbing material comprising a corrugated aluminum panel honeycomb structure or a polymeric foam material.

17. The impact limiter according to claim 4, wherein the end wall of the impact limiter comprises a plurality of fastener openings configured to receive threaded fasteners operable for coupling the impact limiter to a lid of the transport cask.

18. An impact amelioration system for nuclear fuel storage components comprising:
- a fuel storage canister comprising a first shell extending along a vertical centerline, the canister configured for storing nuclear fuel;
- an outer cask defining a cavity receiving the canister, the cask comprising a second shell and a bottom closure plate attached to the second shell;
- a plurality of impact limiter assemblies disposed on the bottom closure plate at a canister to cask interface, each of the impact limiter assemblies comprising a plug frictionally engaged with a corresponding plug hole formed in the bottom closure plate;
- wherein the plugs engage the canister.

19. An unventilated nuclear waste fuel storage pressure vessel with self-regulating internal pressure relief mechanism, the pressure vessel comprising:
- a longitudinal axis;
- a cask body including an inner shell, an outer shell, an annular space containing a radiation shielding material formed between the shells, a bottom baseplate sealed to bottom ends of the shells, and an internal cavity configured to house a nuclear waste fuel canister therein;
- a plurality of upwardly open threaded anchor bosses affixed to a top end of the cask body;
- a radiation shielding lid loosely coupled to the top end of the cask body in a movable manner;
- an annular compressible gasket forming a circumferential seal between the lid and the top end of the cask body which renders the cavity gas tight; and
- a plurality of bolt assemblies passing through the lid and threadably engaged with the anchor bosses, the bolt assemblies configured and operable to loosely secure the lid to the cask body;
- the lid being movable between (1) a downward sealed position engaged with the cask body which seals the gas tight cavity of the cask; and (2) an adjustable raised relief position engaged with the bolt assemblies but ajar from the top end of the cask body to partially open the gas tight cavity thereby defining a gas overpressurization relief passageway to ambient atmosphere;
- wherein the cask is operable to retain an internal pressure within the cavity above atmospheric pressure.

20. A cask for containing radioactive materials comprising:
- a longitudinal axis;
- an axially elongated cask body defining a top opening forming an entrance to an internal storage cavity of non-cylindrical cross-sectional configuration, the cavity configured for holding radioactive waste materials; and
- a closure lid detachably coupled to the cask body at the top opening.

* * * * *